US010866714B2

(12) United States Patent
Kim et al.

(10) Patent No.: US 10,866,714 B2
(45) Date of Patent: Dec. 15, 2020

(54) USER TERMINAL DEVICE AND METHOD FOR DISPLAYING THEREOF

(71) Applicant: SAMSUNG ELECTRONICS CO., LTD., Suwon-si (KR)

(72) Inventors: Yun-kyung Kim, Suwon-si (KR); Hae-yoon Park, Seoul (KR); Yong-yeon Lee, Suwon-si (KR); Ji-yeon Kwak, Seoul (KR); Yeo-jun Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 701 days.

(21) Appl. No.: 14/621,985

(22) Filed: Feb. 13, 2015

(65) Prior Publication Data

US 2015/0227297 A1 Aug. 13, 2015

Related U.S. Application Data

(60) Provisional application No. 61/939,380, filed on Feb. 13, 2014.

(30) Foreign Application Priority Data

Jul. 15, 2014 (KR) .................. 10-2014-0089060

(51) Int. Cl.
*G06F 3/0484* (2013.01)
*G06F 3/0488* (2013.01)
(Continued)

(52) U.S. Cl.
CPC ........ *G06F 3/04845* (2013.01); *G06F 1/1694* (2013.01); *G06F 3/017* (2013.01);
(Continued)

(58) Field of Classification Search
CPC .. G06F 3/04845; G06F 3/0488; G06F 1/1694; G06F 3/017; G06F 3/04883;
(Continued)

(56) References Cited

U.S. PATENT DOCUMENTS 6,115,025 A * 9/2000 Buxton ................. G06F 1/1601
345/166
6,628,310 B1 * 9/2003 Hiura ..................... G06F 3/0481
715/776
(Continued)

FOREIGN PATENT DOCUMENTS

EP 2 685 341 A1 1/2014
KR 10-0667848 B1 1/2007
(Continued)

OTHER PUBLICATIONS

Office Action dated Jan. 9, 2019 by the Korean Intellectual Property Office in counterpart Korean Patent Application No. 10-2014-0089060.

(Continued)

*Primary Examiner* — Jung-Mu T Chuang
(74) *Attorney, Agent, or Firm* — Sughrue Mion, PLLC

(57) ABSTRACT

A user terminal device and a method for displaying on a user terminal device. The method includes displaying a first screen, detecting a user interaction to rotate the first screen while the first screen is displayed, and in response to the detected user interaction, displaying the first screen in a rotated state in a clockwise or counterclockwise direction at a predetermined angle and displaying a second screen related to the rotated first screen on at least one of a plurality of corner areas of the user terminal device.

20 Claims, 144 Drawing Sheets

(51) Int. Cl.
| | |
|---|---|
| *G06F 3/0346* | (2013.01) |
| *G06F 3/01* | (2006.01) |
| *G06F 1/16* | (2006.01) |
| *H04M 1/725* | (2006.01) |
| *H04M 1/02* | (2006.01) |

(52) U.S. Cl.
CPC .......... *G06F 3/0346* (2013.01); *G06F 3/0488* (2013.01); *G06F 3/04883* (2013.01); *H04M 1/0241* (2013.01); *H04M 1/72519* (2013.01); *G06F 2200/1614* (2013.01); *G06F 2203/04806* (2013.01); *H04M 2250/12* (2013.01); *H04M 2250/22* (2013.01)

(58) Field of Classification Search
CPC ........... G06F 3/0346; G06F 2200/1614; G06F 2203/04806; H04M 1/0243; H04M 2250/22; H04M 2250/12; H04M 1/0241; H04M 1/72519
See application file for complete search history.

(56) References Cited

U.S. PATENT DOCUMENTS

| | | | | |
|---|---|---|---|---|
| 6,982,728 | B1* | 1/2006 | Nicolas | G06F 1/1626 345/649 |
| 7,109,977 | B2* | 9/2006 | Durso | E05B 73/0082 178/18.03 |
| 7,814,419 | B2* | 10/2010 | Fabritius | G06F 1/1626 715/702 |
| 7,978,176 | B2* | 7/2011 | Forstall | G06F 1/1626 345/158 |
| 8,072,427 | B2* | 12/2011 | Pletikosa | G06F 1/1622 341/22 |
| 8,185,169 | B2* | 5/2012 | Griffin | H04M 1/0231 345/168 |
| 8,255,825 | B2* | 8/2012 | Morris | G06F 3/1454 715/781 |
| 8,531,486 | B2* | 9/2013 | Laine | G06F 1/1626 345/659 |
| 8,639,102 | B2* | 1/2014 | Seo | G03B 17/02 345/659 |
| 8,726,190 | B2* | 5/2014 | Clark | G06F 3/0481 715/815 |
| 8,872,855 | B2* | 10/2014 | Doll | G09G 5/14 345/649 |
| 9,092,070 | B2* | 7/2015 | Jung | G06F 1/1694 |
| 9,170,659 | B2* | 10/2015 | Kim | G06F 1/1637 |
| 9,177,356 | B2* | 11/2015 | Van Osten | G06T 13/80 |
| 9,182,900 | B2 | 11/2015 | Choi | |
| 9,467,848 | B1* | 10/2016 | Song | G06F 3/0488 |
| 9,489,080 | B2* | 11/2016 | Seo | G06F 1/1641 |
| 9,721,375 | B1* | 8/2017 | Rivard | G06T 13/80 |
| 9,727,292 | B1* | 8/2017 | Kudryashov | G06F 3/14 |
| 9,766,788 | B2* | 9/2017 | Kerr | G06F 1/1626 |
| 9,811,507 | B2* | 11/2017 | Cranfill | G06Q 20/123 |
| 10,061,760 | B2* | 8/2018 | Brant | G06F 17/217 |
| 10,152,460 | B2* | 12/2018 | Kennedy, Jr. | G06F 17/245 |
| 10,410,605 | B2* | 9/2019 | Gardenfors | G09G 5/363 |
| 10,551,995 | B1 | 2/2020 | Ho et al. | |
| 2001/0026379 | A1* | 10/2001 | Collard | H04N 1/00395 358/488 |
| 2005/0064917 | A1* | 3/2005 | Peng | H04M 1/021 455/575.1 |
| 2005/0073504 | A1* | 4/2005 | Durso | E05B 73/0082 345/173 |
| 2005/0114788 | A1* | 5/2005 | Fabritius | G06F 1/1626 715/767 |
| 2006/0126284 | A1* | 6/2006 | Moscovitch | B60R 11/02 361/679.04 |
| 2006/0152497 | A1* | 7/2006 | Rekimoto | G06F 1/1616 345/173 |
| 2006/0284852 | A1* | 12/2006 | Hofmeister | G06F 3/0483 345/173 |
| 2007/0064288 | A1* | 3/2007 | Lee | G06F 3/1205 358/527 |
| 2007/0146347 | A1* | 6/2007 | Rosenberg | G06F 3/04883 345/173 |
| 2007/0220444 | A1* | 9/2007 | Sunday | G06F 3/0488 715/788 |
| 2008/0074442 | A1* | 3/2008 | Taniguchi | G06F 1/1622 345/659 |
| 2008/0165144 | A1* | 7/2008 | Forstall | G06F 1/1626 345/173 |
| 2008/0229224 | A1* | 9/2008 | Kake | G06F 3/04817 715/769 |
| 2009/0058820 | A1* | 3/2009 | Hinckley | G06F 3/017 345/173 |
| 2009/0058882 | A1* | 3/2009 | Adachi | G06F 1/1622 345/650 |
| 2009/0094562 | A1* | 4/2009 | Jeong | G06F 3/0486 715/863 |
| 2009/0262074 | A1* | 10/2009 | Nasiri | G06F 1/1626 345/158 |
| 2010/0037167 | A1* | 2/2010 | Son | H04M 1/27475 715/769 |
| 2010/0081475 | A1* | 4/2010 | Chiang | G06F 3/04883 455/564 |
| 2010/0088630 | A1* | 4/2010 | Morris | G06F 3/1454 715/781 |
| 2010/0097322 | A1* | 4/2010 | Hu | G06F 3/04883 345/173 |
| 2010/0203925 | A1* | 8/2010 | Nagai | H04M 1/0225 455/566 |
| 2010/0265269 | A1* | 10/2010 | Matsuda | G09G 3/2092 345/650 |
| 2011/0016165 | A1* | 1/2011 | Uejima | G06F 3/04883 708/141 |
| 2011/0261075 | A1* | 10/2011 | Tanaka | H04N 1/32133 345/649 |
| 2012/0028688 | A1* | 2/2012 | Vartanian | G09G 5/14 455/566 |
| 2012/0081277 | A1* | 4/2012 | de Paz | G06F 3/04883 345/156 |
| 2012/0084674 | A1* | 4/2012 | Visosky | G06F 3/0483 715/761 |
| 2012/0180001 | A1* | 7/2012 | Griffin | G06F 3/04883 715/863 |
| 2012/0221966 | A1* | 8/2012 | Inami | G06F 1/1641 715/761 |
| 2012/0229399 | A1* | 9/2012 | Kobayashi | G06F 3/0486 345/173 |
| 2012/0235930 | A1 | 9/2012 | Lazaridis et al. | |
| 2012/0235938 | A1* | 9/2012 | Laubach | G06F 3/04883 345/173 |
| 2012/0252410 | A1* | 10/2012 | Williams | G06F 21/36 455/411 |
| 2012/0274663 | A1* | 11/2012 | Laine | G06F 1/1626 345/659 |
| 2012/0304107 | A1* | 11/2012 | Nan | G06F 3/04886 715/781 |
| 2012/0311438 | A1* | 12/2012 | Cranfill | G06F 3/0483 715/256 |
| 2013/0019201 | A1* | 1/2013 | Cabrera-Cordon | G06F 3/04883 715/810 |
| 2013/0021377 | A1* | 1/2013 | Doll | G09G 5/14 345/649 |
| 2013/0024812 | A1* | 1/2013 | Reeves | G06F 3/04842 715/810 |
| 2013/0027613 | A1* | 1/2013 | Kim | H04N 21/4788 348/563 |
| 2013/0069987 | A1* | 3/2013 | Choe | G06F 3/0488 345/649 |
| 2013/0097542 | A1* | 4/2013 | Icho | G06F 3/0486 715/769 |
| 2013/0125045 | A1* | 5/2013 | Sun | G06F 3/04883 715/788 |
| 2013/0128016 | A2* | 5/2013 | Keys | H04N 13/341 348/56 |

(56) References Cited

U.S. PATENT DOCUMENTS

| | | | |
|---|---|---|---|
| 2013/0147795 A1* | 6/2013 | Kim | G06F 1/3203 345/419 |
| 2013/0154947 A1* | 6/2013 | Abrams | G06F 1/1626 345/173 |
| 2013/0176248 A1* | 7/2013 | Shin | G06F 3/041 345/173 |
| 2013/0194309 A1* | 8/2013 | Seo | G03B 17/02 345/659 |
| 2013/0222243 A1* | 8/2013 | Jung | G06F 1/1694 345/158 |
| 2013/0268847 A1 | 10/2013 | Kim et al. | |
| 2013/0298054 A1* | 11/2013 | Nakazawa | G06F 3/04883 715/765 |
| 2013/0321654 A1* | 12/2013 | Shintani | H04N 5/232 348/208.4 |
| 2014/0009418 A1* | 1/2014 | Sugimoto | G06F 3/0412 345/173 |
| 2014/0009499 A1* | 1/2014 | Gardenfors | G06F 1/1626 345/656 |
| 2014/0033127 A1* | 1/2014 | Choi | G06F 3/04845 715/825 |
| 2014/0043265 A1* | 2/2014 | Chang | G06F 3/04883 345/173 |
| 2014/0129975 A1* | 5/2014 | Ramachandran | G06F 3/0488 715/784 |
| 2014/0155165 A1* | 6/2014 | Hammontree | A63F 13/211 463/31 |
| 2014/0173483 A1* | 6/2014 | Hicks | G06F 3/0486 715/769 |
| 2014/0173495 A1* | 6/2014 | Chang | G06F 3/04883 715/776 |
| 2014/0189395 A1* | 7/2014 | Kp | G06F 1/3231 713/320 |
| 2014/0208128 A1* | 7/2014 | Gyorfi | G06F 9/542 713/300 |
| 2014/0282214 A1* | 9/2014 | Shirzadi | G06F 3/04883 715/781 |
| 2014/0304645 A1 | 10/2014 | Osman et al. | |
| 2014/0359541 A1* | 12/2014 | Park | G06F 3/0488 715/863 |
| 2014/0365909 A1* | 12/2014 | Kerr | G06F 1/1626 715/746 |
| 2014/0368422 A1* | 12/2014 | Gupta | G06F 3/0304 345/156 |
| 2014/0380247 A1 | 12/2014 | Tecarro et al. | |
| 2015/0049119 A1* | 2/2015 | Homma | G06F 3/02 345/649 |
| 2015/0113446 A1* | 4/2015 | Penha | G06F 1/1694 715/753 |
| 2015/0186037 A1* | 7/2015 | Kanatani | G06F 3/0488 715/773 |
| 2015/0227297 A1* | 8/2015 | Kim | G06F 1/1694 715/799 |
| 2015/0228255 A1* | 8/2015 | Takasu | G06F 1/3206 345/659 |
| 2015/0277847 A1* | 10/2015 | Yliaho | H04M 1/72569 381/122 |
| 2015/0293656 A1* | 10/2015 | Jung | G06F 1/1694 345/158 |
| 2015/0309691 A1* | 10/2015 | Seo | G06F 1/1641 345/173 |
| 2015/0317060 A1* | 11/2015 | Debets | G06Q 30/0267 715/835 |
| 2016/0041709 A1 | 2/2016 | Choi | |
| 2016/0217554 A1* | 7/2016 | Nguyen | G06F 3/0487 |
| 2016/0224119 A1* | 8/2016 | Wu | G06F 21/36 |
| 2018/0048752 A1* | 2/2018 | Zhou | H04M 1/67 |
| 2019/0012051 A1* | 1/2019 | Jeon | G06F 3/0482 |

FOREIGN PATENT DOCUMENTS

| | | |
|---|---|---|
| KR | 10-2008-0086292 A | 9/2008 |
| KR | 10-1135071 B1 | 4/2012 |
| KR | 10-2013-0054042 A | 5/2013 |
| KR | 10-2014-0013547 A | 2/2014 |

OTHER PUBLICATIONS

Office Action dated Dec. 15, 2016, issued by the United States Patent and Trademark Office in counterpart U.S. Appl. No. 14/621,597.
Office Action dated Jun. 8, 2017, issued by the United States Patent and Trademark Office in counterpart U.S. Appl. No. 14/621,597.
Office Action dated Sep. 20, 2017, issued by the United States Patent and Trademark Office in counterpart U.S. Appl. No. 14/621,597.
Office Action dated Mar. 9, 2018, issued by the United States Patent and Trademark Office in counterpart U.S. Appl. No. 14/621,597.
Office Action dated Aug. 27, 2018, issued by the United States Patent and Trademark Office in counterpart U.S. Appl. No. 14/621,597.
Office Action dated Feb. 26, 2019, issued by the United States Patent and Trademark Office in counterpart U.S. Appl. No. 14/621,597.
Communication dated Oct. 22, 2018, issued by the Korean Intellectual Property Office in counterpart Korean Patent Application No. 10-2014-0088919.
Communication dated Oct. 22, 2018, issued by the Korean Intellectual Property Office in counterpart Korean Patent Application No. 10-2014-0088924.
Office Action dated Mar. 30, 2017, issued by the United States Patent and Trademark Office in counterpart U.S. Appl. No. 14/622,041.
Office Action dated Aug. 30, 2017, issued by the United States Patent and Trademark Office in counterpart U.S. Appl. No. 14/622,041.
Office Action dated Mar. 16, 2018, issued by the United States Patent and Trademark Office in counterpart U.S. Appl. No. 14/622,041.
Office Action dated Aug. 15, 2018, issued by the United States Patent and Trademark Office in counterpart U.S. Appl. No. 14/622,041.
Communication dated Apr. 24, 2019, issued by the Korean Patent Office in counterpart Korean Application No. 10-2014-0088924.
Communication dated Apr. 29, 2019, issued by the Korean Patent Office in counterpart Korean Application No. 10-2014-0088919.
Communication dated Jun. 28, 2019, issued by the United States Patent Office in counterpart U.S. Appl. No. 14/622,041.
Communication dated Oct. 31, 2019 by the Korean Intellectual Property Office in counterpart Korean Patent Application No. 10-2014-0088924.
Communication dated Nov. 27, 2019 by the Korean intellectual Property Office in counterpart Korean Patent Application No. 10-2014-0088919.
Communication dated Nov. 27, 2019 by the United States Patent and Trademark Office in counterpart U.S. Appl. No. 14/621,597.
Communication dated Mar. 27, 2020 from the Korean Patent Office in application No. 10-2014-0088924.
Communication dated Apr. 29, 2020 from the United States Patent and Trademark Office in U.S. Appl. No. 14/621,597.

* cited by examiner

FIG. 3B
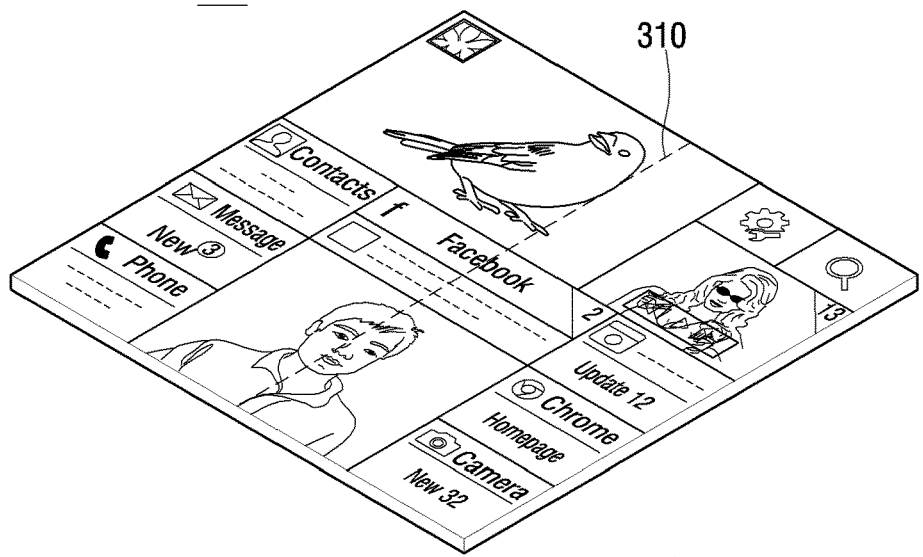
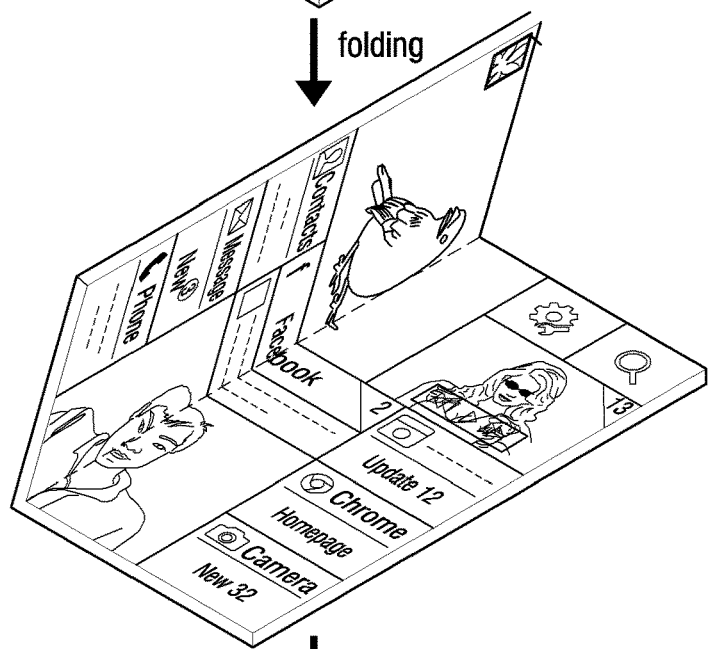
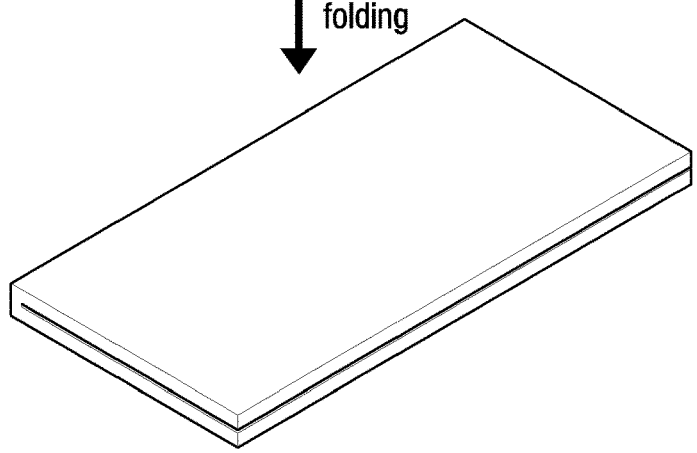

FIG. 5A
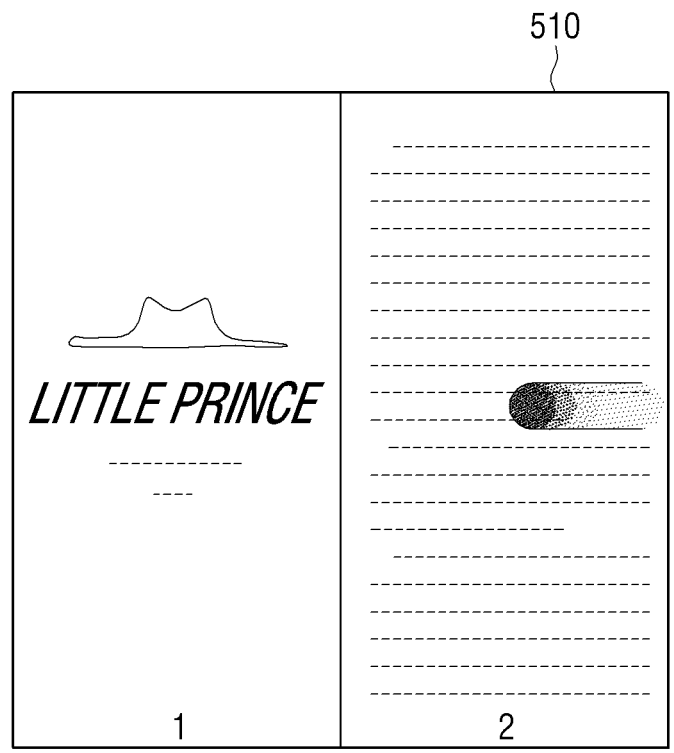
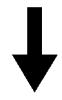
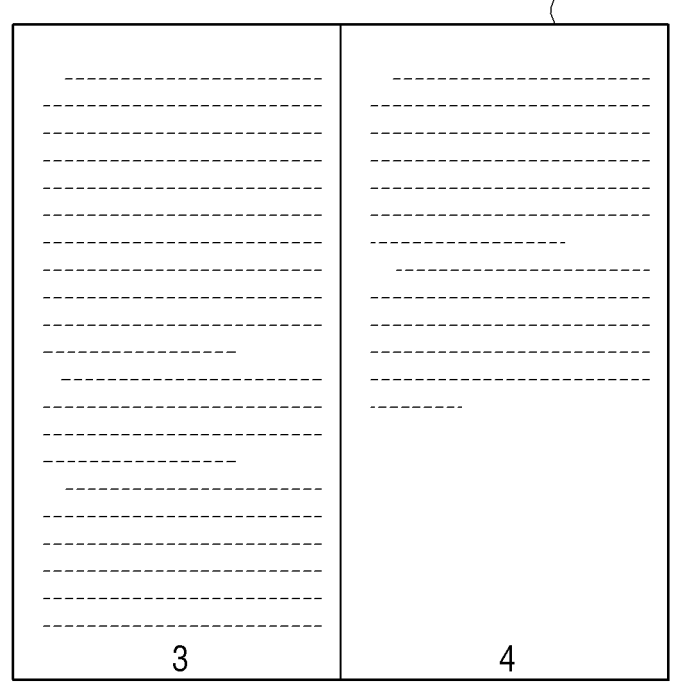

1510

8 New photos

1520

2 New Updates

1530

8 New photos

1540

2 New Updates

FIG. 31A-1         FIG. 31A-2
3110                3120
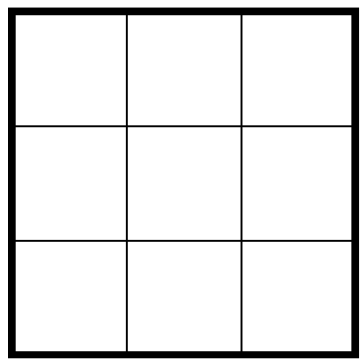 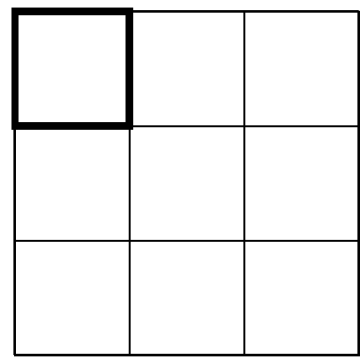
FIG. 31A-3         FIG. 31A-4
3130                3140
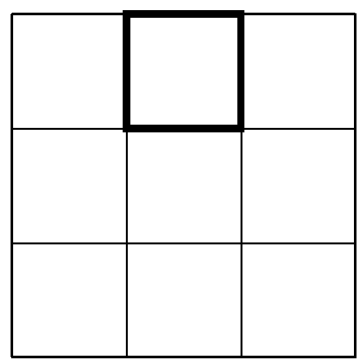 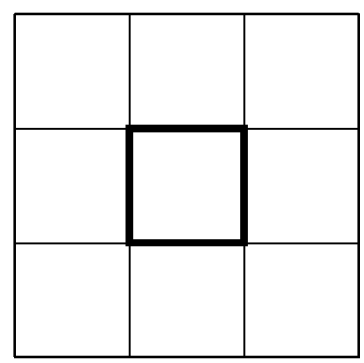

3610-1

3610-2

3610-3

3610-4

FIG. 39
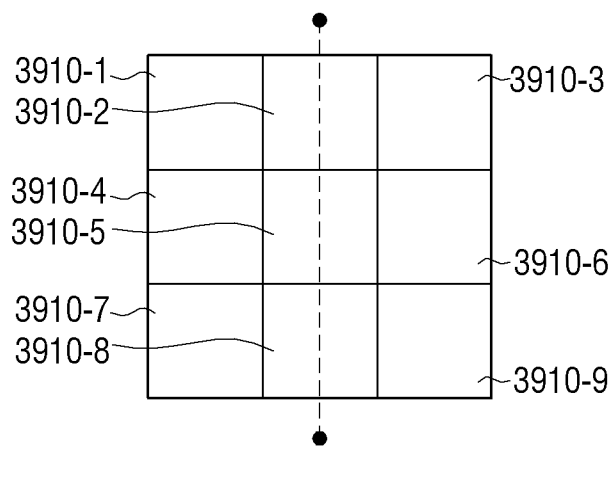
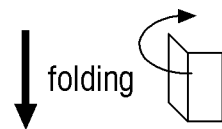
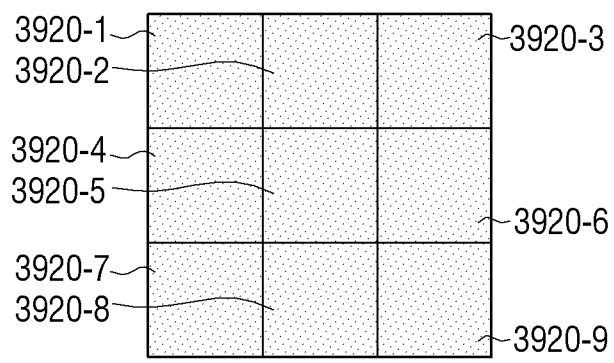

FIG. 40A
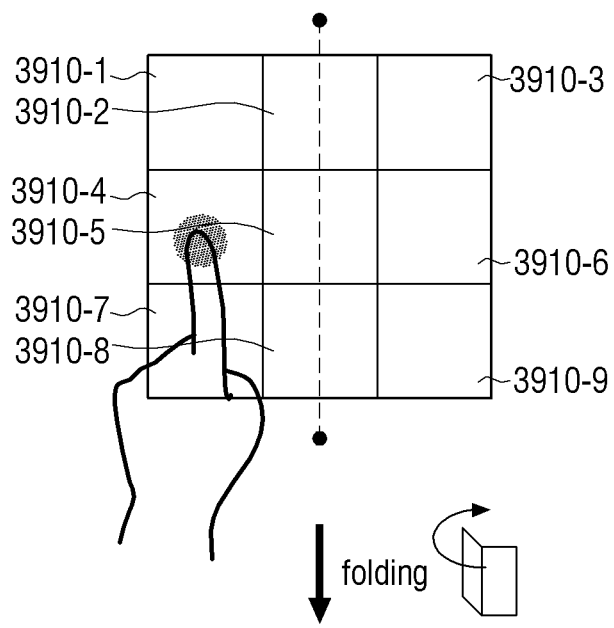
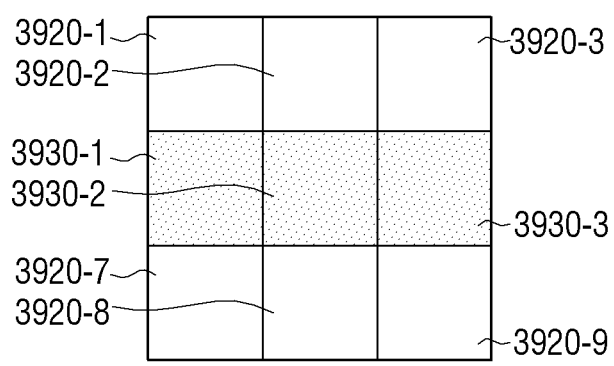

FIG. 40B
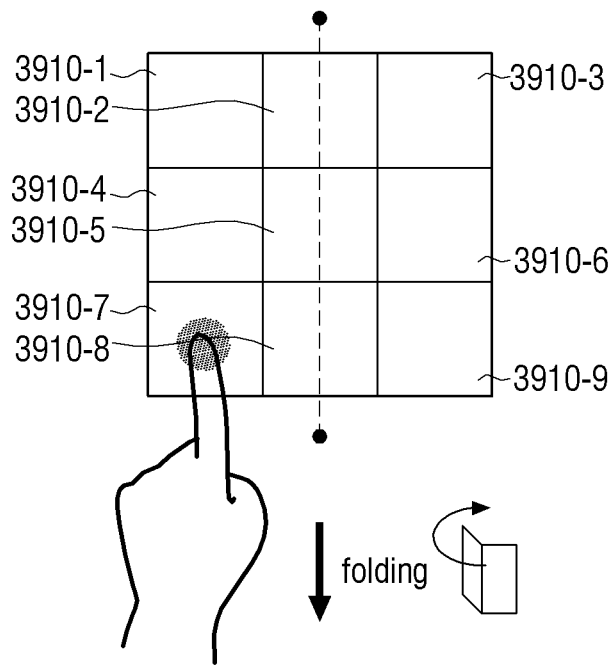
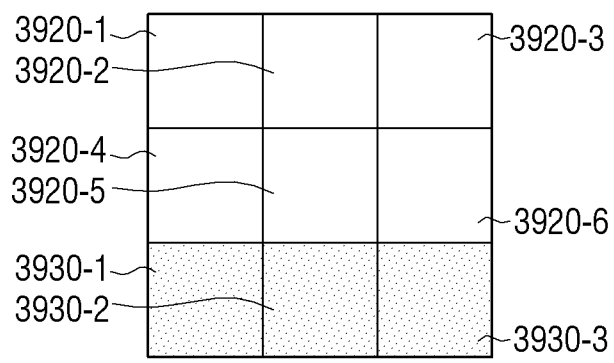

FIG. 42B
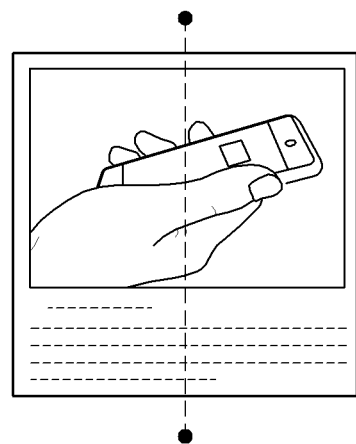
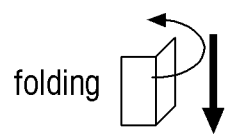
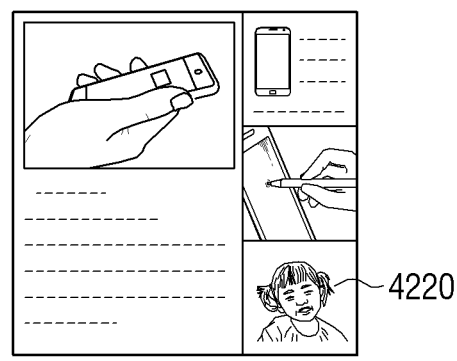

FIG. 43A
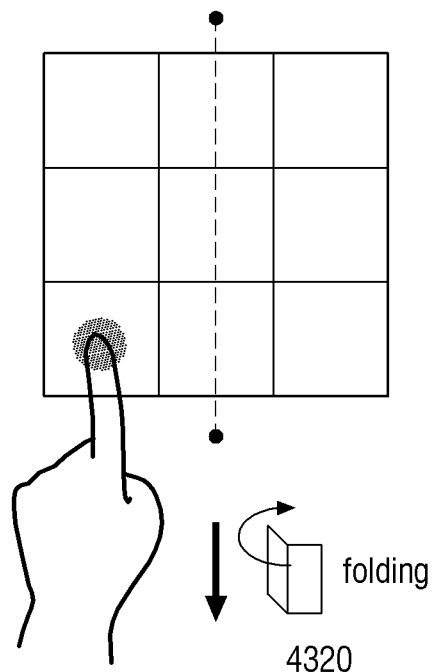
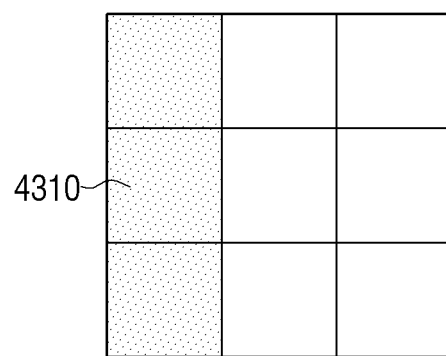

FIG. 43B
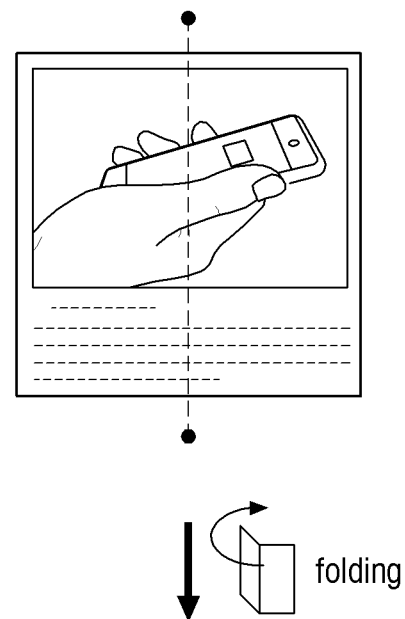
folding
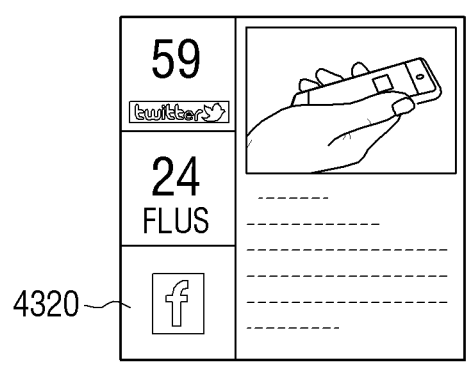

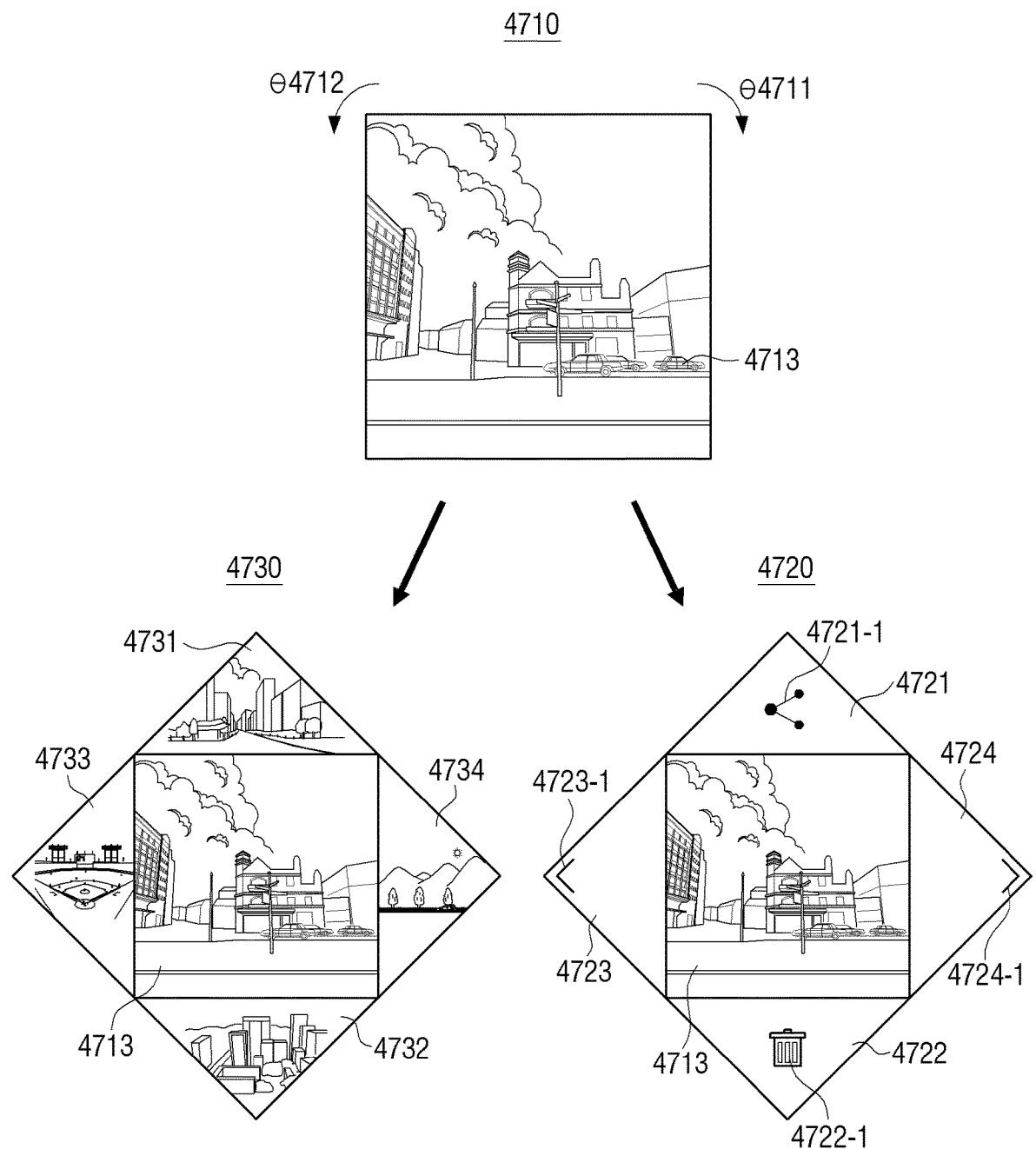

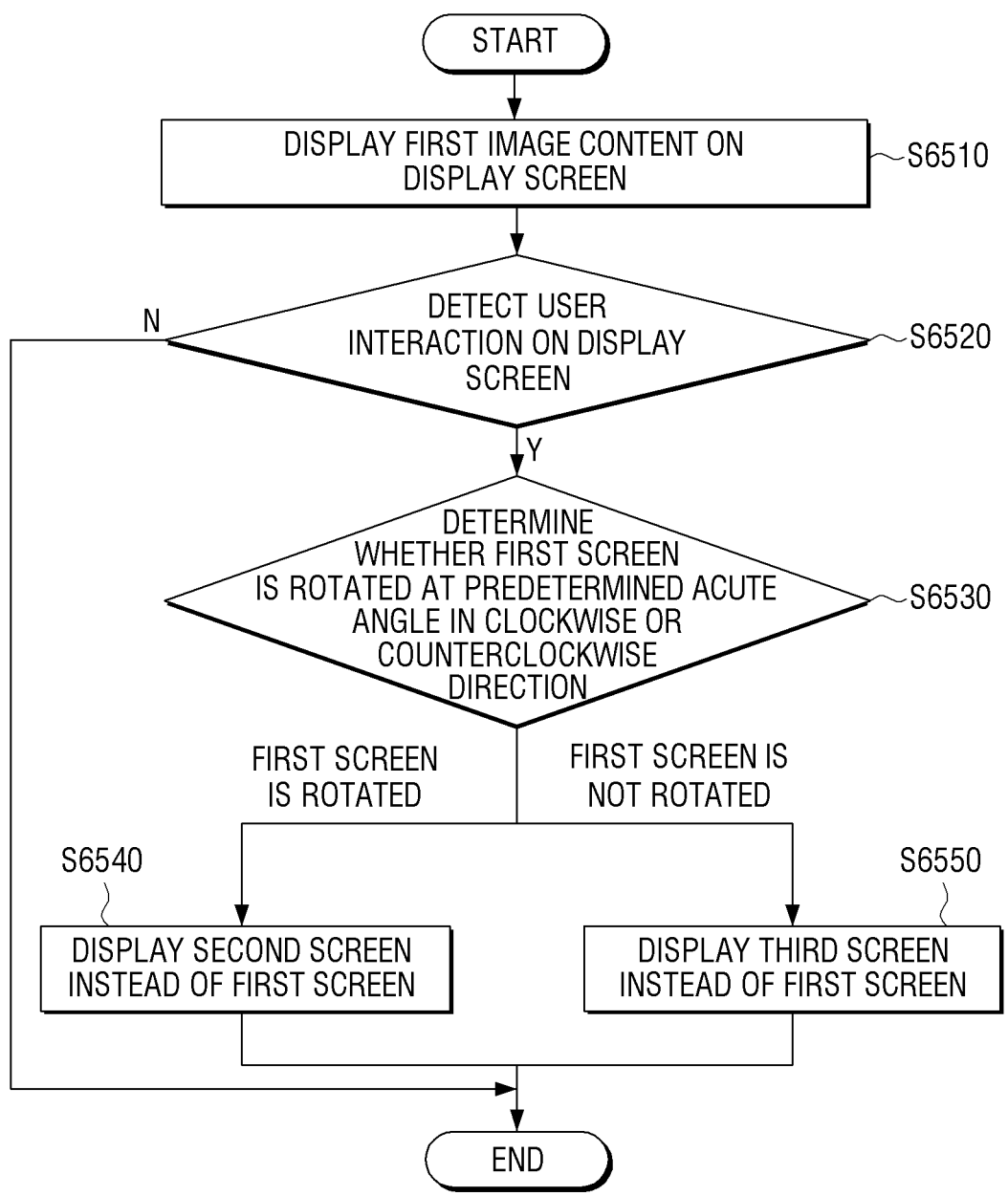

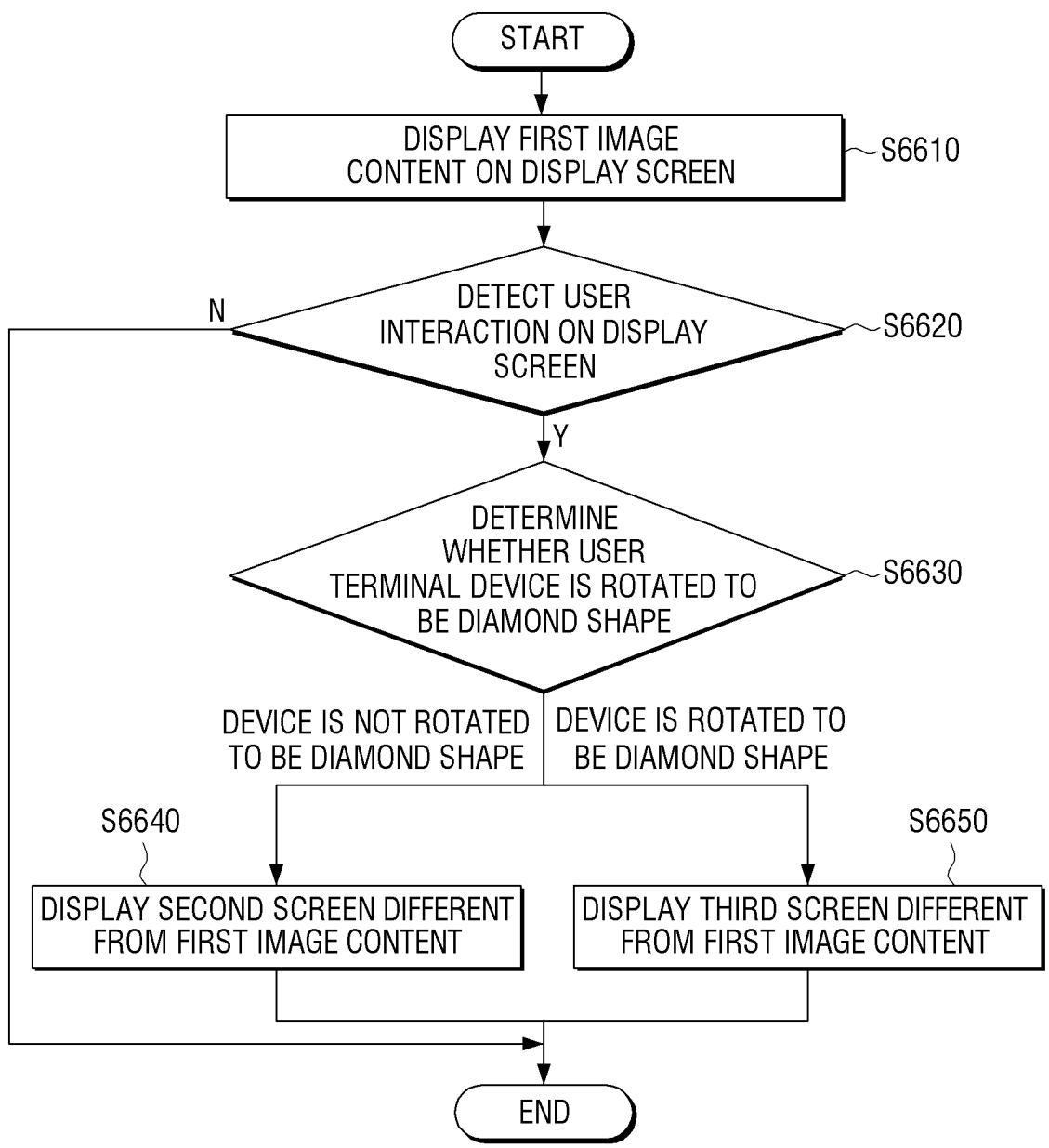

USER TERMINAL DEVICE AND METHOD FOR DISPLAYING THEREOF

CROSS-REFERENCE TO RELATED APPLICATIONS

This application claims the benefit of priority from Korean Patent Application No. 10-2014-0089060, filed on Jul. 15, 2014, in the Korean Intellectual Property Office and U.S. Provisional Application No. 61/939,380, filed on Feb. 13, 2014, the disclosures of which are incorporated herein by reference in their entirety.

BACKGROUND

1. Field

Apparatuses and methods consistent with exemplary embodiments broadly relate to a user terminal device and a method for displaying thereof, and more particularly, to a user terminal device including a display panel in a square shape and a method for displaying thereof.

2. Description of the Related Art

With the development of electronic technology, various types of user terminal devices have been developed and distributed. Recently, size of the user terminal devices has been minimized, but the functions of the user terminal devices have become diverse, and therefore, the demands for the user terminal devices have been increasing.

A user terminal device may provide various contents such as multimedia contents and application screens upon request of a user. A user may select a desired function using a button or a touch screen provided on a user terminal device. A user terminal device may selectively execute a program according to a user interaction between a user and the device, and display the result thereof.

As more diverse functions are provided by a user terminal device, there are various needs for a method of displaying contents or a user interface method. That is, as the method of displaying content has changed and the type and function of the contents have been increasing, the conventional interaction methods such as merely selecting a button or touching a screen may be insufficient to perform various functions of a user terminal device.

Thus, there is a need of user interaction technology which enables a user to use a user terminal device more conveniently.

SUMMARY

Exemplary embodiments may overcome the above disadvantages and other disadvantages not described above. However, it is understood that the exemplary embodiment are not required to overcome the disadvantages described above, and may not overcome any of the problems described above.

Exemplary embodiments are related to a user terminal device which may perform various functions through a diagonal interaction and a method for displaying thereof.

Exemplary embodiments are also related to a user terminal device having a display panel in a square shape which may provide a user terminal device that displays a plurality of objects on a grid screen including a plurality of square cells, and provides various functions on a plurality of objects according to a user action, and a method for displaying thereof.

According to an exemplary embodiment, there is provided a method for displaying includes displaying a first screen on a display of a user terminal device; detecting a user interaction to rotate the first screen while the first screen is displayed; rotating the first screen based on the detecting and in response to the user interaction, displaying the rotated first screen and a second screen related to the rotated first screen on at least one of a plurality of corner areas of the display.

The rotating may include rotating the first screen at a predetermined angle in a clockwise or counterclockwise direction, based on the detecting and an area of the rotated first screen may be smaller than an area of the first screen before the rotating.

The predetermined angle may be between 40 degrees and 50 degrees.

The user interaction may be one of: a user interaction to rotate the user terminal device in a clockwise or counterclockwise direction so that the user terminal device is in a diamond shape, a user interaction to touch the display in which the first screen is displayed and then drag from the touch point of the display in a clockwise or counterclockwise direction, and a user interaction to drag at least one side of a bezel of the user terminal device.

The rotated first screen may be in a square shape and the second screen may be in an isosceles triangle shape, and the rotated first screen and the second screen may share one side.

In response to an image content being displayed in the rotated first screen, a function related to the image content may be displayed in the second screen.

In response to an image content being displayed in the rotated first screen, at least a part of another image content of an image content list, which includes the image content, may be displayed in the second screen.

In response to a first application being displayed in the rotated first screen, icons of second applications related to the first application may be displayed in the second screen.

The method may further include detecting another user interaction to drag at least one side of the display or at least one side of a bezel of the user terminal device; determine one or more of a dragging amount and a direction of this other user interaction, and changing a size of the rotated first screen based on one of the determined dragging amount and the determined direction.

According to yet another exemplary embodiment, a method of displaying includes displaying a first screen on a display of a user terminal device; detecting a user interaction on the display; in response to the detected user interaction and based on the displayed first screen being rotated in a clockwise or counterclockwise direction at a predetermined angle, displaying a second screen instead of the first screen, and in response to the detected user interaction and based on the displayed first screen being not rotated, displaying a third screen instead of the first screen, where the first screen, the second screen, and the third screen are different from each other.

According to an exemplary embodiment, a user terminal device includes a display configured to display a first screen; a detector configured to detect a user interaction to rotate the first screen while the display displays the first screen; and a controller configured to rotate the first screen based on the detected user interaction by the detector and configured to control the display to display the rotated first screen and a second screen related to the rotated first screen on at least one of a plurality of corner areas of the display.

The rotating may include rotating the first screen at a predetermined angle in a clockwise or counterclockwise direction, based on the detecting by the detected and an area of the rotated first screen may be smaller than an area of the first screen before the rotating.

The predetermined angle maybe between 40 degrees and 50 degrees.

The user interaction may be one of: a user interaction to rotate the user terminal device in a clockwise or counterclockwise direction so that the user terminal device is in a diamond shape, a user interaction to touch a display screen in which the first screen is displayed and then drag from the point of touch in a clockwise or counterclockwise direction, and a user interaction to drag at least one side of a bezel of the user terminal device.

The rotated first screen may be in a square shape, the second screen may be in an isosceles triangle shape, and the rotated first screen and the second screen may share one side.

In response to an image content being displayed in the rotated first screen, a function related to the image content may be displayed in the second screen.

In response to an image content being displayed in the rotated first screen, at least a part of another image content of an image content list, which includes the image content, may be displayed in the second screen.

In response to a first application being displayed in the rotated first screen, icons of second applications related to the first application may be displayed in the second screen.

The detector may detect another user interaction to drag at least one side of the display or at least one side of a bezel of the user terminal device, and the controller, in response to this interaction, may determine one or more of the dragging amount and the direction of this other user interaction and control the display to change a size of the rotated first screen based on one of: the determined dragging amount and the determined direction.

According to an exemplary embodiment, a user terminal device includes a display configured to display a first screen; a detector configured to detect a user interaction on the display; and a controller configured to, in response to the detected user interaction by the detector and based on the displayed first screen being rotated in a clockwise or counterclockwise direction at a predetermined angle, controls the display to display a second screen instead of the first screen, and in response to the detected user interaction by the detector and based on the displayed first screen not being rotated, controls the display to display a third screen instead of the first screen, and wherein the first screen, the second screen, and the third screen are different from each other.

As described above, according to various exemplary embodiments, a user may perform various functions using a user terminal device having a display panel in a rectangular shape. Accordingly, user convenience and satisfaction may be improved.

BRIEF DESCRIPTION OF THE DRAWINGS

The above and/or other aspects will be more apparent by describing in detail exemplary embodiments, with reference to the accompanying drawings, in which:

FIGS. 5A to 18C are views illustrating a user terminal device performing various functions according to a diagonal interaction, according to an exemplary embodiment;

FIGS. 39-46B are views illustrating various functions of a user terminal device being performed by folding interaction, according to an exemplary embodiment;

FIGS. 47 to 60 are views illustrating various functions of a user terminal device being performed by a rotation interaction, according to an exemplary embodiments;

FIGS. 63 to 66 are flowcharts illustrating a method of displaying on a user terminal device, according to various exemplary embodiments.

DETAILED DESCRIPTION OF EXEMPLARY EMBODIMENTS

Figure 1:
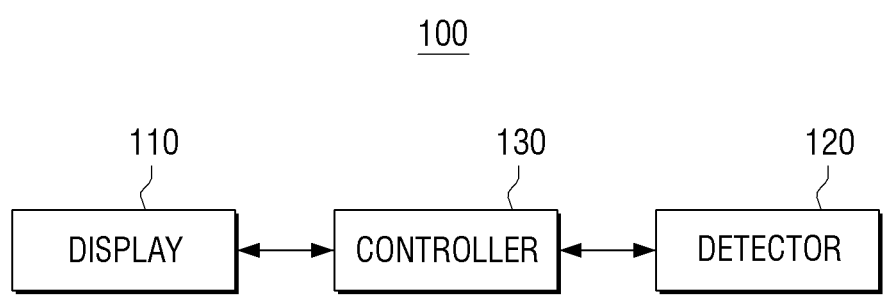
FIG. 1 is a block diagram schematically illustrating a configuration of a user terminal device according to an exemplary embodiment.

In the following description of exemplary embodiments, the same reference numerals are used to denote analogous same elements even when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they may obscure exemplary embodiments with unnecessary detail.

In the present disclosure, relational terms such as first and second, and the like, may be used to distinguish one entity from another, without necessarily implying any actual relationship or order between such entities.

The terms used in the present application are provided to merely explain specific exemplary embodiments and are not intended to limit the scope of an inventive concept. A singular term includes a plural form unless clearly defined otherwise. The terms "include" and "configured to" in the description of the present application are used to indicate that there are features, numbers, steps, operations, elements, parts or combination thereof, and they should not exclude the possibility of combination or addition of one or more features, numbers, steps, operations, elements, parts, or combination thereof.

In an exemplary embodiment, 'a module' or 'a unit' may perform at least one function or operation, and may be realized as hardware, software, or combination thereof. In addition, a plurality of 'modules' or 'units' may be integrated into at least one module and may be realized as at least one process (not shown) except for 'modules' or 'units' that should be realized in specific hardware.

Hereinafter, exemplary embodiments will be described in more detail with reference to the accompanying drawings. FIG. 1 is a block diagram schematically illustrating a configuration of a user terminal device 100 according to an exemplary embodiment. As illustrated in FIG. 1, the user terminal device 100 includes a display 110, a detector 120, and a controller 130. In this case, in an exemplary embodiment, the user terminal device 100 may be implemented as a television (TV), personal computer (PC), laptop PC, cellular phone, tablet PC, a personal digital assistant (PDA), MPEG audio layer-3 (MP3) player, kiosk, a digital photo frame, a table display apparatus, or the like. When a user terminal device is implemented as a portable type apparatus such as cellular phone, tablet PC, PDA, MP3 player, laptop PC, or the like, a user terminal device may be named a mobile device, but in the present specification, a user terminal device will be used.

According to an exemplary embodiment, the display 110 displays various image data and a user interface (UI). In particular, the display 110 may include a square-shaped display panel, and display at least one object having a square shape on a square-shaped display panel. In addition, the display 110 may provide various UIs and screens according to a user interaction detected through the detector 120.

Meanwhile, the display 110 may be combined with a touch detector included in the detector 120 and may be realized as a touch screen.

The detector 120 detects a user interaction. In particular, the detector 120 may include a touch detector which detects user touch interaction. In addition, the detector 120 through a touch detector may detect a dragging interaction to drag one of a plurality of apexes included in the display 110 in a diagonal direction.

The controller 130 controls overall operations of the user terminal device 100. In particular, the controller 130 may control the user terminal device 100 which has a square-shaped display panel according to various user interactions which are detected through the detector 120.

In an exemplary embodiment, while the display 110 displays a first screen, when the detector 120 detects size of an angle at which the user terminal device 100 rotates in a clockwise or counterclockwise direction to be a diamond shape, the controller 130 may control the display 110 to rotate and display the first screen in an opposite direction of the rotated direction based on size of an angle using the detector 120, and display a second screen related to a first screen on at least one of a plurality of corner areas of the user terminal device 100. At this time, an area of the rotated first screen may be smaller than an area of the first screen of the user terminal device 100 before rotation. In addition, when the first screen is in a square shape, and the second screen is in an isosceles triangle shape, the first screen and the second screen may share one side.

To be specific, in an exemplary embodiment, when the controller 130 controls the display 110 to rotate and display the first screen based on a rotation angle, the controller 130 may control the display 110 to rotate and display the first screen as much as the angle in an opposite direction of the rotation direction, or rotate and display the first screen as much as a preset angle in an opposite direction of the rotation direction.

In addition, when the first screen displays image content, the controller 130 may control the display 110 to display objects associated with functions related to the image content on the second screen.

When the first screen displays image content, the controller 130 may control the display 110 to display on the second screen at least a part of another image content in an image content list which includes the image content.

When the first screen displays a specific application, the controller 130 may control the display 110 such that icons indicating applications related to the specific application are displayed on the second screen.

In another exemplary embodiment, while the display 110 displays the first image content, when the detector 120 detects a user interaction on the display screen, the controller 130 may determine whether the user terminal device 100 is rotated in a diamond shape, and if the user terminal device 100 is not rotated, may control the display 110 to display a second image content which is different from the first image content, and if the user terminal device 100 is rotated, display a third image content which is different from the first image content.

As described above, according to various exemplary embodiments, a user may perform various functions using a user terminal device having a square-shaped display panel.

Figure 2:
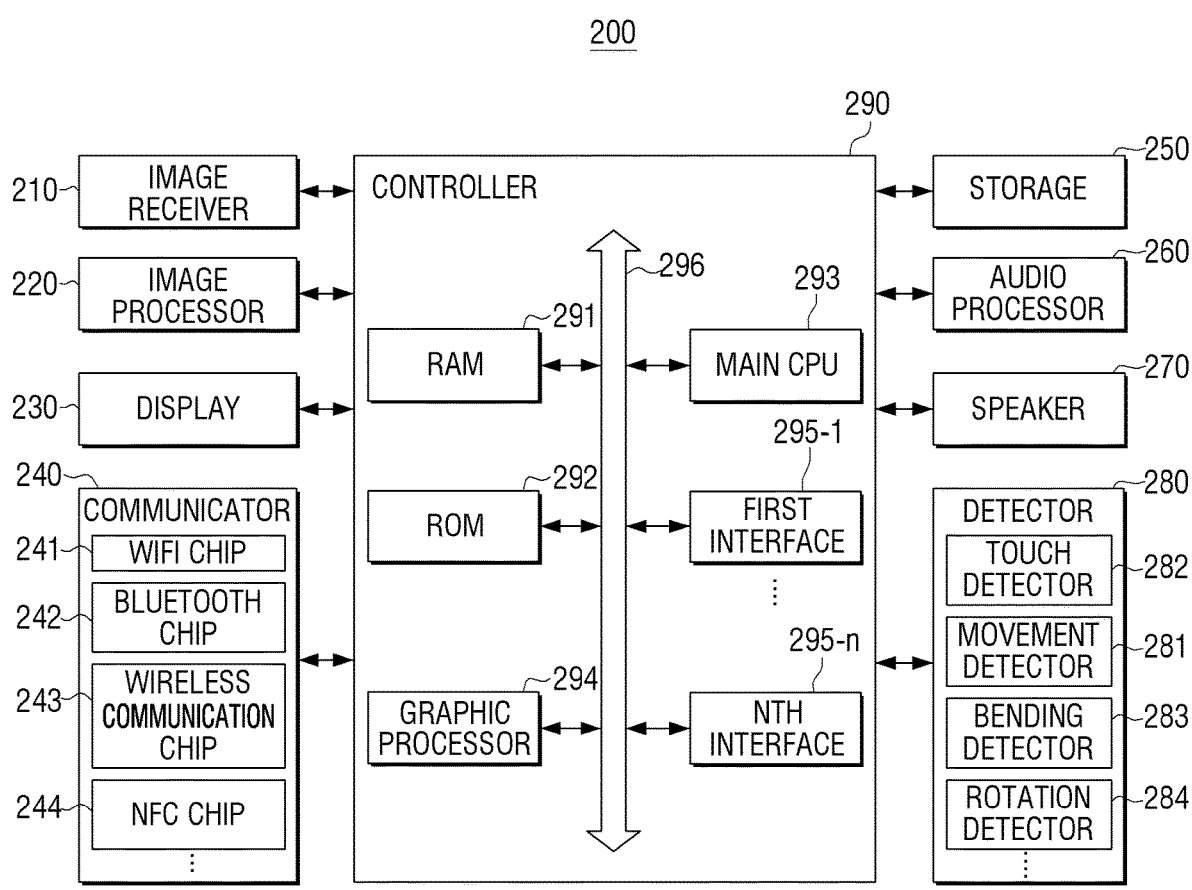
FIG. 2 is a block diagram illustrating in detail a configuration of a user terminal device according to an exemplary embodiment.

Hereinbelow, exemplary embodiments will be explained in further detail with reference to FIGS. 2-60. FIG. 2 is a block diagram illustrating in detail a configuration of a user terminal device according to an exemplary embodiment. As illustrated in FIG. 2, the user terminal device 200 includes the image receiver 210, an image processor 220, a display 230, a communicator 240, a storage 250, an audio processor 260, a speaker 270, a detector 280, and a controller 290.

Meanwhile, FIG. 2 comprehensively illustrates various elements by way of an example that the user terminal device 200 has various functions such as contents providing function and display function. Accordingly, according to an exemplary embodiment, a part of the elements illustrated in FIG. 2 may be omitted or changed, or other components may be further added and are within the scope of exemplary embodiments.

The image receiver 210 receives image data through various sources. For example, the image receiver 210 may receive broadcasting data from an external broadcasting station, receive VOD data from an external server in real-time, and receive image data from an external device.

The image processor 220 is an element which processes image data received from the image receiver 210. The image processor 220 may perform various image processing with respect to image data, such as decoding, scaling, noise filtering, frame rate conversion, resolution conversion.

The display 230 displays at least one of a video frame which is generated as the image processor 220 processes image data received from the image receiver 210 and various screens generated by a graphic processor 294.

Figure 3A:
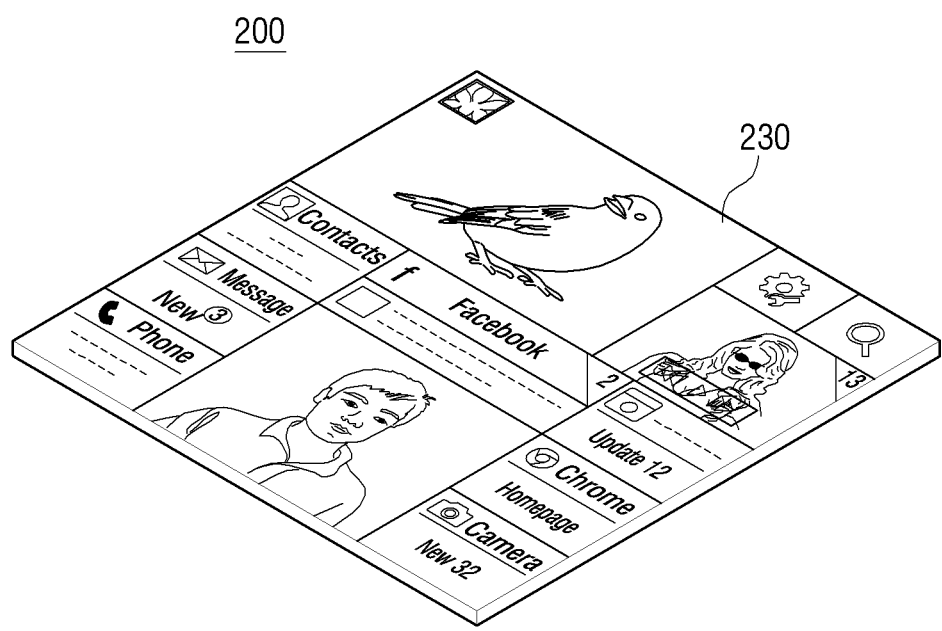
FIGS. 3A and 3B are views illustrating a user terminal device which has a square-shaped display panel according to an exemplary embodiment.

In particular, the display 230 may include a display panel to output image data and a driver to drive a display panel. In this case, the display panel may have a square shape as illustrated in FIG. 3A, according to an exemplary embodiment. In addition, the display panel, as illustrated in FIG. 3B, may include a hinge 310 at a center of the square-shaped display panel, and the user terminal device 200 may be folded around the hinge 310, according to an exemplary embodiment.

FIG. 3B is a view illustrating that the display 230 does not include a bezel, but this is merely an example. In yet another exemplary embodiment, not shown, a bezel, which houses a square-shaped display panel, may be included.

In this case, the bezel may include a touch detector which senses a user touch, a proximity detector, or the like.

The communicator 240 has a configuration of performing communication with various types of external devices according to various types of communication methods in exemplary embodiments. The communicator 240 includes a Wi-Fi chip 241, a Bluetooth chip 242, a wireless communication chip 243, and an NFC chip 244. The controller 290 performs communication with various external devices using the communicator 240.

In particular, the Wi-Fi chip 241 and the Bluetooth chip 242 perform communication using a Wi-Fi method and a Bluetooth method, respectively. In case of using the Wi-Fi chip 241 or the Bluetooth chip 242, connection information such as SSID and a session key may be received and transmitted first, and communication may be established using the connection information, and then, various information may be received and transmitted. The wireless communication chip 243 indicates a chip which performs communication in accordance with various communication standards such as IEEE, ZigBee, 3rd generation (3G), 3rd generation partnership project (3GPP), and long term evolution (LTE) or the like. The NFC chip 244 indicates a chip which operates using near field communication (NFC) method using 13.56 MHz band from among RF-ID frequency bands such as 135 kHz, 13.56 MHz, 433 MHz, 860-960 MHz, and 2.45 GHz.

Figure 4:
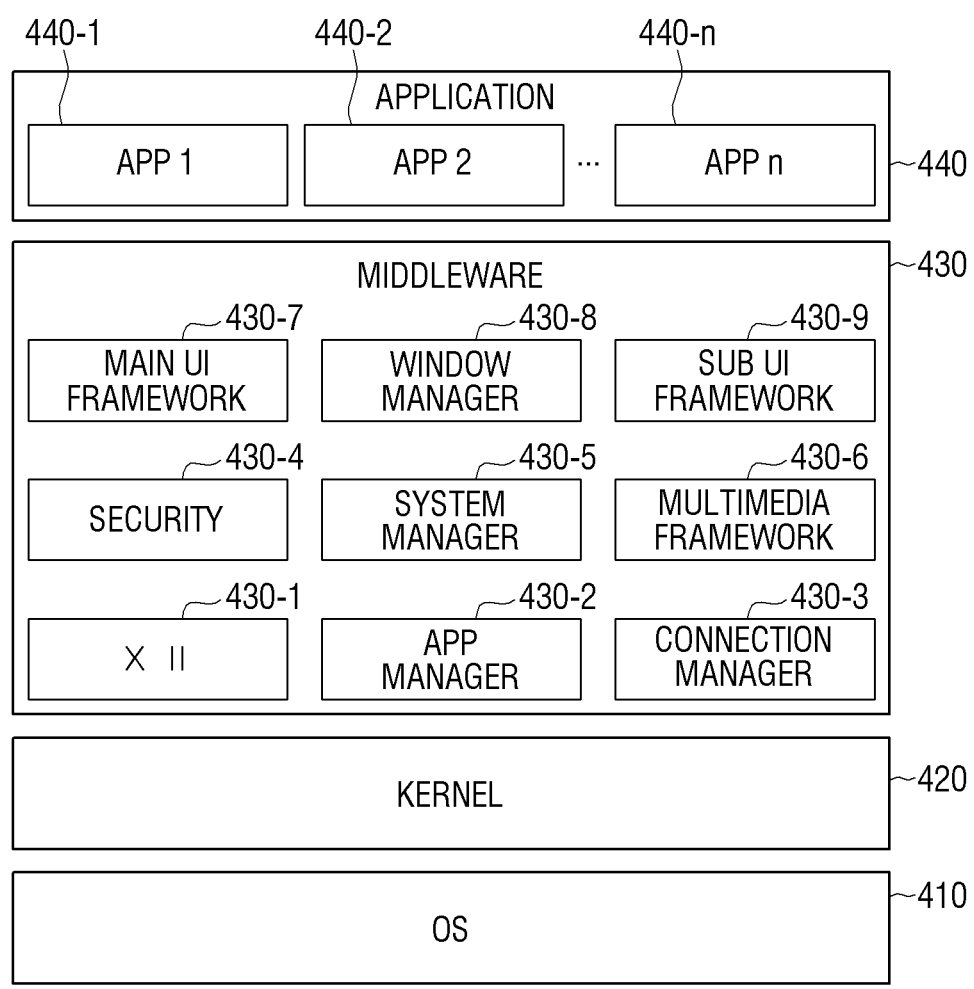
FIG. 4 is a view to describe a configuration of software stored in a storage according to an exemplary embodiment.

The storage 250 may store various programs and data required for the operations of the user terminal device 200. To be specific, the storage 250 may store programs and data to configure various screens which are to be displayed on a main area and a sub area. FIG. 4 is a view illustrating the structure of software stored in the user terminal device according to an exemplary embodiment. According to FIG. 4, the storage 250 may store software including operating system (OS) 410, kernel 420, middleware 430, and application 440.

An operating system (OS) 410 performs a function to control and manage overall operations of hardware. In other words, the OS 410 manages hardware and is responsible for basic functions such as memory and security.

The kernel 420 plays a role as a path which transmits various signals including a touch signal detected by the display 230 to the middleware 430.

The middleware 430 includes various software modules which control the operations of the user terminal device 200. According to FIG. 4, the middleware 430 includes an X11 module 430-1, an APP manager 430-2, a connection manager 430-3, a security module 430-4, a system manager 430-5, a multimedia framework 430-6, a UI framework 430-7, a window manager 430-8, and a sub-user interface (sub-UI) framework 430-9 such as a handwriting recognition module.

The X11 module 430-1 is a module which receives various event signals from various hardware provided in the user terminal device 200. Here, an event may be set in various manner such as an event to detect a user gesture, an event to generate a system alarm, and an event to execute or terminate a specific program.

The APP manager 430-2 is a module which manages execution status of various applications 440 installed in the storage 250. The APP manager 430-2, when an event to execute an application is detected from the X11 module 430-1, calls and executes an application which corresponds to this event.

The connection manager 430-3 is a module to support wired or wireless network connection. The connection manager 430-3 may include various sub modules such as a DNET module and a universal plug and play (UPnP) module.

The security module 430-4 is a module which supports certification, permission, and security storage with respect to hardware.

The system manager 430-5 monitors state of each element within the user terminal device 200, and provides a result of the monitoring to other modules. For example, when remaining battery is not sufficient, error occurs, or communication connection is broken down, the system manager 430-5 provides a monitoring result to the main UI framework 430-7 or the sub UI framework 430-9 and outputs an alarm message or an alarm sound.

The multimedia framework 430-6 is a module to play back multimedia contents stored in the user terminal device 200 or provided from an external source. The multimedia framework 430-6 may include a player module, a camcorder module, and a sound processing module. Accordingly, the multimedia framework 430-6 may reproduce various multimedia contents and play back screens and sounds.

The main UI framework 430-7 is a module to provide various UIs to be displayed on a main area of the display 230, and the sub UI framework 430-9 is a module to provide various UIs to be displayed on a sub area. The main UI framework 430-7 and the sub UI framework 430-9 may include an image compositor module which constitutes various objects, a coordinate compositor module which calculates coordinates to display an object, a rendering module which renders the constituted object on the calculated coordinate, and a 2D/3d UI toolkit which provides a tool to provide a UI in 2D or 3D format, or the like.

The window manager 430-8 may sense a touch event using the body or a pen of a user or other input events. The window manager 430-8, when an event is detected, may transmit an event signal to the main UI framework 430-7 or the sub UI framework 430-9 so that an operation corresponding to the event is performed.

In addition, according to an exemplary embodiment, when a user touches and drags a screen, a writing module to draw a line following a drag trace and various program modules to calculate pitch angle, roll angle, yaw angle based on a detector value detected by the movement detector 281.

The application module 440 include applications 440-1~440-n to support various functions. For example, a program module to provide various services such as a navigator program module, a game module, an e-book module, a calendar module, an alarm management module, or the like may be included. These applications may be installed as default or may be arbitrarily installed by a user in the midst of using the applications. The main CPU 293, when an object is selected, may execute an application which corresponds to a selected object using the application module 440.

The software structure illustrated in FIG. 4 is merely an example, and exemplary embodiments are not limited thereto. Therefore, there may be one or more omissions, modifications, and additions to the exemplary embodiments, if necessary. For example, various programs may be additionally stored in the storage 250 such as a sensing module to analyze signals detected by various detectors, a messaging module such as a messenger program, a short message service (SMS) & multimedia message service (MMS) program, and an e-mail program, a call info aggregator program module, voice over internet protocol (VoIP) module, a web browser module, or the like.

Referring back to FIG. 2, the audio processor 260 is an element to process audio data of image content. In the audio processor 260, various processes such as decoding, amplification, nose filtering of audio data may be performed. The audio data processed by the audio processor 260 may be output to the audio outputter i.e., a speaker 270.

The audio outputter 270 has a configuration to output not only various audio data for which various processes such as decoding, amplification, noise filtering are performed by the audio processor 260, but also various alarm sounds or an audio message. In particular, the audio outputter 270 may be implemented as a speaker, but this is merely an example, and may be realized as an output terminal which may output audio data.

The detector 280 senses various user interactions. In particular, the detector 280, as illustrated in FIG. 2, according to an exemplary embodiment, may include the touch detector 282, the movement detector 281, and the bending detector 283, and a rotation detector 284.

To be specific, in an exemplary embodiment, the touch detector 282 may detect a user's touch interaction using a touch panel attached to a back of a display panel. The movement detector 281 may sense movements of the user terminal device 100 using at least one of an acceleration detector, a terrestrial magnetism detector, a Gyro detector. The bending detector 283 may sense whether a user terminal device 100 is bent around the hinge 310 (shown in FIG. 3B), by using a bending detector 283 (e.g., an illumination detector, or the like). A rotation detector 284, by using at least one of an acceleration detector, a terrestrial magnetism detector, a Gyro detector, and a gravity sensor, may detect rotation of the user terminal device 100. For example, the rotation detector 284 may detect whether the user terminal device 100 is rotated in a diamond shape.

The controller 290 controls overall operations of the user terminal device 200 using various programs stored in the storage 250, according to an exemplary embodiment.

The controller 290, as illustrated in FIG. 2, according to an exemplary embodiment, includes a RAM 291, a ROM 292, a graphic processor 294, a main CPU 293, first to nth interface 295-1~295-n, and bus 296. In this case, the RAM 291, the ROM 292, the graphic processor 294, the main CPU 293, and the first to the nth interface 295-1~295-n may be connected with each other through the bus 296, or the like.

In the ROM 292, a command set for system booting is stored. When a turn-on command is input and power is supplied, the main CPU 293 copies an operating system (0/S) stored in the storage 250 according to a command stored in the ROM 292 to the RAM 291, executes the O/S, and boots the system. When booting is completed, the main CPU 293 copies various application programs stored in the storage 250 to the RAM 291, executes the application programs copied to the RAM 291, and perform various operations.

The graphic processor 294, by using the calculator (not shown) and the renderer (not shown), generates a screen including various objects such as an item, an image, a text, or the like. The calculator, by using a control command received from the detector 280, calculates attribute values such as a coordinate value to which each object is displayed according to a layout of a screen, type, size, or color. The renderer generates a screen of various layouts including objects based on the attribute values calculated by the calculator. The screen generated by the renderer is displayed within a display area of the display 230.

The main CPU 293, by accessing the storage 250, performs booting using the O/S stored in the storage 250. In addition, the main CPU 293 performs various operations using various programs, contents, data stored in the storage 250.

The first to the nth interface 295-1 to 295-n are connected to the above-described various elements. One of the interfaces may be a network interface which is connected to the external apparatus through network.

In particular, the controller 290 may provide various functions regarding the user terminal device 200 having a display panel in a rectangular shape.

<Diagonal Interaction>

According to an exemplary embodiment, while the display 230 displays the first screen, when a user interaction (hereinafter "diagonal interaction") is such that one of the apexes of the first screen is dragged in a diagonal direction is detected through the detector 280, the controller 290 may control the display 230 to display the second screen on the corner area corresponding to the apex where the diagonal interaction is detected. Hereinbelow, with reference to FIGS. 5A to 18C, various functions provided by the user terminal device 200 according to the diagonal interaction, in an exemplary embodiment, will be described.

Figure 5B:
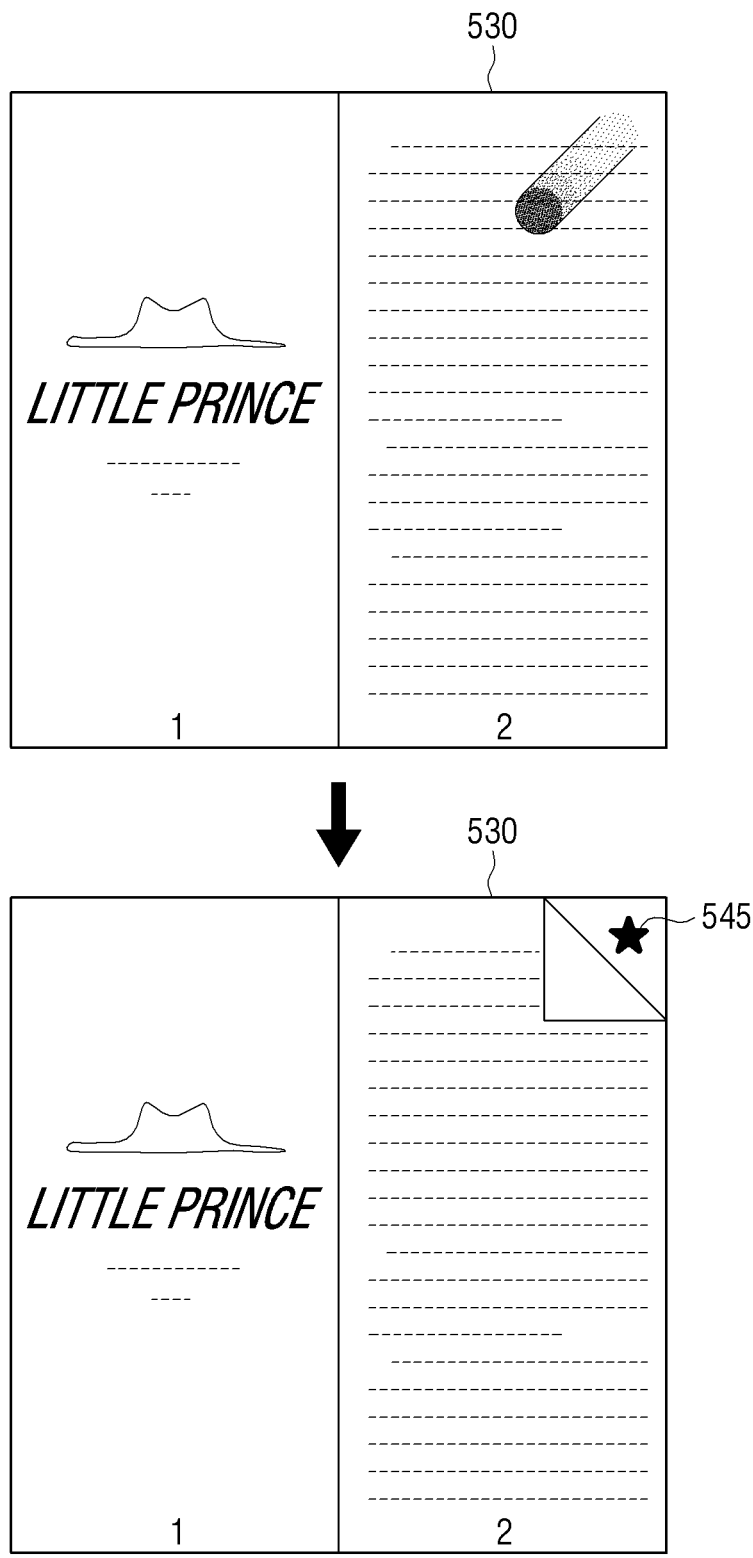

FIGS. 5A and 5B are views illustrating a function provided by a user terminal device, when a user interaction in a width direction and a diagonal interaction are detected, according to an exemplary embodiment.

As illustrated in FIG. 5A, according to an exemplary embodiment, while a first page 510 of the e-book contents is displayed on a display screen, when a user interaction is to drag from a plurality of corners included in the display screen in a width direction (in particular, a left direction) is detected, the controller 290 may control the display 230 to convert a page of the e-book contents to a next page, i.e., convert to a second page 520 of the e-book contents.

As illustrated in FIG. 5B, according to an exemplary embodiment, while a third page 530 of the e-book contents is displayed on a display screen, when a diagonal interaction is detected at one of a plurality of apexes included in the display screen, the controller 290 may control the display 230 to maintain a current page screen, provide an image effect where the corner area corresponding to the apexes where the diagonal interaction is detected is folded, and display a bookmark icon 545 at the folded corner area.

In other words, the controller 290 may provide different functions through a user interaction in a width direction and a diagonal interaction, according to an exemplary embodiment.

In addition, the controller 290 may include information on a function which the user terminal device 200 may provide on the second screen according to a position of the corner area corresponding to the apex where the diagonal interaction is detected from among four apexes of the first screen, according to an exemplary embodiment.

Figure 6A:
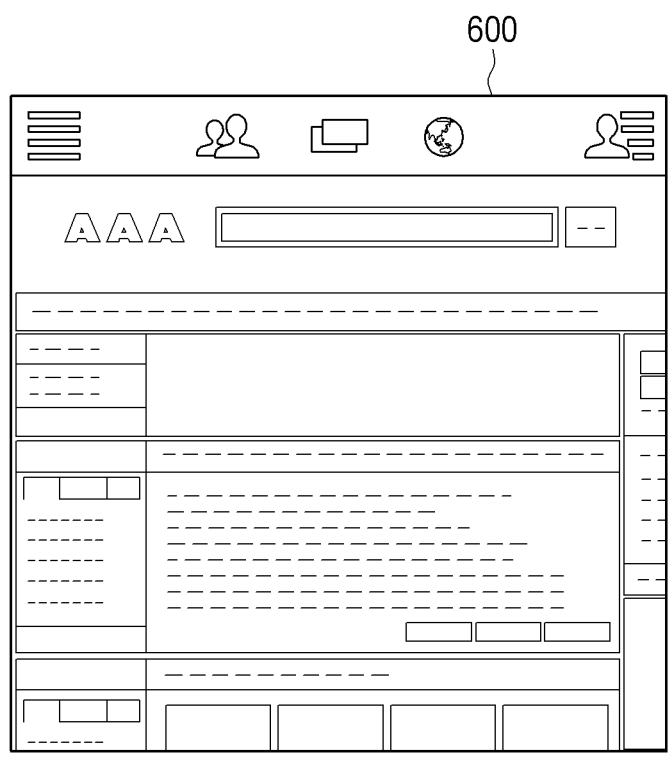

To be specific, as illustrated in FIG. 6A, according to an exemplary embodiment, the controller 290 may control the display 230 to display the image contents 600.

Figure 6B:
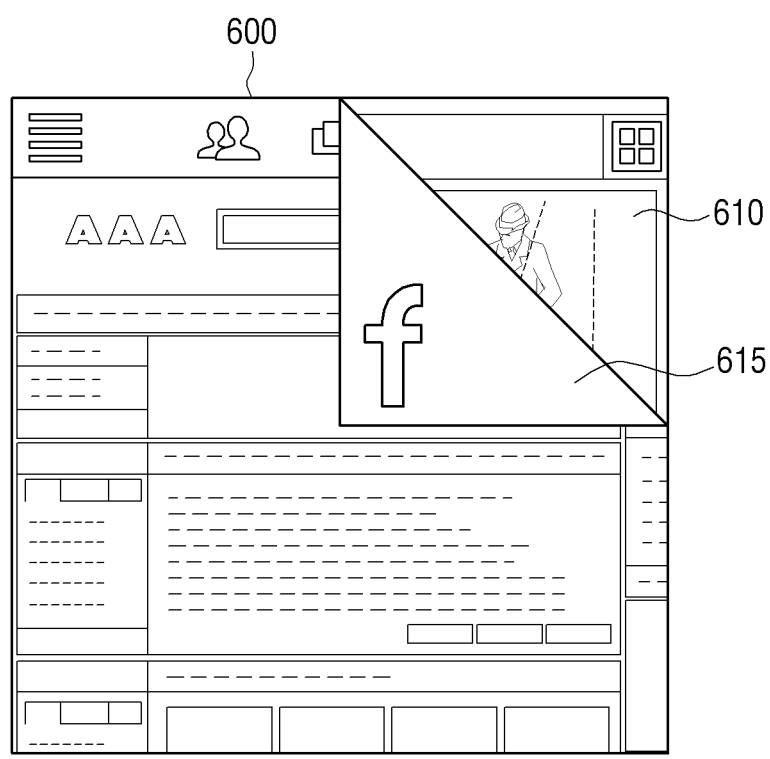

While the image contents 600 are displayed, when a diagonal interaction is detected at an apex in a right upper end portion, the controller 290, as illustrated in FIG. 6B, according to an exemplary embodiment, may control the display 230 to display information 615 (for example, an icon, a recently-executed screen, or the like) on the most recently executed application at a corner area in an upper right end portion where the diagonal interaction is detected. In this case, while the information 615 on the most recently executed application is displayed along with the image contents 600, when the diagonal interactions are sequentially detected at an apex in an upper right end portion, the controller 290 may control the display 230 to display information on the second most recent application 610 at a right top corner area where the diagonal interaction is detected.

Figure 6C:
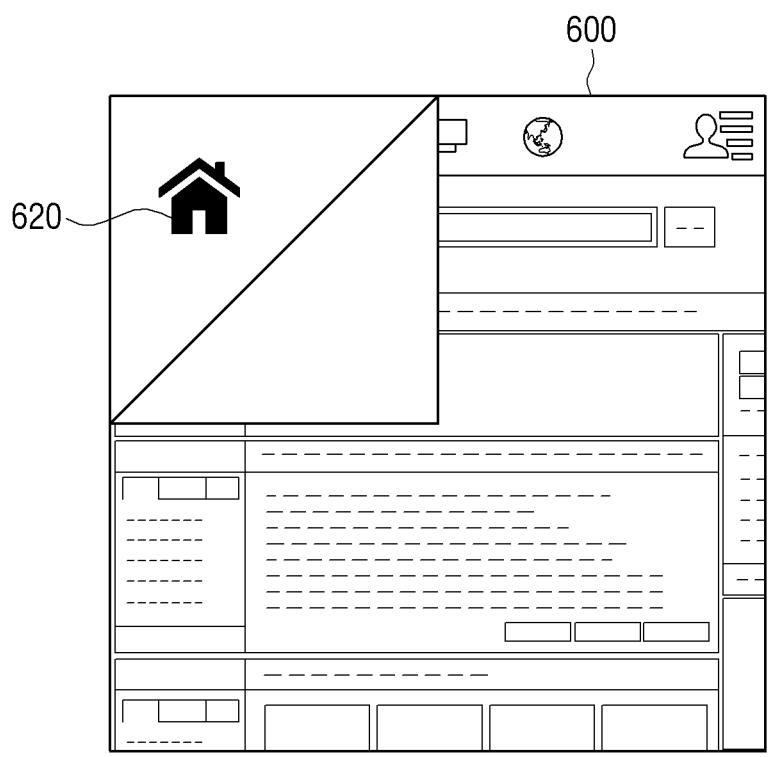

While the image contents 600 are displayed, the diagonal interaction is detected at an apex in an upper left end portion, the controller 290, as illustrated in FIG. 6C, according to an exemplary embodiment, may control the display 230 to display information 620 (for example, icon) which indicates that moving to a home screen is available at a corner area in an upper left end portion where a diagonal interaction is detected. In this case, when the diagonal interaction is continued to an apex in a lower right end portion, the controller 290 may control the display 230 to display a home screen.

Figure 6D:
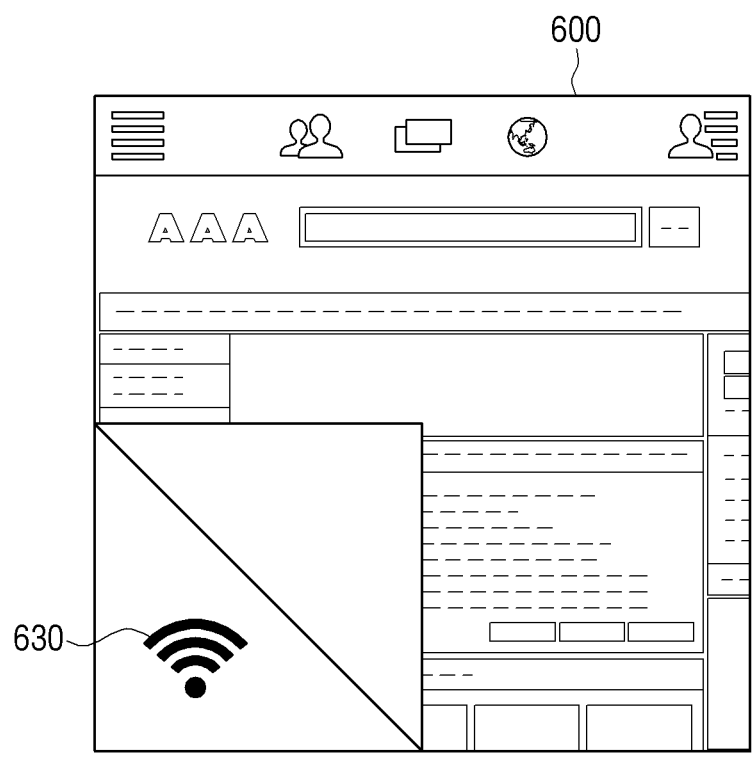

While the image contents 600 are displayed, when a diagonal interaction is detected at an apex in a lower left end portion, the controller 290, as illustrated in FIG. 6D, according to an exemplary embodiment, may control the display 230 to display status information (for example, network information, battery information, etc.) of the user terminal device 100 at left bottom corner area where the diagonal interaction is detected.

Figure 6E:
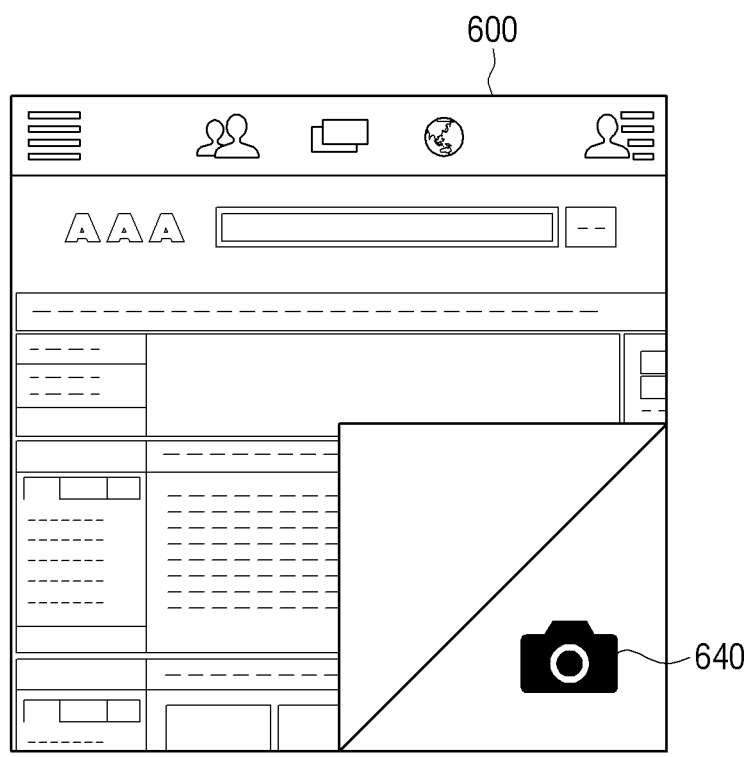

While the image contents 600 are displayed, when the diagonal interaction is detected at an apex in a lower right end portion, the controller 290, as illustrated in FIG. 6E, according to an exemplary embodiment, may control the display 230 to display quick access information 640 (for example, an icon corresponding to the camera application) on the application designated by a user at a right bottom corner area where the diagonal interaction is detected.

In addition, when the diagonal interaction is detected at a lock screen, the controller 290 may control the display 230 to display information on an object regarding which the diagonal interaction is detected at a lock screen.

Figure 7A:
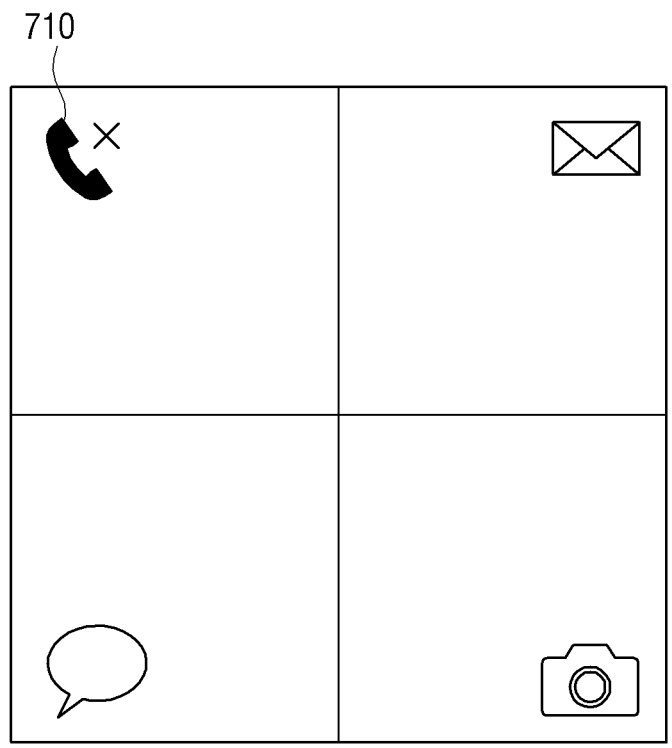
Figure 7B:
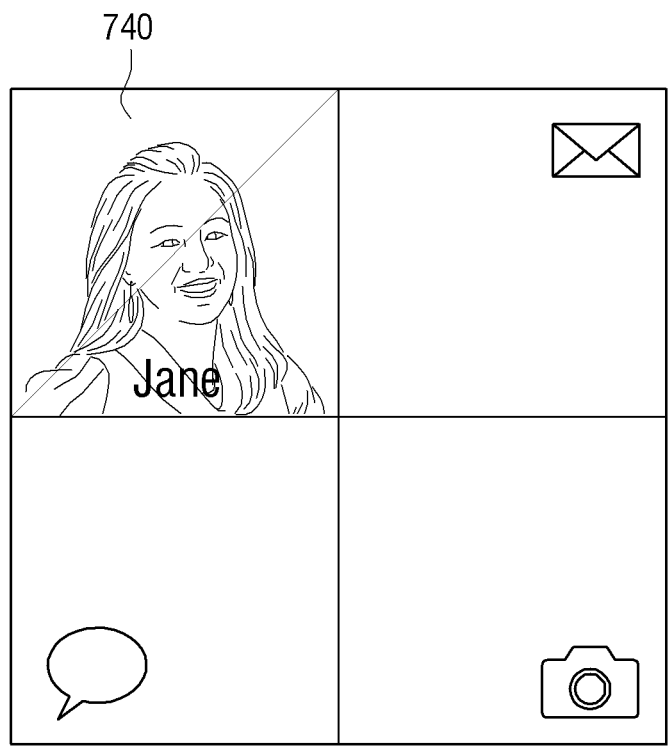

To be specific, as illustrated in FIG. 7A, according to an exemplary embodiment, while four objects are displayed on a lock screen, when the diagonal interaction is detected at the first object 710 which indicates an absent call, the controller 290, as illustrated in FIG. 7B, may control the display 230 to display information 740 (such as information on a caller of the absent call) regarding the absent call at an area where the first object 710 is displayed.

However, as described in FIGS. 7A and 7B, according to an exemplary embodiment, the feature of providing information about an absent call on a lock screen by the controller 290 is merely an example, and various information and functions may be provided on a lock screen through the diagonal interaction in various exemplary embodiments. For example, the controller 290 may provide information about a received message through the diagonal interaction at a lock screen, and provide a quick access function regarding a camera application.

In addition, the controller 290, from among four apexes of the first screen, may include information regarding the functions which the user terminal device 200 may provide according to location of a corner area corresponding to the apexes where the diagonal interaction is detected, and application functions, on the second screen.

Figure 8A:
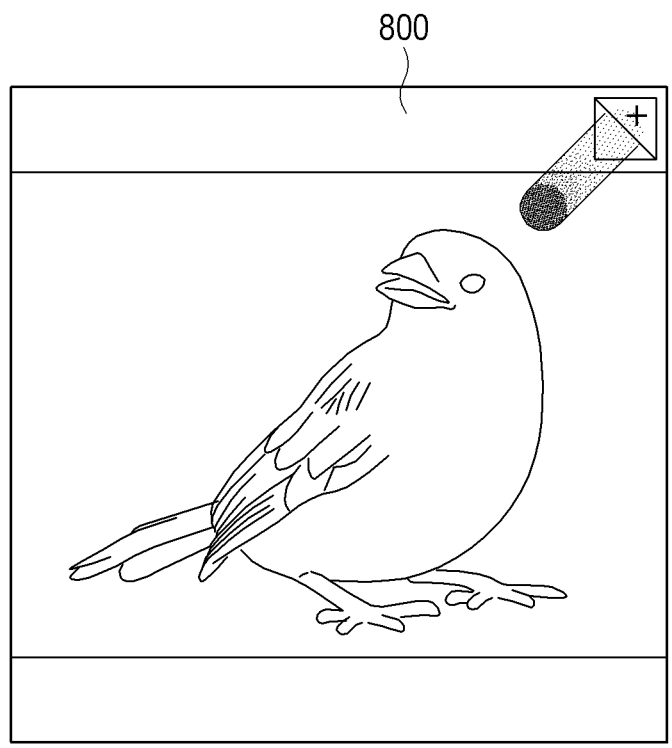

To be specific, as illustrated in FIG. 8A, according to an exemplary embodiment, the controller 290 may control the display 230 to display photo content 800.

Figure 8B:
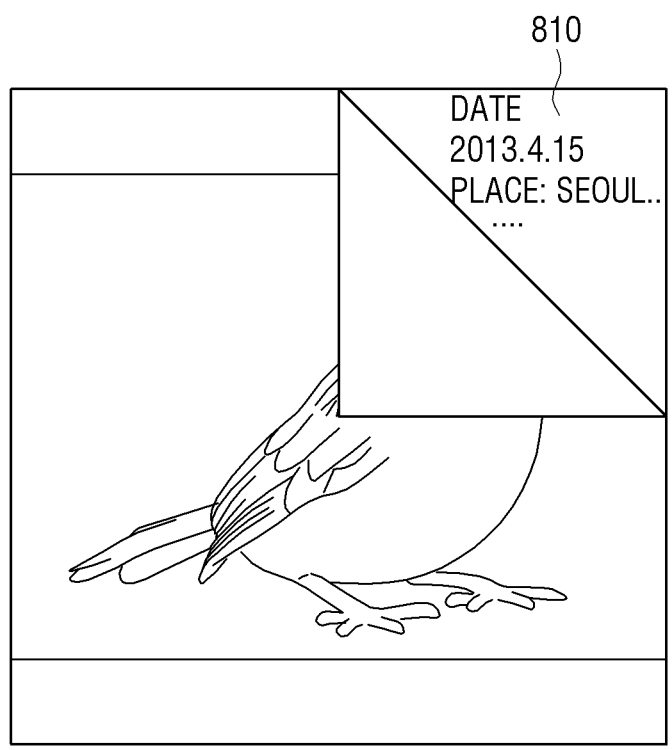
Figure 8C:
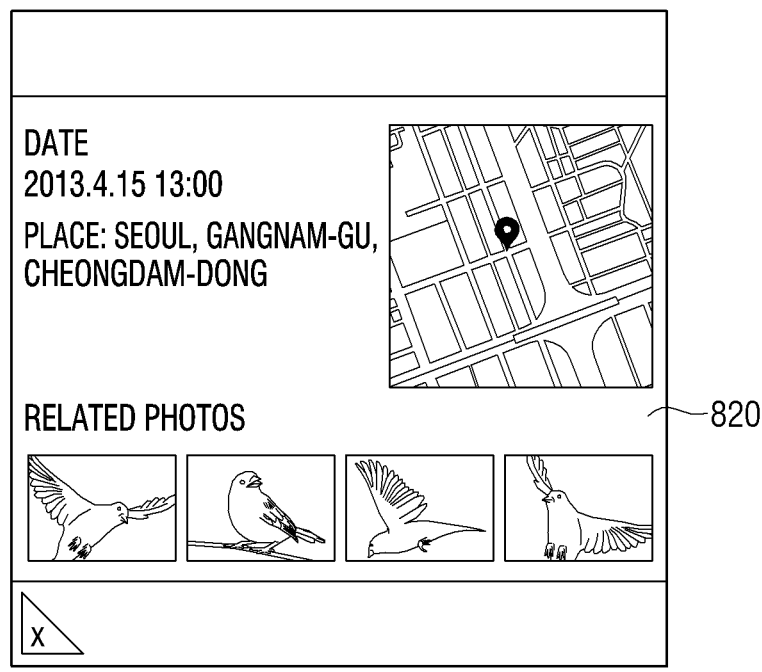

While the photo content 800 is displayed, when the diagonal interaction is detected at an apex in an upper right end portion, the controller 290, as illustrated in FIG. 8B, according to an exemplary embodiment, may control the display 230 to fold the right top corner area where the diagonal interaction is detected, and display the information 810 (for example, photographing date, photographing place, etc.) related to the photo content on a folded corner area of the diagonal interaction. In this case, when the diagonal interaction continues to a left bottom apex, the controller 290, as illustrated in FIG. 8C, according to an exemplary embodiment, may control the display 230 to display information 820 (for example, photographing data, photographing place, map information of photographing place, relevant photo information, etc.) on the display screen.

Figure 9A:
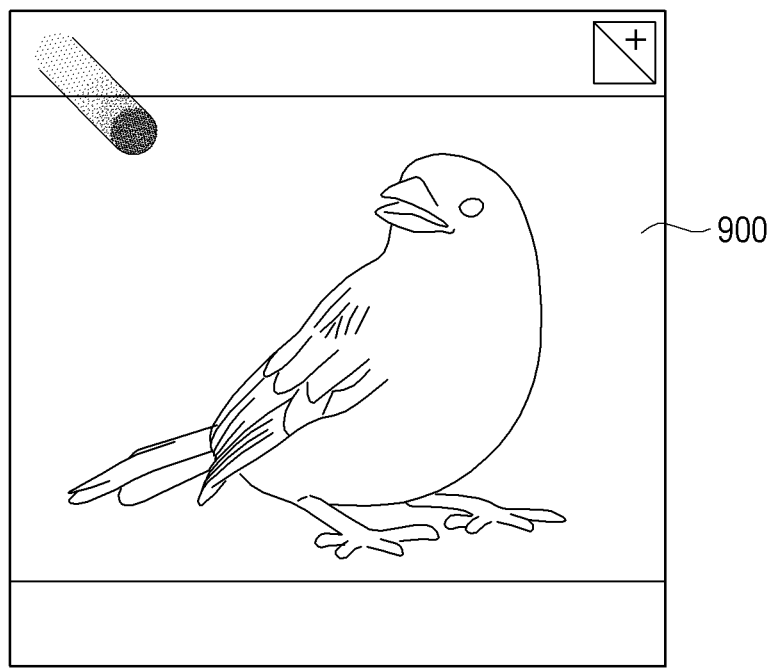
Figure 9B:
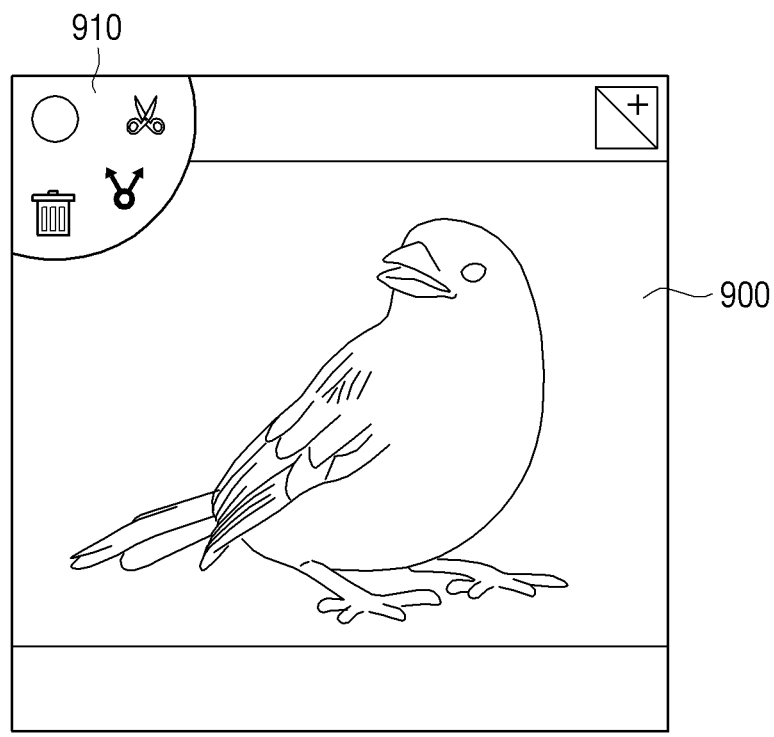

As illustrated in FIG. 9A, according to an exemplary embodiment, while the photo content 900 is displayed, when the diagonal interaction is detected at an apex in an upper left end portion, the controller 290, as illustrated in FIG. 9B, according to an exemplary embodiment, may control the display 230 to display a menu 910 (for example, deleting, editing, sharing, etc.) which may perform various tasks regarding a photo content 900 at a left corner area where the diagonal interaction is detected.

Figure 10A:
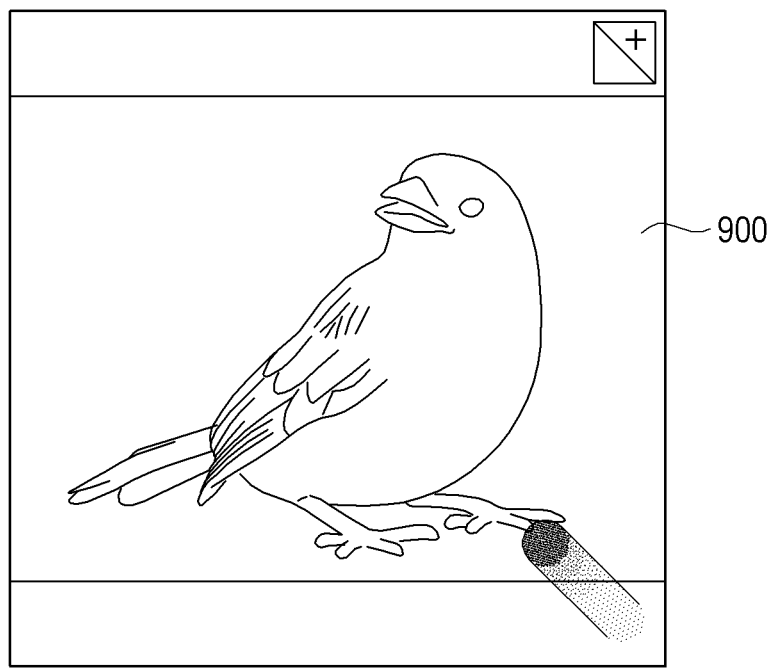
Figure 10B:
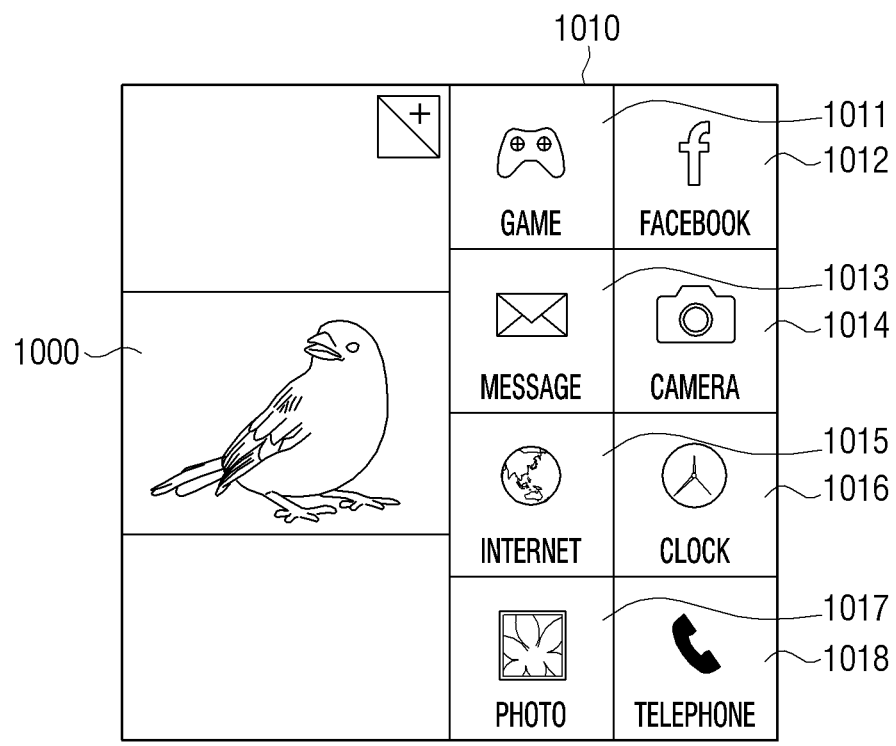
Figure 10C:
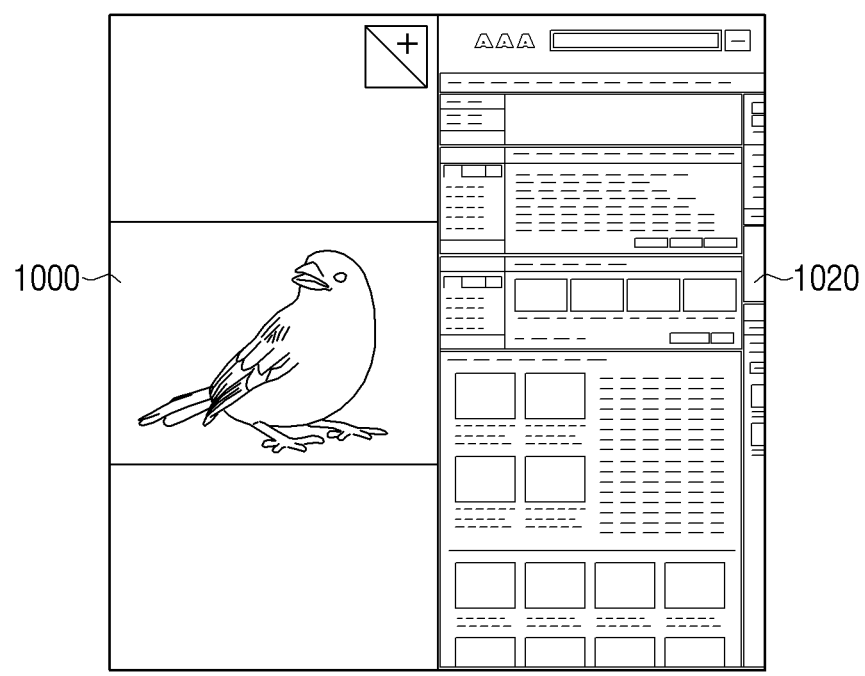

As illustrated in FIG. 10A, according to an exemplary embodiment, while the photo content 900 is displayed, when the diagonal interaction is detected at an apex in a lower right end portion, the controller 290, as illustrated in FIG. 10B, according to an exemplary embodiment, may control the display 230 to decrease the photo content 1000 and display the photo content on a left area of the display screen. In addition, the controller 290 may control the display 230 to display a menu window 1010 including a plurality of icons 1011-1018 which may perform various functions of the user terminal device 100 on a right area of the display screen. When the fifth icon 1015 is selected from among a plurality of icons 1011-1018 included in the menu window 1010, the controller 290 may control the display 230 to display an internet browsing screen 1020 which corresponds to the fifth icon 1015, as shown in FIG. 10C, according to an exemplary embodiment.

As described above, according to an exemplary embodiment, while photo content is displayed, a user may be provided with various functions according to position of an apex where the diagonal interaction is detected.

The controller 290 may change the size of the second screen according to dragging amount of the diagonal interaction, and change quantity of information included in the second screen according to the size of the second screen.

To be specific, in the case when a message is received from outside, while receiving the image content 1000, if the diagonal direction is detected at an apex in a right upper end portion, the controller 290 may control the display 230 to display information about a message received at a corner area in an upper right end portion.

Figure 11A:
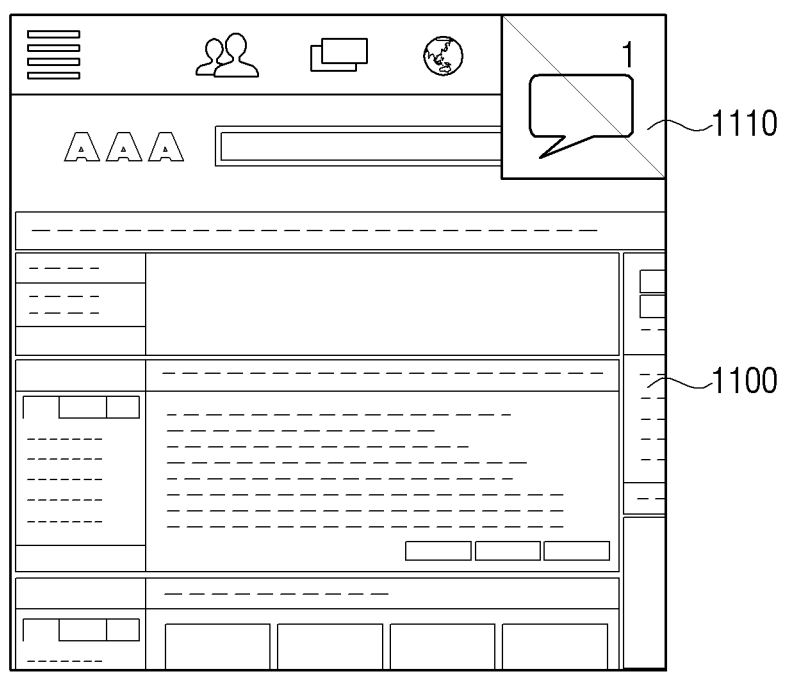

In particular, when dragging amount of the diagonal interaction is less than the first value, the controller 290, as illustrated in FIG. 11A, according to an exemplary embodiment, may control the display 230 to display the icon indicting that a message is received on the second screen 1110 at a corner area in an upper right corner.

Figure 11B:
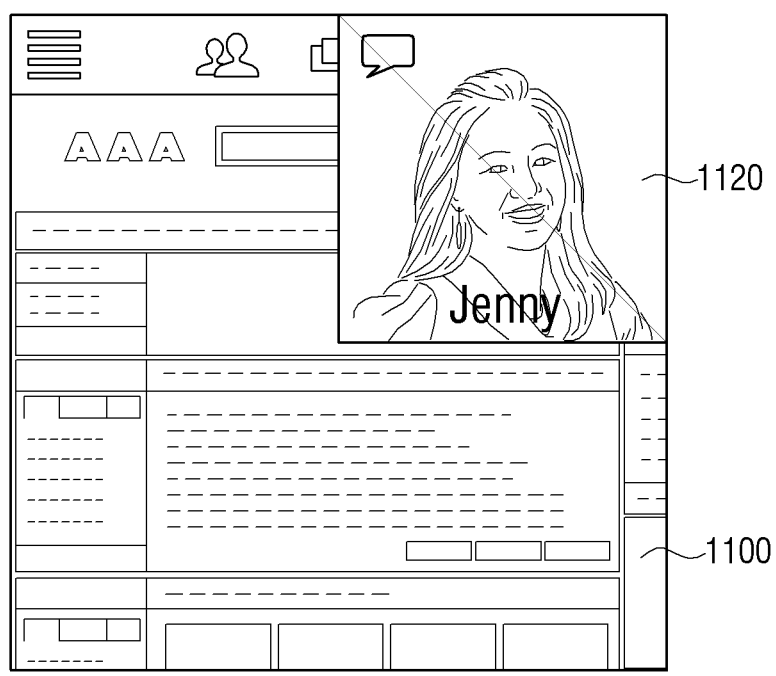

In addition, when dragging amount of the diagonal interaction is not less than the first value and less than the second value, the controller 290, as illustrated in FIG. 11B, according to an exemplary embodiment, may control the display 230 to display the second screen 1120 which includes information (for example, name of a caller, a photo of a caller, etc.) on a caller at a corner area in an upper right corner.

Figure 11C:
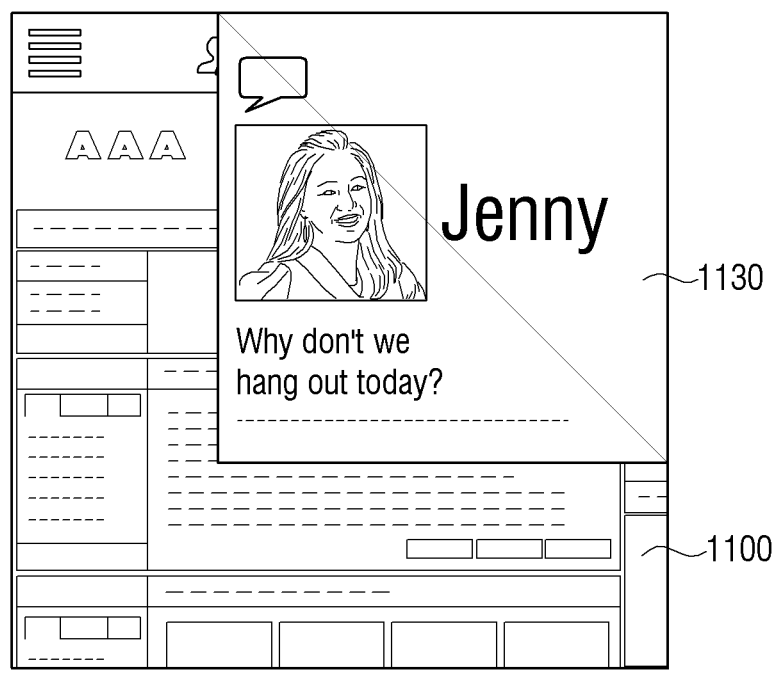

Further, when the dragging amount of the diagonal interaction is not less than the second value and less than the third value, the controller 290, as illustrated in FIG. 11C, according to an exemplary embodiment, may control the display 230 to display the second screen 1130 which includes at least a part of the information on a caller and a part of the contents of the message at a corner area in an upper right end portion.

Figure 11D:
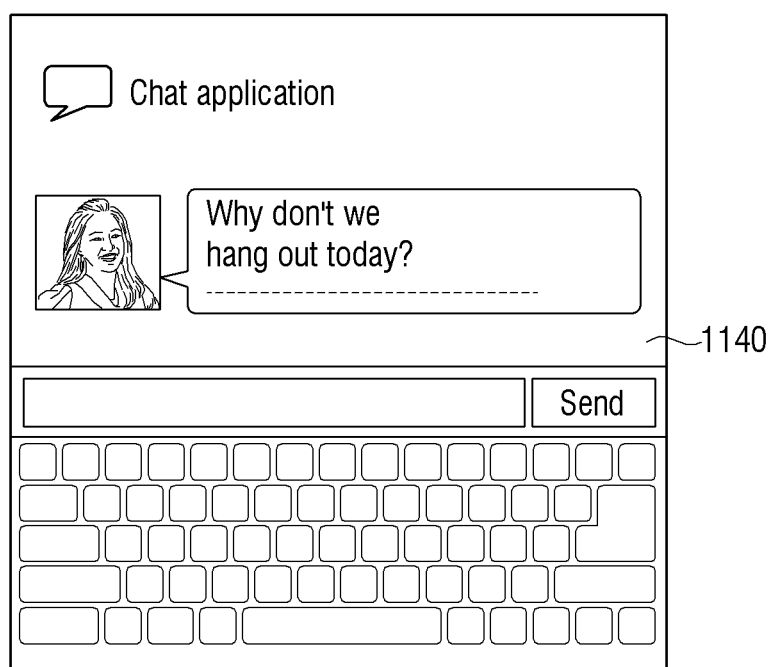

In addition, when the dragging amount of the dragging interaction is not less than the third value, the controller 290, as illustrated in FIG. 11D, according to an exemplary embodiment, may control the display 230 to display a chatting screen 1140 to respond to the received message on a full screen.

In addition, when a plurality of diagonal interactions are detected at the same apex, the controller 290 may successively provide information corresponding to the same apex according to the diagonal interactions.

Figure 12A:
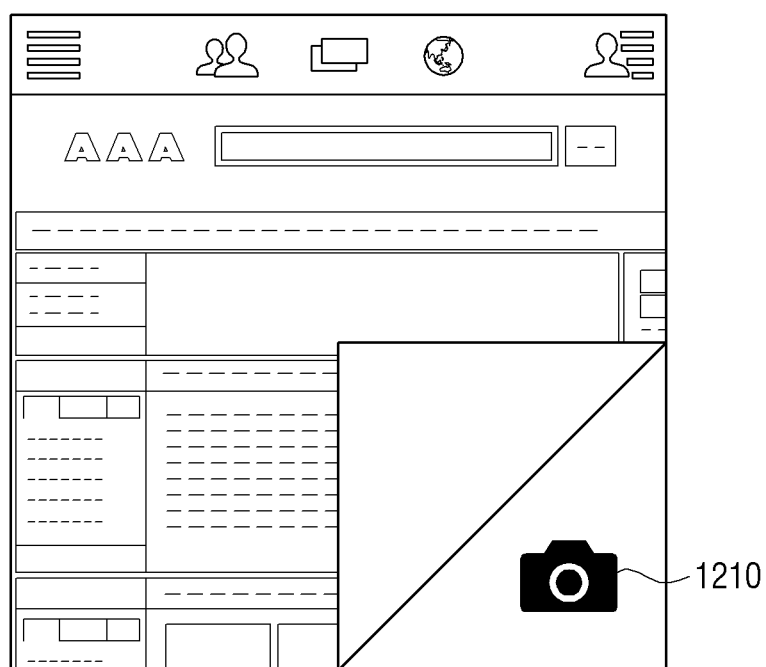

To be specific, in an exemplary embodiment, when the diagonal interaction is detected at an apex in an upper, right end portion while the image content is displayed, the controller 290, as illustrated in FIG. 12A, according to an exemplary embodiment, may control the display 230 so that the bottom right corner area where the diagonal interaction is detected is folded once, and quick access information 1210 (for example, an icon corresponding to a camera application) on an application designated by a user is displayed.

Figure 12B:
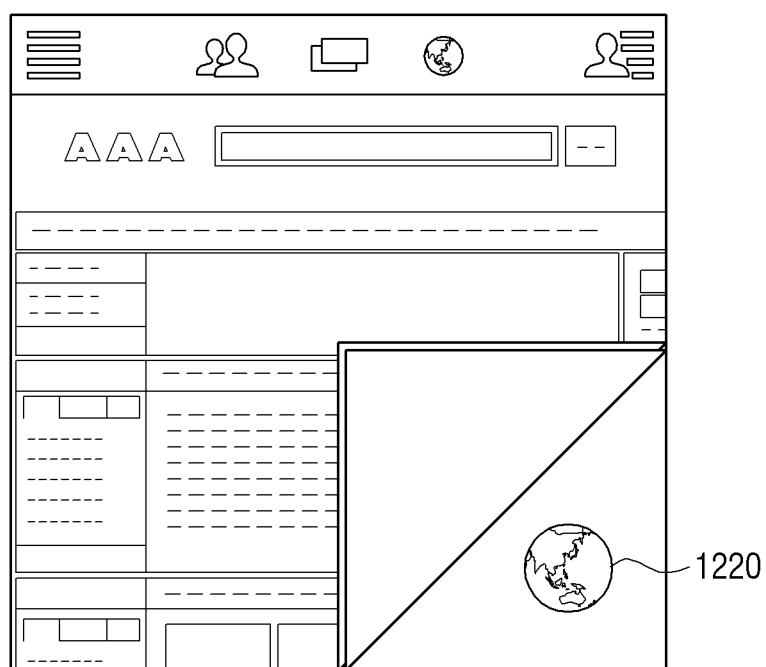

In addition, according to an exemplary embodiment, the diagonal interaction is detected again at a bottom right apex while the image content is displayed along with the quick access information 1210, the controller 290, as illustrated in FIG. 12B, according to an exemplary embodiment, may control the display 230 so that the corner area in a lower right end portion where the diagonal interaction is detected is folded twice, and quick access information 1220 (for example, an icon corresponding to an internet application) on another application designated by a user at a corner area in a lower right end portion is displayed.

Figure 13A:
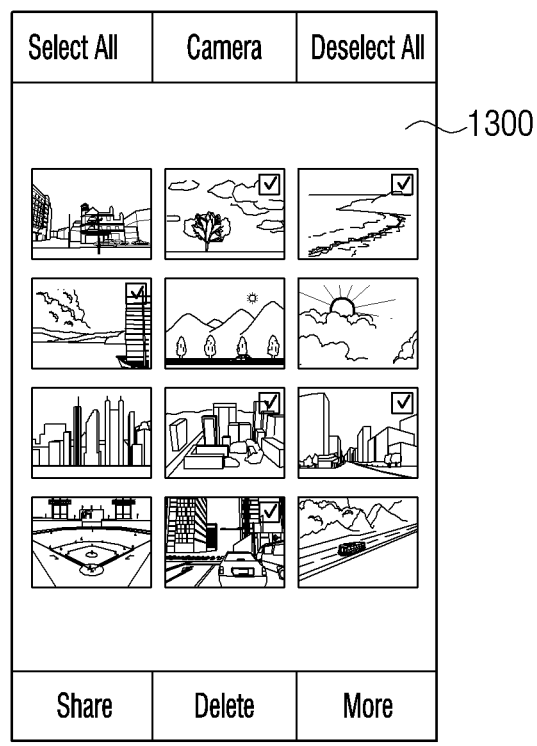

In addition, the controller 290 may perform checking function through the diagonal interaction. To be specific, in the past, if a part of a plurality of items is selected, and a part of a plurality of items is touched, the controller 290, as illustrated in FIG. 13A, according to an exemplary embodiment, may control the display 230 to display a check mark on a side (for example, an upper right end) of the touched item.

Figure 13B:
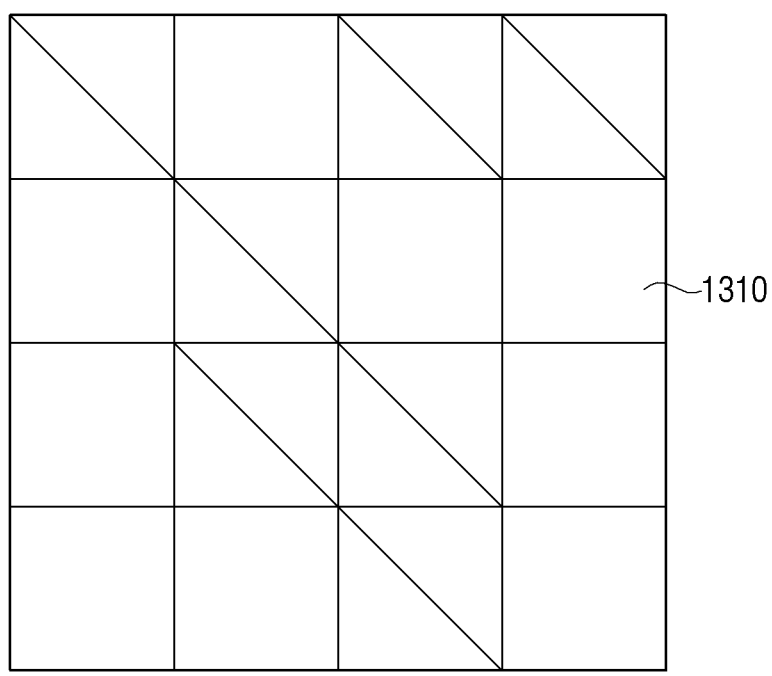

According to an exemplary embodiment, if a part of a plurality of items is selected, and when the diagonal interaction is detected on a part of the plurality of items, the controller 290, as illustrated in FIG. 13B, according to an exemplary embodiment, may control the display 230 to provide an image effect so that a part of items where the diagonal interaction is detected is folded.

Further, when the diagonal interaction is detected for at least one of a plurality of display items included in one screen, the controller 290 may control the display 230 to convert the at least one display item where the diagonal interaction is detected into another screen related to at least one display item, and display the screen.

Figure 14A:
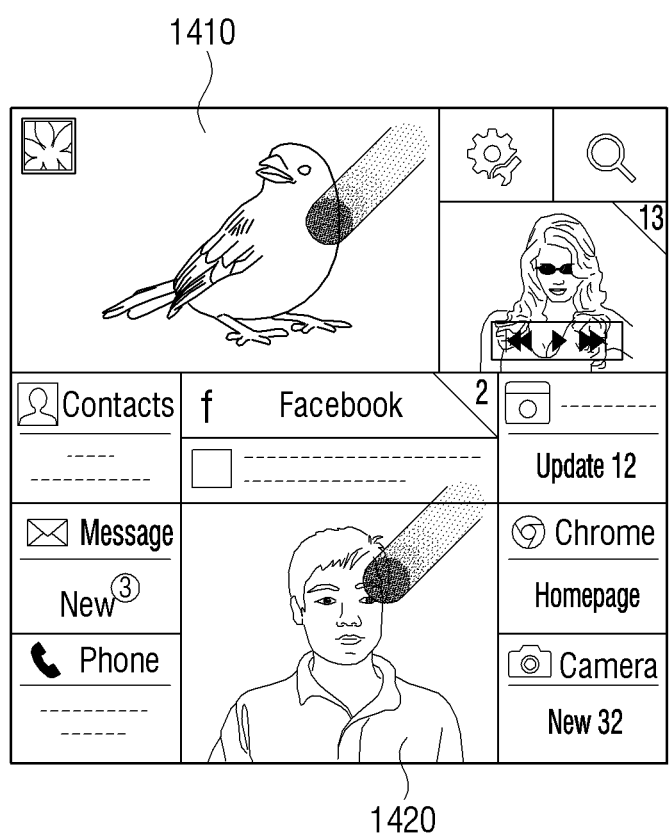

To be specific, the controller 290, as illustrated in FIG. 14A, may control the display 230 to display a home screen including an icon 1410 on a photo application and an icon 1420 on an SNS application.

Figure 14B:
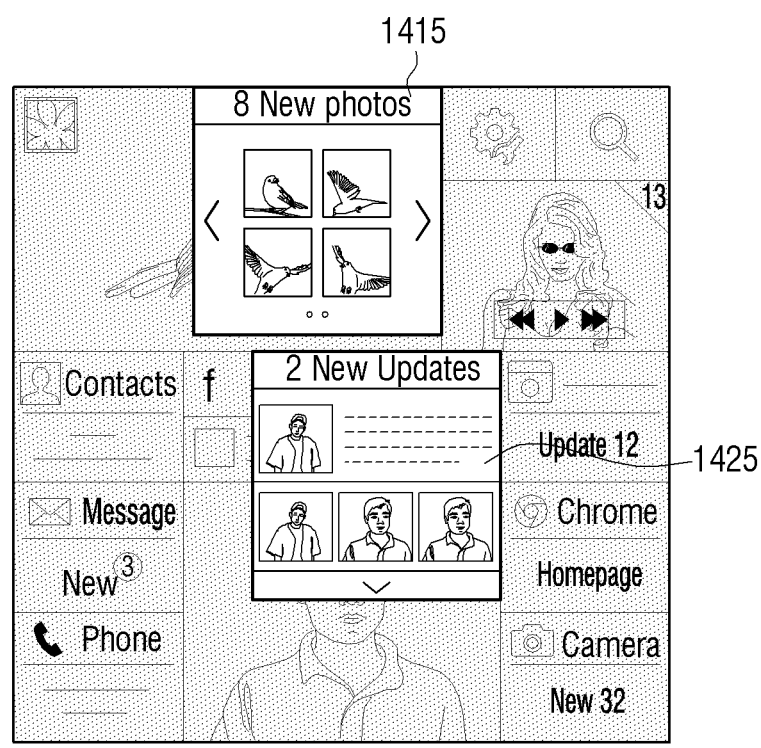

At this time, when the diagonal interaction is detected on the icon 1410 on a photo application and the icon 1420 on the SNS application, the controller 290 may control the display 230 to convert the icon 1410 on a photo application into a thumbnail image 1415 including information (for example, information on new photo contents, etc.) on the photo application, and to convert the icon 1420 on an SNS application into a thumbnail image 1425 including information (for example, information on new mention, etc.) on an SNS application, according to an exemplary embodiment, as shown in FIG. 14B.

Figures 1, 15A:
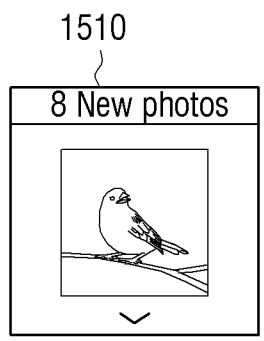
Figures 2, 15A:
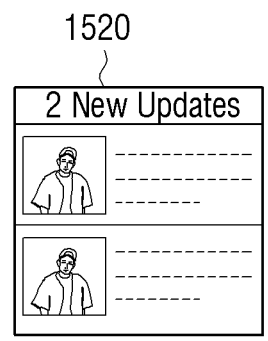
Figures 1, 15B:
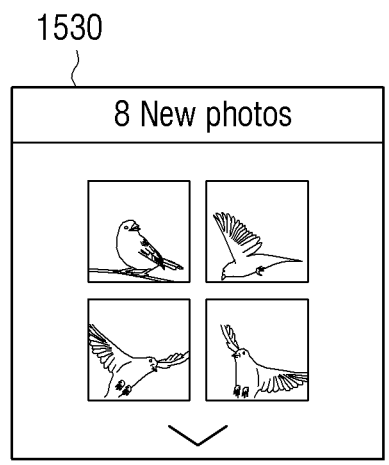
Figures 2, 15B:
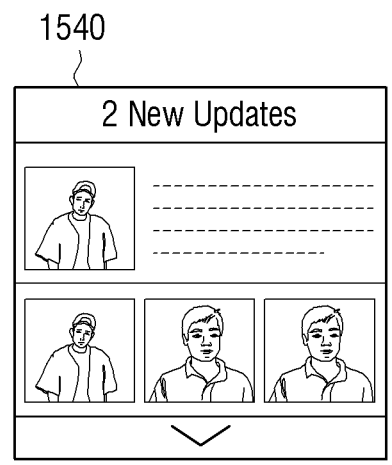

In this case, the converted thumbnail images 1415 and 1425 may include information which is different according to the size of the displayed items. For example, when the icon on a photo application in the first predetermined size is converted to a thumbnail image, the controller 290, as illustrated in FIG. 15A-1, according to an exemplary embodiment, may control the display 230 to display a thumbnail image 1510 in a first mode which displays only a recently-photographed photo. In addition, when an icon on an SNS application with the first pre-determined size is converted into a thumbnail image, the controller 290, as illustrated in FIG. 15A-2, according to an exemplary embodiment, may control the display 230 to display the thumbnail image 1520 in the first mode including information on two new updates. However, when an icon of a photo application with the second predetermined size is converted to a thumbnail image, the controller 290, as illustrated in FIG. 15B-1, according to an exemplary embodiment, may control the display 230 to display a thumbnail image 1530 in the second mode which displays four recently photographed photos. In addition, in an exemplary embodiment, when an icon on the SNS application in the second predetermined size is converted into a thumbnail image, the controller 290, as illustrated in FIG. 15B-2, may control the display 230 to display the thumbnail image 1540 in the second mode including one recently update and three additional update information items.

Meanwhile, when the user interaction is to touch one of a plurality of apexes of the first mode thumbnail image 1510 and 1520 and drag the touched area in an outward direction of the thumbnail image 1510 and 1520 is detected, the controller 290 may convert the first mode thumbnail image 1510 and 1520 to the second mode thumbnail image 1530 and 1540. In addition, according to an exemplary embodiment, when the user interaction to touch one of a plurality of apexes included in the second mode thumbnail image 1530 and 1540, and drag the touched area to an outward direction of the thumbnail image 1530 and 1540 is detected, the controller 290 may convert the second mode thumbnail image 1530 and 1540 to the first mode thumbnail image 1510 and 1520.

In addition, according to an exemplary embodiment, when the diagonal interaction is detected on a displayed item, the controller 290 may provide a folding image effect in which a displayed item for which the diagonal interaction is detected is folded, and when providing the folding image effect, a shadow image effect may be provided for more realistic graphic expression.

To be specific, according to an exemplary embodiment, the controller 290 may control the display 230 to display a screen 1600 which includes four display items 1610-1640 having a rectangular shape. In addition, when the diagonal interaction is detected for at least one of the four display items 1610-1640, the controller 290 may provide a folding image effect that a displayed item for which the diagonal interaction is detected is folded, and the shadow image effect for a specific light source. In an exemplary embodiment, it is assumed that the specific light source is located at an upper part of the image.

To be specific, according to an exemplary embodiment, when the diagonal interaction is detected for a second displayed item 1620 among the four displayed items 1610-

Figure 16A:
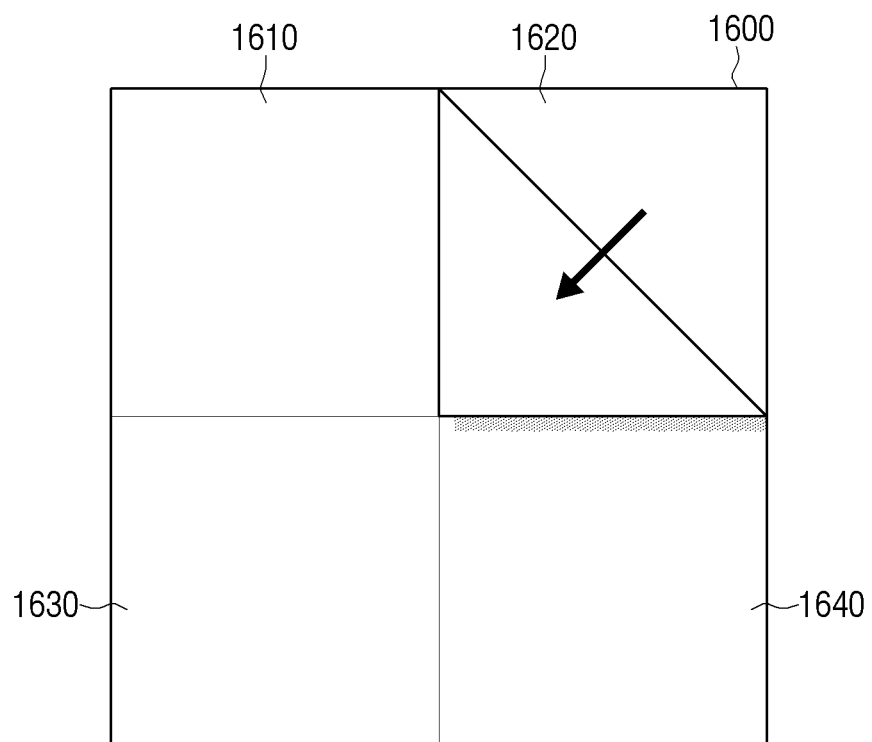
Figure 16B:
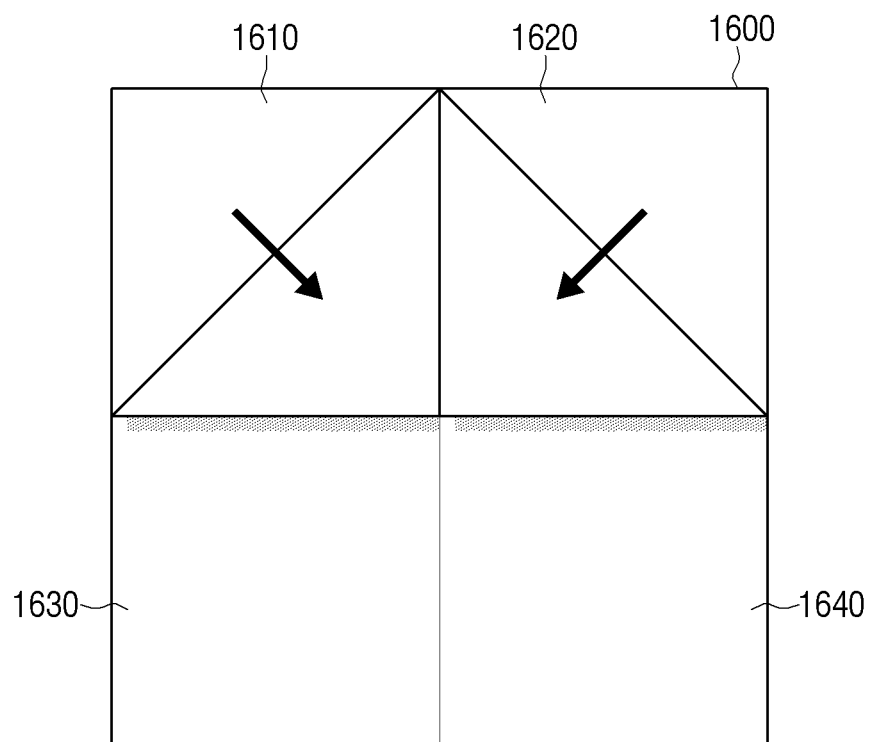
Figure 16C:
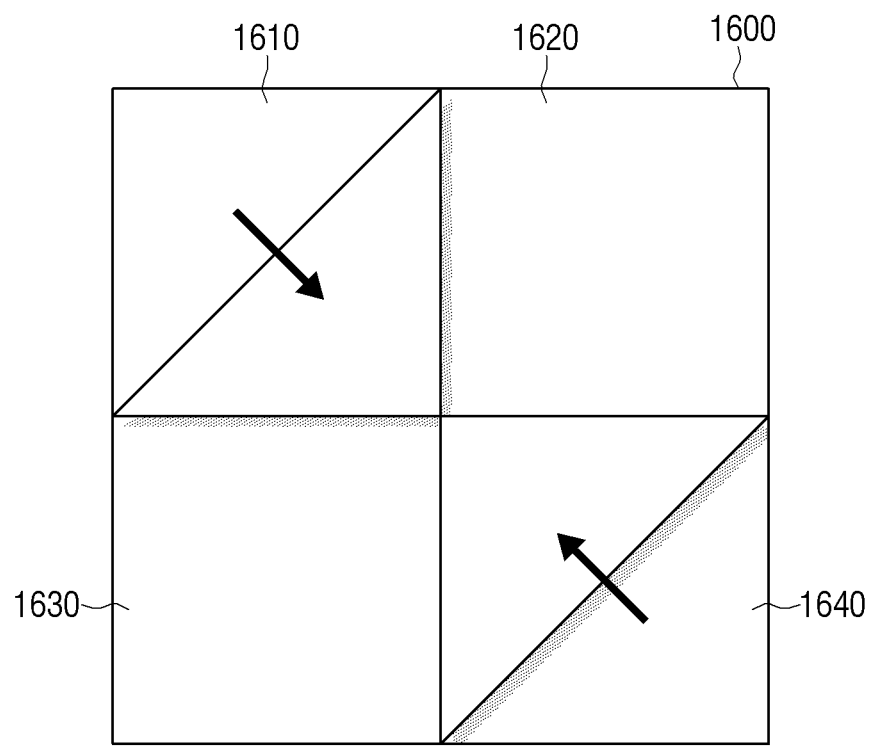

1640, the controller 290, as illustrated in FIG. 16A, according to an exemplary embodiment, may provide a folding image that the second displayed item 1620 is folded, and provide a shadow effect at a bottom side of the folded second displayed item 1620. In addition, when the diagonal interaction is detected for the first and second displayed items 1610 and 1620 among the four displayed items 1610-1640, the controller 290, as illustrated in FIG. 16B, according to an exemplary embodiment, may provide the folding image effect to fold the first and second displayed items 1610 and 1620, and provide a shadow effect on bottom sides of the folded first and second displayed items 1610 and 1620. In addition, when the diagonal interaction is detected for the first and fourth displayed item 1610 and 1640 among the four displayed items 1610-1640, the controller 290, as illustrated in FIG. 16C, according to an exemplary embodiment, may provide a folding image effect to fold the first and fourth display items 1610 and 1640, and provide a shadow effect on the bottom side of the folded first displayed item 1610 and on the diagonal line of the fourth displayed item 1640.

Figure 17:
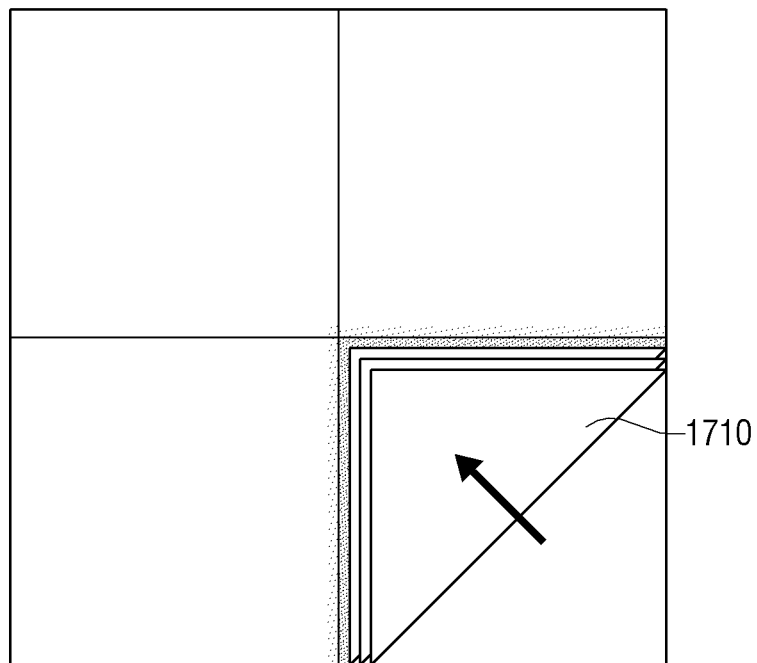

Further, when a plurality of diagonal interactions are detected for one displayed item, the controller 290 may control the display 230 to provide the image effect to fold, several times, the displayed item for which the diagonal interaction is detected. To be specific, according to an exemplary embodiment, when n times of diagonal interactions are detected for one displayed item 1710, the controller 290, as illustrated in FIG. 17, may control the display 230 to provide an image effect that the displayed item 1710 is folded for n times.

In addition, when the diagonal interaction is detected from one of apexes of the first screen, the controller 290 may control the display 230 to display a plurality of items at a corner area corresponding to the apexes where the diagonal interaction is detected. In addition, when a direction of the drag interaction is changed, and a drag interaction toward one of a plurality of items is detected, the controller 290 may execute a function which corresponds to the item where the drag interaction is detected.

Figure 18A:
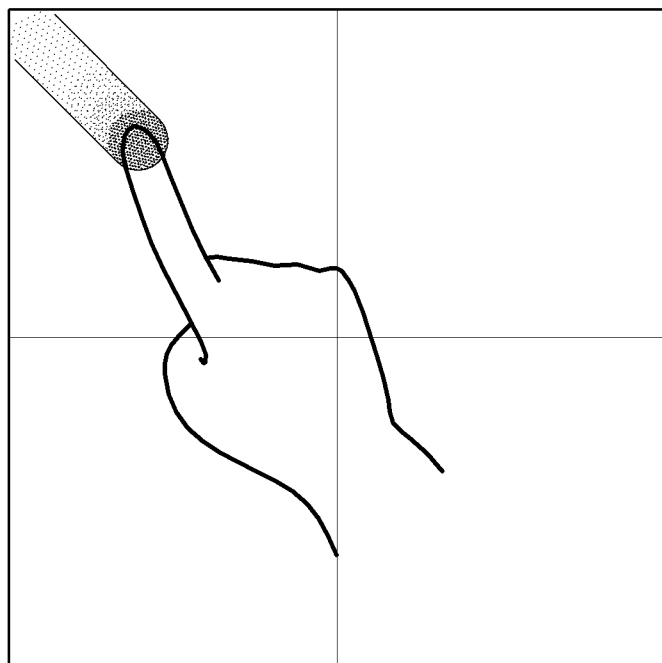
Figure 18B:
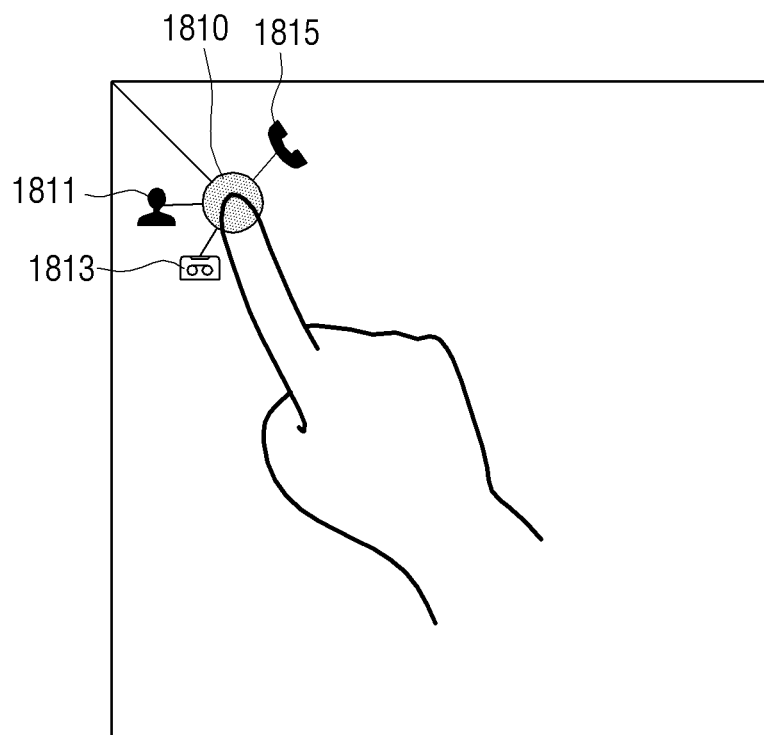

To be specific, as illustrated in FIG. 18A, according to an exemplary embodiment, when the diagonal interaction is detected at an apex in an upper left end portion, the controller 290, as illustrated in FIG. 18B, according to an exemplary embodiment, may control the display 230 to display a menu 1810 which includes a contact list item 1811, a recording item 1813, and a phone item 1815 at a corner area in an upper left end portion. In this case, the items included in the menu may have different numbers according to drag length of the diagonal interaction.

Figure 18C:
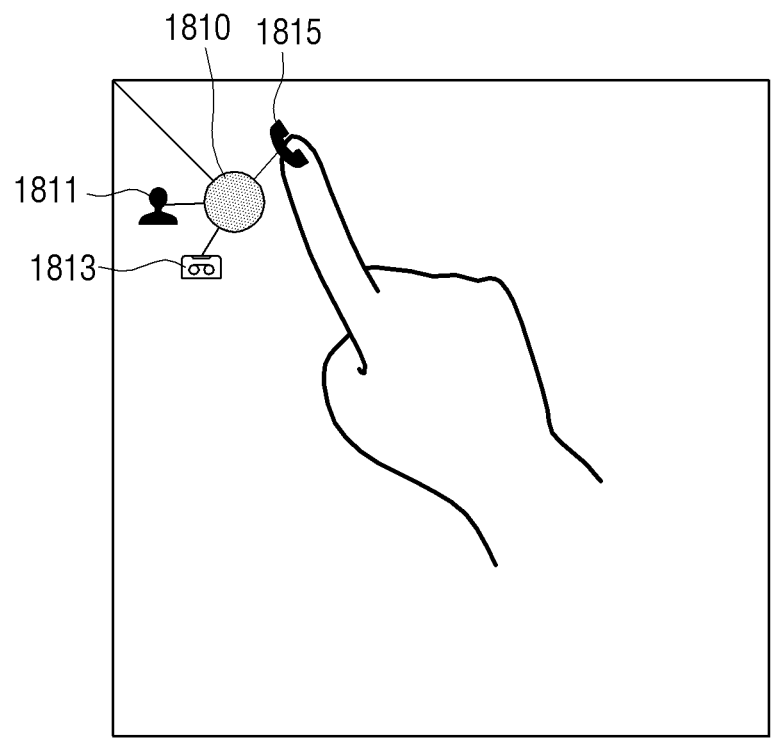

While a menu 1810 is displayed, when a user changes a dragging direction toward a telephone item 1815 in an upper right end, as illustrated in FIG. 18C, according to an exemplary embodiment, the controller 290 may execute a telephone application which corresponds to the telephone item 1815.

As described above, according to an exemplary embodiment, displaying of a menu and executing a function may be performed at the same time through the diagonal interaction and the drag interaction in which the direction is changed.

<Grid Screen>

According to yet another exemplary embodiment, the display 230 may display a grid screen that includes a plurality of square cells. In addition, the display 230 may display a plurality of objects on the plurality of square cells. In this case, each of the plurality of objects may be displayed on at least one of a plurality of square cells. In addition, when a user interaction to touch and drag the first object from among the plurality of objects is detected, the controller 290 may adjust the size of the first object by adjusting the number of cells where the first object is displayed according to a dragging distance and a direction of the user interaction.

Figure 19A:
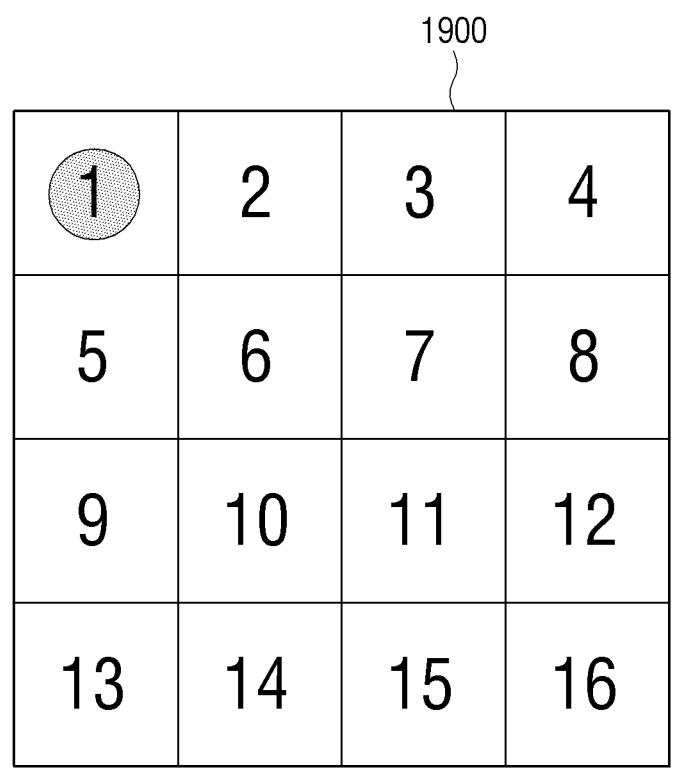
Figure 19B:
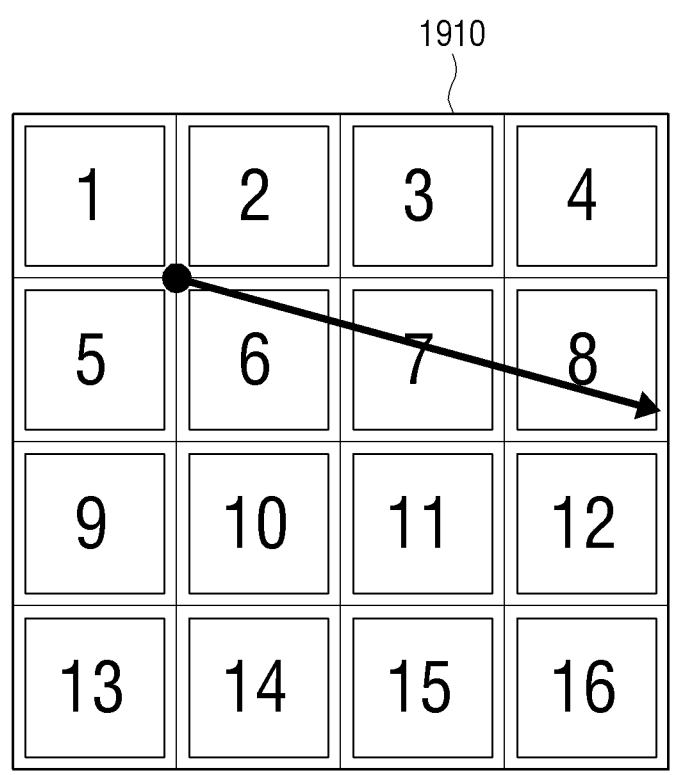
FIGS. 19A to 32C are views illustrating a user terminal device performing various functions on a grid screen composed of a plurality of square cells, according to an exemplary embodiment.

To be specific, as illustrated in FIG. 19A, according to an exemplary embodiment, the display 230 may display sixteen objects on each of a plurality of square cells included in the grid screen. In addition, when a preset user interaction (for example, an interaction to press the first object for a preset time) is detected on the first object, the controller 290 may change a mode of the user terminal device 200 to a grid editing mode. When the mode is changed to the grid editing mode, the size of the sixteen objects displayed on the square cell may decrease as illustrated in FIG. 19B, according to an exemplary embodiment.

Figure 19C:
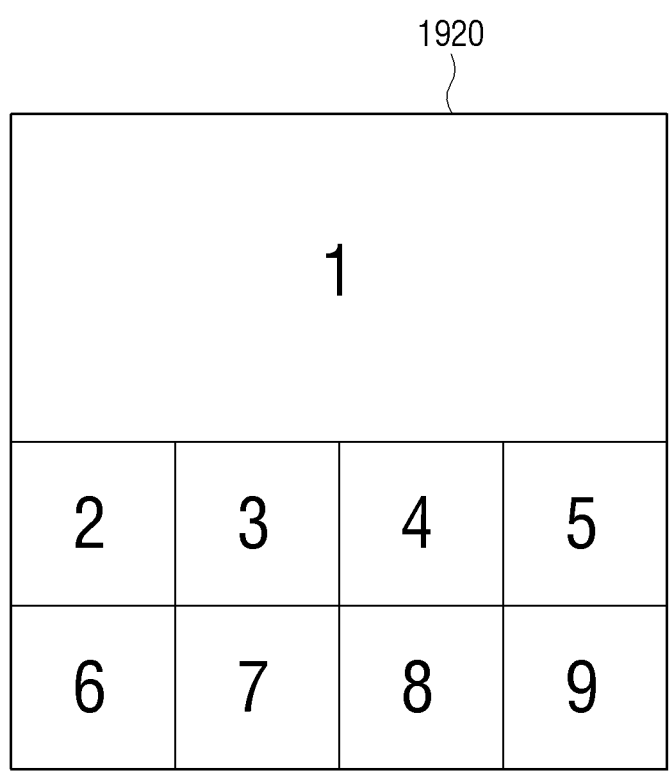

In addition, when a user action to touch and drag an interaction point among the first object, second object, fifth object, and sixth object in a direction of 4 o'clock is detected, as illustrated in FIG. 19B, according to an exemplary embodiment, the controller 290, as illustrated in FIG. 19C, may control the display 230 to determine that the square cell where the first object is displayed is the first to eighth square cell, enlarge the first object so that the first object is displayed on the determined first to eighth cell, and display the first object. In this case, when the ninth to sixteenth object are deleted from the display screen, the second to ninth object, as illustrated in FIG. 19C, according to an exemplary embodiment, may change location of the square cell in which they are displayed.

In particular, a first user interaction to touch and drag the first object in an outward direction is detected, the controller 290 may increase the number of square cell areas in which the first object is displayed, thereby increasing size of the first object, move a part of the plurality of objects excluding the first object to another square cell, and delete another part from the display screen. In addition, when a second user interaction to touch and drag the first object in an inward direction of the first object is detected, the controller 290 may decrease the number of square cell areas where the first object is displayed, thereby reducing size of the first object, move a part of a plurality of objects excluding the first object into another square cell area, and add a new object to the display screen.

Figure 20A:
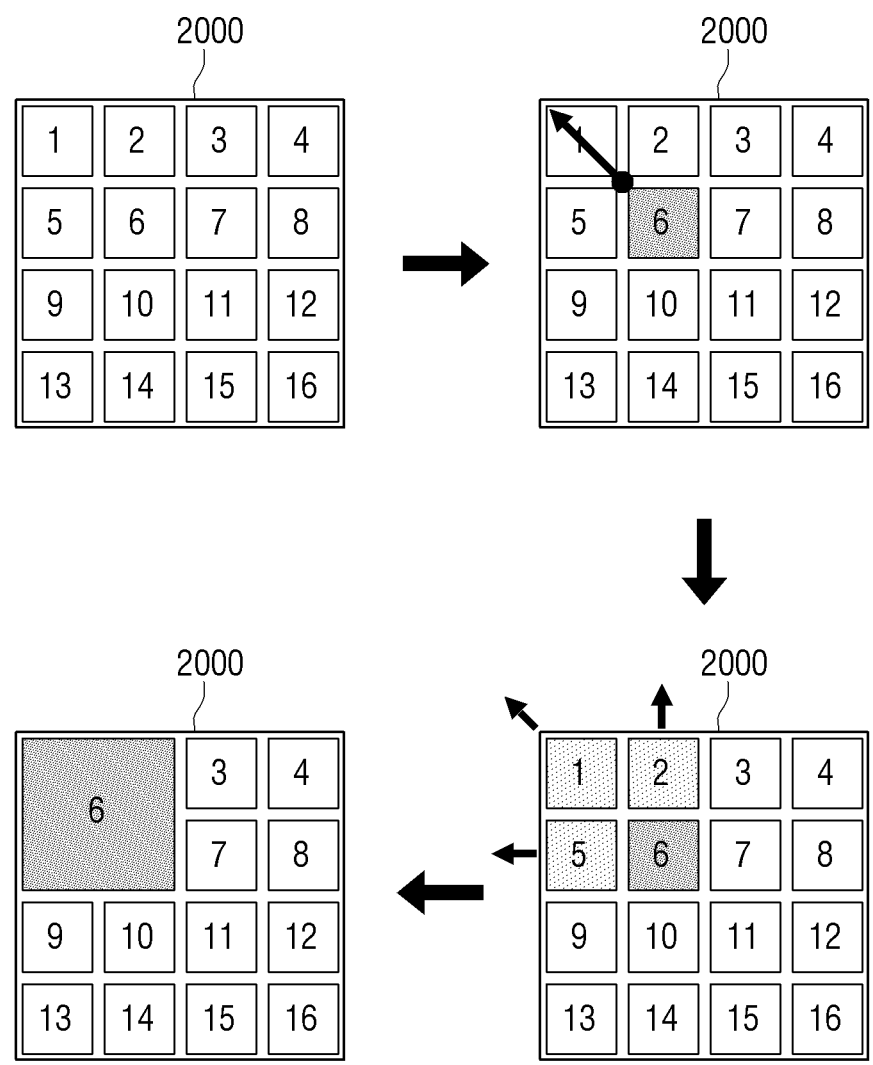

To be specific, as illustrated in FIG. 20A, according to an exemplary embodiment, while sixteen objects are displayed on each of the sixteen square cells included in the grid screen 2000, when a user interaction to touch and drag the sixth object in an outward direction of the sixth object toward an upper right end is detected, the controller 290 may delete the first object, the second object, and the fifth object from the display screen and increase size of the sixth object so that the sixth object is located on four square cells i.e., occupies four square cells.

That is, in case of an object of which line or apex is in contact with the object of which size increases, the object may move in an opposite direction of the line or apex according to a user interaction in an exemplary embodiment. In addition, an object in which a square cell does not exist at a moved position may be deleted from the display screen. In addition, when an object is generated later, the object which is deleted from the display screen may be relocated according to a user interaction. For example, as the fourth screen of FIG. 20A, when a user interaction to drag the sixth object in an inward direction while the sixth object is located on four square cells is detected, the controller 290, as illustrated in the first screen of FIG. 20A, may relocate the first object, the second object, and the fifth object which were removed from the display screen.

Figure 20B:
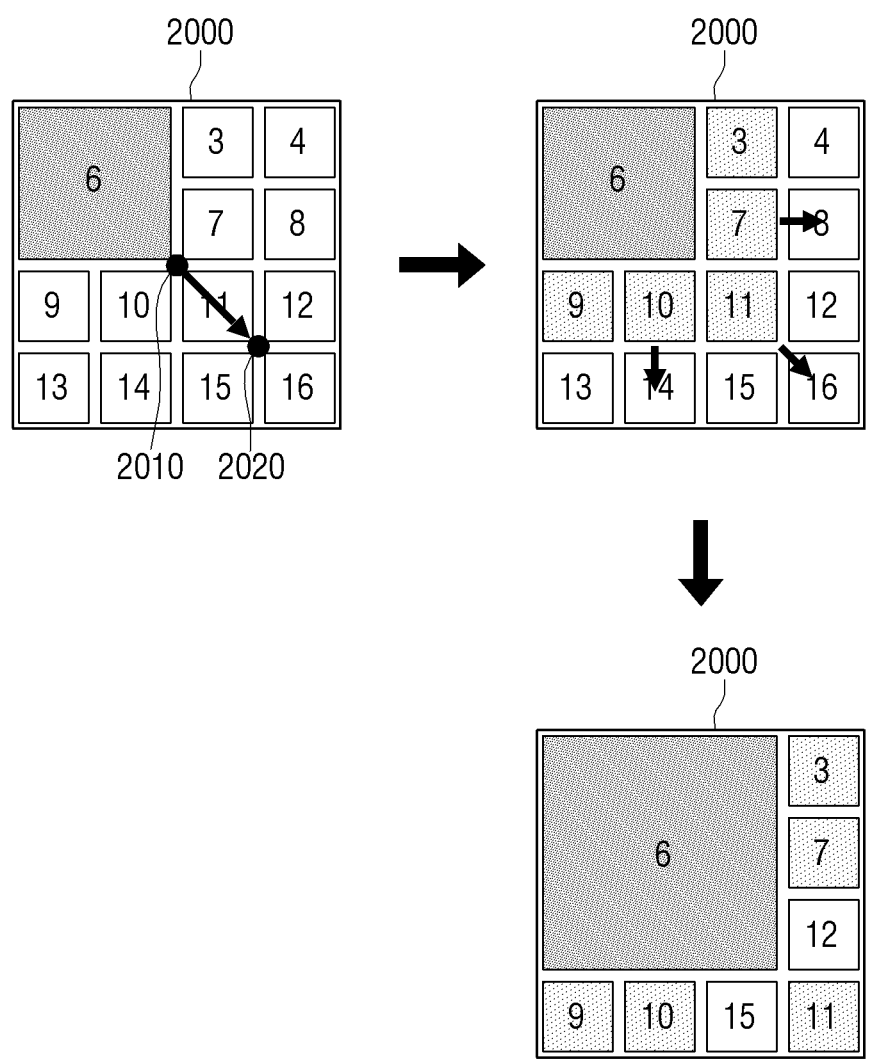

In addition, as illustrated in a first screen of FIG. 20B, according to an exemplary embodiment, when a user interaction to touch and drag a first point 2010 to a second point 2020 in a lower right direction is detected, the controller 290, as illustrated in a third screen of FIG. 20B, may control the display 230 to move the third object, the seventh object, tenth object, and the eleventh object with which a line or an apex of the sixth object is in contact to another location to correspond to a dragging direction, and delete from the display screen the fourth object, eighth object, thirteenth object, fourteenth object, and sixteenth object which were displayed.

When an object displayed on the display 230 is a widget of an application, if the length of one line of the enlarged object is the same as length of one line of the display 230, the controller 290 may change the widget of an application to a screen to execute the application.

Figure 20C:
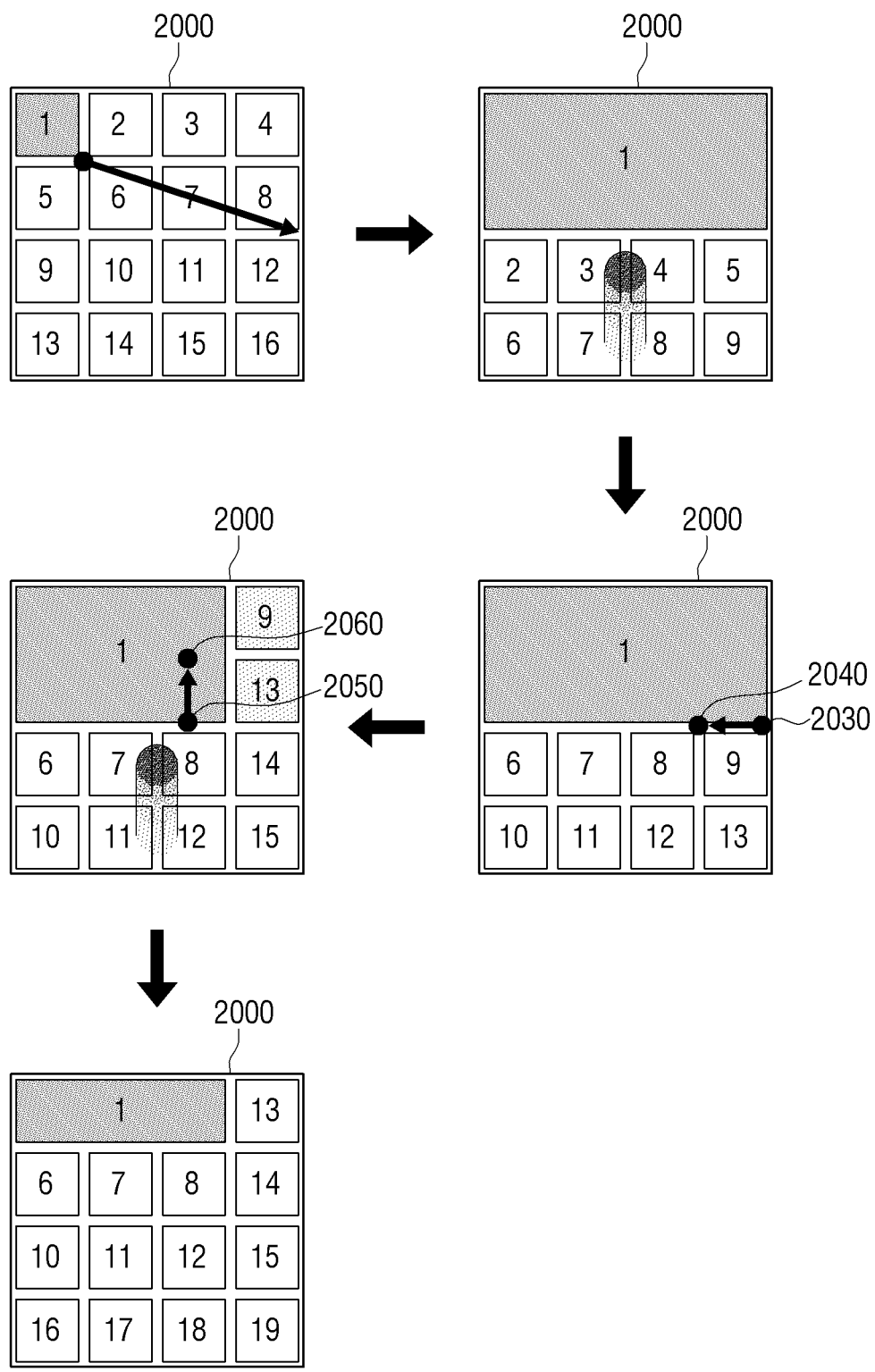

To be specific, as illustrated in a first screen of FIG. 20C, according to an exemplary embodiment, when a user interaction to touch and drag the first object in a widget type to an area where the eighth object is displayed is detected, the controller 290 may increase size of the first object, and change the first object in a widget format to an application screen.

In addition, when a user interaction to scroll an area where the second to ninth objects are displayed is detected, the controller 290 may control the display 230 to fix the first object, delete the second to fifth objects from among the second to ninth objects from the display screen, move location of the sixth to ninth objects in an upward direction, and newly add the tenth to thirteenth objects.

As illustrated in the third screen of FIG. 20C, according to an exemplary embodiment, when a user interaction to touch and drag a third point 2030 of the first object toward a fourth point 2040 is detected, the controller 290, as illustrated in a fourth drawing of FIG. 20C, may control the display 230 to decrease size of the first object, move location of the ninth to thirteenth objects in an upward direction, and display fourteenth to fifteenth objects which are new objects.

In addition, as illustrated in a fourth drawing of FIG. 20C, according to an exemplary embodiment, when a user interaction to touch a fifth point 2050 of the first object and drag toward a sixth point 2060 is detected, the controller 290, as illustrated in a fifth drawing of FIG. 20C, may control the display 230 to decrease size of the first object, delete the ninth object from the display screen, move the sixth object, seventh object, eighth object, and tenth to fifteenth object in another upper direction, and display sixteenth to nineteenth object which are new objects.

In addition, the controller 290 may change the contents included in the first object in accordance with the number of square cells which the first object occupies in the grid screen.

Figure 21A:
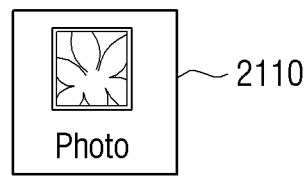

To be specific, when an object of a photo application occupies one square cell, the controller 290, as illustrated in FIG. 21A, according to an exemplary embodiment, may control the display 230 to display an icon corresponding to the photo application as an object 2110.

Figure 21B:
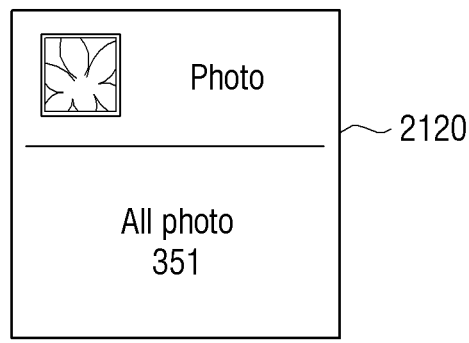

When an object of a photo application occupies four square cells, the controller 290, as illustrated in FIG. 21B, according to an exemplary embodiment, may control the display 230 to display an object 2120 that includes brief information (for example, stored photo information) of the photo application.

Figure 21C:
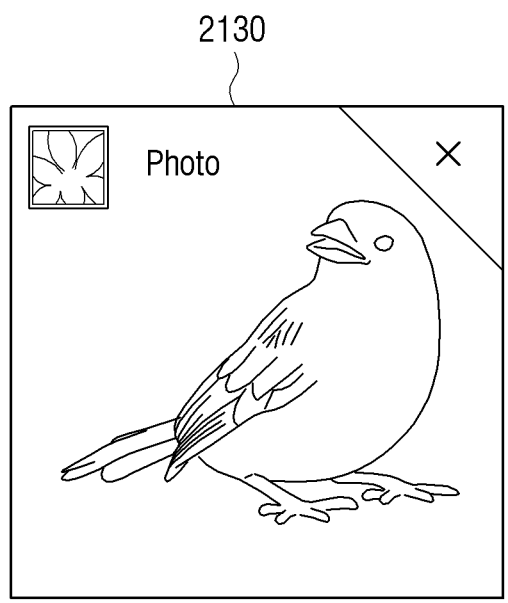

In addition, when an object of a photo application occupies nine square cells, the controller 290, as illustrated in FIG. 21C, according to an exemplary embodiment, may control the display 230 to display an object 2130 that includes detailed information (for example, thumbnail image information about a photo recently taken, etc.) of the photo application.

Figure 21D:
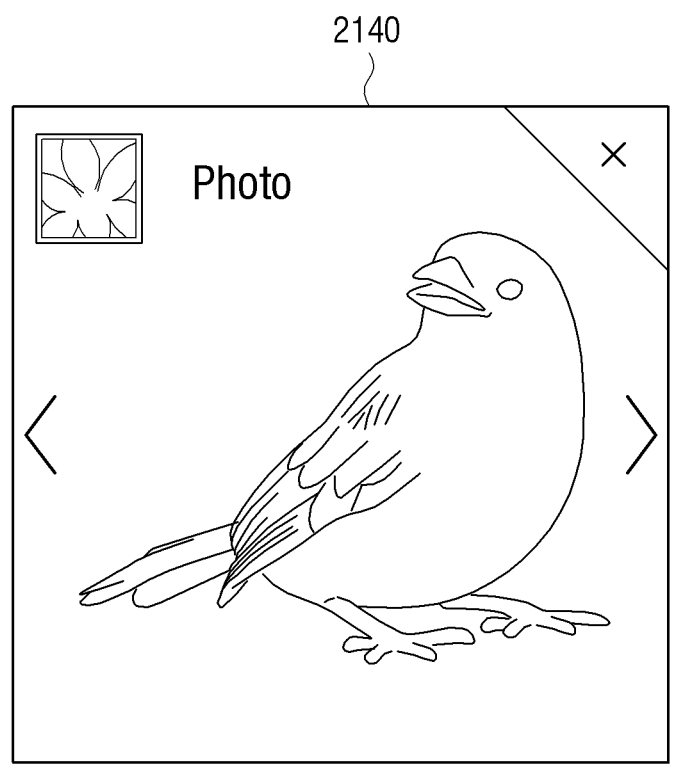

In addition, when an object on a photo application occupies sixteen square cells, the controller 290, as illustrated in FIG. 21D, according to an exemplary embodiment, may control the display 230 to display an object 2140 that includes a screen (for example, a photo list, etc.) for executing the photo application.

However, as described above, that there may be four different operations according to the number of square cells corresponding to an object size of an object is merely exemplary, and there may be a plurality of operations. For example, the controller 290 may differently display an object in three operations according to the number of square cells which an object occupies or the size of an object.

Figures 1, 22A:
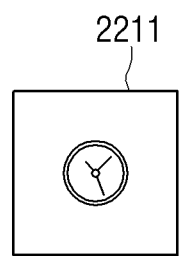
Figures 2, 22A:
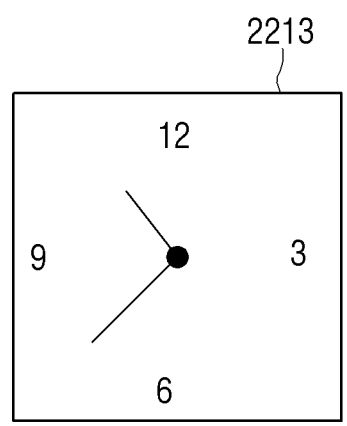
Figures 3, 22A:
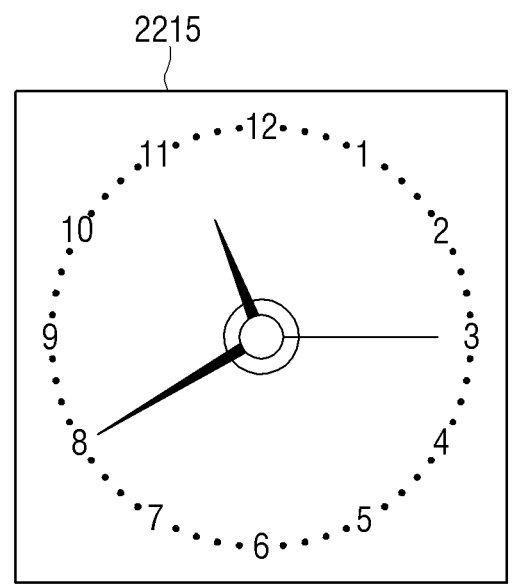

To be specific, as illustrated in FIG. 22A, according to an exemplary embodiment, when an object corresponds to a clock application, when the size of the object occupies a square cell of the first number or size (number of square cells occupied), the controller 290 may control the display 230 to display an object 2211 as an icon which corresponds to the clock application. In addition, when the size of an object occupies a square cell of the second number or size, the controller 290 may control the display 230 to display an object 2213 as a simple clock. In addition, when size of an object occupies a square cell of the third number or size, the controller 290 may control the display 230 to display an object 2215 as a detailed clock (that is, a clock including a second hand and minute intervals).

Figures 1, 22B:
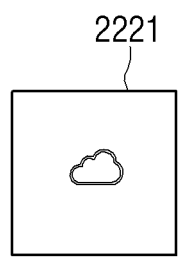
Figures 2, 22B:
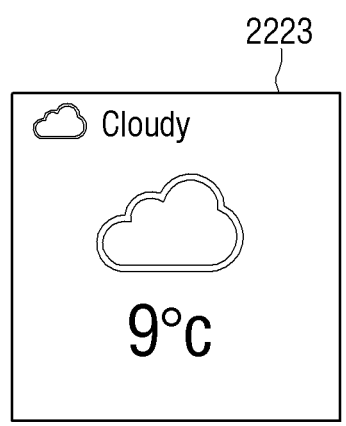
Figures 3, 22B:
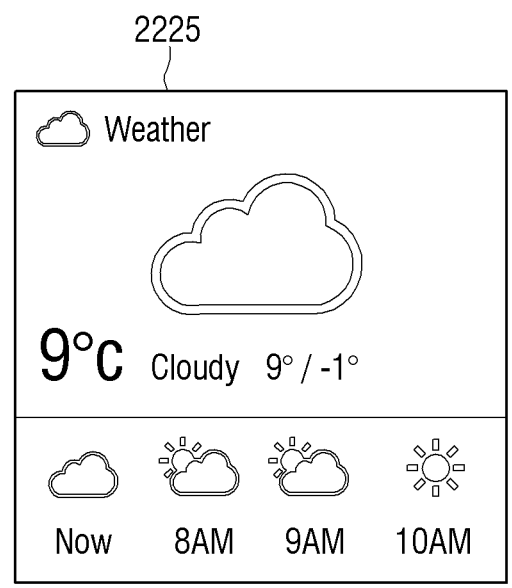

As illustrated in FIG. 22B, according to an exemplary embodiment, when an object corresponds to a weather application, if the object occupies a square cell of the first number, the controller 290 may control the display 230 to display an object 2221 as an icon which corresponds to the weather application. In addition, when the size of the object is a square cell of the second number or size, the controller 290 may control the display 230 to display an object 2223 including brief weather information (for example, current weather of a region where a user is located). In addition, when size of the object is a square cell of the third number or size, the controller 290 may control the display 230 to display an object 2225 that includes detailed weather information (for example, present weather information and future weather information).

Figures 1, 22C:
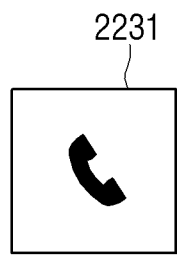
Figures 2, 22C:
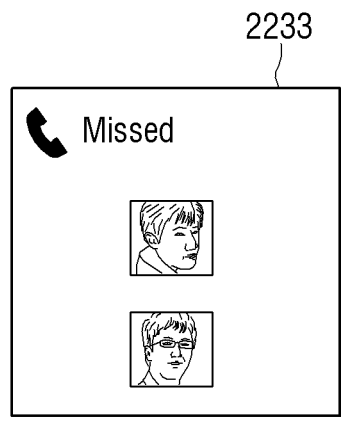
Figures 3, 22C:
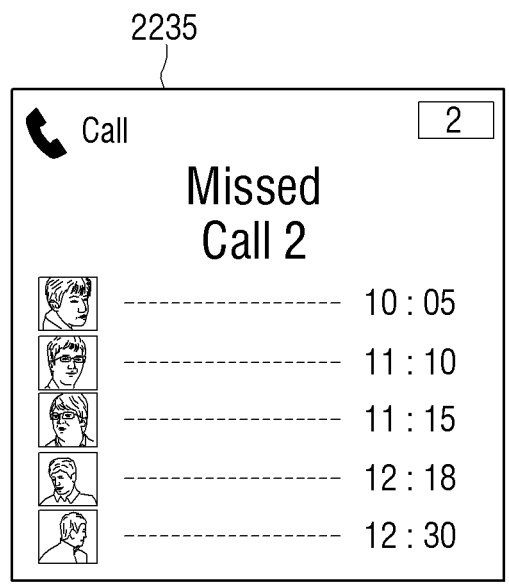

As illustrated in FIG. 22C, according to an exemplary embodiment, when an object corresponds to a telephone application, if the object occupies a square cell of the first number or size, the controller 290 may control the display 230 to display an object 2231 as an icon which corresponds to a telephone application. In addition, when the object occupies a square cell of the second number or size, the controller 290 may control the display 230 to display an object 2233 including two contact information items. When the object occupies a square cell of the third number or size, the controller 290 may control the display 230 to display an object 2235 including a telephone screen which includes five contact information items.

Figures 1, 22D:
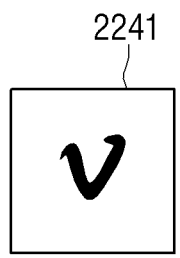
Figures 2, 22D:
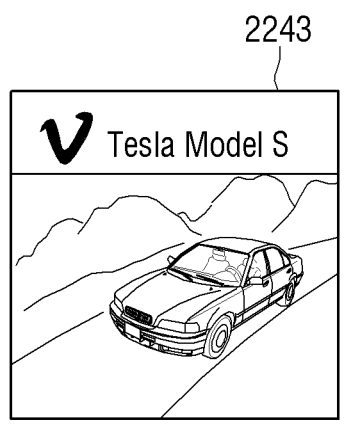
Figures 3, 22D:
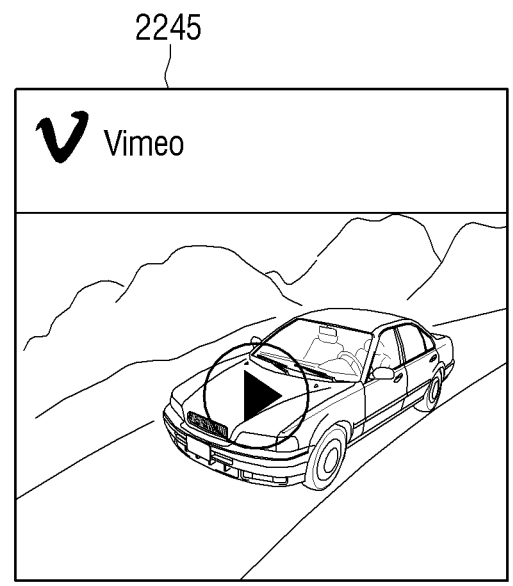

As illustrated in FIG. 22D, according to an exemplary embodiment, when an object corresponds to a video sharing application, if the object occupies a square cell of the first number or size, the controller 290 may control the display 230 to display an object 2241 as an icon which corresponds to the video sharing application. In addition, when the object occupies a square cell of the second number or size, the controller 290 may control the display 230 to display an object 2243 including a thumbnail image of specific video. If size of the object occupies a square cell of the third number or size, the controller 290 may control the display 230 to display an object 2245 which includes a screen for executing a video.

Figures 1, 22E:
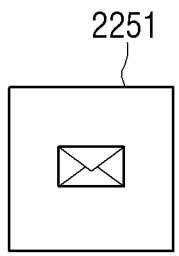
Figures 2, 22E:
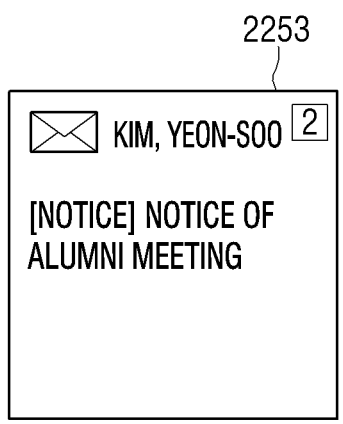
Figures 3, 22E:
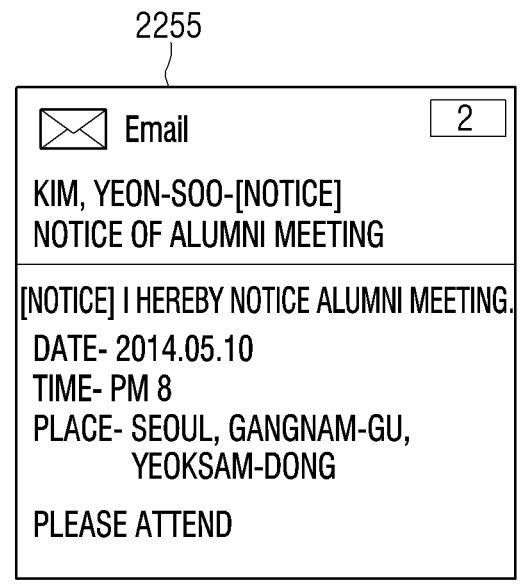

As illustrated in FIG. 22E, according to an exemplary embodiment, when an object corresponds to an e-mail application, if the object occupies a square cell of the first number or size, the controller 290 may control the display 230 to display an object 2251 as an icon which corresponds to the e-mail application. When the object occupies a square cell of the second number or size, the controller 290 may control the display 230 to display an object 2253 which includes brief information (for example, name of a sender, title, etc.) of the received e-mail. When the object occupies a rectangular cell of the third number or size, the controller 290 may control the display 230 to display an object 2255 which includes detailed information (for example, name of a sender, data of receipt, contents of e-mail, etc.) of the received e-mail.

Figures 1, 22F:
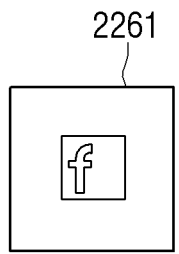
Figures 2, 22F:
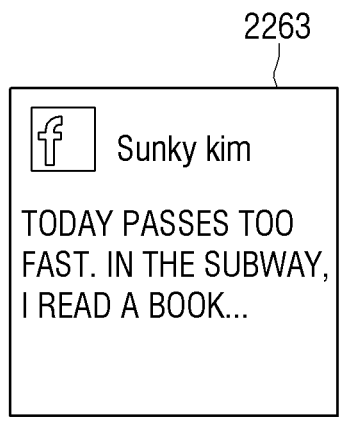
Figures 3, 22F:
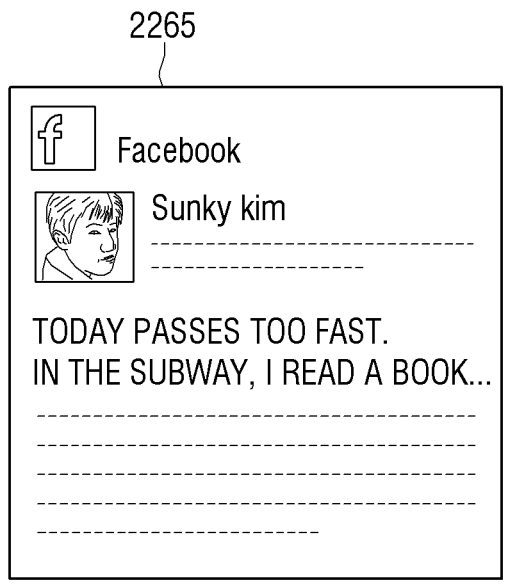

As illustrated in FIG. 22F, according to an exemplary embodiment, when an object corresponds to an SNS application, when the object occupies a square cell of the first number or size, the controller 290 may control the display 230 to display an object 2261 as an icon which corresponds to the SNS application. In addition, when the object occupies a square cell of the second number or size, the controller 290 may control the display 230 to display an object 2263 which includes brief information (for example, writer, contents of writing, etc.) of recently updated writing. Further, when the object occupies a square cell of the third number or size, the controller 290 may control the display 230 to display an object 2265 which includes detailed information (for example, a profile image, a recommendation icon, a reply, etc.) of a recently-updated writing.

Hereinafter, with reference to FIGS. 23A to 23D, according to an exemplary embodiment, an example which describes that the number of square cells on a grid screen which an object occupies according to a user interaction, and contents displayed about the object of which the number of cells is adjusted are changed will be described.

Figure 23A:
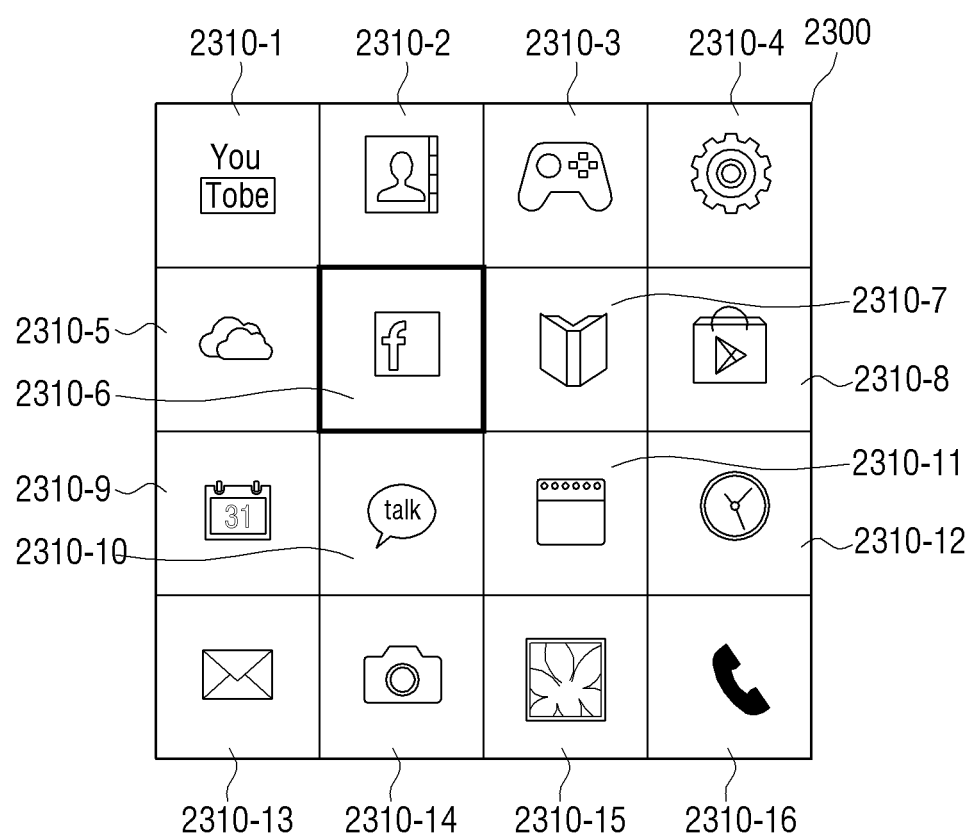
Figure 23B:
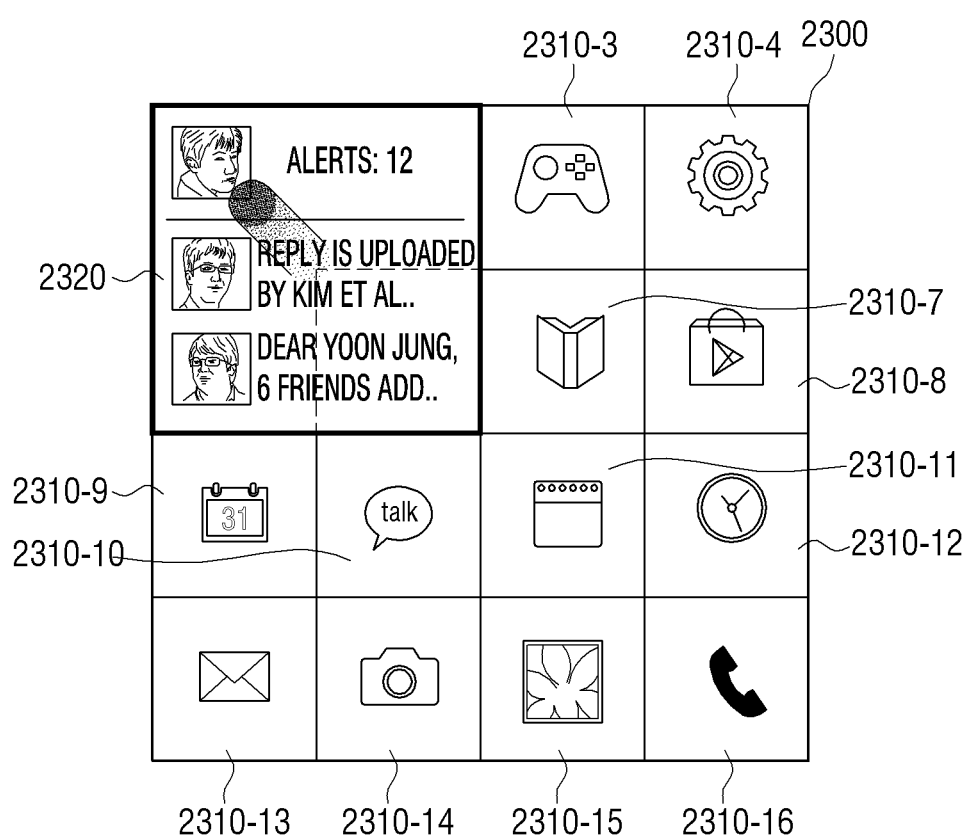

As illustrated in FIG. 23A, according to an exemplary embodiment, the display 230 displays sixteen objects 2310-1 to 2310-16 on a grid screen. In this case, the sixteen objects 2310-1 to 2310-16 may include icons of the corresponding applications respectively.

In addition, when a user interaction to touch a sixth object 2310-6 which corresponds to the SNS application from among the sixteen objects 2310-1 to 2310-16 and drag the object into an upper right end is detected, the controller 290 may control the display 230 to increase the size of the sixth object 2310-6 to occupy four cells, and change and display the object as an object 2320 which includes brief information about a recently updated post. In this case, the controller 290 may control the display 230 to remove the first object 2310-1, the second object 2310-2, and the fifth object 2310-5 from a display screen.

Figure 23C:
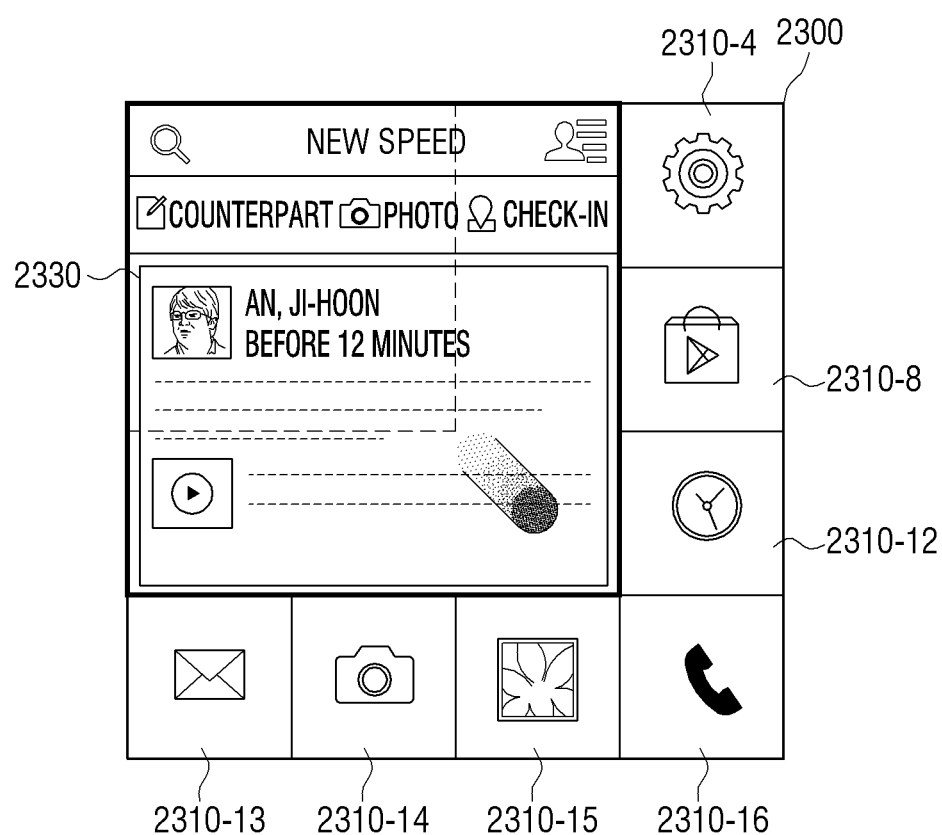

As illustrated in FIG. 23C, according to an exemplary embodiment, when a user interaction to drag the object 2320 which includes brief information about a recently updated post in a right down direction is detected, the controller 290 may control the display 230 to increase size of the sixth object 2320 so that the object 2320 which includes brief information about a recently updated post occupies nine cells, and change the object 2320 which includes brief information about a recently updated post to an object 2330 which includes detailed information about a recently updated post. At this time, the controller 290 may control the display 230 to remove the third object 2310-3, the seventh object 2310-7, the ninth object 2310-9, the tenth object 2310-10, and the eleventh object 2310-11 from a display screen.

Figure 23D:
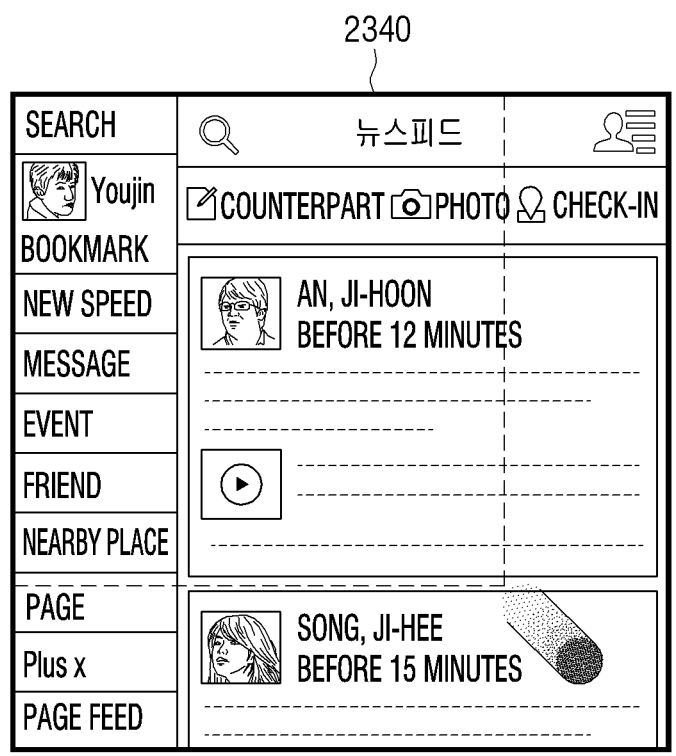

As illustrated in FIG. 23D, according to an exemplary embodiment, when a user interaction to drag the object in a right lower direction is detected, the controller 290 may control the display 230 to increase the size of the sixth object 2330 so that the object 2330 which includes detailed information about a recently updated post occupies all the sixteen cells, change the object 2330 which includes detailed information about a recently updated post to an object 2340 which includes a screen for executing an SNS application, and display the object 2340. At this time, the controller 290 may control the display 230 to remove the fourth object 2310-4, the eighth object 2310-8, the twelfth object 2310-12, and the sixteenth object 2310-16 from a display screen.

In addition, when the number of cells which the object occupies increases according to a user interaction, the controller 290 may change the size and contents of the object using different methods based on a size of an object which is displayed occupying a plurality of square cells.

Figure 24A:
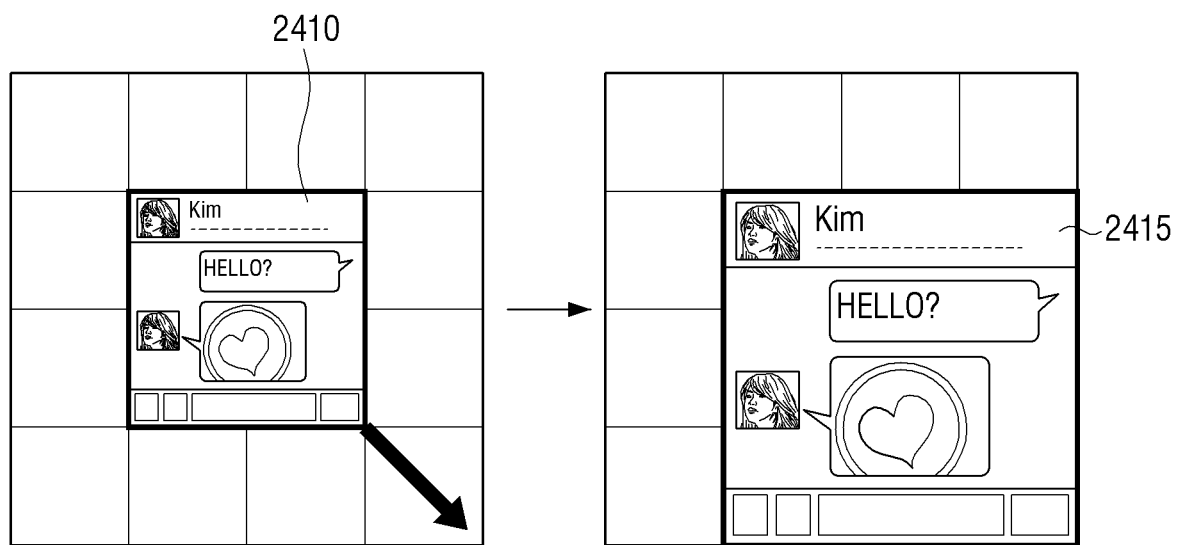

To be specific, as illustrated in FIG. 24A, according to an exemplary embodiment, when a user interaction to touch an object 2410 which displays a chatting screen on four square cells and then drag the object in a right lower direction is detected, the controller 290 may increase the size of the object 2415 to increase a screen ratio and display the chatting screen on nine square cells without changing contents of the chatting screen.

Figure 24B:
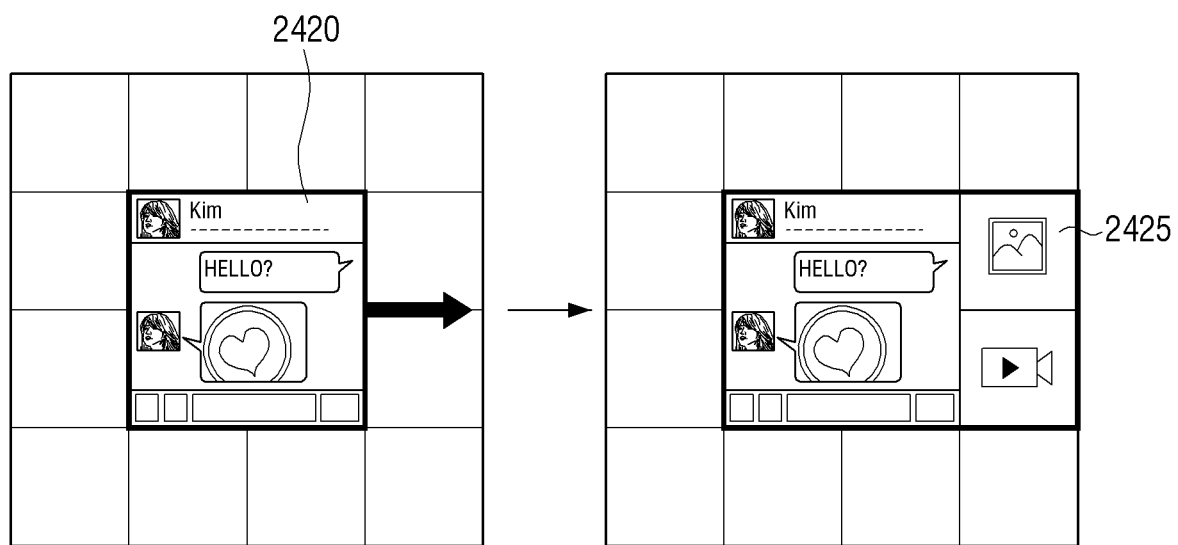

In addition, as illustrated in FIG. 24B, according to an exemplary embodiment, when a user interaction to touch an object 2420 which displays a chatting screen on four square cells and then drag the object in a right direction is detected, the controller 290 may increase size of the object 2425 so as to display the chatting screen on four square cells and display a menu related to the chatting application on two cells.

Figure 24C:
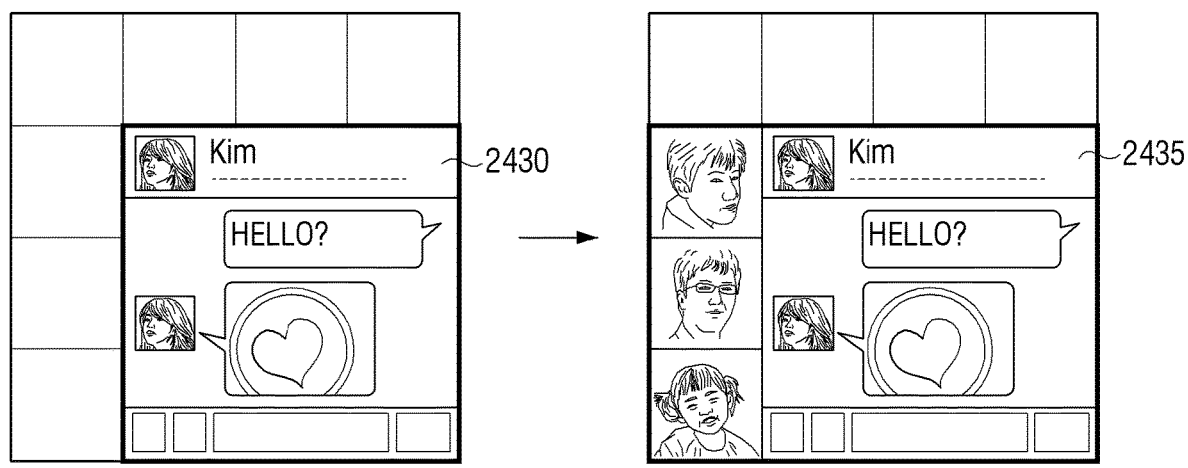

In addition, as illustrated in FIG. 24C, according to an exemplary embodiment, when a user interaction to touch an object 2430 which displays a chatting screen on nine square cells and then drag the object in a left direction is detected, the controller 290 may increase the size of the object 2430 to the object 2435 so as to display the chatting screen on nine square cells and display chatters on three cells.

Figure 24D:
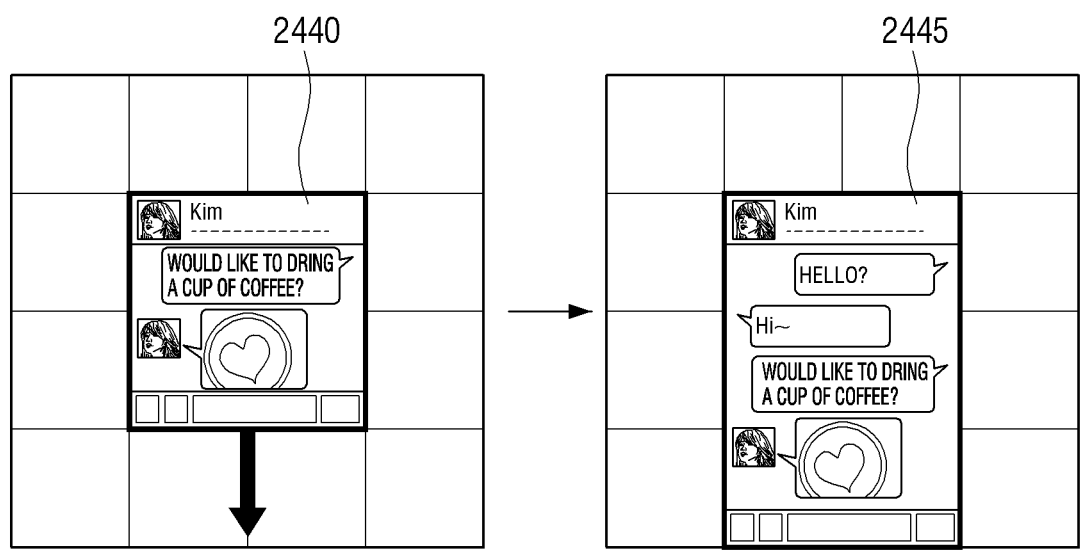

In addition, as illustrated in FIG. 24D, according to an exemplary embodiment, when a user interaction to touch an object 2440 which displays a chatting screen on four square cells and then drag the object in a downward direction is detected, the controller 290 may increase the size of the object 2440 to the object 2445 to display a chatting screen which may include more chatting contents.

Further, while displaying image content on a plurality of square cells, when a user interaction is input, the controller 290 may enlarge or reduce the image contents according to a location of the square cell to which a user interaction is input and a direction of a user interaction.

Figure 25A:
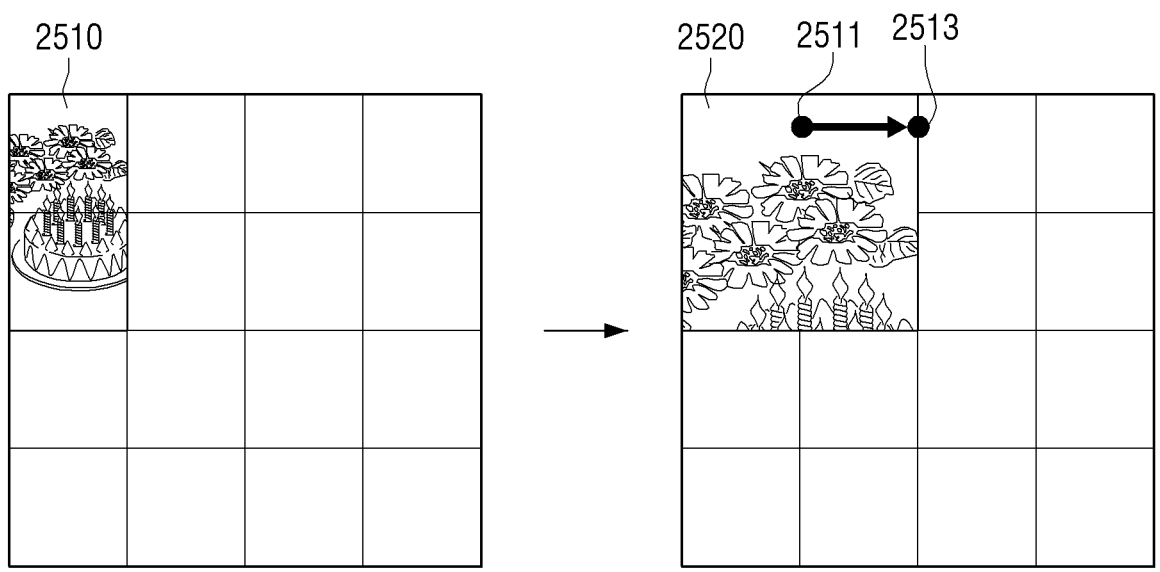

To be specific, as illustrated in FIG. 25A, according to an exemplary embodiment, while a photo content 2510 is displayed on two square cells, when a user interaction to touch a first point 2511 of the content and then drag the point in a right direction to a second point 2513 is detected, the controller 290, as illustrated in right of FIG. 25A, may control the display 230 to display an image 2520 which enlarges a cell that is located at an upper area out of two square cells.

Figure 25B:
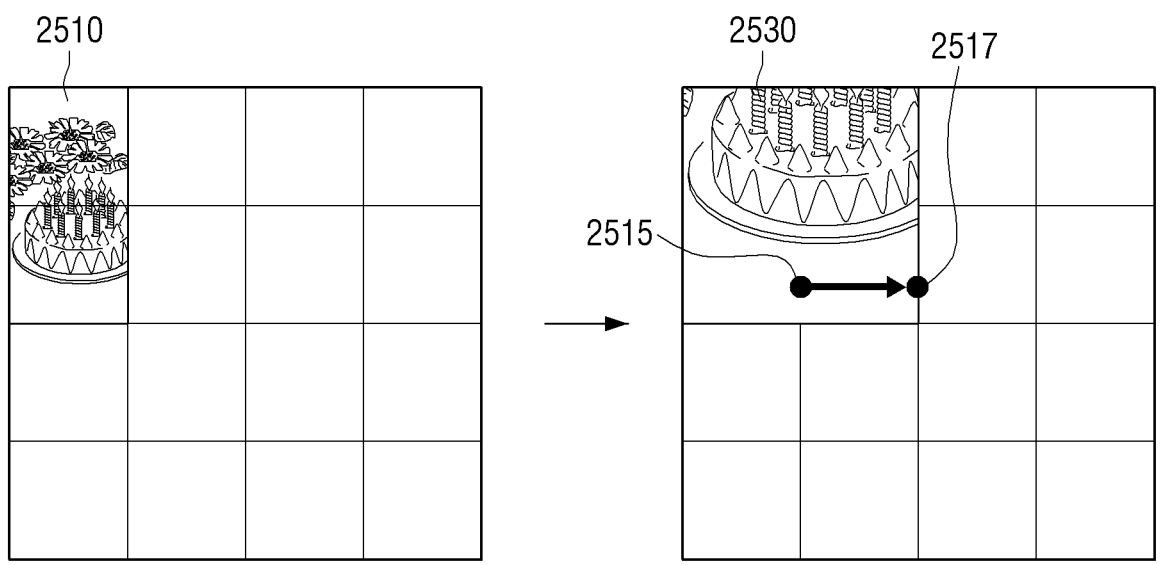

As illustrated in FIG. 25B, according to an exemplary embodiment, while a photo content 2510 is displayed on two square cells, when a user interaction to touch a third point 2515 of a photo content and then drag the point in a right direction to a fourth point 2517 is detected, the controller 290, as illustrated in right portion of FIG. 25B, may control the display 230 to display an image 2530 which enlarges a cell that is located at a lower end portion of two square cells.

Figure 25C:
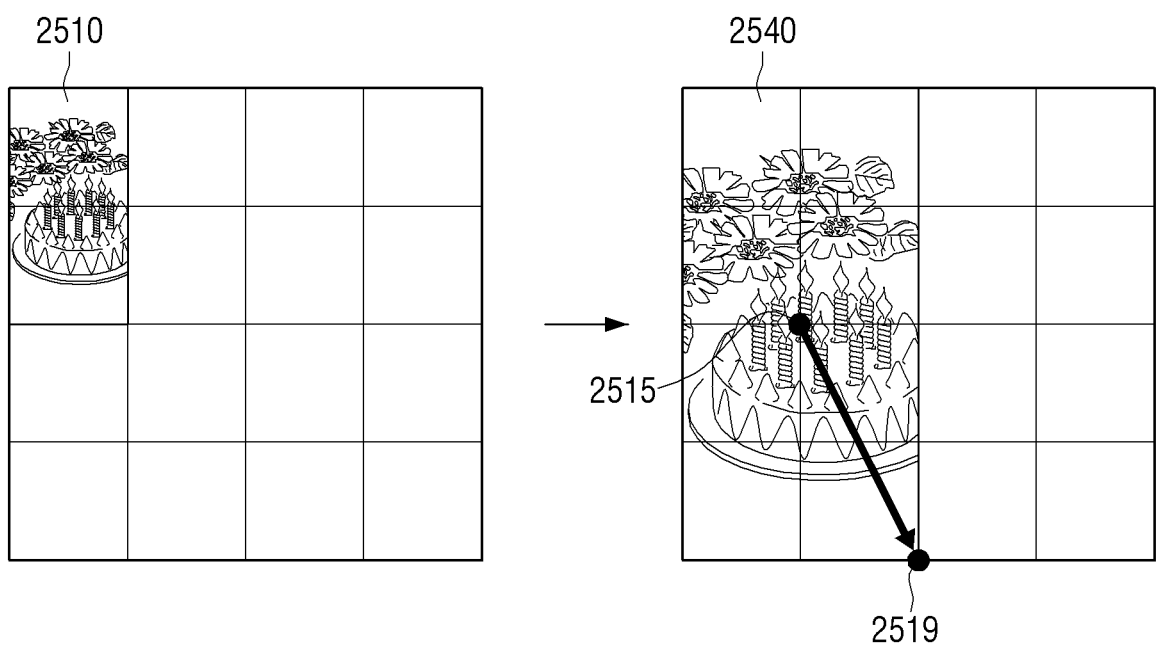

As illustrated in FIG. 25C, according to an exemplary embodiment, while a photo content 2510 is being displayed on two square cells, when a user interaction to touch a third point 2515 of the photo content and drag the point to a fifth point 2519 in a diagonal direction is detected, the controller 290, as illustrated in right of FIG. 25C, may control the display 230 to display an image 2540 which enlarges the photo content 2510 to be displayed on eight rectangular cells.

In addition, while one object is being displayed on a grid screen, when a user interaction to touch and drag two fingers at the same time is detected, the controller 290 may control the display 230 to move an object according to a user interaction and display a menu to control the user terminal device 200.

Figure 26:
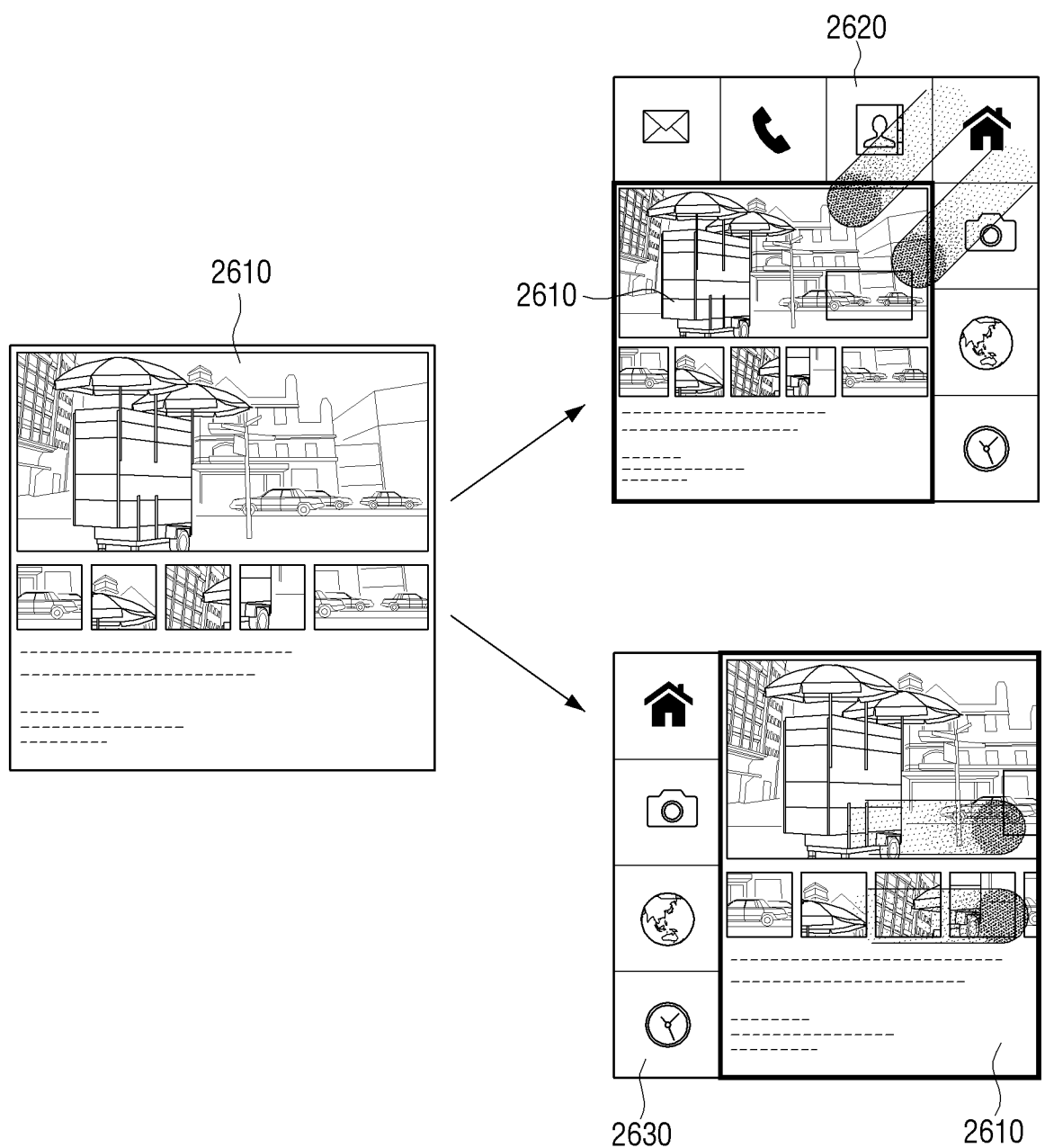

To be specific, as illustrated in FIG. 26, according to an exemplary embodiment, while a specific application screen 2610 is displayed, when a user interaction to touch a specific application screen 2610 with two fingers at the same time and drag in a lower left direction is detected, the controller 290 may control the display 230 to move a specific application screen 2610 in a lower left end portion of the screen, and display a menu 2620 which corresponds to various functions provided by the user terminal device at an upper end and right side of a display screen.

In addition, while a user interaction to touch a specific application screen 2610 with two fingers at the same time, and then drag in a right direction is detected, the controller 290 may control the display 230 to move the application screen 2610 in a right direction and display a menu 2630 which corresponds to various functions provided by the user terminal device on a left side of the display screen.

At this time, a menu which is generated according to moving of the specific application screen 2610 may include different menus according to a position of a display. For example, a menu which is displayed on an upper area is a notification menu which notifies of a received message, a received telephone call, a received e-mail, or the like, and a menu which is displayed at a right side or a left side is a menu which may execute frequently-used menu or display frequently used application icons, and a menu which is displayed on an apex menu may be a menu to move to a home screen.

In addition, when a user interaction to touch and drag with two fingers is input for a plurality of times, the controller 290 may control the display 230 to move the application screen according to a user interaction and display a new application screen.

Figure 27A:
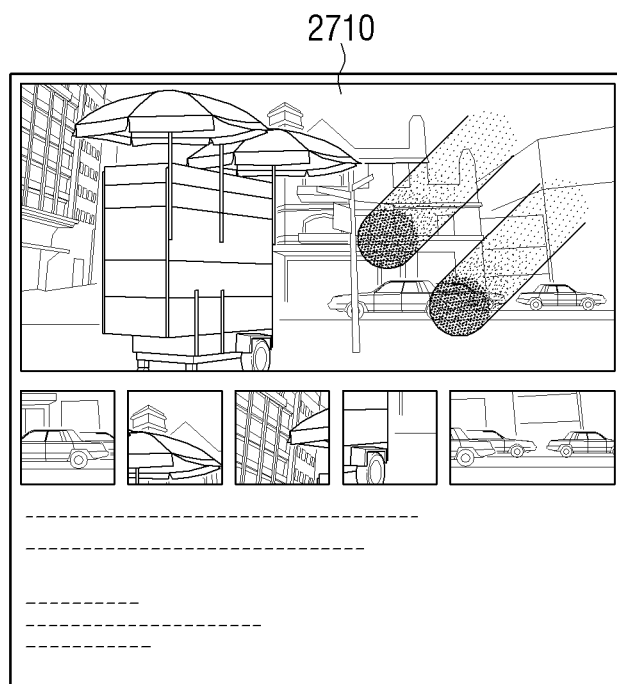
Figure 27B:
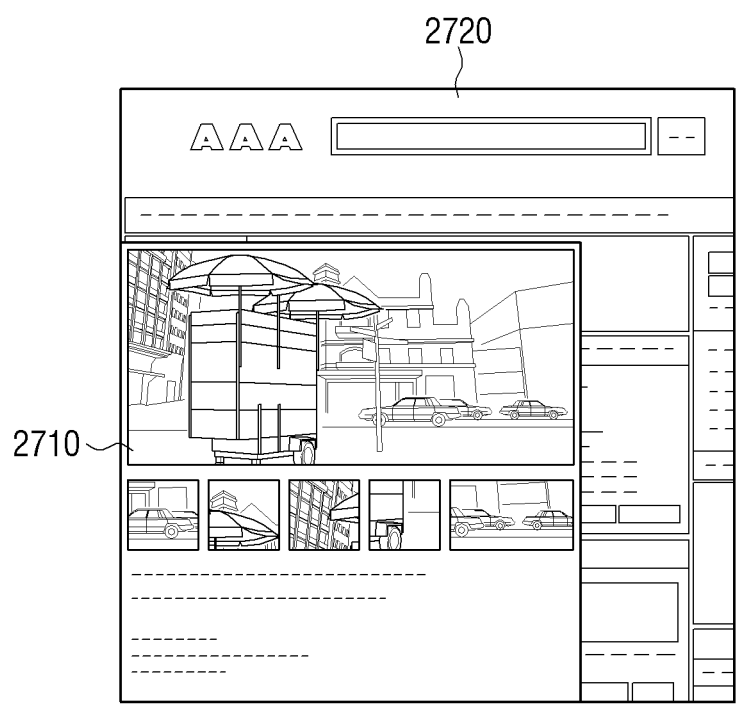

To be specific, as illustrated in FIG. 27A, according to an exemplary embodiment, while a first application screen 2710 is displayed, when a user interaction to touch the first application screen 2710 with two fingers at the same time and drag in a left lower end direction is detected, the controller 290, as illustrated in FIG. 27B, according to an exemplary embodiment, may control the display 230 to move a first application screen 2710 in a lower left direction and display a part of a second application screen 2720 on an upper end and right side of the display screen. At this time, the second application may be an application which was executed prior to the first application.

Figure 27C:
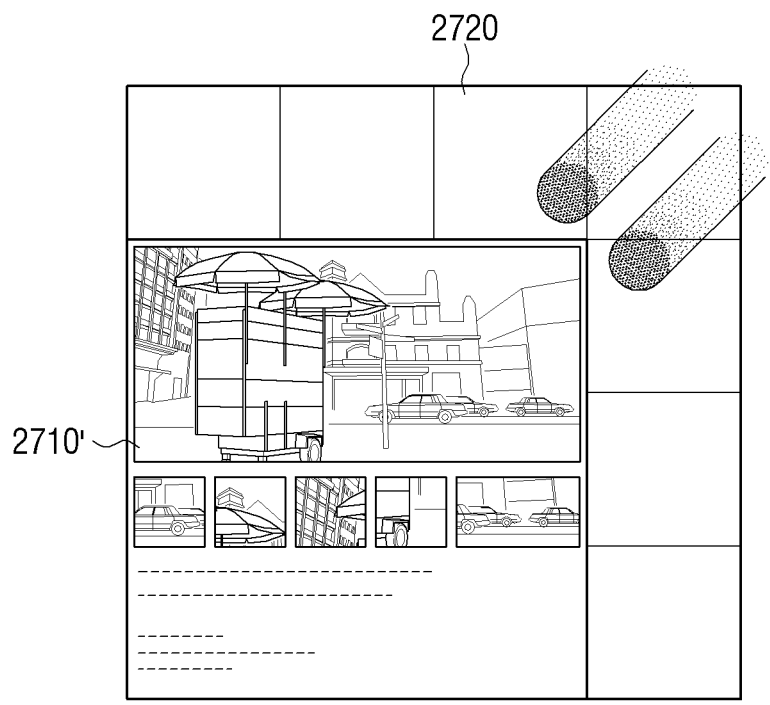
Figure 27D:
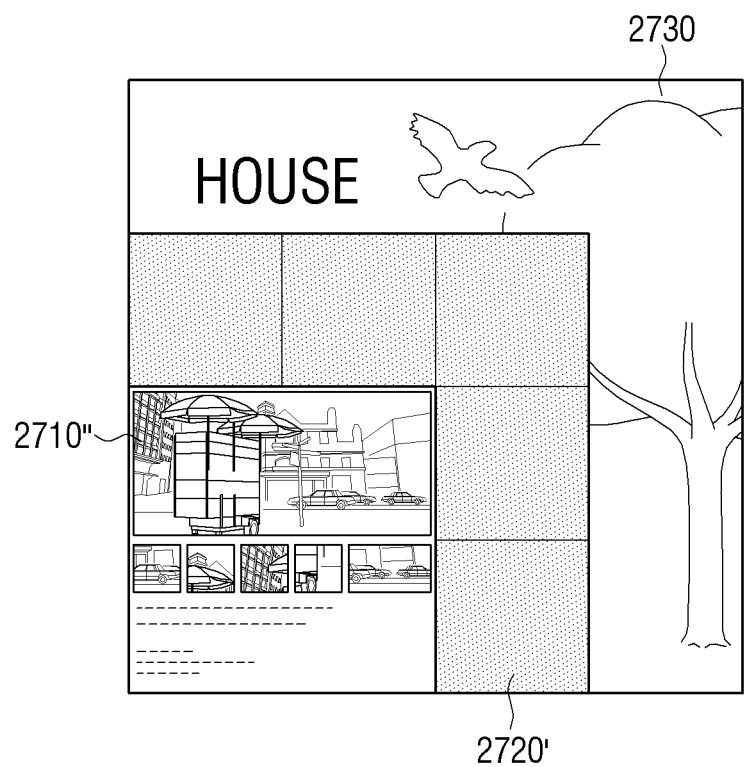

In addition, as illustrated in FIG. 27C, according to an exemplary embodiment, while the first application screen 2710' and a second application screen 2720 are displayed at the same time, when a user interaction to touch the second application screen 2720 with two fingers at the same time and drag in a lower left direction is detected, the controller 290, as illustrated in FIG. 27D, according to an exemplary embodiment, may control the display 230 to move a first application screen 2710" and a second application screen 2720' in a lower left direction and display a part of a third application screen 2730 at an upper end and a right area of the display screen. In this case, the third application may be an application which was executed prior to the second application.

Meanwhile, while the first application screen 2710' and the second application screen 2720 are displayed at the same time, when a user interaction to touch the first application screen 2710' with two fingers at the same time and drag in a lower left direction is detected, the controller 290 may keep moving the first application screen 2710' in a lower left direction and enlarge an area where the second application screen 2720 is displayed.

When a user interaction to touch and drag an intersection point of an area where a plurality of objects are displayed is detected, the controller 290 may adjust screen ratio regarding a plurality of objects and a number of displayed objects according to a user interaction.

Figure 28A:
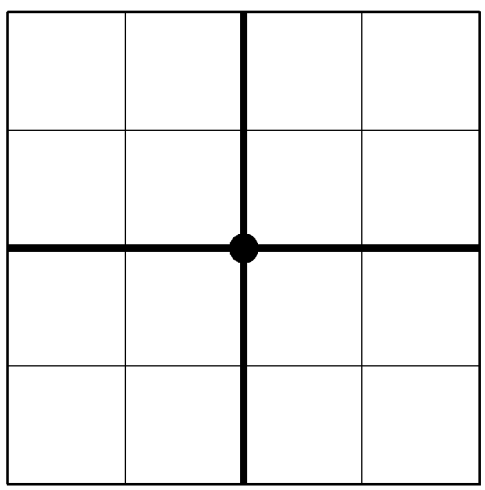
Figure 28B:
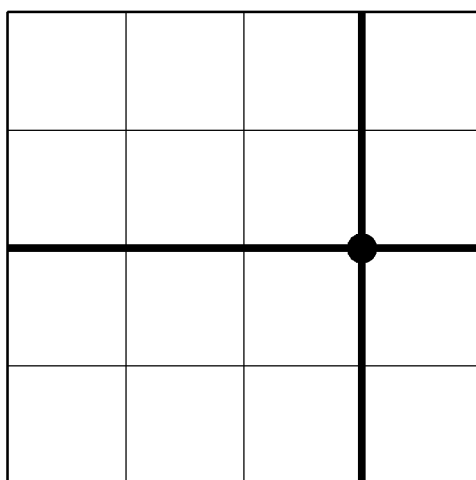

To be specific, as illustrated in FIG. 28A, according to an exemplary embodiment, while four objects are displayed, when a user interaction to touch the intersection point and move the intersection point in a right direction as much as a size of one rectangular cell is detected, the controller 290, as illustrated in FIG. 28B, according to an exemplary embodiment, may increase size of the first object and the third object, and reduce size of the second object and the fourth object.

In addition, as illustrated in FIG. 28B, according to an exemplary embodiment, while four objects are displayed, when a user interaction to touch an intersection point and drag the point in a downward direction as much as size of one rectangular cell is detected, the controller 290, as illustrated in FIG. 28B, may increase size of the first object and the second object, and reduce size of the third object and the fourth object.

Figure 28C:
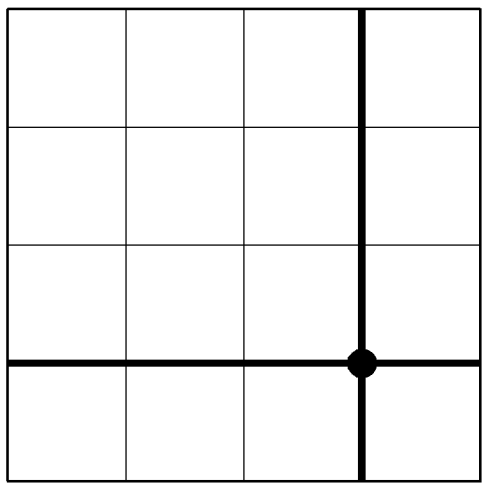
Figure 28D:
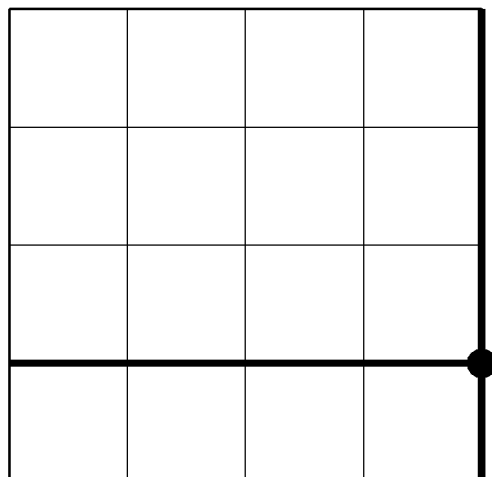

In addition, as illustrated in FIG. 28C, according to an exemplary embodiment, while four objects are displayed, when a user interaction to touch an intersection point and move the point in a right direction as much as a size of one square cell is detected, the controller 290, as illustrated in FIG. 28D, according to an exemplary embodiment, may increase the size of the first object and the third object and remove the second object and the fourth object from a display screen.

Figure 28E:
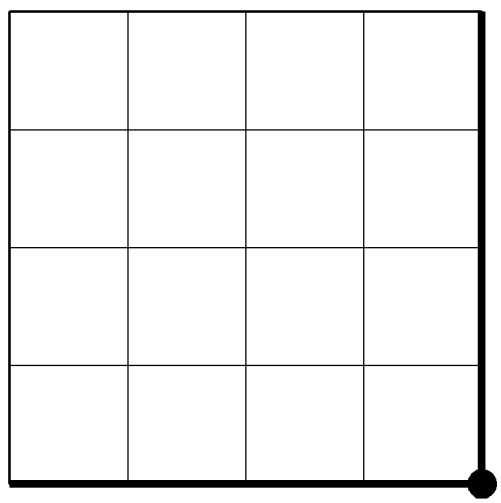

As illustrated in FIG. 28D, while two objects are displayed, when a user interaction to touch an intersection point and move the point in a downward direction as much as the size of one rectangular cell is detected, the controller 290, as illustrated in FIG. 28E, according to an exemplary embodiment, may increase size of the first object and remove the third object from a display screen.

As described above, by touching and dragging the intersection point, a screen ratio of the object and the number of objects which may perform a plurality of tasks may be controlled at the same time.

When a user interaction (that is, long press interaction) to touch an intersection point of an area where a plurality of objects are displayed is detected, the controller 290 may control the display 230 to integrate a plurality of objects which share the intersection point, generate one new object, and display the object.

Figure 29A:
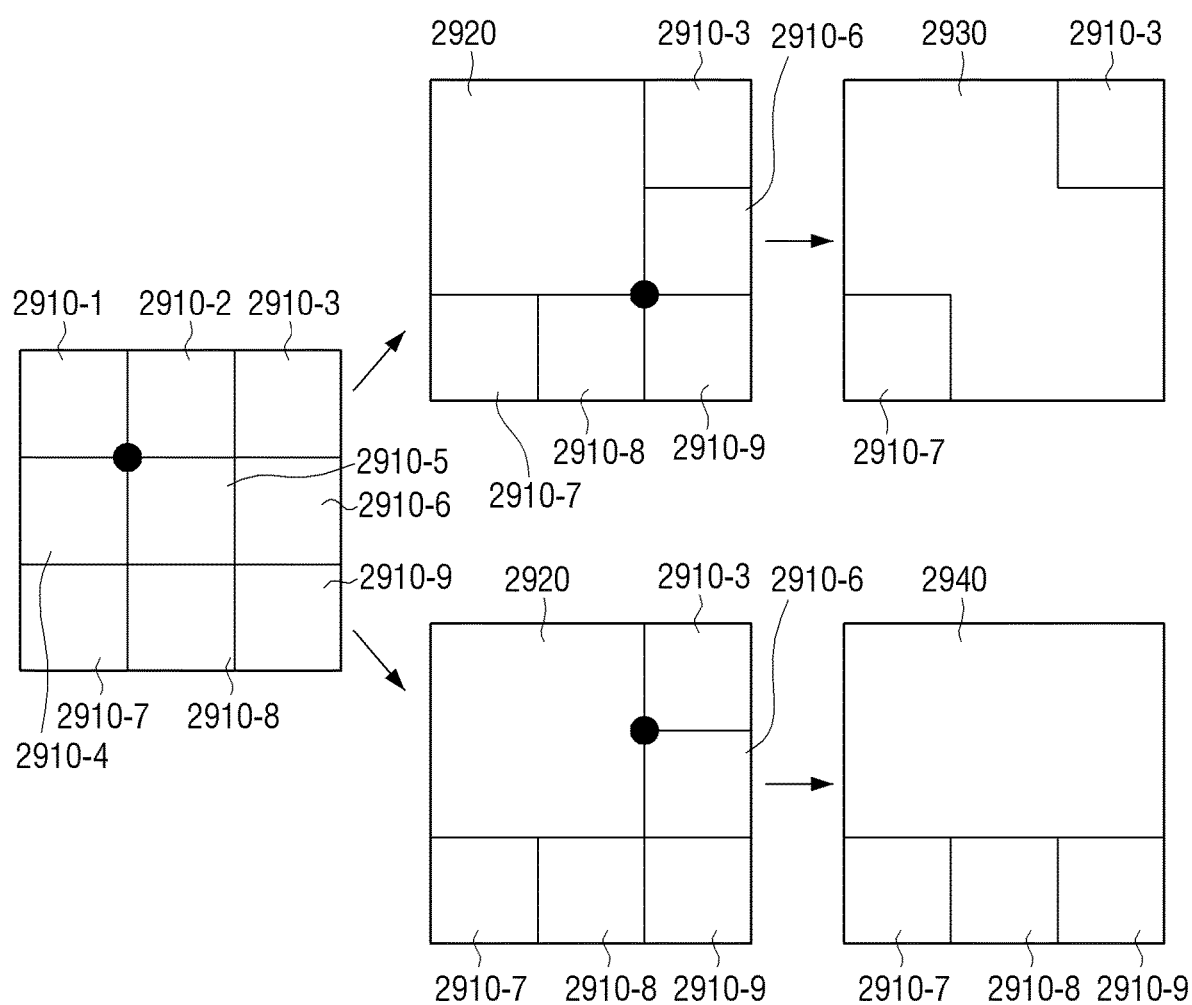

To be specific, as illustrated in FIG. 29A, according to an exemplary embodiment, while a first object to ninth object 2910-1 to 2910-9 are displayed, when a user action to touch an intersection point of the first object 2910-1, a second object 2910-2, a fourth object 2910-4, and a fifth object 2910-5 for a preset time is detected, the controller 290 may control the display 230 to display a tenth object 2920 by incorporating the first object 2910-1, the second object 2910-2, the fourth object 2910-4, and the fifth object 2910-5.

In addition, when a user interaction to touch an intersection point of the tenth object 2920, a sixth object 2910-6, an eighth object 2910-8, and a ninth object 2910-9 for a preset time is detected, the controller 290 may control the display 230 to display a new eleventh object 2930 by integrating the tenth object 2920, the sixth object 2910-6, the eighth object 2910-8, and the ninth object 2910-9.

Alternatively, when a user interaction to touch an intersection point of the tenth object 2920, the third object 2910-3, and the sixth object 2910-6 for a preset time is detected, the controller 290 may control the display 230 to display a new twelfth object 2940 by integrating the tenth object 2920, the third object 2910-3, and the sixth object 2910-6.

In particular, when a plurality of objects are icons to execute a plurality of applications, when a long press interaction is detected at an intersection point of a plurality of objects, the controller 290 may generate a upper folder of the objects which share the intersection point in which the long press interaction is detected.

Figure 29B:
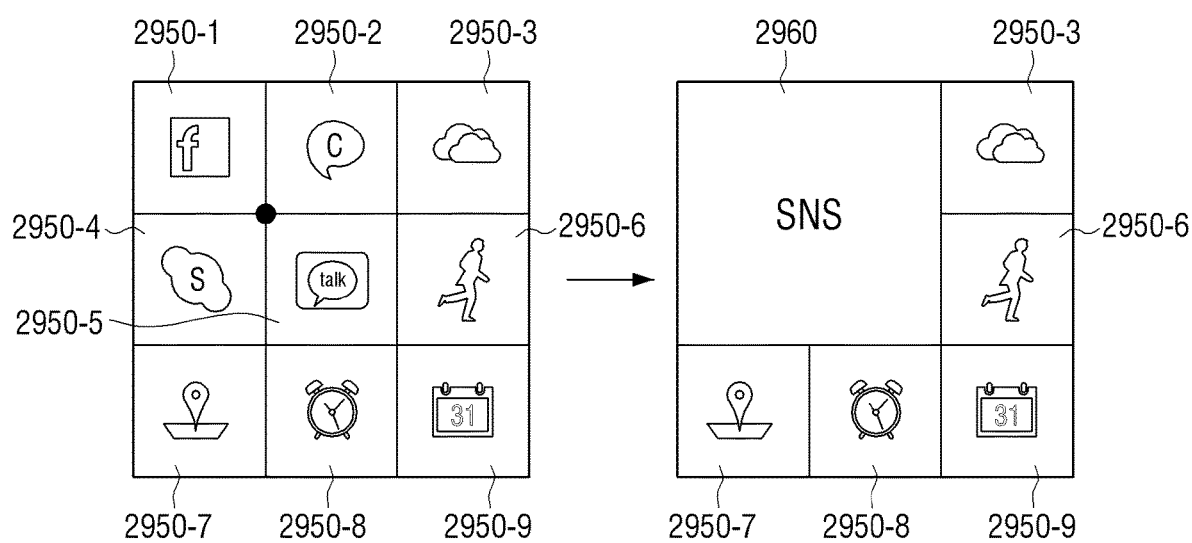

To be specific, as illustrated in FIG. 29B, according to an exemplary embodiment, while the first execution icon to the ninth execution icon 2950-1 to 2950-9 are displayed, when a user interaction to long press an intersection point of the first execution icon 2950-1, the second execution icon 2950-2, the fourth execution icon 2950-4, and the fifth execution icon 2950-5 is detected, the controller 290 may control the display 230 to remove the first execution icon 2950-1, the second execution icon 2950-2, the fourth execution icon 2950-4, and the fifth execution icon 2950-5 from a display screen, and display an SNS folder 2960 which is an upper folder of the first execution icon 2950-1, the second execution icon 2950-2, the fourth execution icon 2950-4, and the fifth execution icon 2950-5. In this case, a folder name may be designated by a user.

In particular, in case when a plurality of objects are a plurality of contents icons, when a long press interaction is detected at an intersection point of a plurality of objects, the controller 290 may generate a playlist including contents which share an intersection point in which a long press interaction is detected.

Figure 29C:
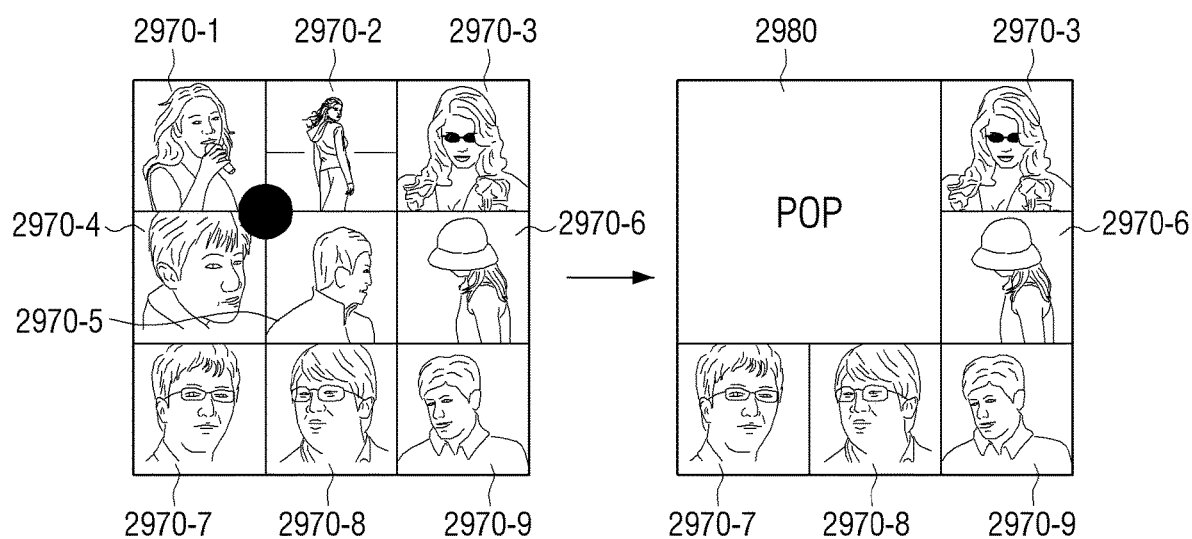

To be specific, as illustrated in FIG. 29C, according to an exemplary embodiment, while the first contents icon to the ninth contents icon 2970-1 to 2970-9 are displayed, when an interaction to long press an intersection point of the first contents 2970-1, the second contents icon 2970-2, the fourth contents icon 2970-4, and the fifth contents icon 2970-5 is detected, the controller 290 may control the display 230 to remove the first contents icon 2970-1, the second contents icon 2970-2, the fourth contents icon 2970-4, and the fifth contents icon 2970-5 from the display screen, and display a POP list 2980 which is a playlist which includes the first contents icon 2970-1, the second contents icon 2970-2, the fourth contents icon 2970-4, and the fifth contents icon 2970-5. In this case, a name of the playlist may be designated by a user.

When a user interaction to touch and drag one of intersection points of a plurality of objects located on one side of the display screen is detected, the controller 290 may adjust the number of objects displayed on the display screen.

Figure 30A:
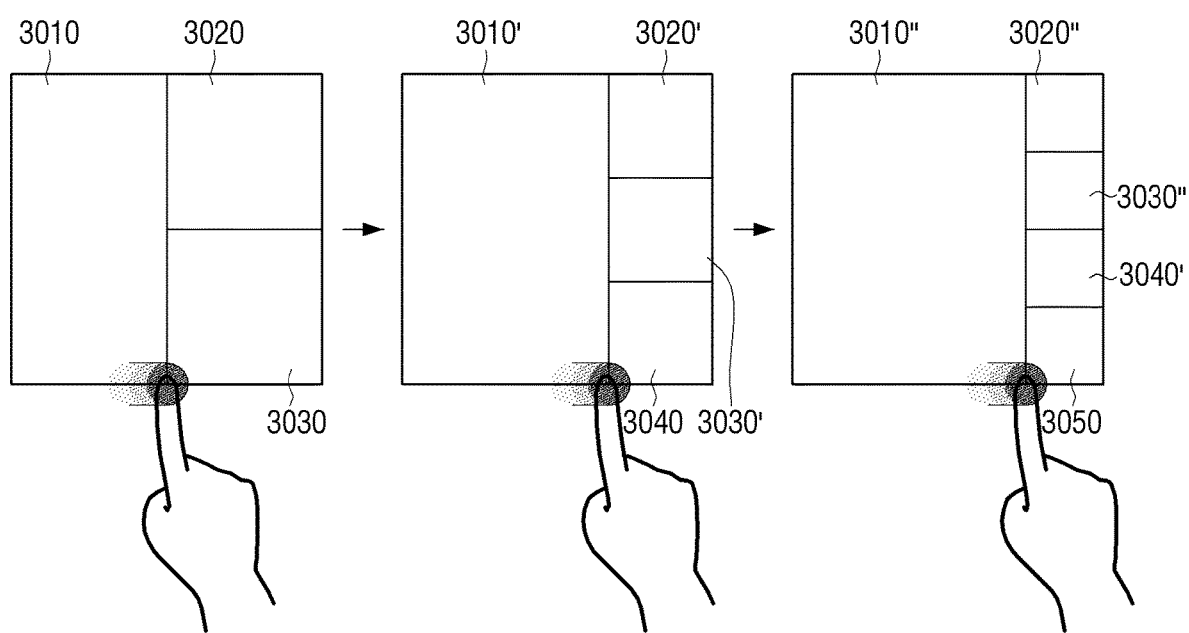

To be specific, as illustrated in FIG. 30A, while the first object to the third object 3010 to 3030 are displayed, when a user interaction to touch and drag the first object 3010 and the third object 3030 in a right direction is detected, the controller 290 may control the display 230 to increase size of the first object 3010, reduce size of the second object 3020, and the third object 3030, and display the fourth object 3040 at a lower end of the third object 3030.

In addition, while displaying the first object to the fourth object 3010-3040, when a user interaction to touch an intersection point of the first object 3010 and the fourth object 3040 and drag the point in a right direction is detected, the controller 290 may control the display 230 to increase the size of the first object 3010 to the size of the first object 3010″, reduce size of the second object to the fourth object 3020″, 3030″, and 3040′, and display the fifth object 3050 at a lower end of the fourth object 3040′.

Figure 30B:
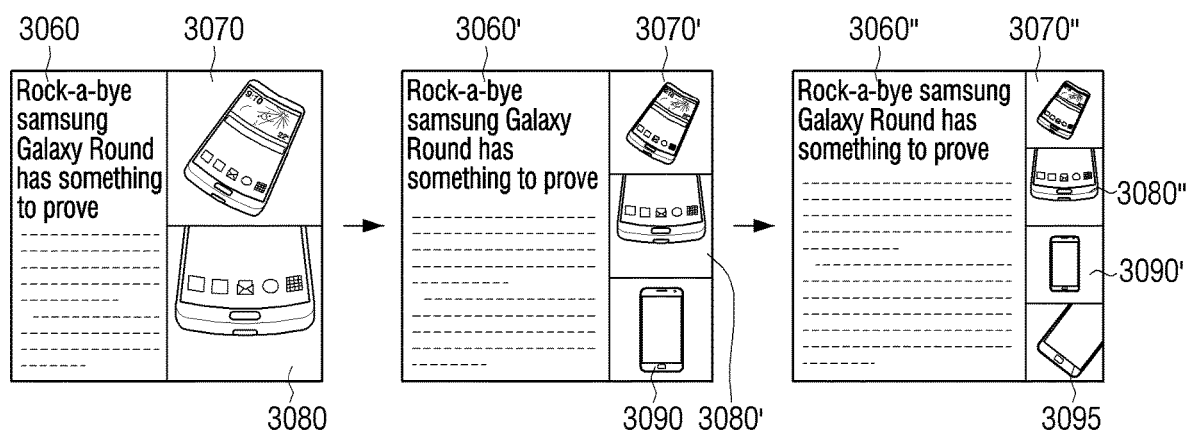

In particular, as illustrated in FIG. 30B, according to an exemplary embodiment, while news content 3060, a first photo content 3070, and a second photo content 3080 are displayed, when a user interaction to touch an intersection point of the news content 3060 and the second photo content 3080 and drag in a right direction is detected, the controller 290 may control the display 230 to increase the size of the news content 3060 to the size of the news contents 3060′, reduce size of the first photo content 3070 and the second photo content 3080 to the size of the first photo content 3070′ and the size of the second photo content 3080′, and display a new third photo content 3090. In addition, when a user interaction to keep dragging in a right direction is detected, the controller 290 may control the display 230 to generate and display a new fourth photo content 3095. In this case, the first to fourth photo content 3070″, 3080″, 3090′, and 3095 may be related to the news content 3060″.

Figure 31B:
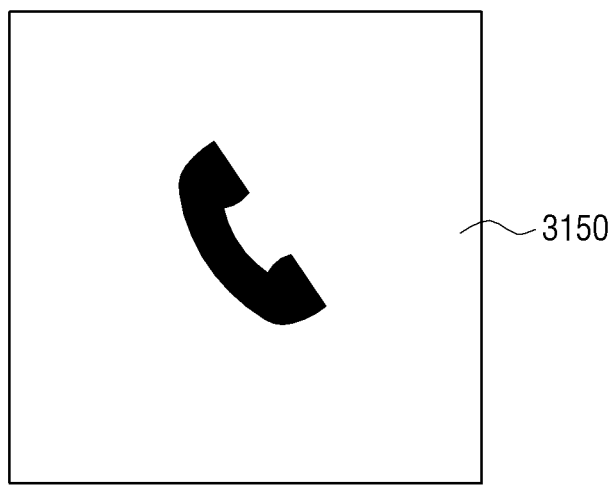
Figure 31C:
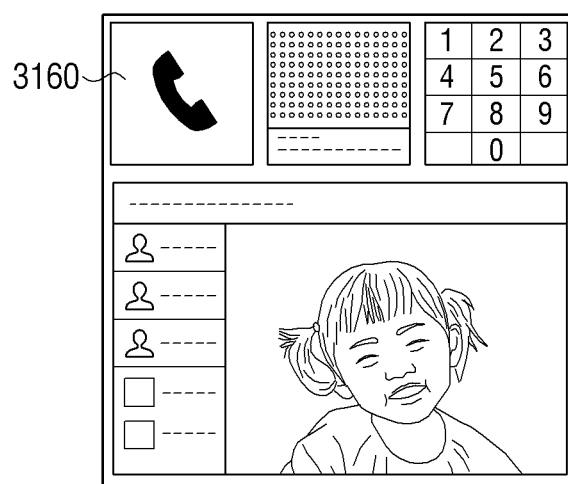
Figure 31D:
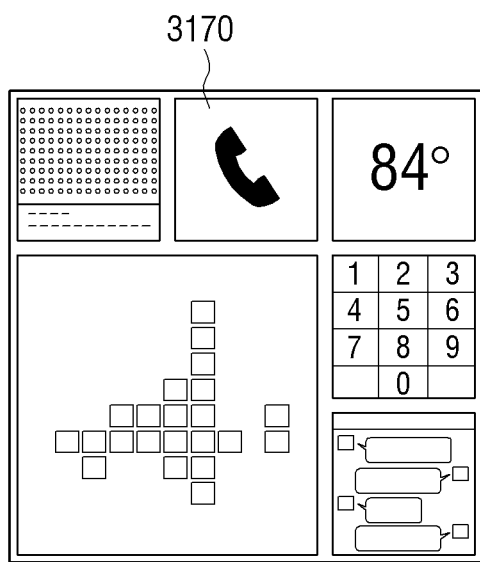

In addition, the controller 290 may provide different functions of a main object according to the number of lines which are in contact with each other from among a plurality of lines included in the display 230. To be specific, the controller 290, as illustrated in FIG. 31A, according to an exemplary embodiment, when a main object 3110 is in contact with four lines of the display 230, as illustrated in FIG. 31B, according to an exemplary embodiment, the object 3150 is in contact with four lines of the display 230, when a main object 3120 is in contact with two lines of the display 230, as illustrated in FIG. 31C, according to an exemplary embodiment, the object 3160 is in contact with two lines of the display 230, when a main object 3130 is in contact with one line of the display 230, as illustrated in FIG. 31D, according to an exemplary embodiment, the object 3170 is in contact with one line of the display 230, and when a main object 3140 is not in contact with lines of the display 230, different functions may be provided, as detailed below by way of an example.

To be specific, when a main object is an object which corresponds to a telephone application, as illustrated in FIG.

Figure 31E:
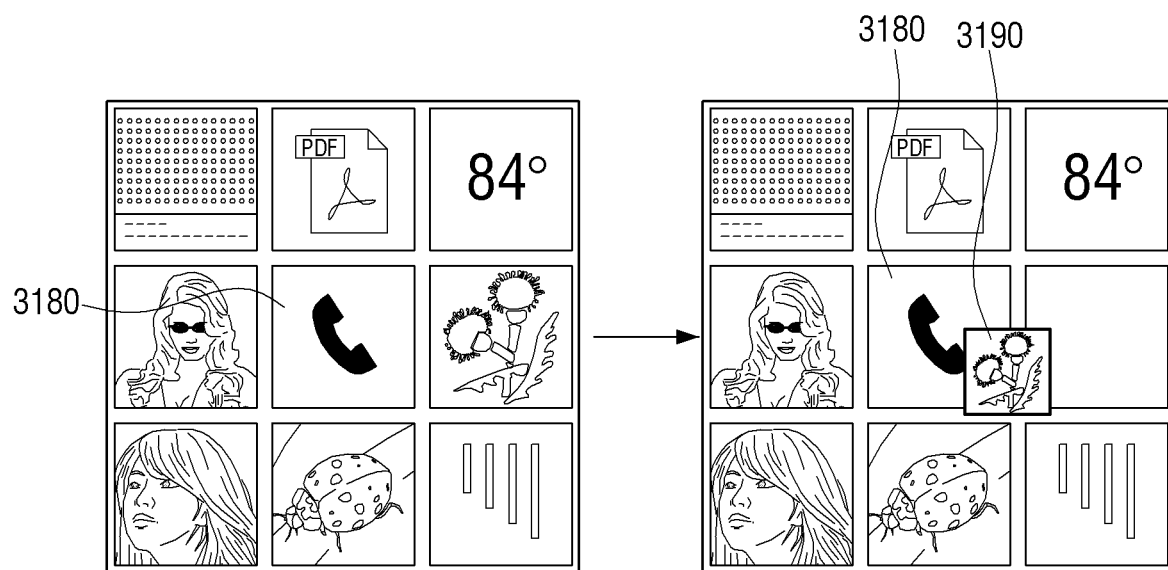

31B, when the main object 3150 is in contact with four lines of the display 230, the controller 290 may control the user terminal device 200 to perform a telephone function. In addition, as illustrated in FIG. 31C, when a main object 3160 is in contact with two lines of the display 230, the controller 290 may control to pause a telephone function of the user terminal device 200, temporarily. In addition, as illustrated in FIG. 31D, when a main object 3170 is in contact with one line of the display 230, the controller 290 may enter a multi-tasking mode so that the user terminal device may perform not only the telephone function but also other functions at the same time. In addition, as illustrated in FIG. 31E, when a main object 3180 is not in contact with one line of the display 230, if a user interaction to drag another object 3190 to an area where the main object 3180 is displayed is detected, the controller 290 may control the communicator 240 to share with a receiver of a phone call the content which corresponds to another object 3190.

When a mode of the user terminal device 200 is a general mode not a grid editing mode, if a user interaction to select and drag one of a plurality of objects is detected, the controller 290 may control the display 230 so that items on the selected object may be displayed in an area which corresponds to the dragging direction.

Figure 32A:
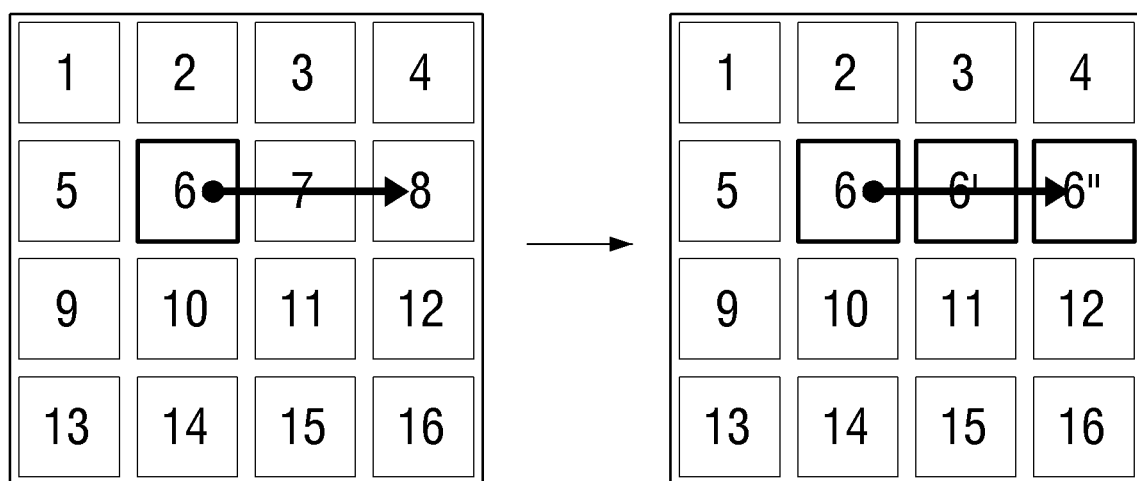

To be specific, as illustrated in FIG. 32A, according to an exemplary embodiment, while the first object to the sixteenth object are displayed, when a user interaction to drag the sixth object is detected, the controller 290 may control the display 230 to remove the seventh object and the eighth object from the display screen, and display the items 6' and 6" of the sixth object in an area where the seventh object and the eighth object are displayed.

Figure 32B:
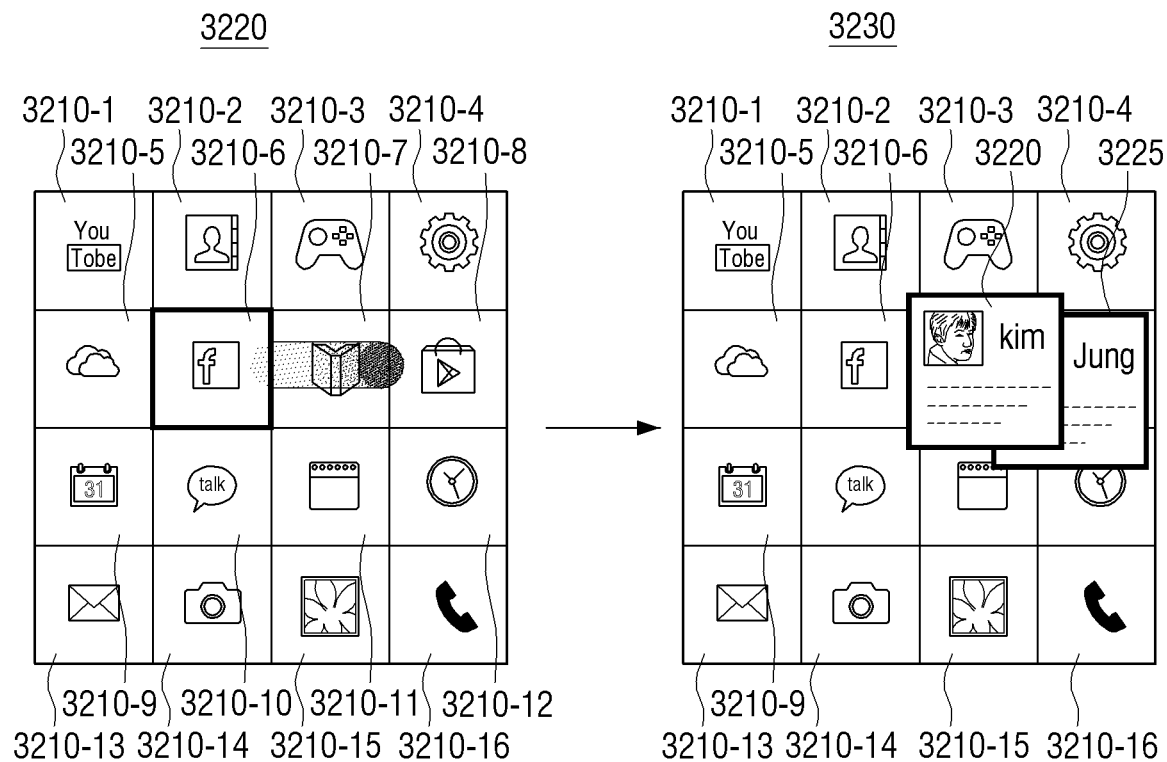

Referring to an exemplary embodiment, as illustrated in FIG. 32B, according to an exemplary embodiment, while displaying a plurality of objects 3210-1 to 3210-16 which correspond to a plurality of applications, when a user interaction to drag the sixth application 3210-6 which corresponds to the SNS application in a right direction is detected, the controller 290 may control the display 230 to display recently updated postings 3220 and 3225 which are the execution items of the SNS application in an area where the seventh object 3210-7 and the eighth object 3210-8 were displayed. In this case, the recently updated postings 3220 and 3225 may have a size larger than one square cell, but this is merely an example, and the recently updated postings 3220 and 3225 may be displayed in one square cell, respectively.

Figure 32C:
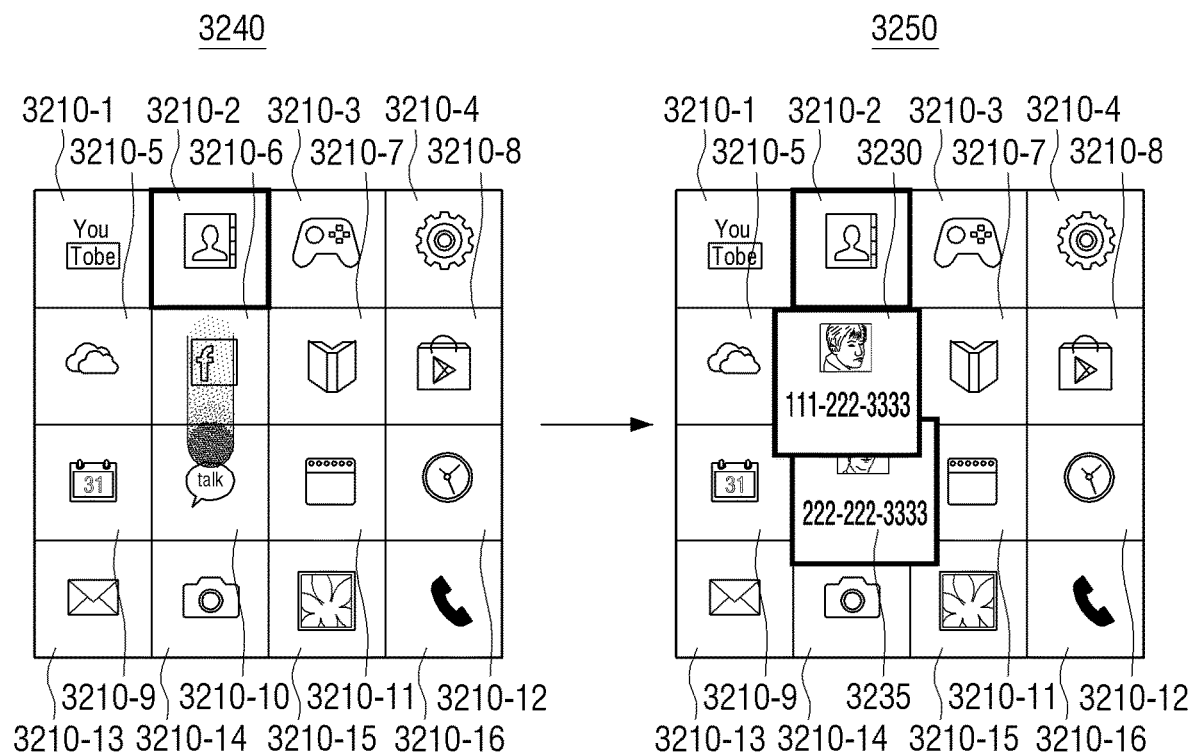

In addition, as illustrated in FIG. 32C, according to an exemplary embodiment, while a plurality of objects 3210-1 to 3210-16 which correspond to a plurality of applications are displayed, when a user interaction to drag the second application 3210-2 which corresponds to the contact list application in a downward direction is detected, the controller 290 may control the display 230 to display information 3230 and 3235 as the recently contacted contacts in the contact list application which are the execution items of the contact list application in an area where the sixth object 3210-6, the tenth object 3210-10, and the fourteenth object 3210-14 are displayed. In this case, the information 3230 and 3235 about the recently contacted contacts in the contact list may have a size larger than one square cell, but this is merely an example, and the information 3230 and 3235 about the recently contacted contacts in the contact list may be displayed in one square cell, respectively.

<Sharing Contents Among a Plurality of User Terminal Devices>

Figure 33:
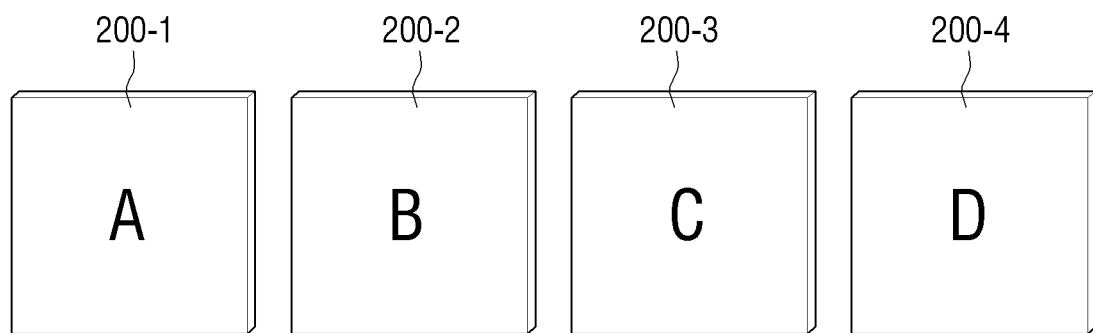
FIGS. 33-38 are views illustrating various functions being performed using a plurality of user terminal devices, according to an exemplary embodiment.

According to another exemplary embodiment, as illustrated in FIG. 33, according to an exemplary embodiment, a plurality of user terminal devices 200-1, 200-2, 200-3, and 200-4 having a display panel in a square shape may share contents when a preset condition is satisfied. To be specific, as there is a display panel in a square shape of which length of width and height is the same, when one line of a plurality of user terminal devices 200-1, 200-2, 200-3, and 200-4 is in contact with each other regardless of direction, user terminal devices of which lines are in contact with, may share contents.

At this time, the plurality of user terminal devices 200-1, 200-2, 200-3, and 200-4 may determine a proximity direction through various methods. As an exemplary embodiment, a plurality of user terminal devices 200-1, 200-2, 200-3, and 200-4 may determine proximity direction using NFC communication technology. To be specific, each of a plurality of user terminal devices 200-1, 200-2, 200-3, and 200-4 may include four NFC chips on four sides, and when the NFC chips which are included in the lines which are in contact with each other are tagged to each other, the proximity direction among the user terminal devices may be determined. As another exemplary embodiment, a plurality of user terminal devices 200-1, 200-2, 200-3, and 200-4 may determine proximity direction among the user terminal devices using an infrared ray detector. To be specific, each of a plurality of user terminal devices 200-1, 200-2, 200-3, 200-4 may have four infrared ray detectors on four sides, and determine proximity direction among the user terminal devices thorough the infrared ray detector. In addition, a plurality of user terminal devices 200-1, 200-2, 200-3, and 200-4 may determine whether lines among the user terminal devices are in contact with each other using a touch detector. However, as described above, according to an exemplary embodiment, to determine the proximity direction and whether lines among the user terminal devices are in contact with each other using NFC communication technology, an infrared ray detector, and a touch detector is merely an example, and the proximity direction and whether the lines among the user terminal devices are in contact with each other may be determined using another method.

At this time, a plurality of user terminal devices 200-1, 200-2, 200-3, and 200-4 may determine a connection state by determining lines which are in contact with each other, and display a sharing area in which the contents may be shared based on the connection state. In addition, when a user interaction to drag a contents icon displayed on one of the plurality of user terminal devices 200-1, 200-2, 200-3, and 200-4 is detected, contents which correspond to a contents icon in which the user interaction is detected may be shared with another user terminal device.

Figure 34A:
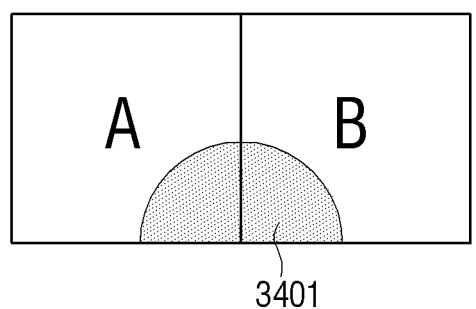
Figure 34B:
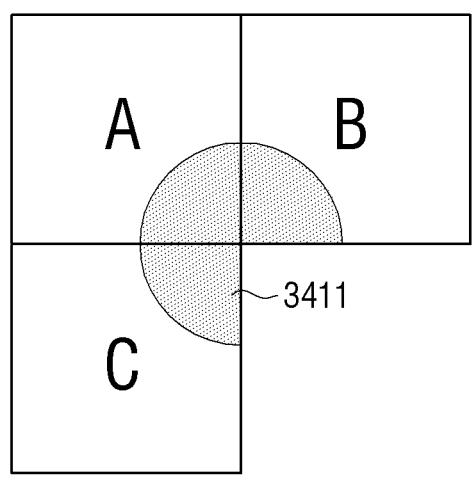

To be specific, when a right line of the first user terminal device 200-1 is in contact with a left line of the second user terminal device 200-2, the first user terminal device 200-1 and the second user terminal device 200-2 may determine a connection state through at least one detector, and as illustrated in FIG. 34A, according to an exemplary embodiment, and display a shared area 3401 at a lower end portion of the lines in contact with each other based on the determined connection state.

In addition, when a right line of the first user terminal device 200-1 is in contact with a left line of the second user terminal device 200-2, and a bottom line of the first user terminal device 200-1 is in contact with an upper line of the third user terminal device 200-3, the first to third user terminal devices 200-1 to 200-3 may determine a connection state through at least one detector, and as illustrated in FIG.

34B, according to an exemplary embodiment, display a shared area 3411 at an area where three user terminal devices are in contact with each other based on the determined connection state.

Figure 34C:
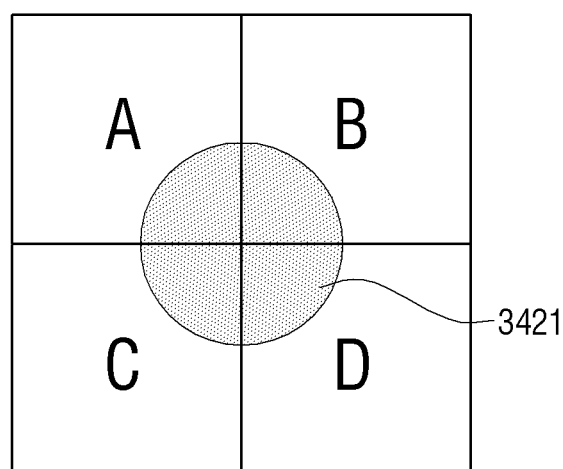

In addition, when a right line of the first user terminal device 200-1 is in contact with a left line of the second user terminal device 200-2, a bottom line of the first user terminal device 200-1 is in contact with an upper line of the third user terminal device 200-3, a bottom line of the second user terminal device 200-2 is in contact with an upper line of the fourth user terminal device 200-4, a right line of the third user terminal device 200-3 is in contact with a left line of the fourth user terminal device 200-4, the first to fourth user terminal devices 200-1 to 200-4 may determine a connection state through at least one detector, and as illustrated in FIG. 34C, according to an exemplary embodiment, display a shared area 3421 at an area where four user terminal devices are in contact with each other, based on the determined connection state.

Figure 34D:
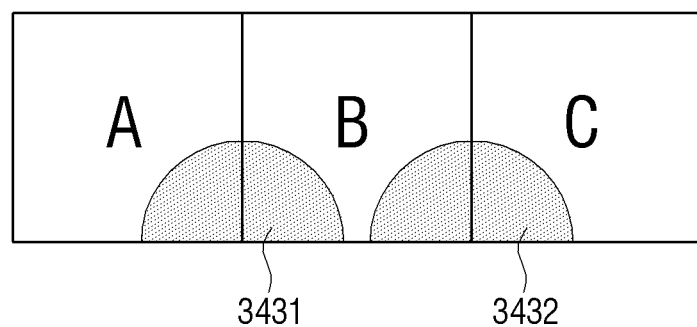

In addition, when a right line of the first user terminal device 200-1 is in contact with a left line of the second user terminal device 200-2, a right line of the second user terminal device 200-2 is in contact with a left line of the third user terminal device 200-3, the first to third user terminal devices 200-1 to 200-3 may determine a connection state using at least one detector, and as illustrated in FIG. 34D, according to an exemplary embodiment, may display a shared area 3431 at a bottom area where a line of the first user terminal device 200-1 is in contact with the second user terminal device 200-2 based on the connection state, and display a shared area 3432 at a bottom area where a line of the second user terminal device 200-2 is in contact with a line of the third user terminal device 200-3.

Figure 34E:
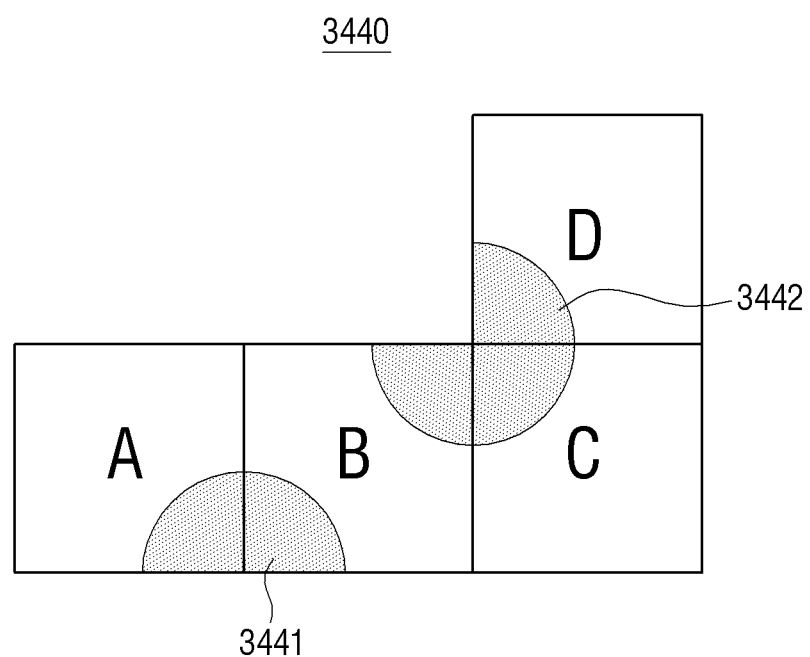

In addition, when a right line of the first user terminal device 200-1 is in contact with a left line of the second user terminal device 200-2, a right line of the second user terminal device 200-2 is in contact with the third user terminal device 200-3, an upper line of the third user terminal device 200-3 is in contact with a bottom line of the fourth user terminal device 200-4, the first to fourth user terminal devices 200-1 to 200-4 may determine a connection state through at least one detector, and as illustrated in FIG. 34E, according to an exemplary embodiment, may display a shared area 3411 at a bottom area of the line of the first user terminal device 200-1 which is in contact with a line of the second user terminal device 200-2, and display a shared area 3442 at an area where lines of the second user terminal device to the fourth user terminal device 200-2 to 200-4 are in contact with each other.

Figure 35A:
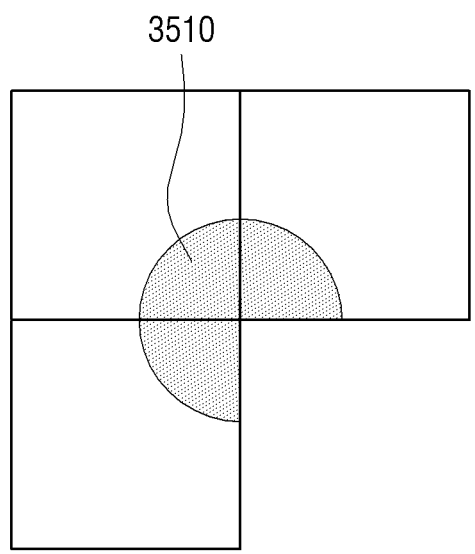
Figure 35B:
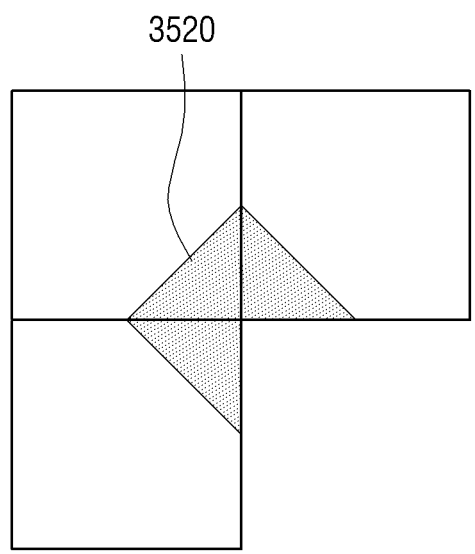
Figure 35C:
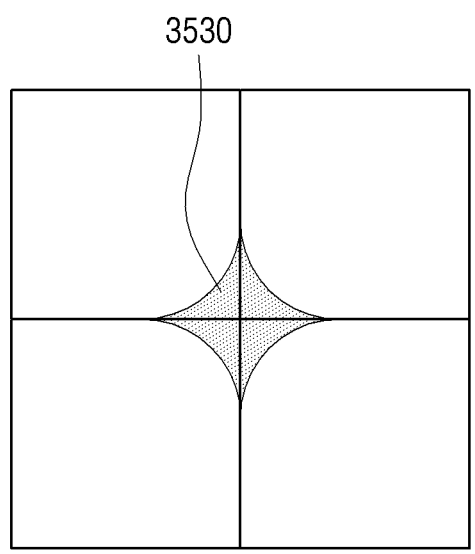

A shared area may be implemented in various shapes. To be specific, as illustrated in FIG. 35, according to an exemplary embodiment, one user terminal device may display a shared area 3510 as a fan shape, one user terminal device may display a shared area 3520 as a triangle shape, and one user terminal device may display a shared area 3530 as a shape which excludes a fan shape from a half circle.

In addition, the plurality of user terminal devices 200-1, 200-2, 200-3, and 200-4, after being connected to each other, may display a shared area, and when a shared area is connected to each other, may share content.

Figures 1, 36A:
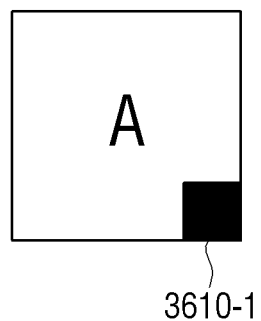
Figures 2, 36A:
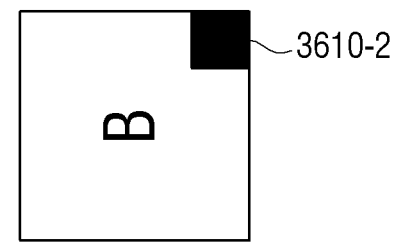
Figures 3, 36A:
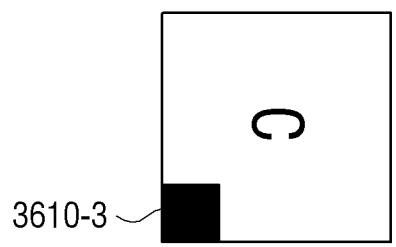
Figures 4, 36A:
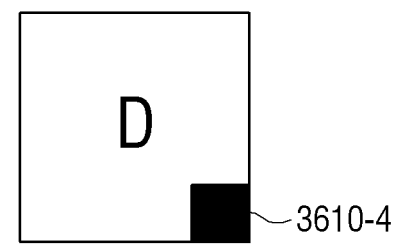
Figure 36B:
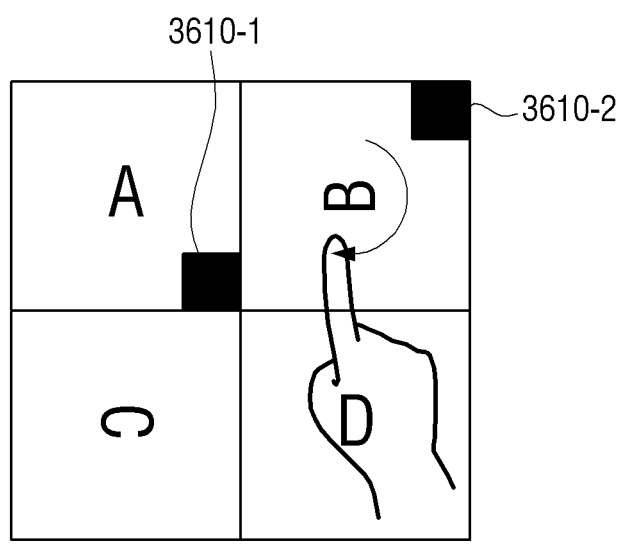
Figure 36C:
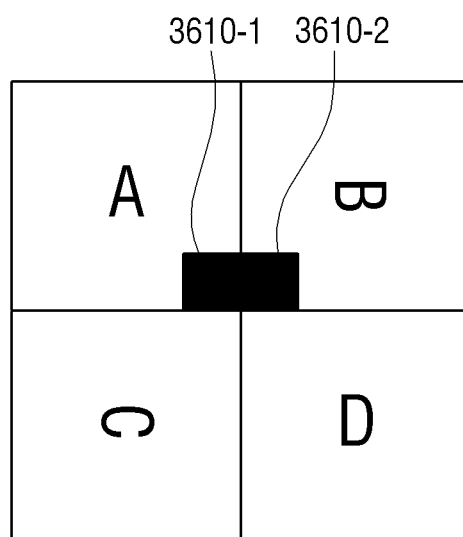

To be specific, as illustrated in FIG. 36A, according to an exemplary embodiment, when a first sharing area 3610-1 is displayed at a bottom right end portion of the first user terminal device 200-1, a second sharing area 3610-2 is displayed at an upper right end of the second user terminal device 200-2, a third sharing area 3610-3 is displayed at a bottom left end part of the third user terminal device 200-3, and a fourth sharing area 3610-4 is displayed at a bottom right end of the fourth user terminal device 200-4. As illustrated in FIG. 36B, according to an exemplary embodiment, four user terminal devices 200-1 to 200-4 may be connected with each other. When the second user terminal device 200-2 is rotated at an angle of 180 in a clockwise direction, the first sharing area 3610-1 and the second sharing area 3610-2 may be connected with each other, as illustrated in FIG. 36C, according to an exemplary embodiment. When the first sharing area 3610-1 is connected with the second sharing area 3610-2, one of the first user terminal device 200-1 and the second user terminal device 200-2 may transmit content to another.

Figure 37A:
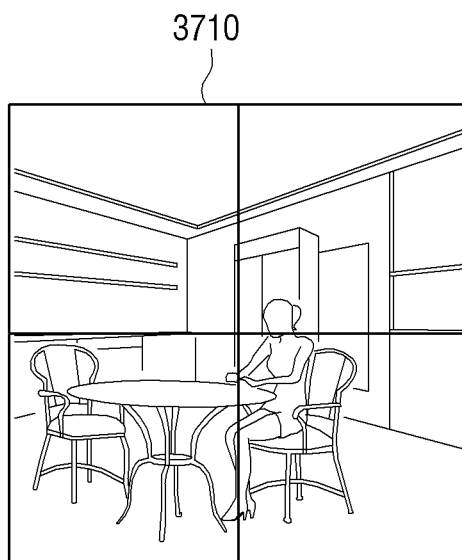
Figure 37B:
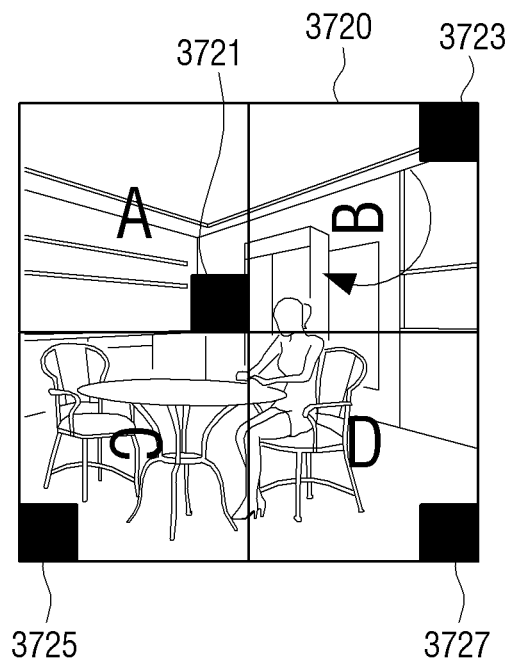
Figure 37C:
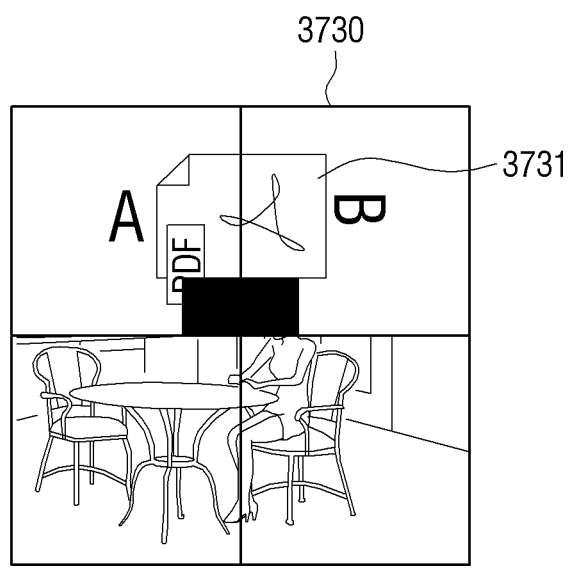
Figure 37D:
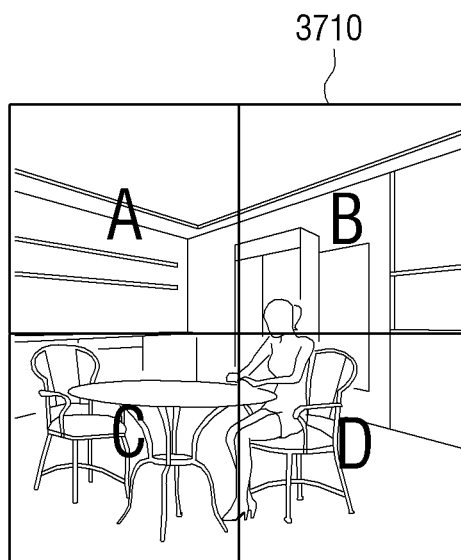

Referring to an exemplary embodiment, the first user terminal device to the fourth user terminal device 200-1 to 200-4, as illustrated in FIG. 37A, according to an exemplary embodiment, which are displayed in a proximity with each other, may display one image content 3710. In this case, the image content 3710 may be stored in the second user terminal device 200-2. In case of operating in a sharing mode, four user terminal devices 200-1 to 200-4, as illustrated in FIG. 37B, according to an exemplary embodiment, may display each of the sharing areas 3721, 3723, 3725, and 3727. In addition, when the second user terminal device 200-2 is rotated clockwise at an angle of 180 and the first sharing area 3721 and 3723 are connected with each other forming image 3730, as illustrated in FIG. 37C, according to an exemplary embodiment, the second user terminal device 200-2 may transmit data of the image content 3710 to the first user terminal device 200-1. While transmitting the data, an icon 3731 which indicates a file format of the image contents may be displayed. After completing the file transmission, the first user terminal device to the fourth user terminal device 200-1 to 200-4, as illustrated in FIG. 37D, according to an exemplary embodiment, may display one image contents 3710.

In addition, when the plurality of user terminal devices 200-1 to 200-4 are connected to each other, the plurality of user terminal device 200-1 to 200-4 may provide a group playback function in various formats.

Figure 38:
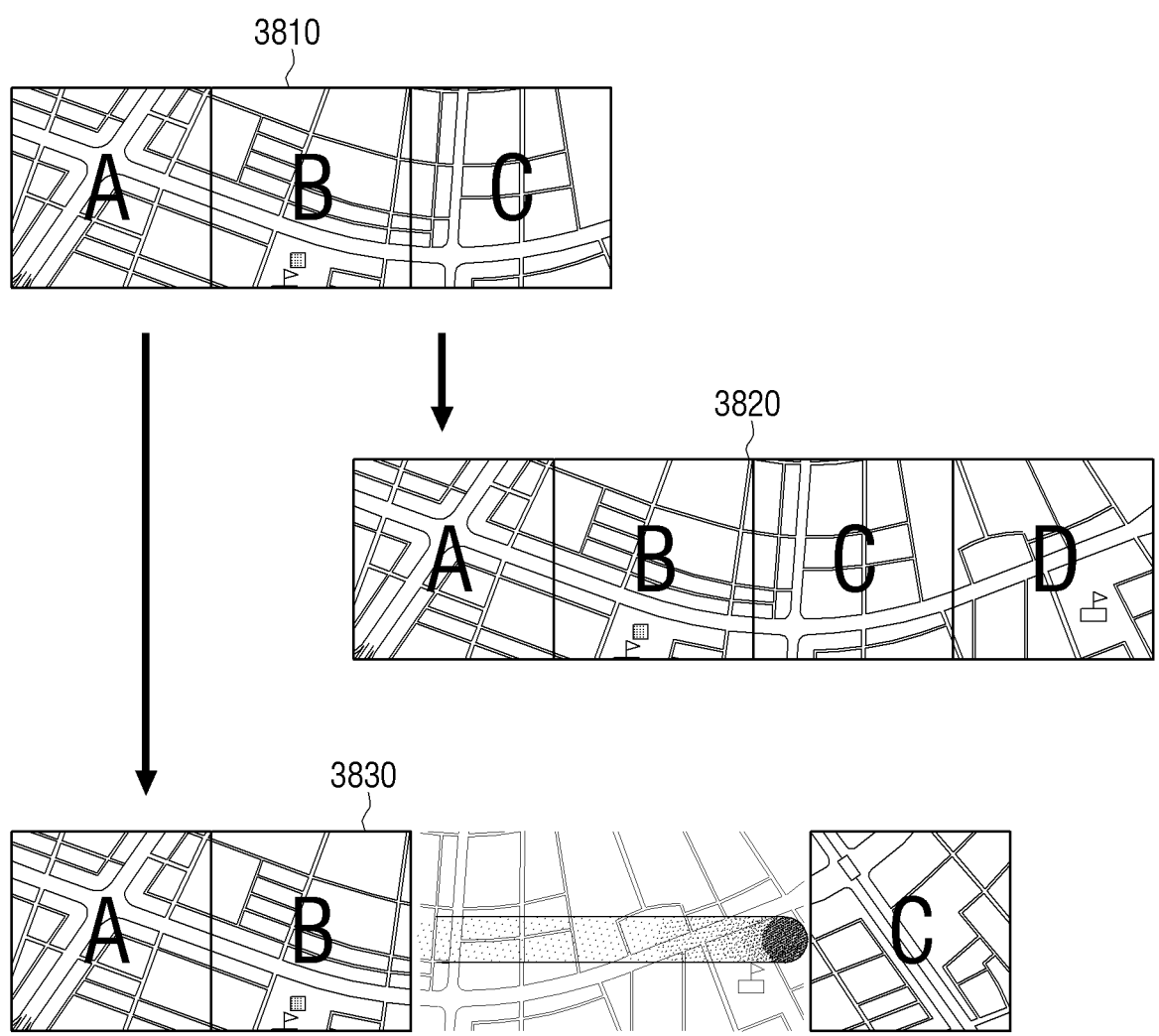

To be specific, as illustrated in FIG. 38, according to an exemplary embodiment, when the fourth user terminal device 200-4 is connected while the first to third user terminal devices 200-1 to 200-3 displaying a map screen of specific areas at the same time, when the fourth user terminal device 200-4 is connected, the fourth user terminal device 200-4 may, additionally, display a west portion of the specific area. However, while the first to third user terminal devices 200-1 to 200-3 displaying a map screen on a specific area, when the third user terminal device 200-3 is pushed aside in a left direction, the third user terminal device 200-3 may determine distance with the second user terminal device 200-2 and additionally display a west area of the specific area based on the distance.

As described above, by using a plurality of user terminal devices having a display panel in a square shape, various contents may be shared and a group playback function may be available.

<Folding Interaction>

According to an exemplary embodiment, when a folding action in which to fold a display more than a preset angle with reference to a hinge 310 is detected, the controller 290 may control the display 230 to change an object which is played on a plurality of rectangular cells into another object and display the changed object. At this time, the controller 290, when the display is folded more than a preset angle using a bending detector 283, may detect that a folding interaction occurs.

To be specific, as illustrated in FIG. 39, according to an exemplary embodiment, while the first object to the ninth object 3910-1 to 3910-9 are displayed on a square cell, when a folding interaction is detected, the controller 290 may control the display 230 to remove the first object to the ninth object 3910-1 to 3910-9 from a display screen and display new tenth object to eighteenth object 3920-1 to 3920-2.

In particular, after touching one of a plurality of square cells, when a folding interaction is detected, the controller 290 may change an object which is in a row including the touched rectangular cell to another object, and maintain objects which are present in other rows without change.

To be specific, as illustrated on the upper image of FIG. 40A, according to an exemplary embodiment, while the first object to ninth object 3910-1 to 3910-9 are displayed, after the fourth object 3910-4 is touched, and then a folding interaction is detected, the controller 290, as illustrated in a bottom image of FIG. 40A, may control the display 230 to change an object in the second row which includes the fourth object 3910-4 to new tenth to twelfth object 3930-1 to 3930-3, and maintain objects which are displayed in the first and third rows without a change.

In addition, as illustrated on in a top image of FIG. 40B, according to an exemplary embodiment, while the first object to ninth object 3910-1 to 3910-9 are displayed, after the seventh object 3910-7 is touched, a folding interaction is detected, the controller 290, as illustrated in a bottom image of FIG. 40B, may control the display 230 to change an object in the third row which includes the seventh object 3910-7 to new tenth object to twelfth object 3930-1 to 3930-3, and maintain an object displayed on the first and second row without change.

Figure 41A:
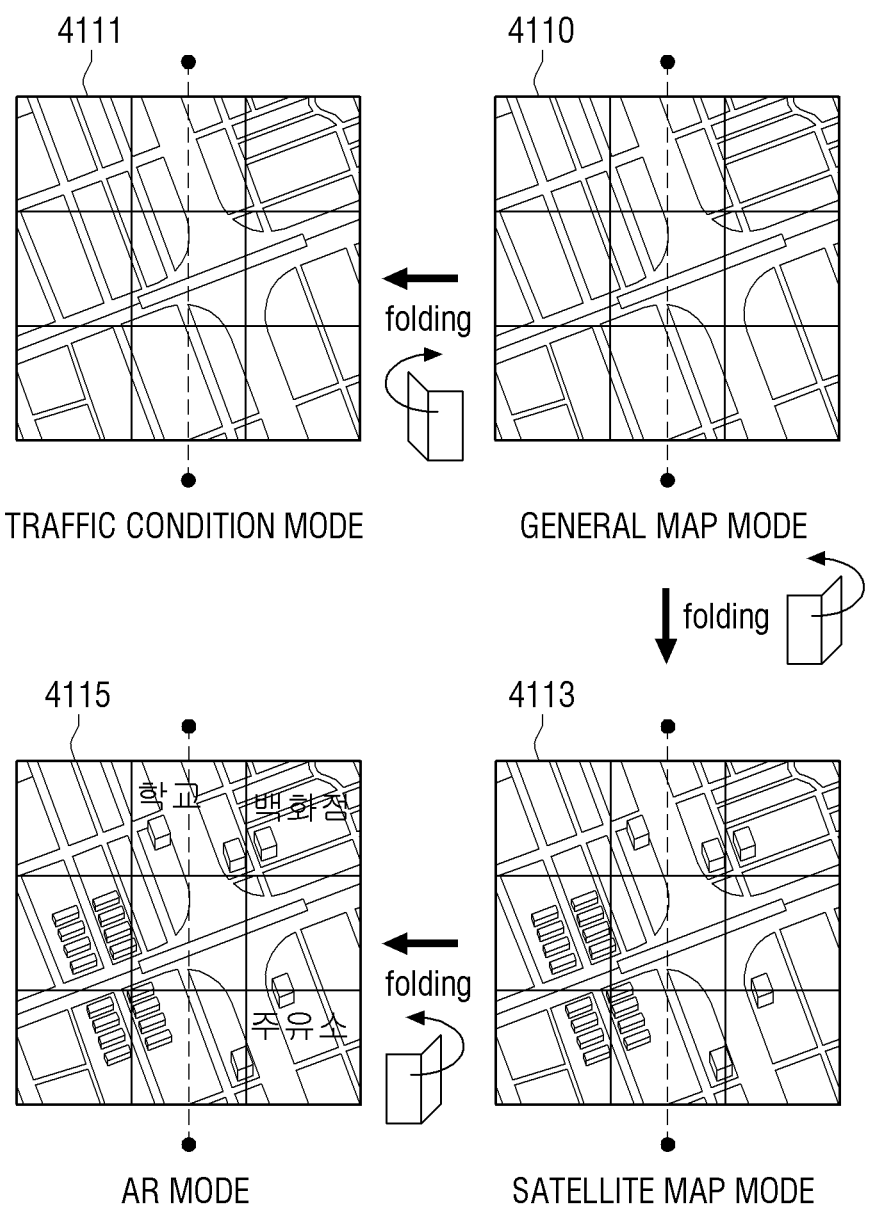

Referring to an exemplary embodiment, as illustrated in the second screen of FIG. 41A, according to an exemplary embodiment, while a general map screen 4110 is displayed in the first rectangular cell to the ninth square cell, when a folding interaction to touch a display panel in a right display panel direction is detected, the controller 290, as illustrated in the first figure of FIG. 41A, may change the general map mode 4110 which is displayed in a plurality of square cells to a traffic condition mode 4111. As illustrated in the second screen of FIG. 41A, while the general map mode 4110 is displayed in the first square cell to the ninth square cell, when a folding interaction to fold a right display panel in a left display panel direction is detected, the controller 290, as illustrated in the third screen of FIG. 41A, may change the general map mode 4110 to a satellite map mode 4113. In addition, as illustrated in the third screen of FIG. 41A, while the satellite map mode 4113 is displayed in the first square cell to the ninth square cell, when a folding interaction to fold a right display panel in a left display panel direction is detected, the controller 290, as illustrated in the fourth screen of FIG. 41A, may change the satellite map mode 4113 to an AR (Augmented Reality) mode 4115. That is, when a folding interaction is detected, the controller 290 may change a map display mode based on a direction of detected folding interaction.

Figure 41B:
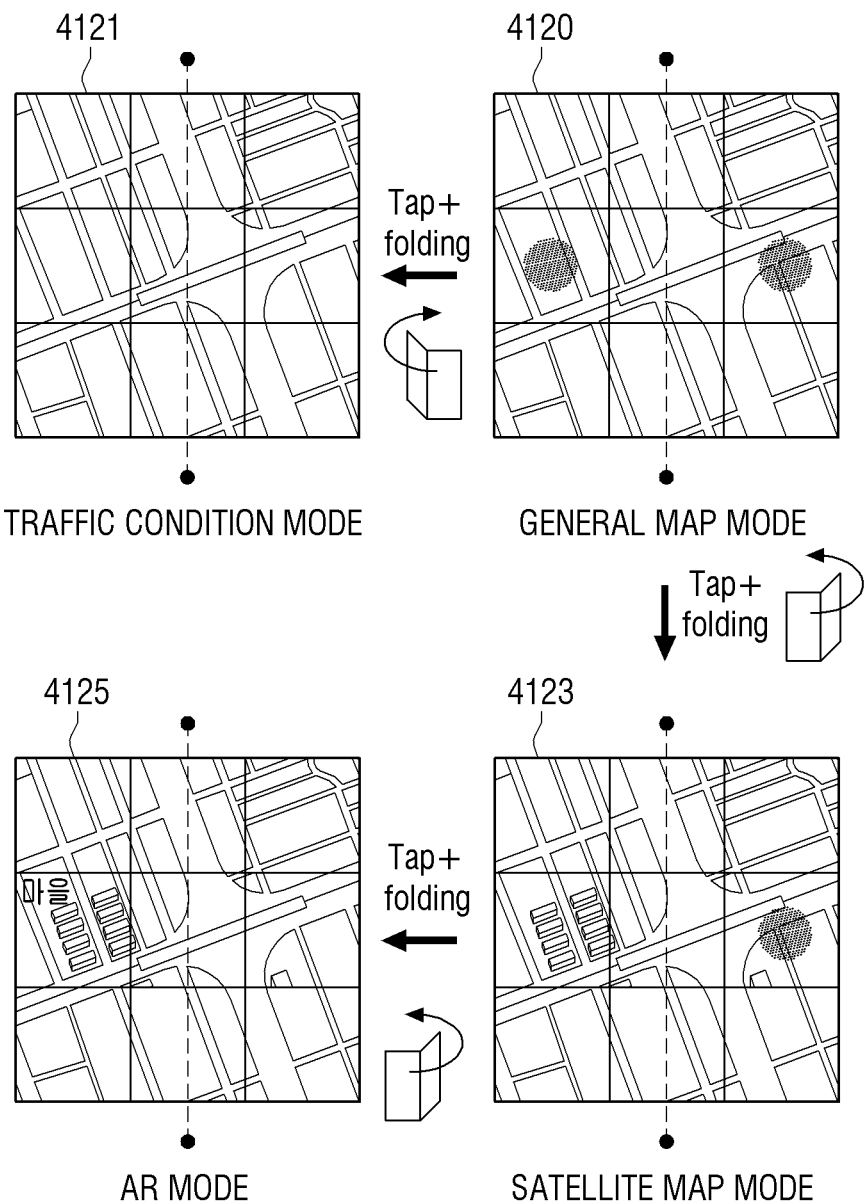

However, as illustrated in the second screen of FIG. 41B, according to an exemplary embodiment, while the general map mode 4120 is displayed in the first square cell to the ninth square cell, after a square cell included in the second row, when a folding interaction to fold a left display channel in a right display panel direction is detected, the controller 290, as illustrated in the first screen of FIG. 41B, may control the display 230 to maintain the first and the third rows as in the general map mode, and display a screen 4121 in which the second row is changed to a traffic condition mode. However, as illustrated in the second screen of FIG. 41B, while the general map mode 4120 is displayed in the first square cell to the ninth square cell, after the square cell which is included in the second row is touched, when a folding interaction to fold a right display panel in a left display panel direction is detected, the controller 290, as the third screen of FIG. 41B, may control the display 230 to maintain the first and the third rows as in the general map mode and that the second row displays a screen 4123 which is changed to the satellite map mode. In addition, as illustrated in the third screen of FIG. 41B, while a screen 4123 which displays the general map mode and the satellite map mode at the same time in the first square cell to the ninth square cell is displayed, when a folding interaction to touch a square cell included in the second row and then fold a right display panel in a left display panel direction is detected, the controller 290, as the fourth screen of FIG. 41B, may control the display 230 to maintain the first row and the third row as in the general map mode and display the screen 4125 which is changed to the AR mode on the second row. That is, after a specific square cell is touched, when a folding interaction is detected, the controller 290 may control the display 230 to change only rows which include the touched square cell, according to an exemplary embodiment.

In addition, while main content is displayed in a plurality of square cells, after a specific square cell is touched, when a folding interaction is detected, the controller 290 may provide different contents or menus with respect to columns which include a specific square cell according to a location of the touched specific square cell.

Figure 42A:
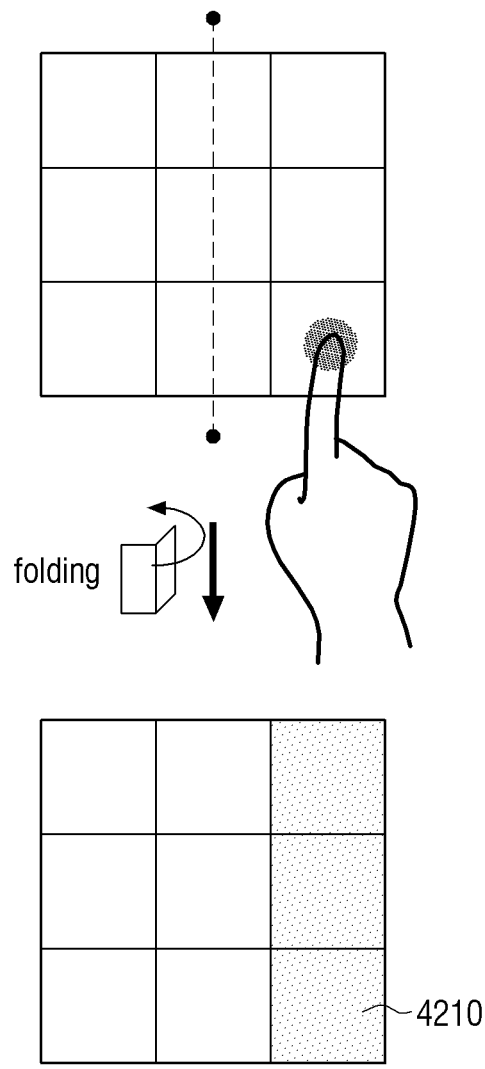

To be specific, as illustrated in FIG. 42A, according to an exemplary embodiment, while image content is displayed in nine square cells, after the ninth square cell is touched, when a folding interaction is detected, the controller 290 may control the display 230 to display content 4210 which is related to the image content in the third column. As illustrated in FIG. 42B, according to an exemplary embodiment, while news content is displayed in nine square cells, after the ninth square cell is touched, when a folding interaction is detected, the controller 290 may control the display 230 to display three news items 4220 related to the news content in the third column.

In addition, as illustrated in FIG. 43A, according to an exemplary embodiment, while an image content is displayed in nine square cells, after the seventh square cell is touched, when a folding interaction is detected, the controller 290 may control the display 230 to display a menu 4310 to control functions of the user terminal device in the first column. As illustrated in FIG. 43B, according to an exemplary embodiment, while news contents are displayed in nine square cells, after the seventh square cell is touched, when a folding interaction is detected, the controller 290 may control the display 230 to display a menu 4320 regarding the user terminal device in the first column.

In addition, the controller 290 may divide or integrate a display screen using a folding interaction and a rotation interaction.

Figure 44:
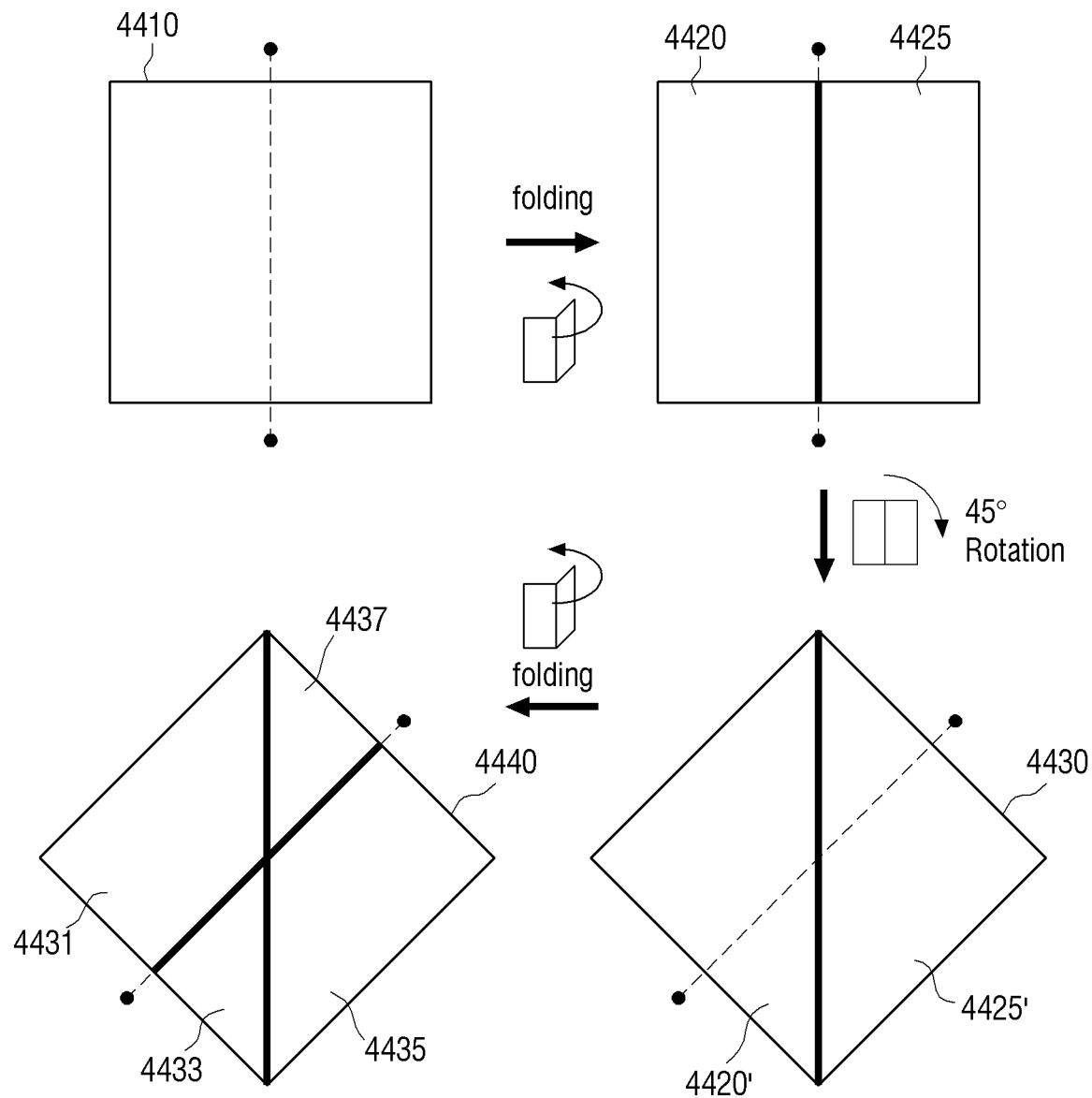

To be specific, as illustrated in the first screen of FIG. 44, according to an exemplary embodiment, while one image content 4410 is displayed, when a folding interaction is detected with reference to the hinge (shown as a dotted line), the controller 290, as illustrated in the second screen of FIG. 44, may control the display 230 to split the display screen into two screens and display two image contents 4420, 4425.

In addition, while two image contents 4420 and 4425 are displayed as the second screen of FIG. 44, when a rotation interaction to rotate a display at an angle of 45 in a clockwise direction is detected through a detector (for example, a tilting detector, a gyro detector, an accelerator detector, or the like) for detecting the rotation of the user terminal device 200, the controller 290, as illustrated in the third screen of FIG. 44, may control the display 230 to rotate and display two image contents 4420' and 4425' so that split lines of the two screens may be used. In addition, as shown in the third screen of FIG. 44, while two image contents 4420' and 4425' are split, when a folding interaction is detected, the controller 290, as illustrated in the fourth screen of FIG. 44, may control the display 230 to split the display screen into four screens and display four image contents 4431, 4433, 4435, and 4437.

Figure 45:
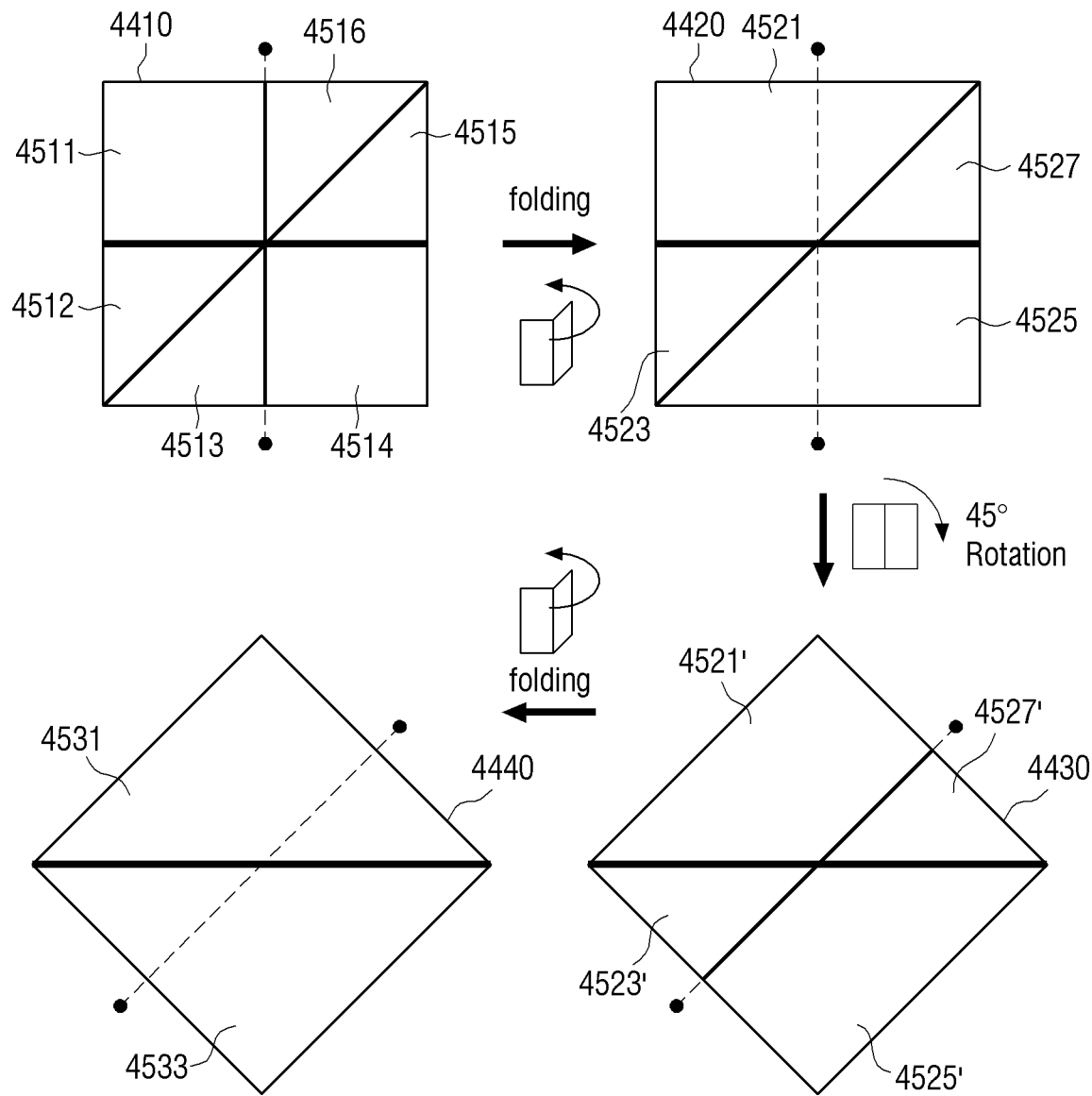

In addition, as shown in the first screen of FIG. 45, according to an exemplary embodiment, while six image contents 4511 to 4516 are displayed, when a folding interaction with reference to the hinge (shown as a vertical line) is detected, the controller 290 may control the display 230 to remove the split line with reference to the hinge, as illustrated in the second screen of FIG. 45, and display four image contents 4521, 4523, 4525, and 4527. In addition, as illustrated in the second screen of FIG. 45, while the four image contents 4521, 4523, 4525, and 4527 are displayed, when a rotation interaction to rotate a display at an angle of 45 degrees in a clockwise direction is detected, the controller 290, as illustrated in the third screen of FIG. 45, may control the display 230 to maintain split lines of four screens and rotate and display four image contents 4521', 4523', 4525', and 4527'. In addition, as illustrated in the third screen of FIG. 45, while four image contents 4521', 4523', 4525', and 4527' are displayed, when a folding interaction is detected with reference to the hinge, the controller 290 may control the display 230 to remove the split line with reference to the hinge and as illustrated in the fourth screen of FIG. 45, display two image contents 4531 and 4533.

Figure 46A:
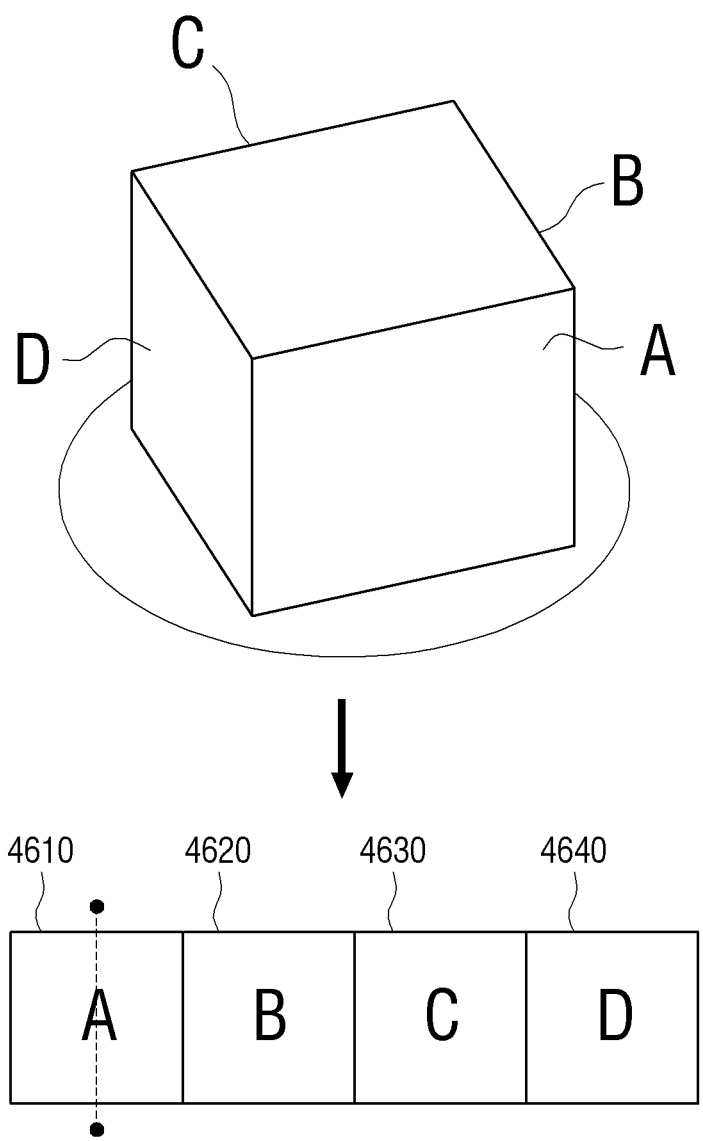
Figure 46B:
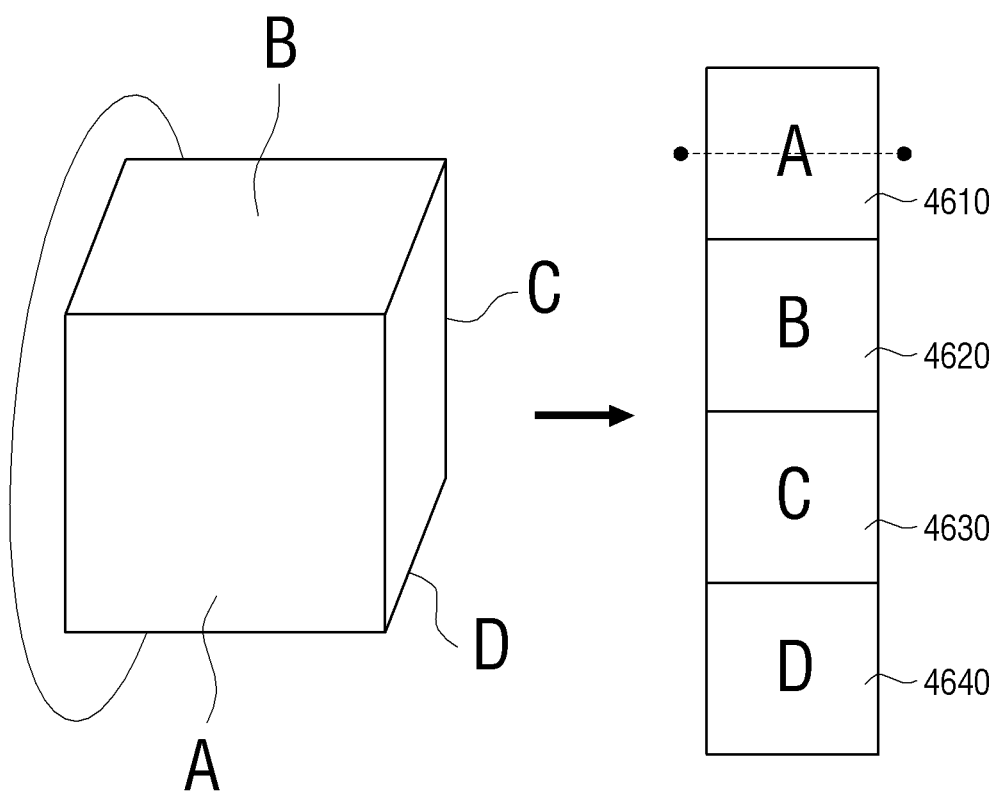

In addition, the controller 290 may change a screen according to a direction of the hinge as if a third dimensional cube is rotated. To be specific, as illustrated in FIG. 46A, according to an exemplary embodiment, while the hinge (shown as a dotted line) is in a vertical state, when a folding interaction is detected, the controller 290, as if a cube is rotated in a horizontal direction, may change a screen according to an order of "screen A->screen B->screen C->screen D->screen A-> . . . ". In addition, as illustrated in FIG. 46B, according to an exemplary embodiment, while the hinge is in a horizontal state, when a folding interaction is detected, the controller 290, as if a cube is rotated in a vertical direction, may change a screen according to an order of "screen A->screen B->screen C->screen D->screen A-> . . . ".

<Rotation Interaction>

According to an exemplary embodiment, while the first screen is displayed, when the detector 280 detects a user interaction to rotate the first screen, the controller 290, according to a user interaction, may control the display 230 to display the first screen in a rotated state in a clockwise or counterclockwise direction at a predetermined angle. In this case, the controller 290 may control the display 230 to display a second screen related to the rotated first screen on at least one of a plurality of corner areas of the user terminal device 200.

Figure 62A:
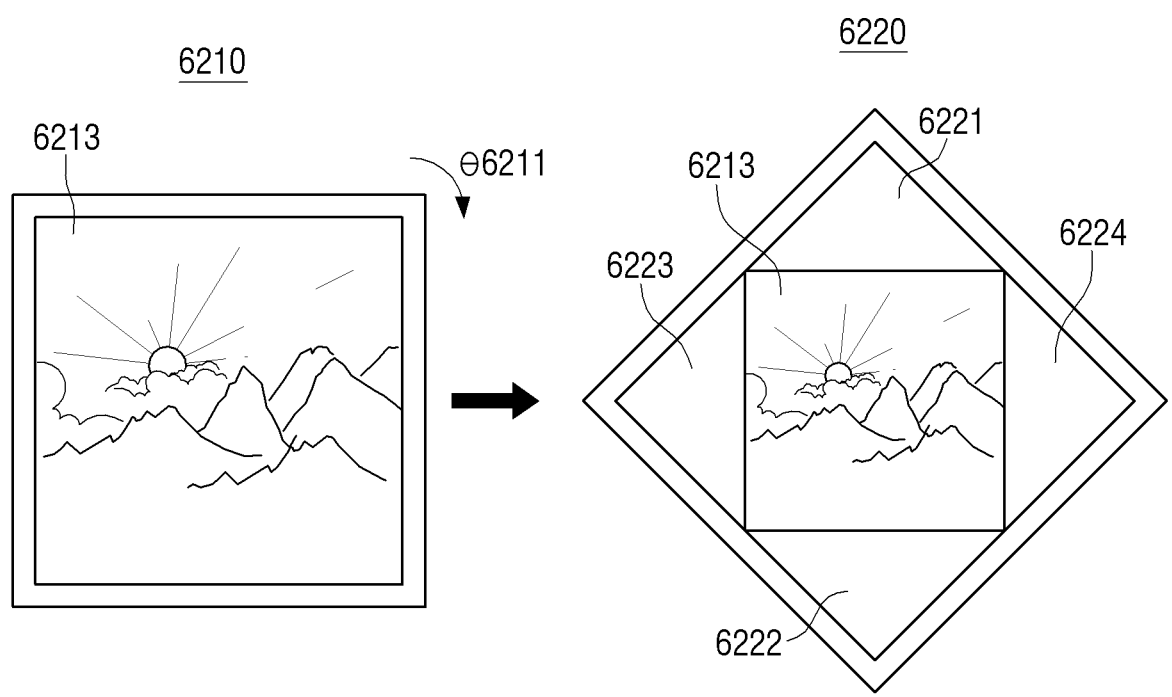
FIGS. 62A to C are views illustrating a rotation of a screen, according to an exemplary embodiment.
Figure 62B:
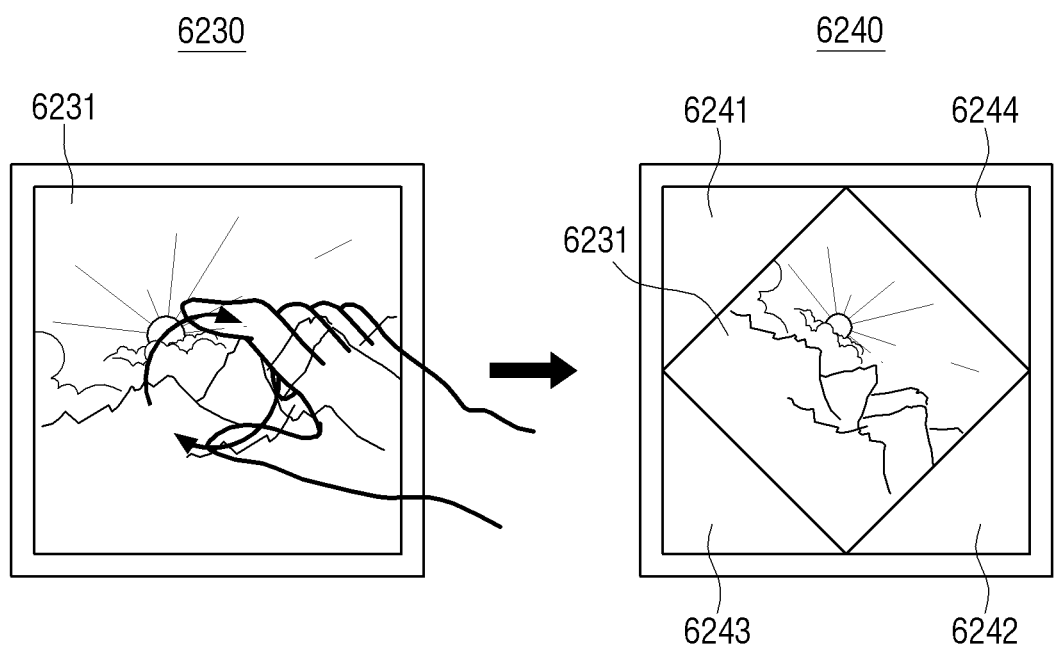
Figure 62C:
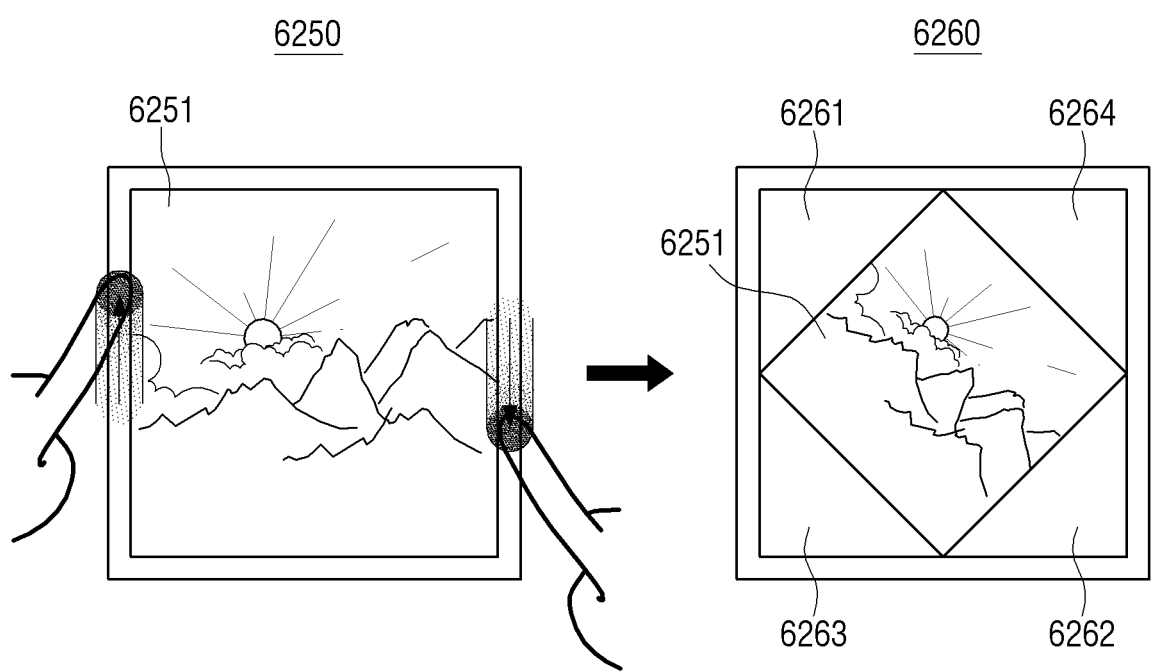

FIGS. 62A to 62C are views illustrating the rotations of a screen according to an exemplary embodiment.

In an exemplary embodiment, referring to 6210 of FIG. 62A, according to an exemplary embodiment, the controller 290 may control the display 230 to display a first screen 6213. While the first screen 6213 is displayed, the rotation detector 284, as the user terminal device 200 is rotated in a clockwise direction to be a diamond shape, may detect a rotation angle θ 6211. When the rotation detector 284 detects size of a rotation angle θ 6211 in a clockwise direction, as illustrated in 6220 of FIG. 62A, the controller 290 may control the display 230 to rotate and display a first screen 6213 in a counterclockwise direction at a predetermined acute angle based on the size of the detected angle θ 6211. In addition, the controller 290 may control the display 230 to display second screens 6221-6224 related to the first screen 6213 on each of a plurality of corner areas of the user terminal device 200.

In another exemplary embodiment, referring to 6230 of FIG. 62B, according to an exemplary embodiment, the controller 290 may control the display 230 to display the first screen 6231. While the first screen 6231 is displayed, the touch detector 282 may detect a user interaction to touch a display screen and drag the screen in a clockwise direction using at least one finger. When the rotation detector 284 senses a user interaction, as illustrated in 6240 of FIG. 62B, the controller 290 may control the display 230 to rotate and display the first screen 6231 in a clockwise direction at a predetermined acute angle. In addition, the controller 290 may control the display 230 to display second screen 6241-6244 related to the first screen 6231 on each of a plurality of corner areas of the user terminal device 200.

In still another exemplary embodiment, referring to 6250 of FIG. 62C, according to an exemplary embodiment, the controller 290 may control the display 230 to display the first screen 6251. While the first display 6251 is displayed, the detector 280 may detect a user interaction to drag at least one side of a bezel of the user terminal device 200. For example, the detector 280 may detect a user interaction to drag one side of the bezel in one direction and, at the same time, drag another side of the bezel which faces this one side in an opposite direction. When the detector 280 detects a user interaction, as illustrated in 6260 of FIG. 62C, the controller 290 may control the display 230 to rotate and display the first screen 6251 in a clockwise direction at a predetermined acute angle. The controller 290 may control the display 230 to display second screens 6261-6264 related to the first screen 6251 at each of a plurality of corner areas of the user terminal device 200.

When the user terminal device 200 detects the size of a rotation angle, as the display is rotated in a clockwise or counterclockwise direction to be a diamond shape, the controller 290 may control the display 230 to rotate and display the first screen at a predetermined acute angle in an direction opposite to the rotation direction of the user terminal device 200. For example, when the size of an angle detected through the rotation detector 284 is not less than a predetermined first angle, the controller 290 may control the display 230 to rotate and display the first screen in a direction opposite to the rotation direction at a predetermined second angle. Here, the predetermined acute angle may be between 40° and 50°, and preferably 45°. For example, when the size of an angle detected through the rotation detector 284 is not less than 30°, the controller 290 may control the display 230 to rotate and display the first screen at an angle of −45°. In this case, it is not necessary that the first screen is rotated and displayed by −45°, and the first screen may be rotated and displayed at a larger (for example, −43°) or smaller (for example, −48°) than −45°. In addition, when the first screen is displayed based on the size of an angle of the user terminal device 200, the first screen may be rotated and displayed as much as an angle in a direction opposite to the rotation direction of the first screen, or the first screen may be rotated and displayed in a direction opposite to the rotation direction as much as a predetermined angle. To be specific, when the size of an angle detected through the rotation detector 284 is 45°, the controller 290 may control the display 230 to rotate and display the first screen at an angle of −45°. Alternatively, if the size of an angle detected through the rotation detector 284 is 43°, the controller 290 may control the display 230 to rotate and display the first screen at an angle of −43°.

Figure 61A:
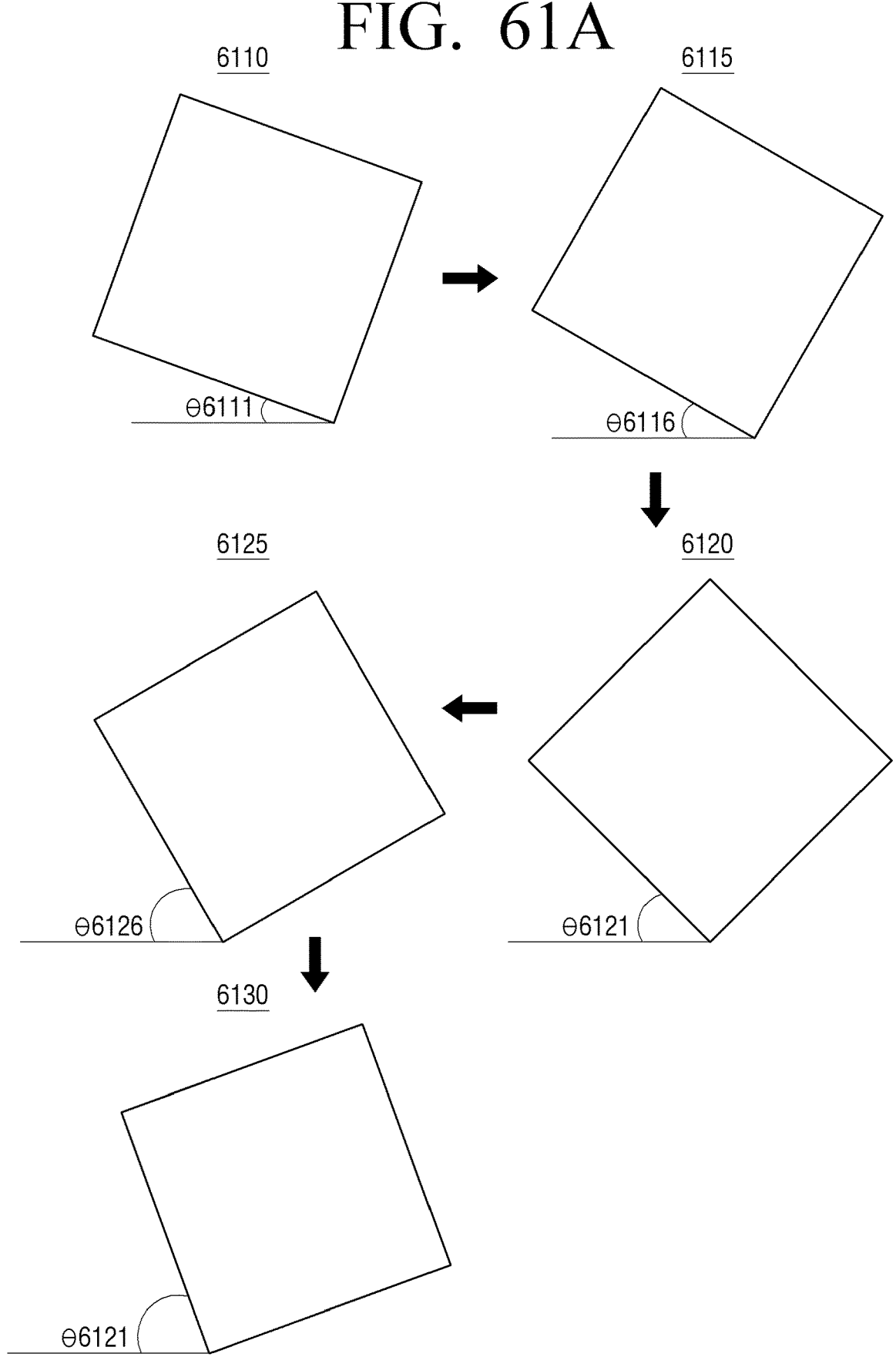
FIGS. 61A and B are views illustrating a diamond shape of a rotated user terminal device, according to an exemplary embodiment.
Figure 61B:
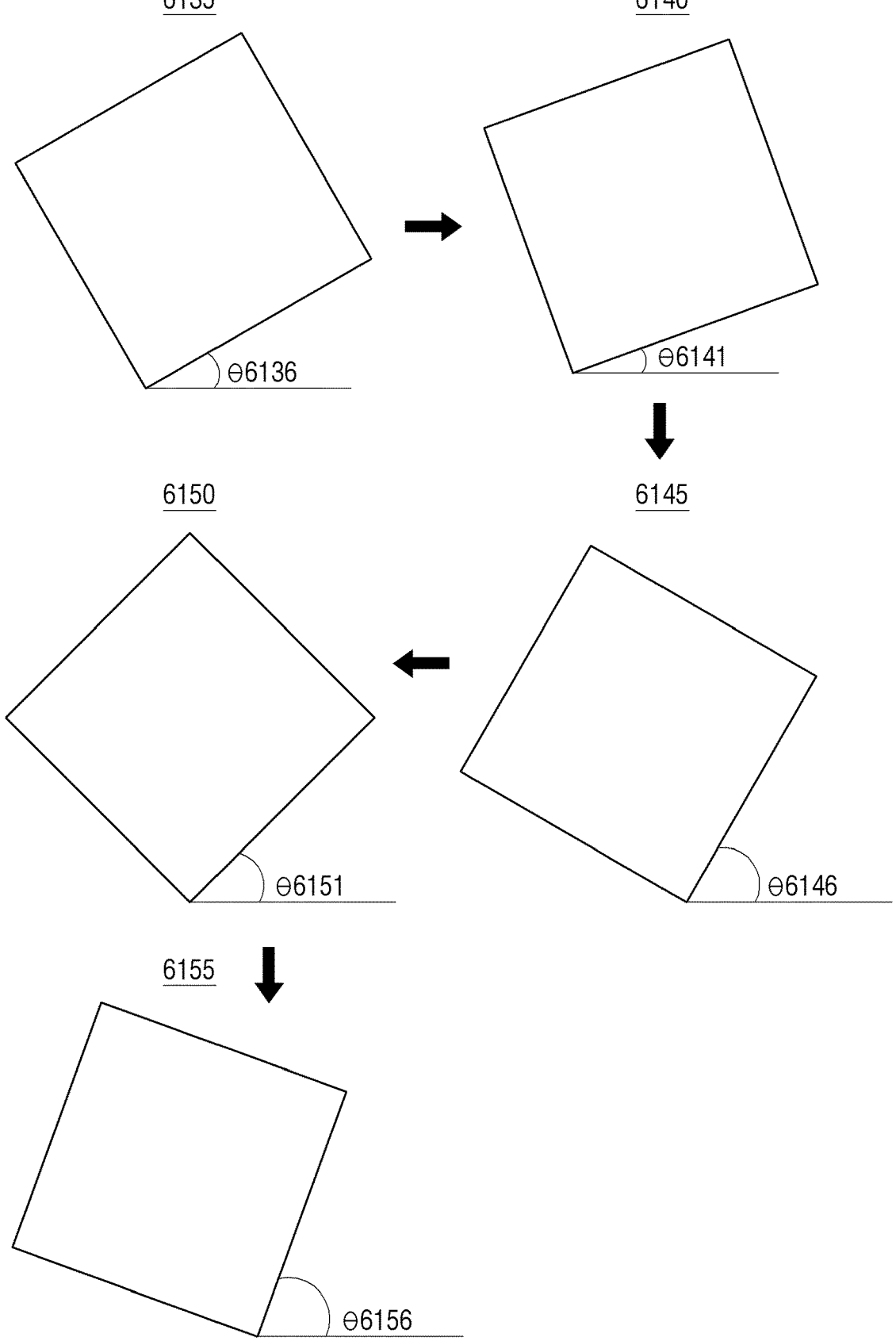

Meanwhile, according to an exemplary embodiment, a diamond shape indicates that a square shape is inclined, and may indicate that a square is rotated in a clockwise or counterclockwise direction at a size of an acute angle. In this case, a size of the acute angle which indicates that the user terminal device 200 is a diamond shape may be between 20° and 90°, but this is merely an example, and the size of an angle which indicates that the display becomes a diamond shape may become different according to a user setting value or a value which is set at the time when the user terminal device 200 is manufactured. FIGS. 61A and 61B are views illustrating a user terminal device being rotated in a clockwise or counterclockwise direction according to various exemplary embodiments. 6110 to 6130 of FIG. 61A indicate that the user terminal device 200 is rotated in a clockwise direction as much as angles of θ 6111 (about 20°), θ 6116 (about 30°), θ 6121 (about 45°), θ 6126 (about 60°) and θ 6131 (about 70°). In addition, 6135 to 6155 of FIG. 61B are views illustrating a user terminal device being rotated in a counterclockwise direction according to various exemplary embodiment, For example, the user terminal device 200 is rotated in a counterclockwise direction at angles of θ 6136 (about 20°), θ 6141 (about 30°), θ 6146 (about 45°), θ 6151 (about 60°) and θ 6156 (about 70°).

In addition, when the rotated first screen is displayed, an area of the rotated first screen may be smaller than an area of the first screen of the user terminal device 200 before rotation. For example, when the first screen is rotated as much as −45° and is displayed, an area of the first screen may be about a half of an area before the rotation. In this case, in an exemplary embodiment, each position of four apexes of the rotated first screen may be displayed and may correspond to a center of side of the display screen which is a full screen of the display 230. In addition, when the first screen is in a square shape, the second screen which is displayed at a plurality of corner areas may be an isosceles triangle shape, and the first screen and the second screen may share one side, according to an exemplary embodiment.

FIG. 47 is a view illustrating various functions of a user terminal device based on a rotation interaction according to an exemplary embodiment.

As illustrated in 4710 of FIG. 47, the controller 290 may control the display 230 to display an image content on a first screen 4713. In this case, the rotation detector 284 may detect a size of a rotation angle, as the user terminal device 200 is rotated in a clockwise or counterclockwise direction. For example, when a user rotates the user terminal device 200 is a clockwise or counterclockwise direction, the rotation detector 284 may detect a size of a rotation angle.

In an exemplary embodiment, when the rotation detector 284 detects the size of rotation to be angle θ 4711 in a clockwise direction, as illustrated in 4720 of FIG. 47, the controller 290 may control the display 230 to rotate and display an image content in a counterclockwise direction based on the detected angle θ 4711. In addition, the controller 290 may control the display 230 to display objects 4721-1-4724-1 which indicate functions related to the image content in the second screens 4721-4724 which correspond to each of a plurality of corner areas of the user terminal device 200.

For example, the controller 290 may control the display 230 to display a content sharing object 4721-1 in the second screen 4721. When a user selects the content sharing object 4721-1 or the second screen 4721, the controller 290 may provide a function to share an image content with another user terminal device or a counterpart.

In addition, the controller 290 may control the display 230 to display a content deletion object 4722-1 in the second screen 4722. When a user selects the content deletion object 4722-1 or the second screen 4722, the controller 290 may provide a function to delete image content.

In addition, the controller 290 may control the display 230 to display content search objects 4723-1 and 4724-1 on each of the second screens 4723 and 4724, respectively. When a user selects one of the content search objects 4723-1 and 4724-1, the controller 290 may control the display 230 to display in the first screen 4713 an image content which is located before or after the image content displayed on the first screen 4713 in the image content list.

In another exemplary embodiment, when the rotation detector 284 detects a size of a rotation angle θ 4712 in a counterclockwise direction, as illustrated in 4730 of FIG. 47, the controller 290 may control the display 230 to rotate and display image content in a clockwise direction based on the size of the detected angle θ 4712. In addition, the controller 290 may control the display 230 to display at least a part of other image contents on the second screens 4731-4734 which correspond to each of a plurality of corner areas of the user terminal device 200.

For example, the controller 290 may control the display 230 to display on each of the second screens 4731 and 4732 at least a part of the image contents which are photographed within a specific time (for example, 1 hour) or on the same date as the time when the image content displayed on the first screen 4713. In this case, when a user selects one of the image contents which are displayed in the second screens 4731 and 4732, the controller 290 may control the display 230 to display the selected image content in the first screen 4713.

In addition, the controller 290 may control the display 230 to display on each of the second screens 4733 and 4734 as a part of the image contents which is photographed on the dates which are different from the date when the image content which is displayed on the first screen 4713 is photographed. In this case, when a user selects one of the image contents displayed on the second screens 4733 and 4734, the controller 290 may control the display 230 to display the selected image content in the first screen 4713.

That is, as illustrated in FIG. 47, the controller 290 may control the display 230 to display in the second screen an image which has a different type according to a rotation direction of the user terminal device 200.

Figure 48A:
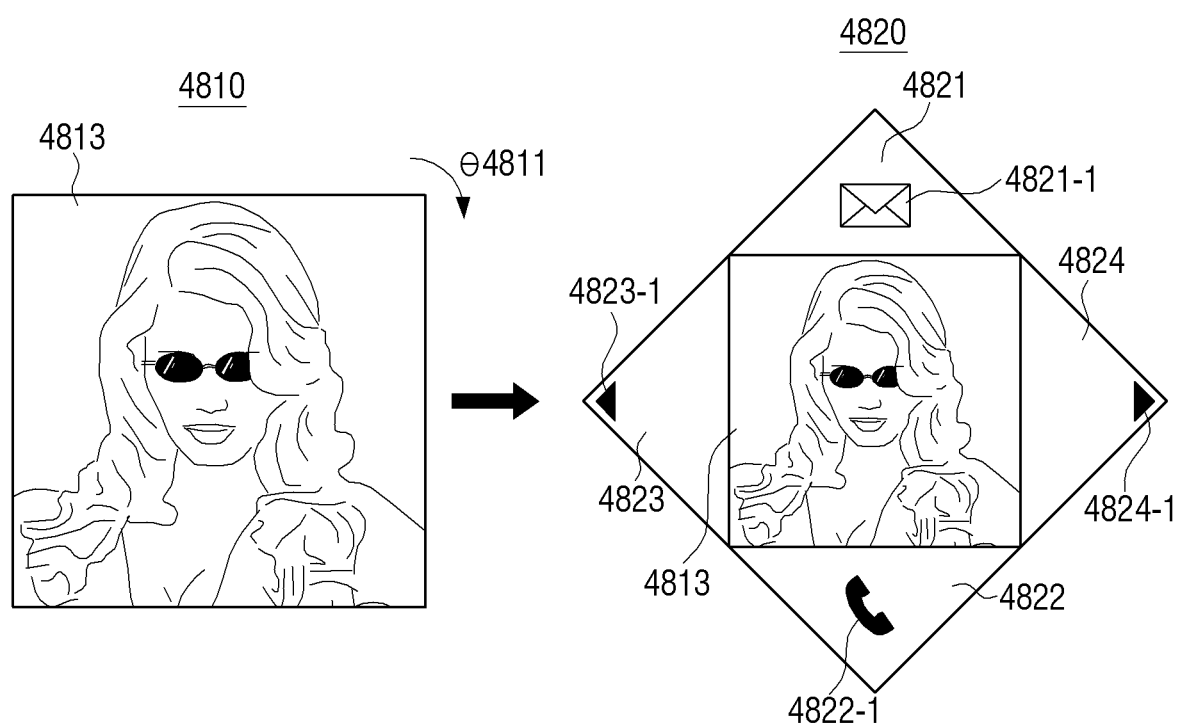

FIG. 48A is a view illustrating various functions of a user terminal device based on a rotation interaction according to yet another exemplary embodiment.

As illustrated in 4810 of FIG. 48A, the controller 290 may control the display 230 to display in the first screen 4813 information about a contact (i.e., a person in a phone book of the user terminal device 200). Information about the contact may include, for example, an image content related to the contact, a name of the contact, a nickname of the contact, a profile of the contact, identification information of the contact, or the like. In this case, the rotation detector 284 may detect a size of an acute angle θ 4811 which is rotated according to a rotation of the user terminal device 200 in a clockwise direction.

When the rotation detector 284 detects the size of an acute angle θ 4811 of the rotation in a clockwise direction, as illustrated in 4820 of FIG. 48A, the controller 290 may control the display 230 to rotate and display content in a counterclockwise direction based on the size of the detected acute angle θ 4811. In addition, the controller 290 may control the display 230 to display the objects 4821-1-4824-1 which indicate the functions related to information about the contact in the second screens 4821-4824 which correspond to each of a plurality of corner areas of the user terminal device 200.

For example, the controller 290 may control the display 230 to display a text or mail transmission object 4821-1 in the second screen 4821. When a user selects the letter or mail transmission object 4821-1, or the second screen 4821, the controller 290 may provide a function to transmit a text or mail to the contact. For example, the controller 290 may execute a text or mail transmission application.

In addition, the controller 290 may control the display 230 to display a telephone object 4822-1 in a second screen 4822. When a user selects the telephone object 4822-1 or the second screen 4822, the controller 290 may provide a function to request a telephone call to the contact. For example, the controller 290 may execute a telephone application.

In addition, the controller 290 may control the display 230 to display the search objects of a contact 4823-1 and 4824-1 in each of the second screens 4823 and 4824. When a user selects one of the search objects of a contact 4823-1 and 4824-1 or one of the second screens 4823 and 4824, the controller 290 may control the display 230 to display information of another contact located before or after the current contact in a contact list (for example, a telephone list, mail list, or SNS friends list).

Figure 48B:
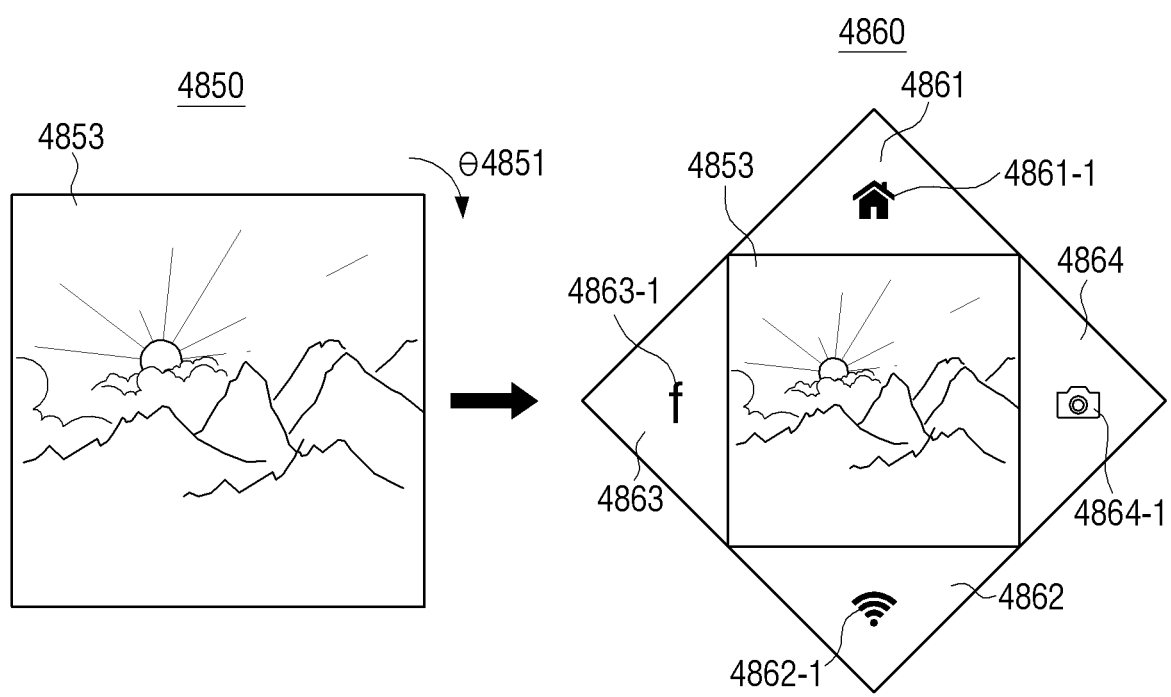

FIG. 48B is a view illustrating various functions of a user terminal device based on a rotation interaction according to an exemplary embodiment.

As illustrated in 4850 of FIG. 48B, the controller 290 may control the display 230 to display an image content in a first screen 4853. In this case, the rotation detector 284 may detect a size of a rotation angle, as the user terminal device 200 rotates in a clockwise direction or counterclockwise direction. For example, when a user rotates the user terminal device 200 in a clockwise direction or counterclockwise direction, the rotation detector 284 may detect the size of a rotation angle.

When the rotation detector 284 detects size of a rotation angle θ 4851 in a clockwise direction, as illustrated in 4860 of FIG. 48B, the controller 290 may control the display 230 to rotate and display image content in a counterclockwise direction based on the size of the detected angle θ 4851. In addition, the controller 290 may control the display 230 to display objects 4861-1-4864-1 which indicate global functions in the second screens 4861-4864 which correspond to each of a plurality of corner areas of the user terminal device 200. The global function may be a function which is executed independently of an application which is displayed in the first screen 4853.

For example, the controller 290 may control the display 230 to display a home screen icon 4861-1 in a second screen 4861. When a user selects the home screen icon 4861-1 or the second screen 4861, the controller 290 may control the display 230 to execute a home screen application and display the application in the first screen 4853.

In addition, the controller 290 may control the display 230 to display a wireless network icon (for example, a Bluetooth icon) 4862-1 in the second screen 4862. When a user selects a wireless network icon 4862-1 or a second screen 4862, the controller 290 may control the display 230 to execute wireless network application and display the application in the first screen 4853.

In addition, the controller 290 may control the display 230 to display an SNS application icon 4863-1 in a second screen 4863. When a user selects the SNS application icon 4863-1 or the second screen 4863, the controller 290 may control the display 230 to execute the SNS and display the application in the first screen 4853.

The controller 290 may control the display 230 to display a camera application icon 4864-1 in a second screen 4864. When a user selects the camera application icon 4864-1 or the second screen 4864, the controller 290 may control the display 230 to execute a cameral application and display the application in the first screen 4853.

Figure 49:
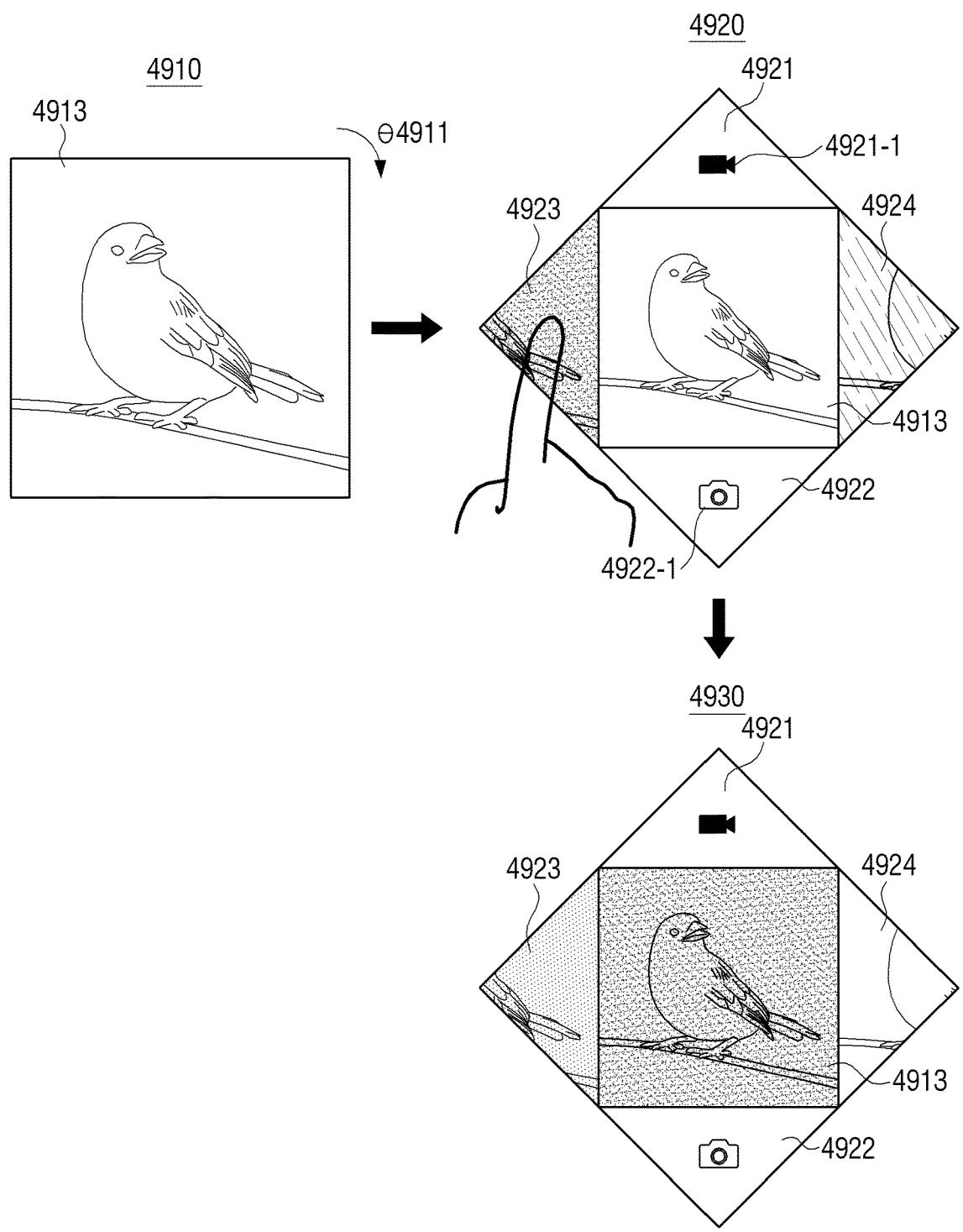

FIG. 49 is a view illustrating various functions of a user terminal device based on a rotation interaction according to another exemplary embodiment.

As illustrated in 4910 of FIG. 49, the controller 290 may control the display 230 to display an image content in a first screen 4913. In this case, the rotation detector 284 may detect a size of a rotation angle θ 4911 as the user terminal device 200 rotates in a clockwise direction.

When the rotation detector 284 detects the size of a rotation angle θ 4911 in a clockwise direction, as illustrated in 4920 of FIG. 49, the controller 290 may control the display 230 to rotate and display the content in a counterclockwise direction based on the size of the detected angle θ 4911. The controller 290 may control the display 230 to display objects 4921-1, 4922-1 which indicate functions related to an image content in the second screens 4921 and 4922 which correspond to a vertical direction from among a plurality of corner areas of the user terminal device 200, and display at least a part of the image contents to which a filter is applied in the seconds screens 4923 and 4924 which correspond to a horizontal direction from among a plurality of corner areas.

For example, the controller 290 may control the display 230 to display a camcorder object 4921-1 in a second screen 4921. When a user selects the camcorder object 4921-1 or a second screen 4921, the controller 290 may provide a function to film a video. For example, the controller 290 may execute a video filming function of a camera application.

In addition, the controller 290 may control the display 230 to display a camera object 4922-1 in the second screen 4922. When a user selects the camera object 4922-1 or the second screen 4922, the controller may provide a function to photograph a photo. For example, the controller 290 may execute a photographing function of a camera application.

The controller 290 may control the display 230 to display at least a part of the image contents to which a color (for example, blue or red) filter to each of the second screens 4923 and 4924. In this case, the touch detector 282 may detect a user interaction to touch the second screen 4923.

When a user interaction to touch the second screen 4923 is detected by the touch detector 282, as illustrated in 4930 of FIG. 49, the controller 290 may control the display 230 to display image content which is displayed in the second screen 4923 in the first screen 4913. The controller 290 may control the display 230 to display image content to which another color filter is applied in the second screen 4923.

Figure 50A:
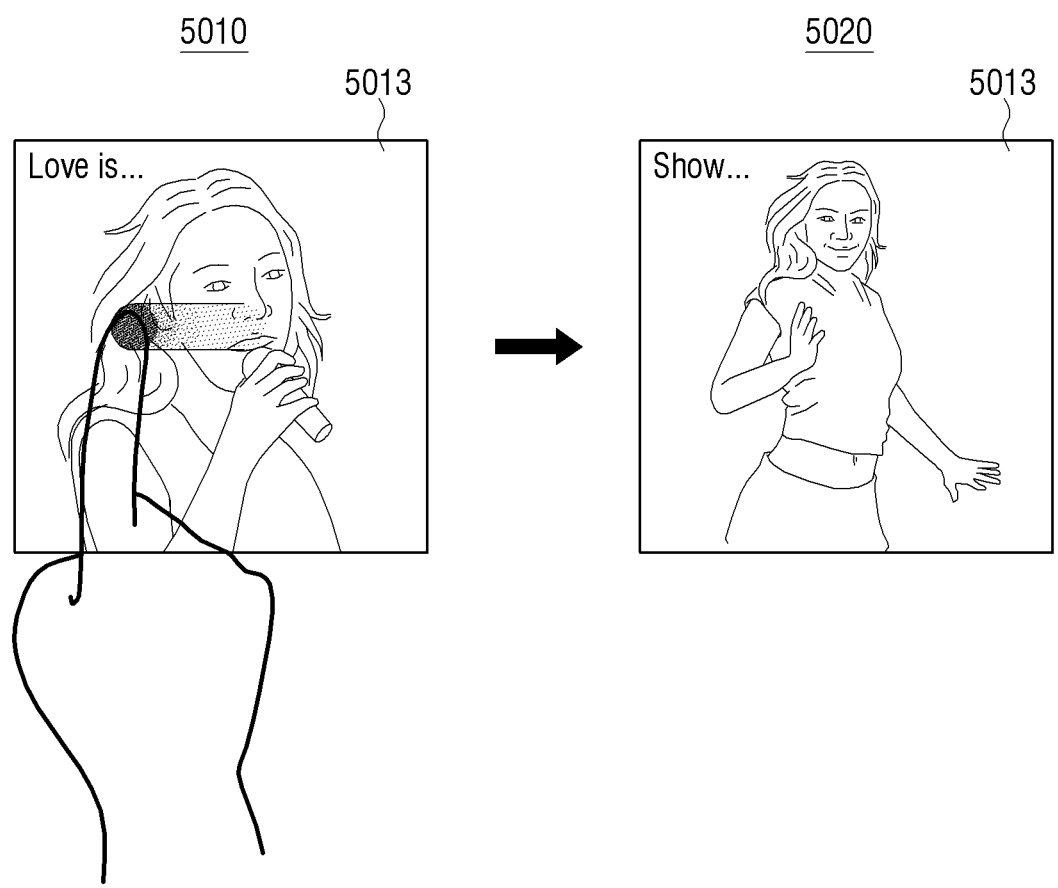
Figure 50B:
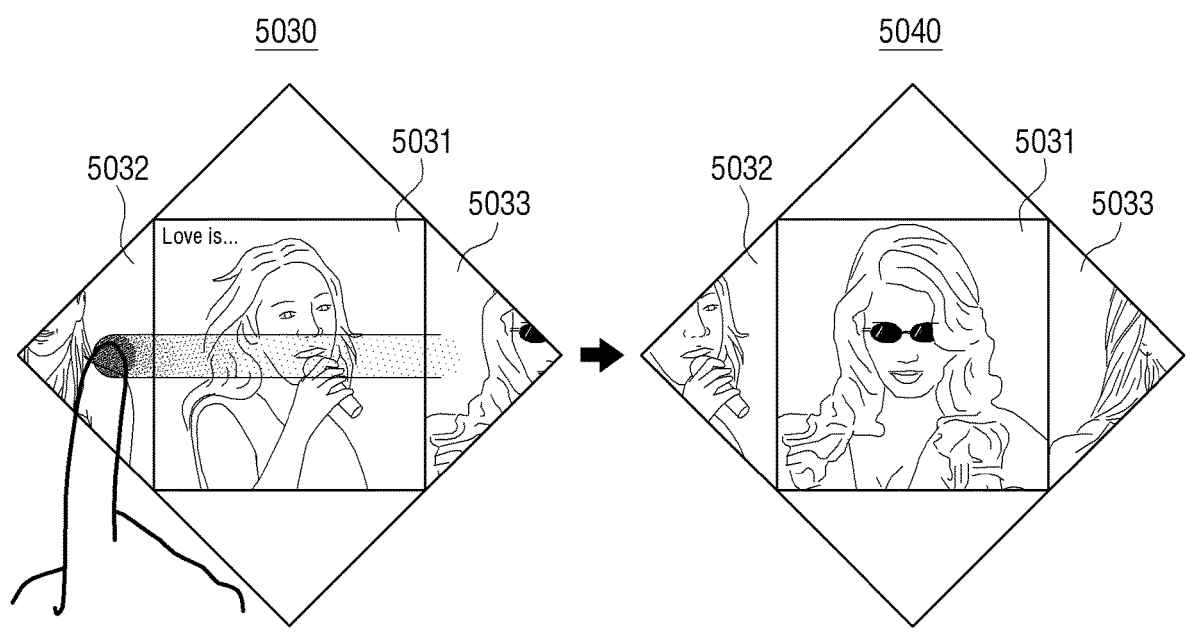

FIGS. 50A and 50B are views illustrating various functions of a user terminal device based on a rotation interaction according to yet another exemplary embodiment.

When the user terminal device 200 is not rotated, as illustrated in 5010 of FIG. 50A, the controller 290 may control the display 230 to display image content (for example, a cover image for a song in a music playlist) on a first screen 5013. In this case, the touch detector 282 may detect a user interaction to flick or drag in the first screen 5013.

When the touch detector 282 detects a user interaction to flick or drag in the first screen 5013, the controller 290 may determine whether the user terminal device 200 is rotated. When the user terminal device 200 is not rotated, as illustrated in 5020 of FIG. 50A, the controller 290 may control the display 230 to display another image content (for example, a cover image for another song in the playlist) in the first screen 5013.

When the user terminal device 200 is rotated, as illustrated in 5030 of FIG. 50B, the controller 290 may control the display 230 to display image content (for example, a cover image for a song in a music playlist) in the first screen 5031 and display other image contents (for example, a cover image for another song in the playlist) in second screens 5032 and 5033. At this time, the touch detector 282 may detect a user interaction to flick or drag the second screen 5033 in a direction of the first screen 5031.

When the touch detector 282 detects a user interaction to flick or drag, the controller 290 may determine whether the user terminal device 200 is rotated or not. When the user terminal device 200 is rotated, as illustrated in 5040 of FIG. 50B, the controller 290 may control the display 230 to display yet another image content (for example, a cover image for a song in another playlist not including the music playlist) in the first screen 5031.

Figure 51:
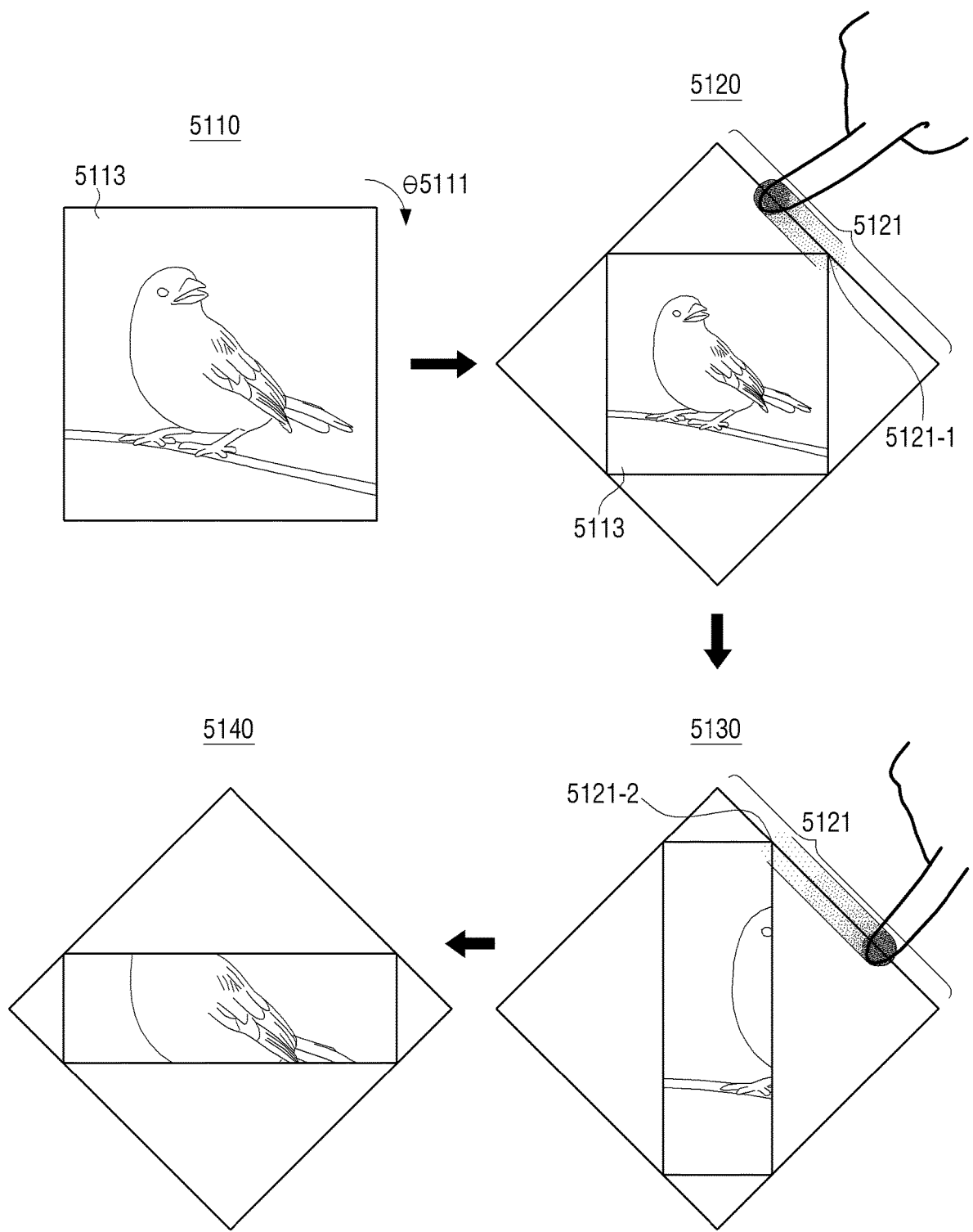

FIG. 51 is a view illustrating various functions of a user terminal device based on a rotation interaction according to yet another exemplary embodiment.

As illustrated in 5110 of FIG. 51, the controller 290 may control the display 230 so that image content is displayed in the first screen 5113. Herein, image content may be, for example, a representative image to determine a layout ratio of a photo which is photographed by a camera application. That is, a ratio of width to height of a photographed photo may be determined according to a ratio of width to height of the image content. In this case, the rotation detector 284 may detect size of a rotation angle θ 5111 as the user terminal device 200 is rotated in a clockwise direction.

When the rotation detector 284 detects the size of a rotation angle θ 5111 in a clockwise direction, as illustrated in 5120 of FIG. 51, the controller 290 may control the display 230 to rotate and display image content in a counterclockwise direction based on the size of the detected angle θ 5111. An area of the rotated image content may be half of an area of an image content before rotation. At this time, the touch detector 282 may detect a user interaction to drag in an upward direction along one side 5121 of a display screen or one side of a bezel (not shown) of the user terminal device 200. At this time, a location of a display screen or a side of the bezel from which a user starts a touch may be a location 5121-1 which corresponds to an apex of an image content.

When the touch detector 282 detects a user interaction to touch along a side in an upward direction is detected, as illustrated in 5130 of FIG. 51, the controller 290 may control the display 230 to change and display an area and a shape of an image content according to the dragging amount. For example, when a user touches a location 5121-1 corresponding to an apex of an image content and drags along one side in an upward direction, the controller 290, as the apex of the image content moves, may control the display 230 so that a ratio between width to height gets smaller. Again, the touch detector 282 may detect a user interaction to drag one side 5121 of a display screen or one side of a bezel of the user terminal device 200 in a downward direction along one side of a bezel.

When the touch detector 282 detects a user interaction to drag along one side in a downward direction, as illustrated in 5140 of FIG. 51, the controller 290 may control the display 230 to change and display an area and a shape of the image content according to the dragging amount. For example, when a user touches a location 5121-2 corresponding to an apex of an image content and drags along one side in a downward direction, the controller 290, as an apex of an image content moves, may control the display 230 so that a ratio between width to height of the image content becomes bigger and then smaller. For example, before a touch location of dragging passes by a center of one side, a ratio between width and height of an image content may get bigger, and after a touch location of dragging passes by a center of one side, a ratio between width and height of an image content may get smaller.

Figure 52:
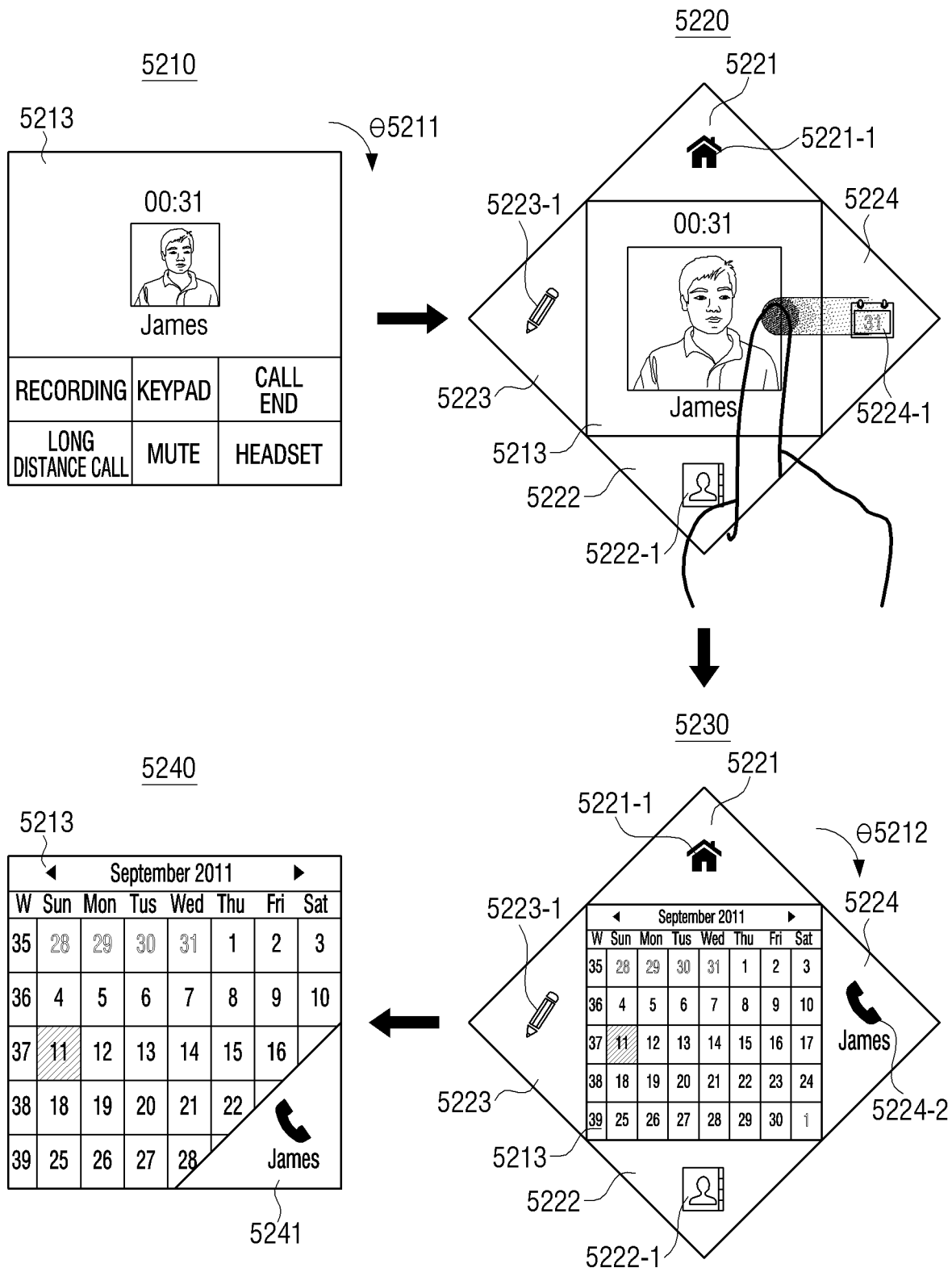

FIG. 52 is a view illustrating various functions of the user terminal device 200 based on a rotation interaction according to yet another exemplary embodiment.

As illustrated in 5210 of FIG. 52, the controller 290 may control the display 230 to display a telephone application in the first screen 5213. The first screen 5213 which provides a telephone application, for example, may include at least one of a button providing an image of a contact, a name of a contact, a calling time, a call record button, a keypad button, a call end button, a long distance call button, a mute button, and a headset button. At this time, the rotation detector 284 may detect the size of a rotation angle θ 5211 as the user terminal device 200 rotates in a clockwise direction.

When the rotation detector 284 detects the size of a rotation angle θ 5211 in a clockwise direction, as illustrated in 5220 of FIG. 52, the controller 290 may control the display 230 to rotate and display the first screen 5213 which provides a telephone application in a counterclockwise direction based on the size of the detected angle θ 5211. At this time, amount of information related to a telephone application after rotation which is displayed in the first screen 5213 may be simplified compared to the amount of information displayed before rotation. For example, information related to a telephone application after rotation may include at least one of an image of a contact, a name of a contact, and duration time of the call. In addition, the controller 29 may control the display 230 to display icons 5221-15224-1 which indicate applications related to a telephone application in the second screens 5221-5224 which correspond to each of a plurality of corner areas of the user terminal device 200.

For example, the controller 290 may control the display 230 to display a home screen icon 5221-1 in a second screen 5221. When a user selects the home screen icon 5221-1 or the second screen 5221, or performs a user interaction to drag from the second screen 5221 to the first screen 5213, the controller 290 may control the display 230 to display a home screen application in the first screen 5213.

In addition, the controller 290 may control the display 230 to display a contact list icon 5222-1 in the second screen 5222. When a user performs a user interaction to select the contact list icon 5222-1 or the second screen 5222, or drag from the second screen 5222 toward the first screen 5213, the controller 290 may control the display 230 to display a contact list application in the first screen 5213.

In addition, the controller 290 may control the display 230 to display a note icon 5223-1 in the second screen 5223. When a user performs a user interaction to select the contact list icon 5223-1 or the second screen 5223, or drag from the second screen 5223 toward the first screen 5213, the controller 290 may control the display 230 to display a note application in the first screen 5213.

The controller 290 may control the display 230 to display a calendar icon 5224-1 in a second screen 5224. At this time, the touch detector 282 may detect a user interaction to flick or drag from the second screen 5224 toward the first screen 5213.

When the touch detector 282 detects a user interaction to flick or drag, as illustrated in 5230 of FIG. 52, the controller 290 may control the display 230 to display a calendar application in the first screen 5213. In this case, in the second screen 5224 in which the calendar icon 5224-1 which corresponds to the note application is displayed, information related to the telephone application may be displayed. Amount of information related to a telephone application which is provided to the second screen 5224 may be further simplified in comparison with amount of information displayed on the first screen 5213. For example, information related to a telephone application which is provided to the second screen 5224 may include at least one of icons 5224-2 which correspond to a name of a contact, duration time of the call, and telephone application. The rotation detector 284 may detect the size of a rotation angle θ 5212, as the user terminal device 200 is rotated in a clockwise direction.

When the rotation detector 284 detects the size of a rotation angle θ 5212 in a clockwise direction, as illustrated in 5240 of FIG. 52, the controller 290 may control the display 230 to rotate and display the first screen 5213 which provides a calendar application in a counterclockwise direction based on the size of the detected angle θ 5212. At this time, the user terminal device 200 may be a square shape instead of a diamond shape according to the rotation which is performed twice. In addition, the first screen 5213 may be enlarged and displayed on a full display screen. Meanwhile, a third screen 5241 which includes information related to the telephone application may be displayed at a corner area of the display screen so that the running of the telephone application is still indicated.

Figure 53:
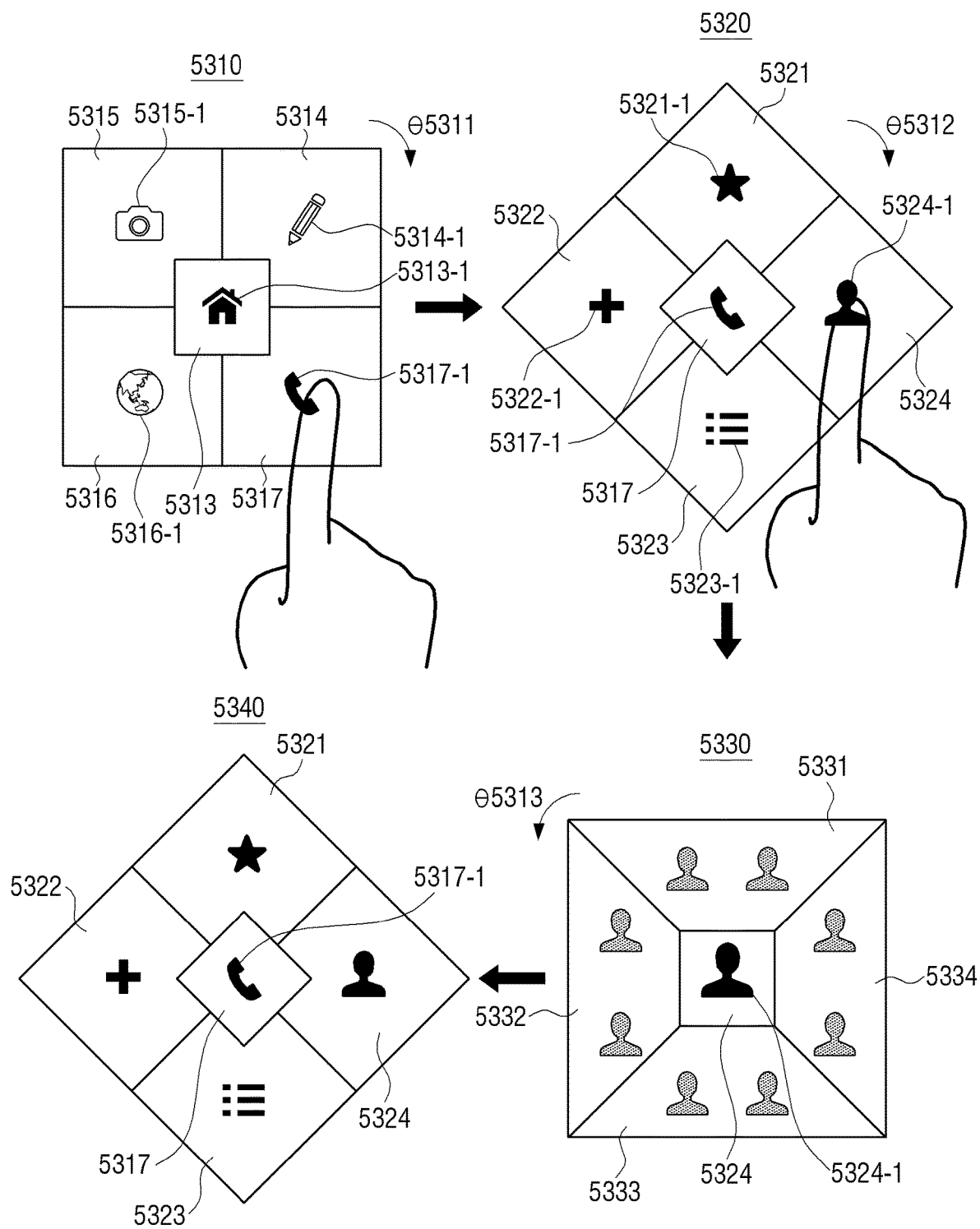

FIG. 53 is a view illustrating various functions of a user terminal device based on a rotation interaction according to yet another exemplary embodiment.

As illustrated in 5310 of FIG. 53, the controller 290 may control the display 230 to display a home screen icon 5313-1 in a first screen 5313 which is located at the center of the display 230. The controller 290 may control the display 230 to display icons 5314-15317-1 which indicate detailed functions of the home screen application in second screens 5314-5317 around the first screen 5313. For example, in the second screen 5314, a memo icon 5314-1 related to a memo function may be displayed, in a second screen 5315, a camera icon 5315-1 related to a camera function may be displayed, in a second screen 5316, an internet icon 5316-1 related to an internet function may be displayed, and in a second screen 5317, a telephone icon 5317-1 related to a telephone function may be displayed. At this time, the touch detector 282 may detect a user interaction to select a second screen 5317, and the rotation detector 284 may detect the size of a rotation angle θ 5311 of the user terminal device 200 which rotates in a clockwise direction. At this time, the touch detector 282 and the rotation detector 284 may detect a user interaction and size of an angle θ 5311 at the same time or sequentially within a specific time (for example, 2 seconds).

When the touch detector 282 and the rotation detector 284 detect a user interaction and the size of an angle θ5311, as illustrated in 5320 of FIG. 53, the controller 290 may control the display 230 to rotate and display a second screen 5317 including a telephone icon 5317-1 at the center of the display 230 based on the size of the detected angle θ 5311. In addition, the controller 290 may control the display 230 to display icons 5321-1-5324-1 indicating detailed functions of a telephone application which correspond to the telephone icon 5317-1 in the third screen 5321-5324 around the second screen 5317. For example, in the third screen 5321, a bookmark icon 5321-1 which is related to a bookmark list search function may be displayed, and in a third screen 5322, a registration/add icon 5322-1 related to registration or adding a new contact to the list may be displayed, in a third screen 5323, a telephone history icon 5323-1 related to the call log function may be displayed, and in the third screen 5324, a search icon 5324-1 which is related to a contact list search function may be displayed. The touch detector 282 may detect a user interaction to select the third screen 5324, and the rotation detector 284 may detect the size of a rotation angle θ 5312, as the user terminal device 200 rotates in a clockwise direction. In this case, the touch detector 282 and the rotation detector 284 may detect a user interaction and the size of an angle θ 5312 at the same time or sequentially within a specific time (for example, 2 seconds).

When the touch detector 282 and the rotation detector 284 detect a user interaction and a size of an angle θ 5312, as illustrated in 5330 of FIG. 53, the controller 290 may control the display 230 to rotate a third screen 5324 including a search icon 5324-1 in a counterclockwise direction and display in the center of the display 230 based on the size of the detected angle θ 5312. The controller 290 may control the display 230 to display icons indicating a detailed item of a contact list search function which corresponds to the search icon 5324-1 of the fourth screens 5331-5334 around the second screen 5317. The detailed item of the contact list search function may include, for example, image contents related to a contact, names of contacts or identification information of contacts. The rotation detector 284 may detect a size of a rotation angle θ 5313, as the user terminal device 200 rotates in a counterclockwise direction.

When the touch detector 282 and the rotation detector 284 detect a user interaction and a size of an angle θ 5313, as illustrated in 5340 of FIG. 53, the controller 290 may control the display 230 so that a display screen returns to a display screen 5320 of FIG. 53 which is a prior screen in which the user terminal device 200 is not yet rotated in a clockwise direction. To be specific, the controller 290 may control the display 230 to display third screens 5321-5324 around the second screen 5317 including a search icon 5317-1.

Figure 54:
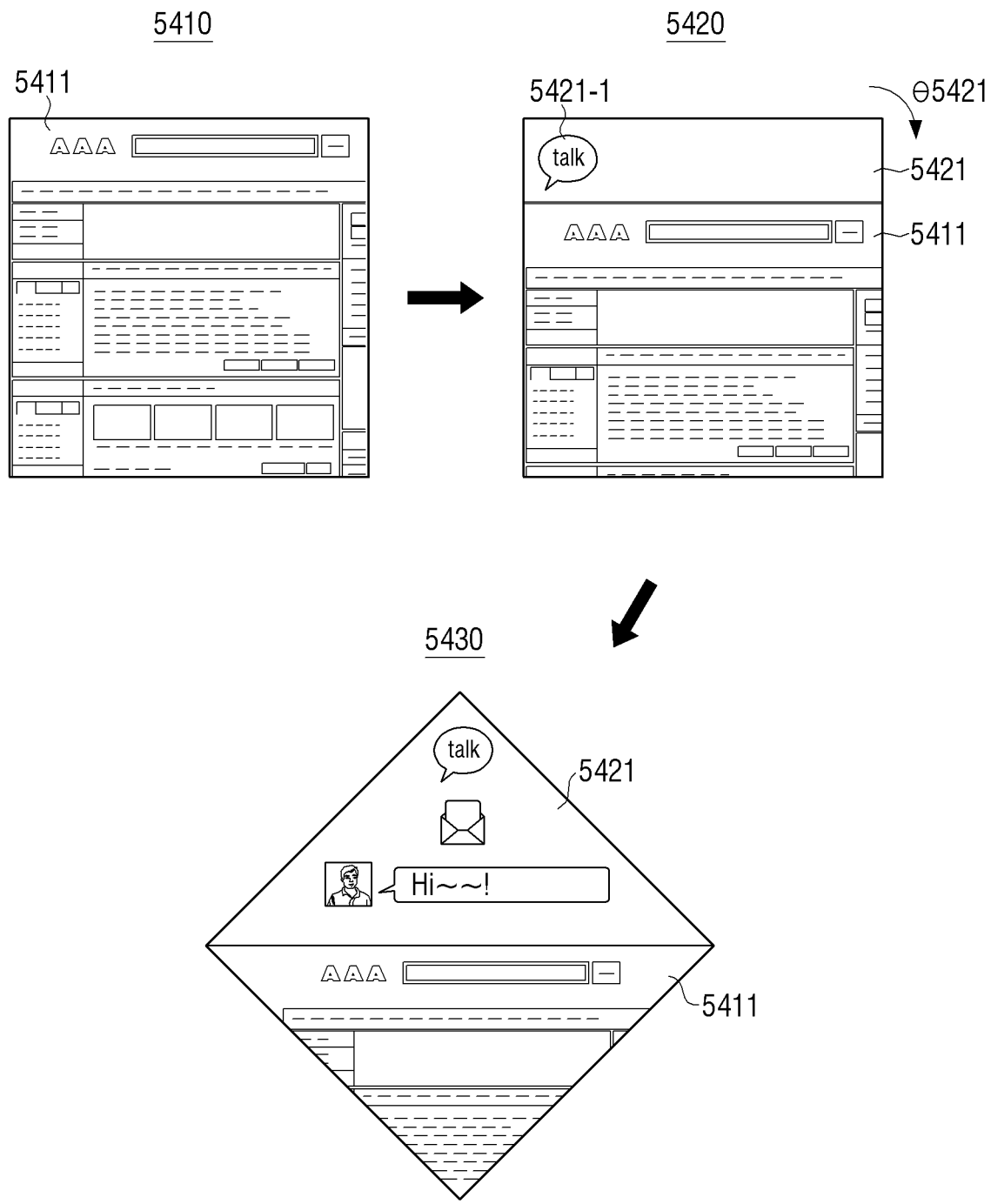

FIG. 54 is a view illustrating various functions of a user terminal device based on a rotation interaction according to yet another exemplary embodiment.

As illustrated in 5410 of FIG. 54, the controller 290 may control the display 230 to display an application in a first screen 5411. In this case, the controller 290 may obtain an alert notification. For example, the alert notification may include information indicating that a call, an e-mail, text, or a message is received from an outside source, information received from the user terminal device 200 regarding remaining battery charge and events, or information about an update of a preinstalled application.

In response to the obtained alert notification, as illustrated in 5420 of FIG. 54, the controller 290 may control the display 230 to display an alert notification 5421-1 in the second screen 5421. In another exemplary embodiment, the controller 290 may control the display 230 not to display the second screen 5421, and display an alert notification on one side of the first screen 5421. At this case, the rotation detector 284 may detect a size of a rotation angle θ 5421 of the user terminal device 200 which is rotated in a clockwise direction.

When the rotation detector 284 detects the size of a rotation angle θ 5421 in a clockwise direction, as illustrated in 5430 of FIG. 54, the controller 290 may control the display 230 to divide a display screen into a upper and lower screens, and display the first screen 5411 in a lower part of the display screen. At this time, the first screen 5411 may indicate visual effect that, as the user terminal device 200 is rotated in a clockwise direction, the screen is slid and descends toward a lower part of a display screen. The controller 290 may control the display 230 to display a second screen 5421 on a display screen. At this time, an alert notification in the second screen 5421 may display a visual effect that, as the user terminal device 200 is rotated in a clockwise direction, the screen is slid and descends toward a lower part of the second screen 5421. In particular, in case when there are several alert notifications, a plurality of alert notifications may display a visual effect that, as the user terminal device 200 is rotated in a clockwise direction, a screen is accumulated while the screen is slid according to the time order.

Figure 55:
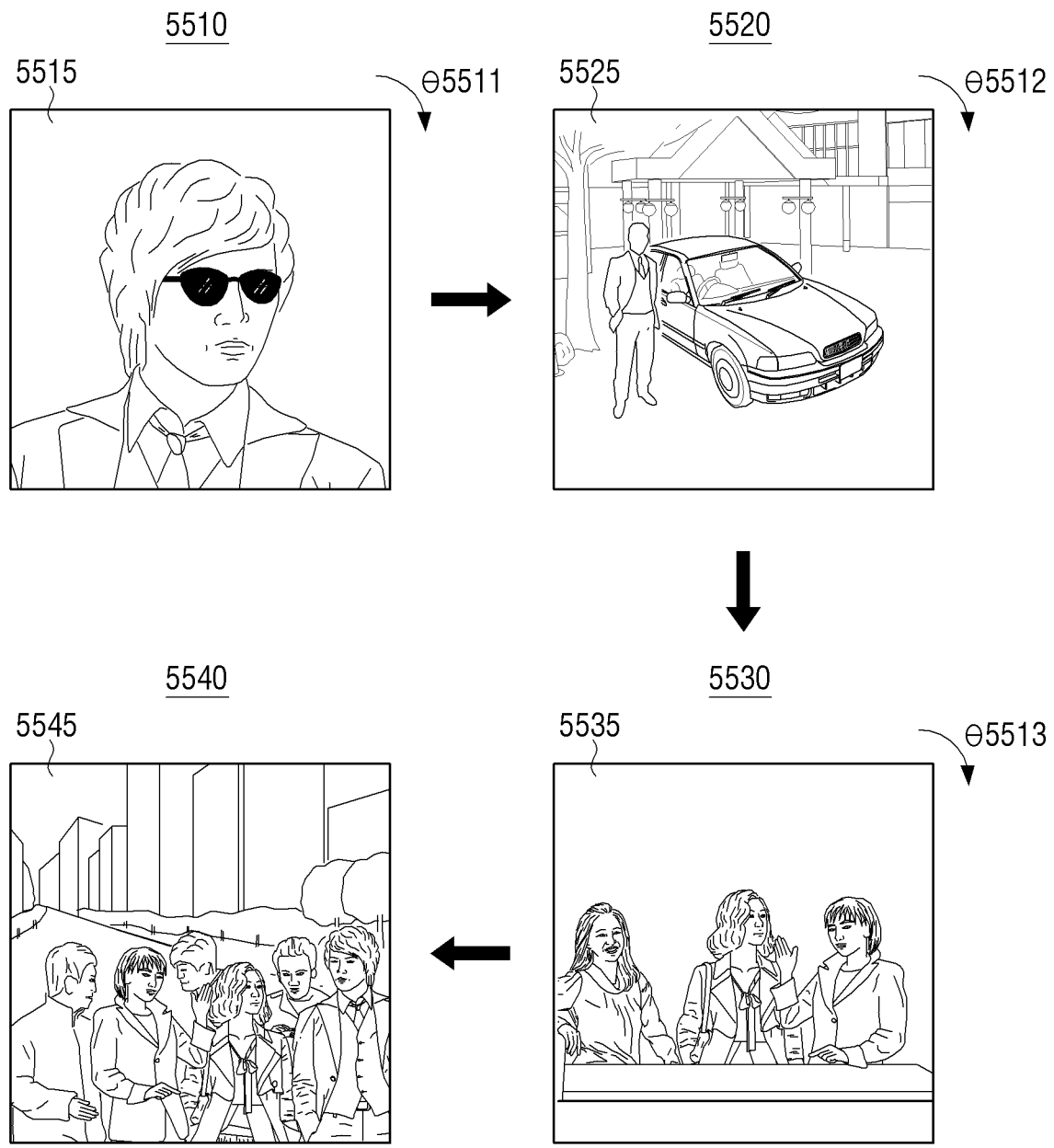

FIG. 55 is a view illustrating various functions of a user terminal device based on a rotation interaction according to yet another exemplary embodiment.

As illustrated in 5510 of FIG. 55, the controller 290 may control the display 230 to display on a display screen a photo 5515 which is provided by a gallery application. The photo 5515, for example, may be a self-photo which photographs a user. At this time, the rotation detector 284 may detect a size of a rotation angle θ 5511 as the user terminal device 200 is rotated in a clockwise direction. The rotation angle θ 5511 may be between 80° and 100°.

When the rotation detector 284 detects a rotation angle θ 5511 in a clockwise direction, as illustrated in 5520 of FIG. 55, the controller 290 may control the display 230 to display another photo 5525 on a display screen. This other photo 5525 may be a photo in which a minimum number of people (for example, 1 person) is photographed. The rotation detector 284 may detect a rotation angle θ 5512, while the user terminal device 200 is rotated in a clockwise direction. The rotation angle θ 5512 may be between 80° and 100°.

When the rotation detector 284 detects a rotation angle θ 5512 in a clockwise direction, as illustrated in 5530 of FIG. 55, the controller 290 may control the display 230 to display on a display screen yet another photo 5535. This other photo 5535 may be a photo in which a small number of people (for example, less than 5 people) are photographed. The rotation detector 284 may detect a rotation angle θ 5513, as the user terminal device 200 is rotated in a clockwise direction. The rotation angle θ 5513 may be between 80° and 100°.

When the rotation detector 284 detects a rotation angle θ 5513 in a clockwise direction, as illustrated in 5540 of FIG. 55, the controller 290 may control the display 230 to display on a display screen yet another photo 5545. This other photo 5545 may be a photo in which many people (for example, more than 5 people) are photographed.

As described above, as the user terminal device 200 is rotated in a clockwise direction, the controller 290 may search for a photo which gradually includes a larger number of people and display a searched photo on a display screen.

In an exemplary embodiment described above, when a gallery application is executed, a filtered photo based on a number of people is displayed, as the user terminal device 200 is rotated. However, this is merely an example, and a filtered photo based on other conditions (such as, a date of photographing, a place of photographing, etc.) may be displayed.

Figure 56:
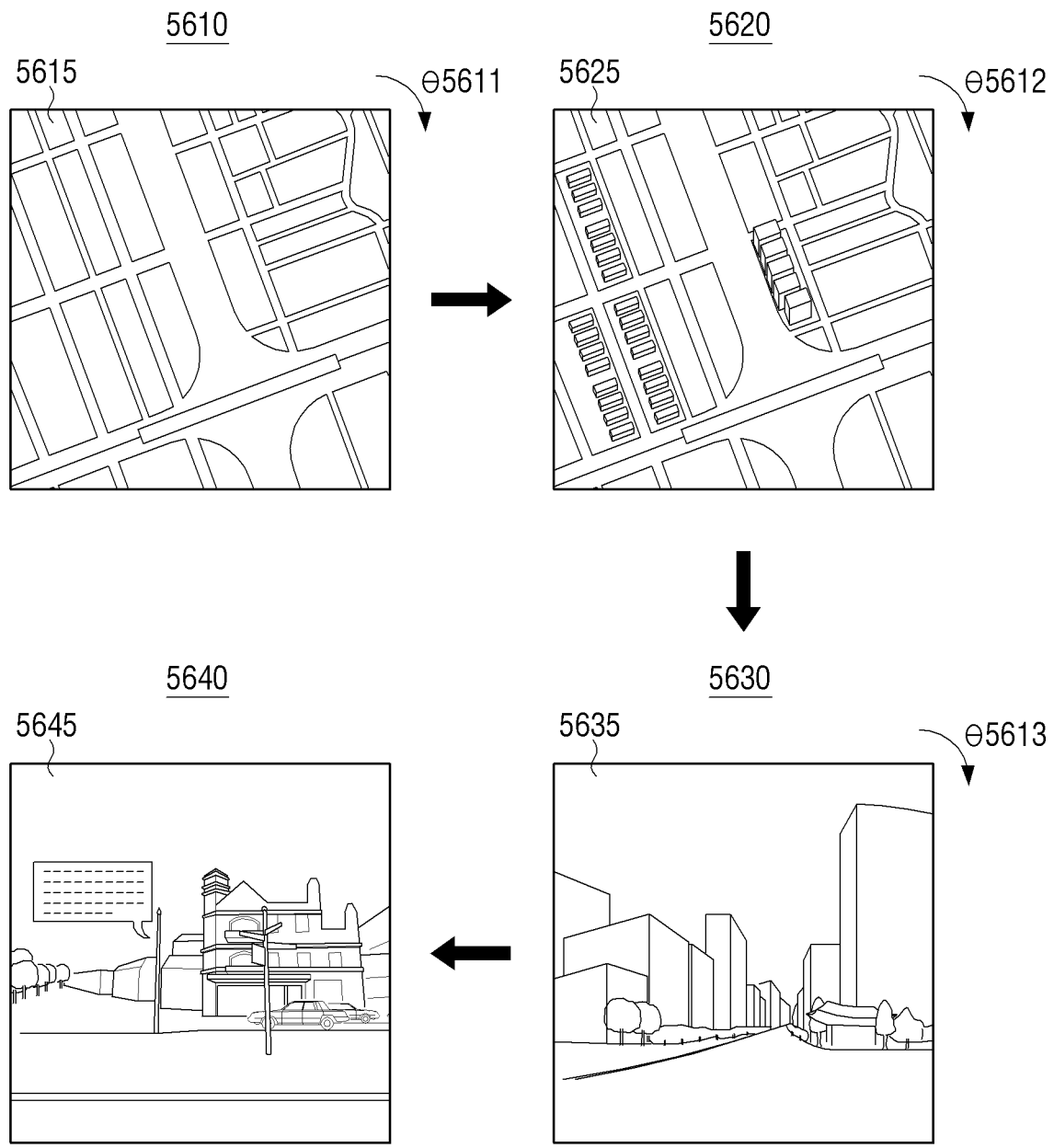

FIG. 56 is a view illustrating various functions of a user terminal device based on a rotation interaction according to yet another exemplary embodiment.

As illustrated in 5610 of FIG. 56, the controller 290 may control the display 230 to display a map 5615 provided by a map application on a display screen. The map 5615, for example, may be a two dimensional map. At this time, the rotation detector 284 may detect a rotation angle θ 5611, as the user terminal device 200 is rotated in a clockwise direction. The rotation angle θ 5611 may be between 80° and 100°.

When the rotation detector 284 detects a rotation angle θ 5611 in a clockwise direction, as illustrated in 5620 of FIG. 56, the controller 290 may control the display 230 to display on a display screen another map 5625. This other map 5625, for example, may be a three dimensional map which is photographed from the sky. The rotation detector 284 may detect a rotation angle θ 5612, as the user terminal device 200 is rotated in a clockwise direction. The rotation angle θ 5612 may be between 80° and 100°.

When the rotation detector 284 detects a rotation angle θ 5612 in a clockwise direction, as illustrated in FIG. 56, the controller 290 may control the display 230 to display yet another map 5635 on a display screen. This other map 5635, for example, may be a street view which photographs views of a street in three dimensions. The rotation detector 284 may detect a rotation angle θ 5613 as the user terminal device 200 is rotated in a clockwise direction. The rotation angle θ 5613 may be between 80° and 100°.

When the rotation detector 284 detects a rotation angle θ 5613 in a clockwise direction, as illustrated in 5640 of FIG. 56, the controller 290 may control the display 230 to display yet another map 5645 on a display screen. This other map 5645 may be augmented reality map which displays view of a street and is overlapped with information.

Figure 57:
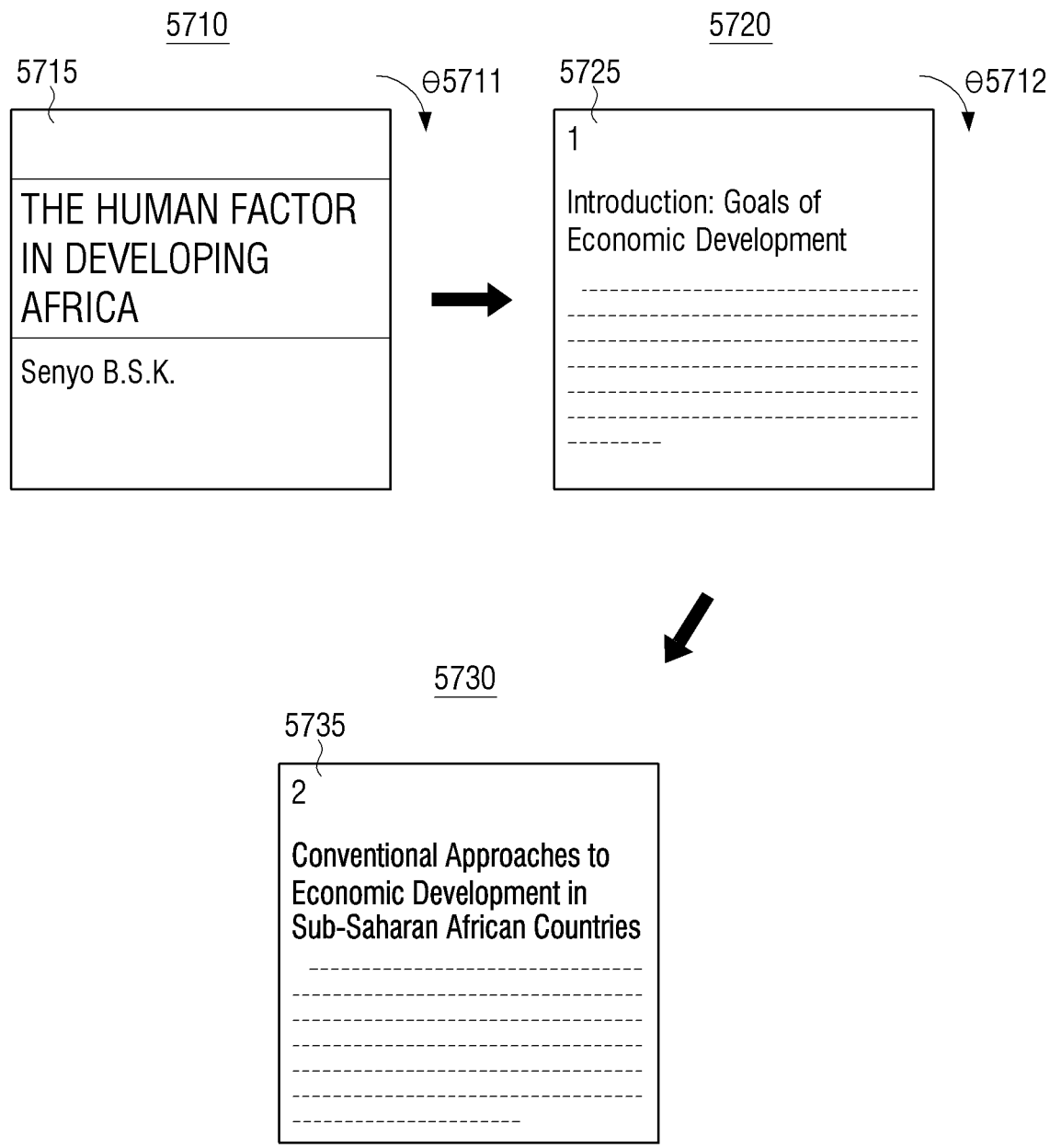

FIG. 57 is a view illustrating various functions of a user terminal device based on a rotation interaction according to yet another exemplary embodiment.

As illustrated in 5710 of FIG. 57, the controller 290 may control the display 230 to display on a display screen a page 5715 of a book which is provided by an e-book application. At this time, the rotation detector 284 may detect a rotation angle θ 5711 of the user terminal device 200 which is rotated in a clockwise direction. The rotation angle θ 5711 may be between 80° and 100°.

When the rotation detector 284 detects a rotation angle θ 5711 in a clockwise direction, the controller 290 may control the display 230 to display on a display screen one page 5725 of a next chapter of the book, title page of which, page 5715 that was previously displayed. When the rotation detector 284 keeps detecting a rotation angle θ 5712 in a clockwise direction, the controller 290 may control the display 230 on a display screen to display page 5735 of a next chapter with respect to the chapter of page 5725 that was previously displayed.

In addition, the controller 290 may control the display 230 to change a chapter of a book as the rotation detector 284 detects a rotation in a clockwise direction, and display a page with a bookmark or a page of another book which is provided by the e-book application.

Figure 58:
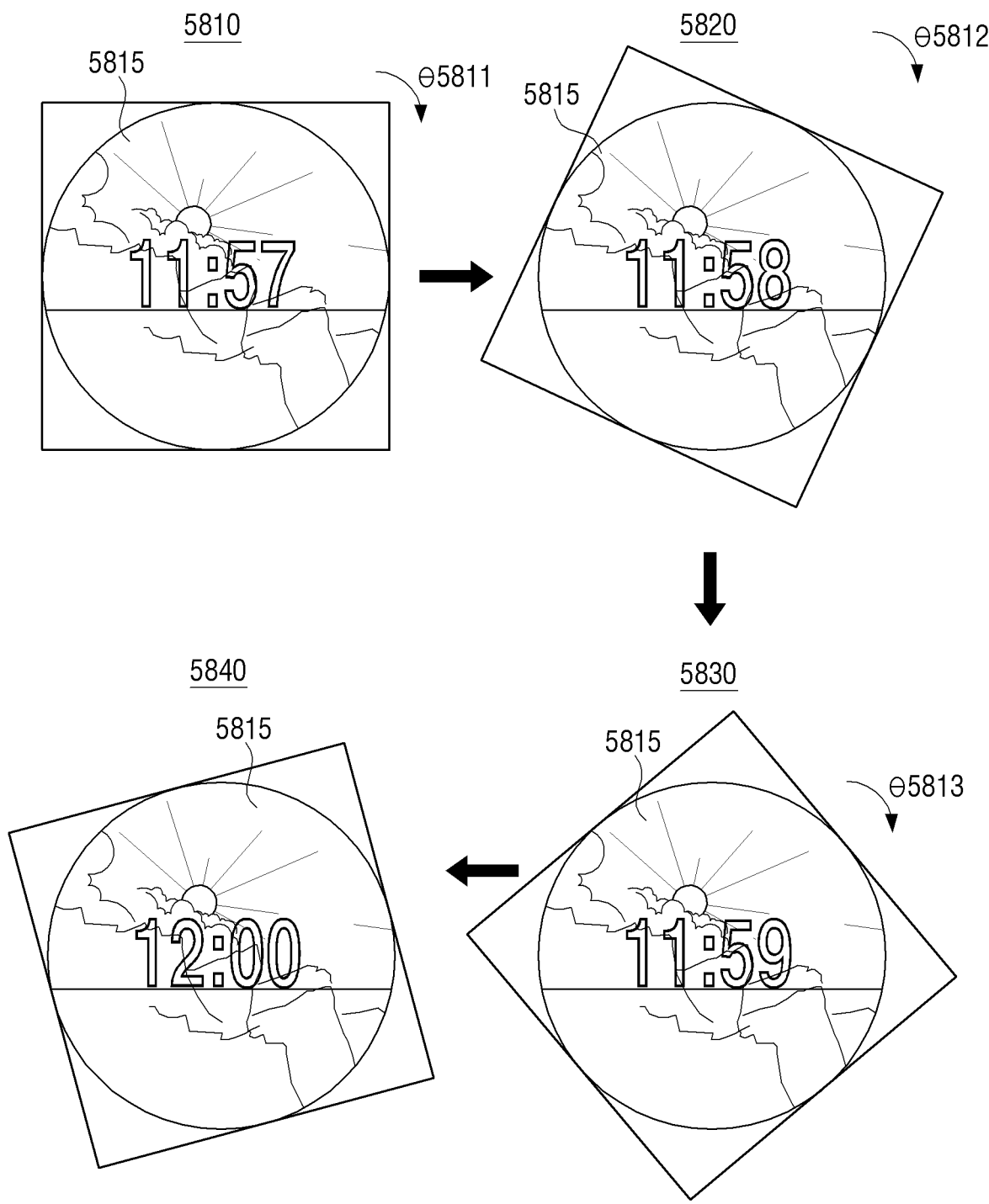
Figure 59:
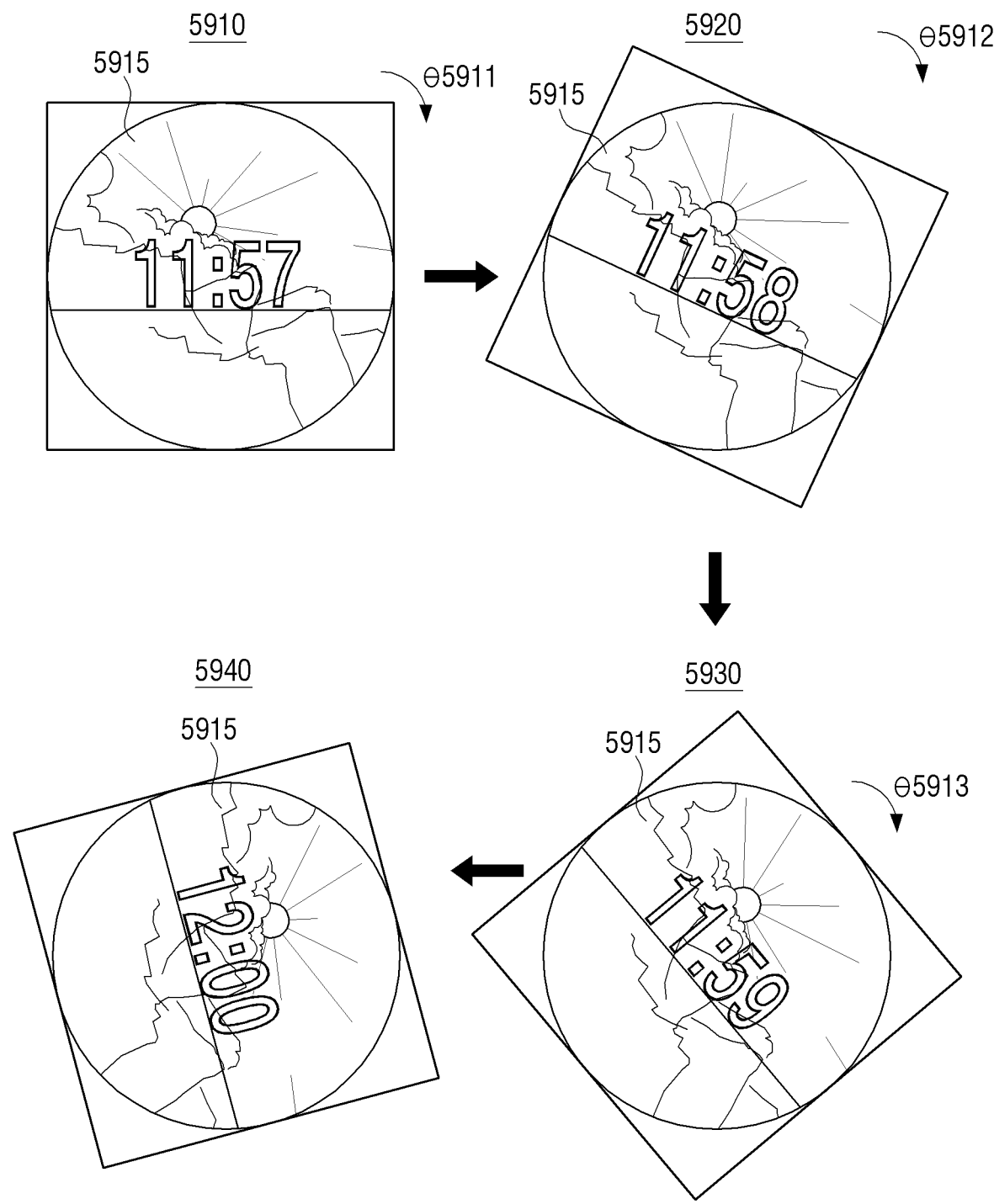
Figure 60:
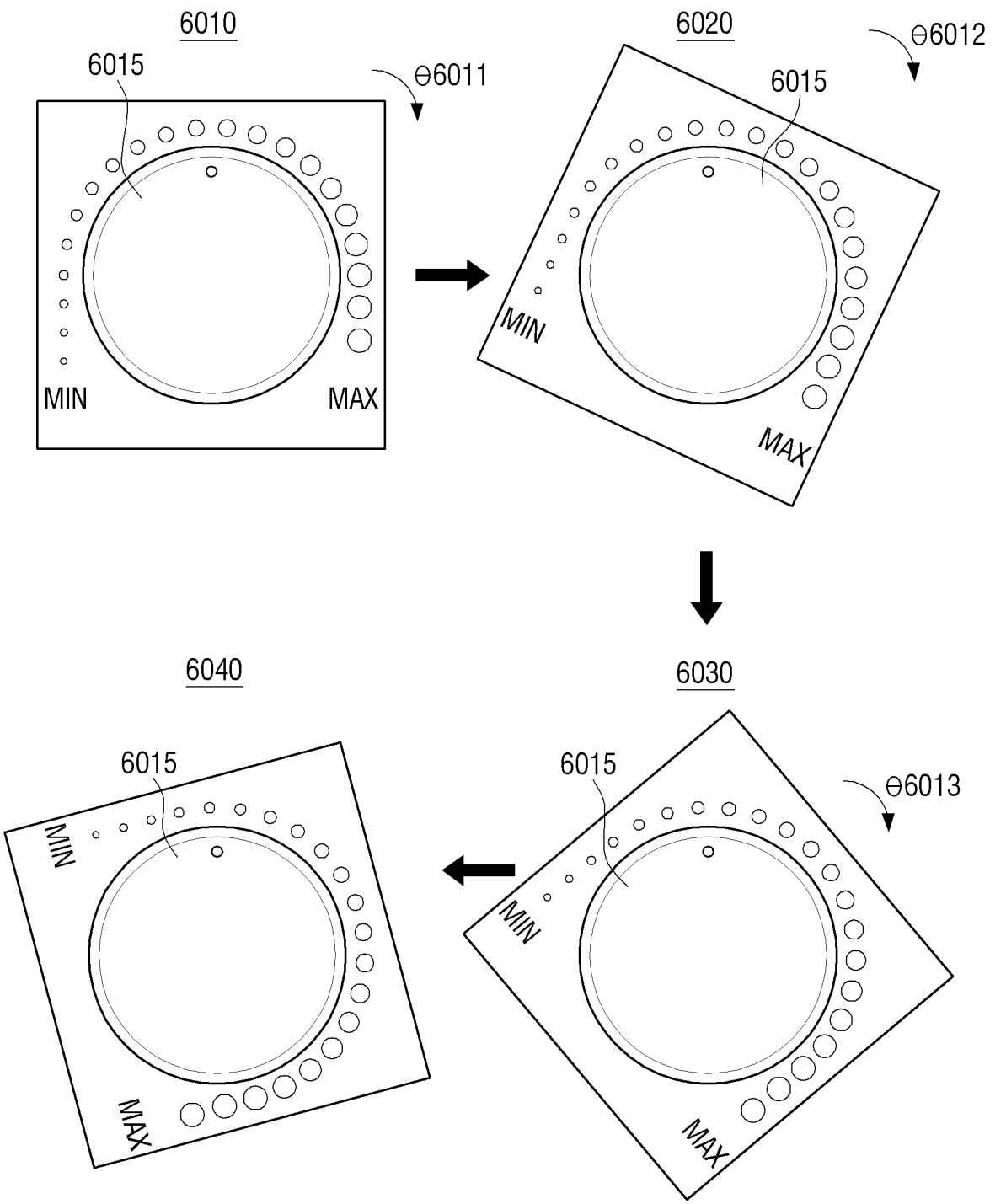

FIGS. 58-60 are views illustrating various functions of a user terminal device based on a rotation interaction according to yet another exemplary embodiment.

Referring to FIGS. 58-60, the controller 290 may control the display 230 to display a first screen in a circular shape on a display screen. At this time, the first screen in a circular shape may be suitable for a function which is continued without separation of starting or ending. In particular, the circular shape may be used for a function to adjust a changing value according to adjustment of brightness, volume, or time which changes according to a rotation direction and a rotation degree.

For example, as illustrated in 5810 of FIG. 58, the controller 290 may control the display 230 to display time which is provided by an alert application on a first screen 5815. At this time, the rotation detector 284 may detect a rotation angle θ 5811, as the user terminal device 200 is rotated in a clockwise direction.

When the rotated angle θ 5811 is greater than a certain degree, as illustrated in 5820 of FIG. 58, the controller 290 may control the display 230 to increase time provided by the alert application and displayed in the first screen 5815.

When the rotation detector 284 keeps detecting rotation angles θ 5812 and θ 5813 of the user terminal device 200, as illustrated in 5830 and 5840 of FIG. 58, respectively, the controller 290 may control the display 230 to increase time provided by the alert application and displayed in the first screen 5815.

In this case, the controller 290 may control the display 230 to keep rotating the first screen 5815 in a counterclockwise direction and display the first screen based on the detected rotation angles θ 5811, θ 5812, and θ 5813. In other words, the controller 290 may control the display 230 so that location of the first screen 5815 is seen as if the first screen is fixed, while the user terminal device 200 is rotated.

As illustrated in 5910 of FIG. 59, according to another exemplary embodiment, the controller 290 may control the display 230 to display time provided by the alert application in a first screen 5915. At this time, when the rotation detector 284 detects rotation angles θ 5911, θ 5912, and θ 5913 of the user terminal device 200, as illustrated in 5920-5940 of FIG. 59, the controller 290 may control the display 230 to increase time provided by the alert application and displayed in the first screen 5915. In this case, the controller 290 may control the display 230 to display the first screen 5915 on a display screen and rotating the screen with respect to the detected rotation angle on the display screen.

As illustrated in 6010 of FIG. 60, according to yet another exemplary embodiment, the controller 290 may control the display 230 to display a volume control button in a first screen 6015. In this case, as the rotation detector 284 detects rotation angles θ 6011, θ 6012, and θ 6013 of the user terminal device 200, as illustrated in 6020 to 6040 of FIG. 60, the controller 290 may control the audio processor 260 or the speaker 270 to gradually increase or decrease volume. In addition, the controller 290 may control the display 230 to keep rotating and displaying the first screen 6015 based on the rotation angles θ 6011, θ 6012, and θ 6013 in a clockwise direction. In other words, the controller 290, while the user terminal device 200 is rotated, may control the display 230 so that the location of the first screen 6015 is seen to be fixed to a user, while the volume control dial is rotated.

Figure 63:
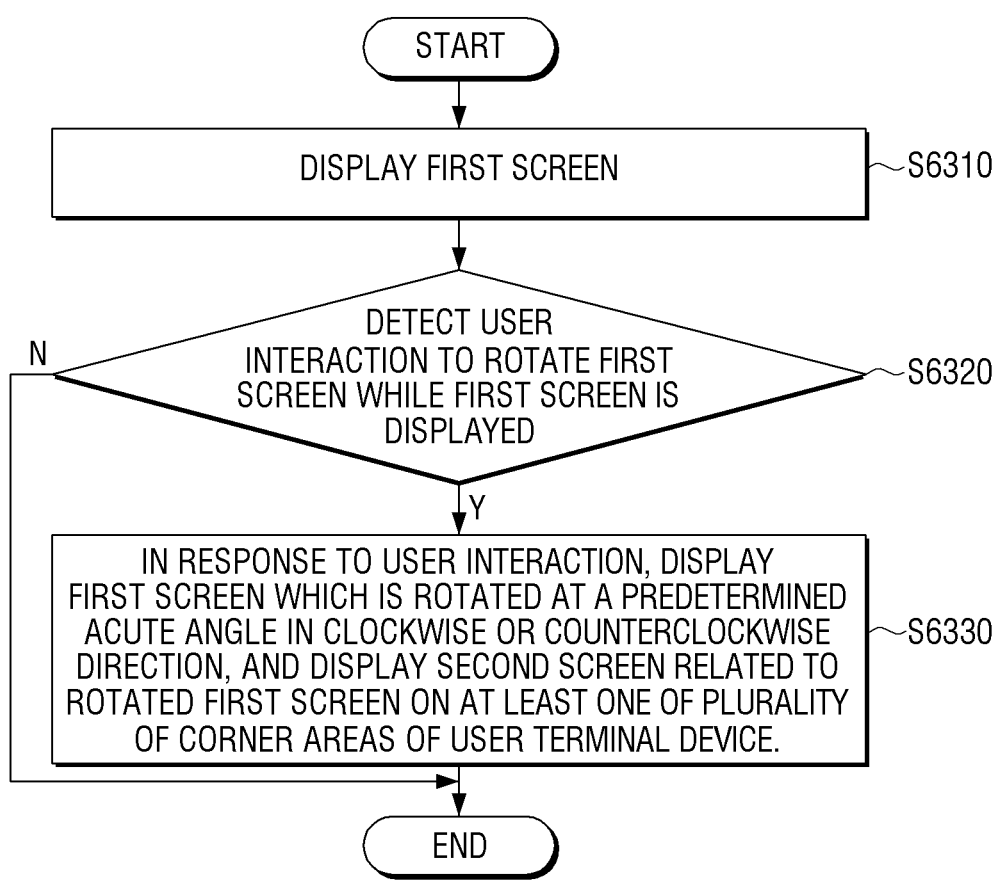
Figure 64:
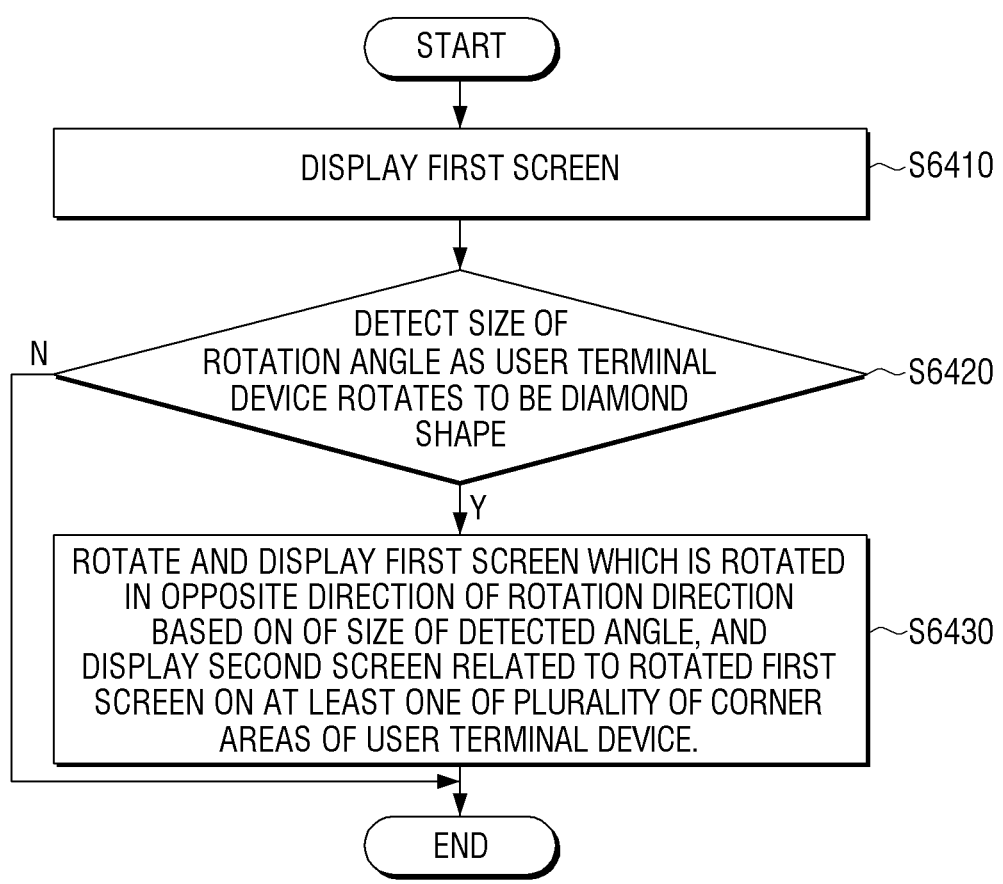

Hereinafter, FIGS. 63-65 are flowcharts illustrating methods for displaying on a user terminal device according to exemplary embodiments.

FIG. 63 is a flowchart illustrating a method for displaying on a user terminal device based on a rotation interaction according to an exemplary embodiment.

The user terminal device 200 may display a first screen (in operation S6310).

Then, the user terminal device 200, while the first screen is displayed, may detect a user interaction to rotate the first screen (in operation S6320). For example, the user terminal device 200 may detect one of a user interaction to rotate the user terminal device 200 in a clockwise or a counterclockwise direction so that the user terminal device 200 is in a diamond shape, a user interaction to touch and drag a display screen in which the first screen is displayed in a clockwise or a counterclockwise direction, or a user interaction to drag at least one side of a bezel of the user terminal device.

When a size of a user interaction is detected (in operation S6320-Y), the user terminal device 200 may display the first screen which is rotated at a predetermined acute angle in a clockwise or counterclockwise direction, and display a second screen which is related to the rotated first screen on at least one of a plurality of corner areas of the user terminal device 200 (in operation S6330).

FIG. 64 is a flowchart illustrating a method for displaying on a user terminal device based on a rotation interaction according to yet another exemplary embodiment.

The user terminal device 200 may display the first screen (in operation S6410).

Then, the user terminal device 200 may detect a size of a rotation angle, as the user terminal device 100 is rotated, to be a diamond shape (in operation S6420). For example, when a user rotates the user terminal device 200 in a clockwise or counterclockwise direction, the user terminal device 200 may detect the size of a rotation angle in a clockwise or counterclockwise direction.

When the size of a rotation angle is sensed (S6420-Y), the user terminal device 200 may rotate and display the first screen in an opposite direction of the rotation direction based on the size of a detected angle, and display a second screen related to the first screen in at least one of a plurality of corner areas of the user terminal device 200 (in operation 6430).

FIG. 65 is a flowchart illustrating a method for displaying on a user terminal device based on a rotation interaction according to yet another exemplary embodiment.

The user terminal device 200 may display a first image content on a display screen (in operation S6510).

Then, the user terminal device 200 may detect a user interaction on a display screen (in operation S6520).

When a user interaction is detected (in operation S6520-Y), the user terminal device 200 may determine whether the first screen is rotated at a predetermined acute angle in a clockwise or counterclockwise direction (in operation S6530).

When the first screen is rotated at a predetermined acute angle, the user terminal device 200 may display a second screen instead of the first screen (in operation S6540).

On the other hand, when the first screen is not rotated, the user terminal device 200 may display a third screen instead of the first screen (in operation S6550). In this case, the first to the third screen may be different from each other.

As another exemplary embodiment, the user terminal device 200 may determine before detecting a user interaction that whether or not the first screen is rotated at a predetermined acute angle in a clockwise or counterclockwise direction. When a user interaction is detected, a second screen or a third screen may be displayed according to a determined result.

FIG. 66 is a flowchart illustrating a method for displaying on a user terminal device based on a rotation interaction according to yet another exemplary embodiment.

The user terminal device 200 may display a first image content on a display screen (in operation S6610).

The user terminal device 200 may detect a user interaction on a display screen (in operation S6620).

When a user interaction is detected (in operation S6420-Y), the user terminal device 200 may determine whether the user terminal device 200 is rotated to be a diamond shape (in operation S6630).

When the user terminal device 200 is not rotated to a diamond shape, the user terminal device 200 may display a second image content which is different from the first image content (in operation S6640). In this case, the second image content, for example, may be an image content of a playlist or a folder which is the same as the first image content.

When the user terminal device 200 is rotated to be a diamond shape, the user terminal device 200 may display a third image content which is different from the first image content (in operation S6650). In this case, the third image content, for example, may be an image content of a playlist or a folder which is different from the first image content.

As another exemplary embodiment, the user terminal device 200 may predetermine, before detecting a user interaction, that whether or not the user terminal device 200 is rotated to be a diamond shape. In addition, when a user interaction is detected, a second image content which is different from the first image content, or a third image content which is different from the first image content may be displayed according to a determined result.

As described above, according to various exemplary embodiments, a user may perform various functions using a user terminal device which has a display panel in a square shape. Accordingly, user convenience and satisfaction may be improved.

In addition, a method for displaying on a user terminal device according to various exemplary embodiments may be realized as a software program and provided to a user terminal device via wireless or wired transmission. To be specific, a non-transitory computer readable medium in which a program which includes a method of controlling a terminal device is stored therein may be provided.

The non-transitory computer-recordable medium is not a medium configured to temporarily store data such as a register, a cache, or a memory but an apparatus-readable medium configured to semi-permanently store data. Specifically, the above-described various applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and then provided to a user terminal device.

The foregoing exemplary embodiments are merely exemplary and are not to be construed as limiting. Exemplary embodiments can be readily applied to other types of devices or apparatuses. Also, the description of exemplary embodiments is intended to be illustrative, and not to limit the scope of an inventive concept, and many alternatives, modifications, and variations will be apparent to those skilled in the art and may be made therein without departing from the spirit and scope of the present disclosure as defined by the appended claims and their equivalents.

What is claimed is:

1. A method of displaying a first screen on a user terminal device, the method comprising:
    displaying a first content of a first application on the first screen on a display of the user terminal device based on the first application being run by the user terminal device;
    detecting a first user interaction to rotate the user terminal device while the first screen is displayed;
    rotating the first screen based on detecting the first user interaction;
    displaying the rotated first screen that includes a square shape in a middle of a plurality of discrete corner areas of the display of the user terminal device which are formed as a result of the rotating of the user terminal device;
    displaying, on the plurality of discrete corner areas, a plurality of second screens that each includes a triangle shape;
    displaying, on the plurality of second screens, a plurality of second application icons, of second applications of the user terminal device that are related to the first content on the first screen and that are different than the first application, that were previously non-displayed before the rotating of the user terminal device;
    detecting a second user interaction that flicks or drags from a second screen having a second application icon of the displayed plurality of second application icons towards the rotated first screen;
    displaying, on the rotated first screen, a second content of a second application that corresponds to the second application icon based on detecting the second user interaction, and based on the second application being run by the user terminal device;
    displaying, on the second screen, a first application icon of the first application based on displaying the second content of the second application on the rotated first screen;
    detecting a third user interaction that rotates the user terminal device while the first screen and the second screen are displayed;
    rotating the first screen based on the detecting the third user interaction;
    displaying the first screen on a full area of the display of the user terminal device based on rotating the user terminal device and based on the detecting the third user interaction;
    displaying the second content of the second application on the first screen; and
    displaying a third screen, on a corner area of the display, including information related to the first application to indicate that the first application is being run by the user terminal device.

2. The method of claim 1, wherein, rotating the first screen comprises rotating the first screen at a predetermined angle in a clockwise or counterclockwise direction, based on detecting the first user interaction and wherein an area of the rotated first screen is smaller than an area of the displayed first screen before rotating the first screen.

3. The method of claim 2, wherein the predetermined angle is between 40 degrees and 50 degrees.

4. The method of claim 1, wherein the first user interaction is one of:
    a user interaction to rotate the user terminal device in a clockwise or a counterclockwise direction so that the user terminal device is in a diamond shape,
    a user interaction to touch the display in which the first screen is displayed at a touch point and then drag from the touch point of the display in the clockwise or the counterclockwise direction, and a user interaction to drag at least one side of a bezel of the user terminal device.

5. The method of claim 1, wherein each second screen, of the plurality of second screens, includes an isosceles triangle shape, and wherein the rotated first screen shares a side with each second screen of the plurality of second screens.

6. The method of claim 1, wherein, in response to an image content being displayed in the rotated first screen, a plurality of functions related to the image content is displayed in the plurality of second screens.

7. The method of claim 1, wherein, in response to an image content being displayed in the rotated first screen, at least a part of another image content of an image content list, which comprises the image content, is displayed in a second screen of the plurality of second screens.

8. The method of claim 1, wherein, in response to the first application being displayed in the rotated first screen, the plurality of second application icons of second applications related to the first application are displayed in the plurality of second screens.

9. The method of claim 1, further comprising:
detecting a fourth user interaction to drag at least one side of the display of the user terminal device or at least one side of a bezel of the user terminal device;
determining at least one of a dragging amount and a direction of the fourth user interaction; and
changing a size of the rotated first screen based on at least one of the determined dragging amount and the determined direction.

10. The method of claim 1, wherein the first user interaction includes a touch and rotate interaction with respect to the touched display screen.

11. The method of claim 1, wherein, in response to rotating the first screen, the plurality of discrete corner areas is formed on the display of the user terminal device and wherein the plurality of second screens is displayed in the plurality of discrete corner areas formed by rotating the first screen.

12. A user terminal device, comprising:
a display configured to display a first content of a first application on a first screen, based on the first application being run by the user terminal device;
a detector; and
a controller configured to:
control the display to rotate the first screen based on a first user interaction to rotate the user terminal device while the display displays the first screen detected by the detector;
control the display to display the rotated first screen that includes a square shape in a middle of a plurality of discrete corner areas of the display of the user terminal device which are formed as a result of the rotating of the user terminal device;
control the display to display, on the plurality of discrete corner areas, a plurality of second screens that each includes a triangle shape;
control the display to display, on the plurality of second screens, a plurality of second application icons, of second applications of the user terminal device that are related to the first content on the first screen and that are different than the first application, that were previously non-displayed before the rotating of the user terminal device;
control the display to display, on the rotated first screen, a second content of a second application that corresponds to a second application icon based on a second user interaction that flicks or drags from a second screen having second application icon of the second application towards the rotated first screen detected by the detector, and based on the second application being run by the user terminal device;
control the display to display, on the second screen, a first application icon of the first application based on displaying the second content of the second application on the rotated first screen;
control the display to rotate the first screen, based on a third user interaction to rotate the user terminal device while the first screen and the second screen are displayed detected by the detector;
control the display to display the first screen on a full area of the display of the user terminal device based on rotating the user terminal device and based on the detected third user interaction;
control the display to display the second content of the second application on the first screen; and
control the display to display a third screen, on a corner area of the display, including information related to the first application to indicate that the first application is being run by the user terminal device.

13. The user terminal device of claim 12, wherein the controller is configured to rotate the first screen at a predetermined angle in a clockwise or counterclockwise direction, based on the first user interaction and wherein an area of the rotated first screen is smaller than an area of the displayed first screen before the first screen is rotated.

14. The user terminal device of claim 13, wherein the predetermined angle is between 40 degrees and 50 degrees.

15. The user terminal device of claim 12, wherein the first user interaction is one of:
a user interaction to rotate the user terminal device in a clockwise or a counterclockwise direction so that the user terminal device is in a diamond shape,
a user interaction to touch the display in which the first screen is displayed at a touch point and then drag from the touch point of the display in the clockwise or the counterclockwise direction, and
a user interaction to drag at least one side of a bezel of the user terminal device.

16. The user terminal device of claim 12, wherein each second screen of the plurality of second screens includes an isosceles triangle shape, and
wherein the rotated first screen shares a side with each second screen of the plurality of second screens.

17. The user terminal device of claim 12, wherein, in response to an image content being displayed in the rotated first screen, a plurality of functions related to the image content is displayed in the plurality of second screens.

18. The user terminal device of claim 12, wherein, in response to an image content being displayed in the rotated first screen, at least a part of another image content of an image content list comprising the image content, is displayed in a second screen of the plurality of second screens.

19. The user terminal device of claim 12, wherein, in response to the first application being displayed on the rotated first screen, the second application icons of second applications related to the first application are displayed on the plurality of second screens.

20. The user terminal device of claim 12, wherein the detector is configured to detect a fourth user interaction to drag at least one side of the display or at least one side of a bezel of the user terminal device, and
  wherein the controller is configured to:
    determine at least one of a dragging amount and a direction of the fourth user interaction, and
    control the display to change a size of the rotated first screen according to the determined dragging amount or the determined direction of the fourth user interaction.

* * * * *